US008272943B2

(12) United States Patent
Saito et al.

(10) Patent No.: US 8,272,943 B2
(45) Date of Patent: Sep. 25, 2012

(54) SLOT MACHINE EXECUTING FREE GAME AND SLOT MACHINE THAT INCREASES THE NUMBER OF DISPLAYED SPECIAL SYMBOLS

(75) Inventors: Hiroki Saito, Tokyo (JP); Kazumasa Yoshizawa, Tokyo (JP); Fumiya Abe, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 340 days.

(21) Appl. No.: 12/569,505

(22) Filed: Sep. 29, 2009

(65) Prior Publication Data

US 2010/0087243 A1 Apr. 8, 2010

Related U.S. Application Data

(60) Provisional application No. 61/103,812, filed on Oct. 8, 2008, provisional application No. 61/103,976, filed on Oct. 9, 2008, provisional application No. 61/104,013, filed on Oct. 9, 2008.

(51) Int. Cl.
*A63F 9/24* (2006.01)
*A63F 13/00* (2006.01)

(52) U.S. Cl. ........................................ 463/20; 463/30

(58) Field of Classification Search .................... 463/20, 463/30

See application file for complete search history.

(56) References Cited

U.S. PATENT DOCUMENTS

| | | | | |
|---|---|---|---|---|
| 6,012,983 | A | 1/2000 | Walker et al. | |
| 6,089,976 | A * | 7/2000 | Schneider et al. | 463/16 |
| 6,093,102 | A | 7/2000 | Bennett | |
| 6,960,133 | B1 | 11/2005 | Marks et al. | |
| 2002/0025848 | A1* | 2/2002 | Graham et al. | 463/25 |
| 2005/0101376 | A1* | 5/2005 | Walker et al. | 463/25 |
| 2006/0084498 | A1 | 4/2006 | Baerlocher et al. | |
| 2006/0264254 | A1 | 11/2006 | Aoki | |
| 2007/0149268 | A1* | 6/2007 | Gauselmann | 463/16 |
| 2008/0070673 | A1 | 3/2008 | Bennett | |
| 2008/0076527 | A1* | 3/2008 | Low et al. | 463/25 |
| 2008/0119282 | A1* | 5/2008 | Bennett | 463/42 |
| 2008/0318657 | A2* | 12/2008 | Okada | 463/20 |
| 2009/0017906 | A1* | 1/2009 | Jackson | 463/26 |
| 2011/0053675 | A1* | 3/2011 | Aoki et al. | 463/20 |

FOREIGN PATENT DOCUMENTS

AU 200119729 9/2001

* cited by examiner

*Primary Examiner* — Peter DungBa Vo
*Assistant Examiner* — Nicholas Ditoro
(74) *Attorney, Agent, or Firm* — Sheppard, Mullin, Richter & Hampton LLP

(57) ABSTRACT

According to a slot machine of the present invention, a first specific number of free games are executed when a first predetermined condition is established in a normal game. Further, a second specific number of free games are executed, when a second predetermined condition is established. Furthermore, when the first predetermined condition is established in the free game executed triggered by the establishment of the second predetermined condition, a third specific number of free games are further executed after the second specific number of free games are executed. Here, the third specific number is larger than the first specific number.

12 Claims, 94 Drawing Sheets

FIG. 5

| | | First array | Second array | Third array | Fourth array | Fifth array |
|---|---|---|---|---|---|---|
| Code No. | Random number value | Symbol | Symbol | Symbol | Symbol | Symbol |
| 00 | 0~3277 | J | WILD | A | Q | J |
| 01 | 3278~6555 | Q | A | J | J | A |
| 02 | 6556~9833 | FLOWER1 | Q | FLOWER1 | FLOWER1 | FLOWER1 |
| 03 | 9834~13111 | J | WILD | 10 | Q | J |
| 04 | 13112~16389 | Q | WILD | FLOWER2 | K | A |
| 05 | 16390~19667 | FLOWER2 | WILD | FLOWER1 | FLOWER1 | FISH |
| 06 | 19668~22945 | A | FISH | FEATURE | A | FLOWER2 |
| 07 | 22946~26223 | BIRD | BIRD | A | K | FEATURE |
| 08 | 26224~29501 | 10 | K | J | 9 | K |
| 09 | 29502~32779 | 9 | FLOWER2 | 9 | Q | 9 |
| 10 | 32780~36057 | A | WILD | A | BIRD | Q |
| 11 | 36058~39335 | Q | A | Q | 10 | FLOWER1 |
| 12 | 39336~42613 | 10 | 9 | BIRD | FEATURE | K |
| 13 | 42614~45891 | FLOWER2 | BIRD | K | K | BIRD |
| 14 | 45892~49169 | K | J | FISH | 10 | 10 |
| 15 | 49170~52447 | A | WILD | Q | BIRD | J |
| 16 | 52448~55725 | WILD | 10 | FEATURE | A | WILD |
| 17 | 55726~59003 | J | FLOWER1 | A | WILD | WILD |
| 18 | 59004~62281 | Q | WILD | WILD | FISH | WILD |
| 19 | 62282~65535 | FISH | FEATURE | WILD | FLOWER2 | Q |

(Range of random number value:0~65535)

FIG. 7

| Symbol | Number of rearranged symbols | | | |
|---|---|---|---|---|
| | Two symbols | Three symbols | Four symbols | Five symbols |
| 10 | 2 | 4 | 6 | 8 |
| J | 3 | 6 | 9 | 12 |
| Q | 30 | 60 | 90 | 120 |
| K | 10 | 20 | 30 | 40 |
| FLOWER1 | 5 | 10 | 15 | 20 |
| FLOWER2 | 8 | 16 | 24 | 32 |
| BIRD | 15 | 30 | 45 | 60 |
| FISH | 25 | 50 | 75 | 100 |
| FEATURE | Free game (※) | | | |

※Free game is played when three or more symbols are rearranged.

FIG. 13

Table for determining the number of to-be-added special symbols

| Number of to-be-added special symbols | Random number value |
|---|---|
| 10 | 0～13106 |
| 20 | 13107～26214 |
| 30 | 26215～39321 |
| 40 | 39322～52428 |
| 50 | 52429～65535 |

(Range of random number value:0～65535)

FIG. 15

Symbol-array determination table

| Symbol array No. | Random number value |
|---|---|
| 1 | 0~13106 |
| 2 | 13107~26214 |
| 3 | 26215~39321 |
| 4 | 39322~52428 |
| 5 | 52429~65535 |

(Range of random number value:0~65535)

FIG. 16

Code-number determination table

| Random number value | Code No. |
|---|---|
| 0～2978 | 00 |
| 2979～5957 | 01 |
| 5958～8936 | 02 |
| 8937～11915 | 03 |
| 11916～14894 | 04 |
| 14895～17873 | 05 |
| 17874～20852 | 06 |
| 20853～23831 | 07 |
| 23832～26810 | 08 |
| 26811～29789 | 09 |
| 29790～32768 | 10 |
| 32769～35747 | 11 |
| 35748～38726 | 12 |
| 38727～41705 | 13 |
| 41706～44684 | 14 |
| 44685～47663 | 15 |
| 47664～50642 | 16 |
| 50643～53621 | 17 |
| 53622～56600 | 18 |
| 56601～59579 | 19 |
| 59580～62558 | 20 |
| 62559～65535 | End |

FIG. 17A

| First array | | | Second array | | | Third array | | |
|---|---|---|---|---|---|---|---|---|
| Code No. | Random number value | Symbol | Code No. | Random number value | Symbol | Code No. | Random number value | Symbol |
| 00 | 0~2849 | J | 00 | 0~3119 | WILD | 00 | 0~2978 | A |
| 01 | 2850~5700 | Q | 01 | 3120~6240 | A | 01 | 2979~5957 | J |
| 02 | 5701~8551 | FLOWER1 | 02 | 6241~9361 | Q | 02 | 5958~8936 | FLOWER1 |
| 03 | 8552~11402 | J | 03 | 9362~12482 | WILD | 03 | 8937~11915 | 10 |
| 04 | 11403~14253 | Q | 04 | 12483~15603 | WILD | 04 | 11916~14894 | FLOWER2 |
| 05 | 14254~17104 | FLOWER2 | 05 | 15604~18723 | WILD | 05 | 14895~17873 | FLOWER1 |
| 06 | 17105~19955 | A | 06 | 18724~21844 | FISH | 06 | 17874~20852 | WILD |
| 07 | 19956~22806 | BIRD | 07 | 21845~24965 | BIRD | 07 | 20853~23831 | FEATURE |
| 08 | 22807~25657 | 10 | 08 | 24966~28086 | K | 08 | 23832~26810 | A |
| 09 | 25658~28508 | 9 | 09 | 28087~31207 | FLOWER2 | 09 | 26811~29789 | J |
| 10 | 28509~31359 | A | 10 | 31208~34328 | WILD | 10 | 29790~32768 | 9 |
| 11 | 31360~34210 | Q | 11 | 34329~37449 | A | 11 | 32769~35747 | A |
| 12 | 34211~37061 | 10 | 12 | 37450~40570 | WILD | 12 | 35748~38726 | Q |
| 13 | 37062~39912 | WILD | 13 | 40571~43691 | 9 | 13 | 38727~41705 | WILD |
| 14 | 39913~42763 | FLOWER2 | 14 | 43692~46812 | BIRD | 14 | 41706~44684 | BIRD |
| 15 | 42764~45614 | K | 15 | 46813~49933 | J | 15 | 44685~47663 | K |
| 16 | 45615~48465 | A | 16 | 49934~53054 | WILD | 16 | 47664~50642 | FISH |
| 17 | 48466~51316 | WILD | 17 | 53055~56175 | 10 | 17 | 50643~53621 | Q |
| 18 | 51317~54167 | J | 18 | 56176~59296 | FLOWER1 | 18 | 53622~56600 | FEATURE |
| 19 | 54168~57018 | Q | 19 | 59297~62417 | WILD | 19 | 56601~59579 | A |
| 20 | 57019~59869 | FISH | 20 | 62418~65535 | FEATURE | 20 | 59580~62558 | WILD |
| 21 | 59870~62720 | WILD | | | | 21 | 62559~65535 | WILD |
| 22 | 62721~65535 | WILD | | | | | | |

(Range of random number value:0~65535)

FIG. 17B

| Fourth array | | | Fifth array | | |
|---|---|---|---|---|---|
| Code No. | Random number value | Symbol | Code No. | Random number value | Symbol |
| 00 | 0~2978 | Q | 00 | 0~2978 | J |
| 01 | 2979~5957 | J | 01 | 2979~5957 | A |
| 02 | 5958~8936 | FLOWER1 | 02 | 5958~8936 | FLOWER1 |
| 03 | 8937~11915 | Q | 03 | 8937~11915 | J |
| 04 | 11916~14894 | K | 04 | 11916~14894 | A |
| 05 | 14895~17873 | FLOWER1 | 05 | 14895~17873 | FISH |
| 06 | 17874~20852 | A | 06 | 17874~20852 | FLOWER2 |
| 07 | 20853~23831 | K | 07 | 20853~23831 | FEATURE |
| 08 | 23832~26810 | 9 | 08 | 23832~26810 | K |
| 09 | 26811~29789 | Q | 09 | 26811~29789 | 9 |
| 10 | 29790~32768 | BIRD | 10 | 29790~32768 | Q |
| 11 | 32769~35747 | WILD | 11 | 32769~35747 | FLOWER1 |
| 12 | 35748~38726 | WILD | 12 | 35748~38726 | K |
| 13 | 38727~41705 | 10 | 13 | 38727~41705 | BIRD |
| 14 | 41706~44684 | FEATURE | 14 | 41706~44684 | 10 |
| 15 | 44685~47663 | K | 15 | 44685~47663 | J |
| 16 | 47664~50642 | 10 | 16 | 47664~50642 | WILD |
| 17 | 50643~53621 | BIRD | 17 | 50643~53621 | WILD |
| 18 | 53622~56600 | A | 18 | 53622~56600 | WILD |
| 19 | 56601~59579 | WILD | 19 | 56601~59579 | WILD |
| 20 | 59580~62558 | FISH | 20 | 59580~62558 | WILD |
| 21 | 62559~65535 | FLOWER2 | 21 | 62559~65535 | Q |

(Range of random number value:0~65535)

FIG. 26

| Third-specific-number determination table | |
|---|---|
| Number of maximum BET game | Third specific number |
| 0~199 | 25 |
| 200~399 | 30 |
| 400~599 | 35 |
| 600~799 | 40 |
| 800~999 | 45 |
| 1000 | 50 |

FIG. 27
16
400
401
402
CREDIT
1369680
BET
500
WIN
0
MAX BET 450 GAMES
207
35 FREE GAMES
ARE ADDED!!
208
FREE GAME
8 of 65
300

FIG. 34

| | | First array | Second array | Third array | Fourth array | Fifth array |
|---|---|---|---|---|---|---|
| Code No. | Random number value | Symbol | Symbol | Symbol | Symbol | Symbol |
| 00 | 0~3277 | J | WILD | A | Q | J |
| 01 | 3278~6555 | Q | A | J | J | A |
| 02 | 6556~9833 | FLOWER1 | Q | FLOWER1 | FLOWER1 | FLOWER1 |
| 03 | 9834~13111 | J | WILD | 10 | Q | J |
| 04 | 13112~16389 | Q | WILD | FLOWER2 | K | A |
| 05 | 16390~19667 | FLOWER2 | WILD | FLOWER1 | FLOWER1 | FISH |
| 06 | 19668~22945 | A | FISH | FEATURE | A | FLOWER2 |
| 07 | 22946~26223 | BIRD | BIRD | A | K | FEATURE |
| 08 | 26224~29501 | 10 | K | J | 9 | K |
| 09 | 29502~32779 | 9 | FLOWER2 | 9 | Q | 9 |
| 10 | 32780~36057 | A | WILD | A | BIRD | Q |
| 11 | 36058~39335 | Q | A | Q | 10 | FLOWER1 |
| 12 | 39336~42613 | 10 | 9 | BIRD | FEATURE | K |
| 13 | 42614~45891 | FLOWER2 | BIRD | K | K | BIRD |
| 14 | 45892~49169 | K | J | FISH | 10 | 10 |
| 15 | 49170~52447 | A | WILD | Q | BIRD | J |
| 16 | 52448~55725 | WILD | 10 | FEATURE | A | WILD |
| 17 | 55726~59003 | J | FLOWER1 | A | WILD | WILD |
| 18 | 59004~62281 | Q | WILD | WILD | FISH | WILD |
| 19 | 62282~65535 | FISH | FEATURE | WILD | FLOWER2 | Q |

(Range of random number value:0~65535)

FIG. 36

| Symbol | Number of rearranged symbols | | | |
|---|---|---|---|---|
| | Two symbols | Three symbols | Four symbols | Five symbols |
| 10 | 2 | 4 | 6 | 8 |
| J | 3 | 6 | 9 | 12 |
| Q | 30 | 60 | 90 | 120 |
| K | 10 | 20 | 30 | 40 |
| FLOWER1 | 5 | 10 | 15 | 20 |
| FLOWER2 | 8 | 16 | 24 | 32 |
| BIRD | 15 | 30 | 45 | 60 |
| FISH | 25 | 50 | 75 | 100 |
| FEATURE | Free game (※) | | | |

※Free game is played when three or more symbols are rearranged.

FIG. 47

Table for determining the number of to-be-added special symbols

| Number of to-be-added special symbols | Random number value |
|---|---|
| 10 | 0~13106 |
| 20 | 13107~26214 |
| 30 | 26215~39321 |
| 40 | 39322~52428 |
| 50 | 52429~65535 |

(Range of random number value:0~65535)

FIG. 49

Symbol-array determination table

| Symbol array No. | Random number value |
|---|---|
| 1 | 0～13106 |
| 2 | 13107～26214 |
| 3 | 26215～39321 |
| 4 | 39322～52428 |
| 5 | 52429～65535 |

(Range of random number value:0～65535)

FIG. 50

Code-number determination table

| Random number value | Code No. |
|---|---|
| 0～2978 | 00 |
| 2979～5957 | 01 |
| 5958～8936 | 02 |
| 8937～11915 | 03 |
| 11916～14894 | 04 |
| 14895～17873 | 05 |
| 17874～20852 | 06 |
| 20853～23831 | 07 |
| 23832～26810 | 08 |
| 26811～29789 | 09 |
| 29790～32768 | 10 |
| 32769～35747 | 11 |
| 35748～38726 | 12 |
| 38727～41705 | 13 |
| 41706～44684 | 14 |
| 44685～47663 | 15 |
| 47664～50642 | 16 |
| 50643～53621 | 17 |
| 53622～56600 | 18 |
| 56601～59579 | 19 |
| 59580～62558 | 20 |
| 62559～65535 | End |

FIG. 51A

| First array | | | Second array | | | Third array | | |
|---|---|---|---|---|---|---|---|---|
| Code No. | Random number value | Symbol | Code No. | Random number value | Symbol | Code No. | Random number value | Symbol |
| 00 | 0~2849 | J | 00 | 0~3119 | WILD | 00 | 0~2978 | A |
| 01 | 2850~5700 | Q | 01 | 3120~6240 | A | 01 | 2979~5957 | J |
| 02 | 5701~8551 | FLOWER1 | 02 | 6241~9361 | Q | 02 | 5958~8936 | FLOWER1 |
| 03 | 8552~11402 | J | 03 | 9362~12482 | WILD | 03 | 8937~11915 | 10 |
| 04 | 11403~14253 | Q | 04 | 12483~15603 | WILD | 04 | 11916~14894 | FLOWER2 |
| 05 | 14254~17104 | FLOWER2 | 05 | 15604~18723 | WILD | 05 | 14895~17873 | FLOWER1 |
| 06 | 17105~19955 | A | 06 | 18724~21844 | FISH | 06 | 17874~20852 | WILD |
| 07 | 19956~22806 | BIRD | 07 | 21845~24965 | BIRD | 07 | 20853~23831 | FEATURE |
| 08 | 22807~25657 | 10 | 08 | 24966~28086 | K | 08 | 23832~26810 | A |
| 09 | 25658~28508 | 9 | 09 | 28087~31207 | FLOWER2 | 09 | 26811~29789 | J |
| 10 | 28509~31359 | A | 10 | 31208~34328 | WILD | 10 | 29790~32768 | 9 |
| 11 | 31360~34210 | Q | 11 | 34329~37449 | A | 11 | 32769~35747 | A |
| 12 | 34211~37061 | 10 | 12 | 37450~40570 | WILD | 12 | 35748~38726 | Q |
| 13 | 37062~39912 | WILD | 13 | 40571~43691 | 9 | 13 | 38727~41705 | WILD |
| 14 | 39913~42763 | FLOWER2 | 14 | 43692~46812 | BIRD | 14 | 41706~44684 | BIRD |
| 15 | 42764~45614 | K | 15 | 46813~49933 | J | 15 | 44685~47663 | K |
| 16 | 45615~48465 | A | 16 | 49934~53054 | WILD | 16 | 47664~50642 | FISH |
| 17 | 48466~51316 | WILD | 17 | 53055~56175 | 10 | 17 | 50643~53621 | Q |
| 18 | 51317~54167 | J | 18 | 56176~59296 | FLOWER1 | 18 | 53622~56600 | FEATURE |
| 19 | 54168~57018 | Q | 19 | 59297~62417 | WILD | 19 | 56601~59579 | A |
| 20 | 57019~59869 | FISH | 20 | 62418~65535 | FEATURE | 20 | 59580~62558 | WILD |
| 21 | 59870~62720 | WILD | | | | 21 | 62559~65535 | WILD |
| 22 | 62721~65535 | WILD | | | | | | |

(Range of random number value:0~65535)

FIG. 51B

| Fourth array | | | Fifth array | | |
|---|---|---|---|---|---|
| Code No. | Random number value | Symbol | Code No. | Random number value | Symbol |
| 00 | 0~2978 | Q | 00 | 0~2978 | J |
| 01 | 2979~5957 | J | 01 | 2979~5957 | A |
| 02 | 5958~8936 | FLOWER1 | 02 | 5958~8936 | FLOWER1 |
| 03 | 8937~11915 | Q | 03 | 8937~11915 | J |
| 04 | 11916~14894 | K | 04 | 11916~14894 | A |
| 05 | 14895~17873 | FLOWER1 | 05 | 14895~17873 | FISH |
| 06 | 17874~20852 | A | 06 | 17874~20852 | FLOWER2 |
| 07 | 20853~23831 | K | 07 | 20853~23831 | FEATURE |
| 08 | 23832~26810 | 9 | 08 | 23832~26810 | K |
| 09 | 26811~29789 | Q | 09 | 26811~29789 | 9 |
| 10 | 29790~32768 | BIRD | 10 | 29790~32768 | Q |
| 11 | 32769~35747 | WILD | 11 | 32769~35747 | FLOWER1 |
| 12 | 35748~38726 | WILD | 12 | 35748~38726 | K |
| 13 | 38727~41705 | 10 | 13 | 38727~41705 | BIRD |
| 14 | 41706~44684 | FEATURE | 14 | 41706~44684 | 10 |
| 15 | 44685~47663 | K | 15 | 44685~47663 | J |
| 16 | 47664~50642 | 10 | 16 | 47664~50642 | WILD |
| 17 | 50643~53621 | BIRD | 17 | 50643~53621 | WILD |
| 18 | 53622~56600 | A | 18 | 53622~56600 | WILD |
| 19 | 56601~59579 | WILD | 19 | 56601~59579 | WILD |
| 20 | 59580~62558 | FISH | 20 | 59580~62558 | WILD |
| 21 | 62559~65535 | FLOWER2 | 21 | 62559~65535 | Q |

(Range of random number value:0~65535)

FIG. 59

| | | First array | Second array | Third array | Fourth array | Fifth array |
|---|---|---|---|---|---|---|
| Code No. | Random number value | Symbol | Symbol | Symbol | Symbol | Symbol |
| 00 | 0~3277 | J | WILD | A | Q | J |
| 01 | 3278~6555 | Q | A | J | J | A |
| 02 | 6556~9833 | FLOWER1 | Q | FLOWER1 | FLOWER1 | FLOWER1 |
| 03 | 9834~13111 | J | WILD | 10 | Q | J |
| 04 | 13112~16389 | Q | WILD | FLOWER2 | K | A |
| 05 | 16390~19667 | FLOWER2 | WILD | FLOWER1 | FLOWER1 | FISH |
| 06 | 19668~22945 | A | FISH | FEATURE | A | FLOWER2 |
| 07 | 22946~26223 | BIRD | BIRD | A | K | FEATURE |
| 08 | 26224~29501 | 10 | K | J | 9 | K |
| 09 | 29502~32779 | 9 | FLOWER2 | 9 | Q | 9 |
| 10 | 32780~36057 | A | WILD | A | BIRD | Q |
| 11 | 36058~39335 | Q | A | Q | 10 | FLOWER1 |
| 12 | 39336~42613 | 10 | 9 | BIRD | FEATURE | K |
| 13 | 42614~45891 | FLOWER2 | BIRD | K | K | BIRD |
| 14 | 45892~49169 | K | J | FISH | 10 | 10 |
| 15 | 49170~52447 | A | WILD | Q | BIRD | J |
| 16 | 52448~55725 | WILD | 10 | FEATURE | A | WILD |
| 17 | 55726~59003 | J | FLOWER1 | A | WILD | WILD |
| 18 | 59004~62281 | Q | WILD | WILD | FISH | WILD |
| 19 | 62282~65535 | FISH | FEATURE | WILD | FLOWER2 | Q |

(Range of random number value:0~65535)

FIG. 61

| Symbol | Number of rearranged symbols | | | |
|---|---|---|---|---|
| | Two symbols | Three symbols | Four symbols | Five symbols |
| 10 | 2 | 4 | 6 | 8 |
| J | 3 | 6 | 9 | 12 |
| Q | 30 | 60 | 90 | 120 |
| K | 10 | 20 | 30 | 40 |
| FLOWER1 | 5 | 10 | 15 | 20 |
| FLOWER2 | 8 | 16 | 24 | 32 |
| BIRD | 15 | 30 | 45 | 60 |
| FISH | 25 | 50 | 75 | 100 |
| FEATURE | Free game (※) | | | |

※Free game is played when three or more symbols are rearranged.

FIG. 66

Number-of-games determination table

| Number of games | Random number value |
|---|---|
| 5 | 0~13106 |
| 10 | 13107~26214 |
| 15 | 26215~39321 |
| 20 | 39322~52428 |
| 30 | 52429~65535 |

(Range of random number value:0~65535)

FIG. 69

Table for determining the number of to-be-added special symbols

| Number of to-be-added special symbols | Random number value |
|---|---|
| 10 | 0～13106 |
| 20 | 13107～26214 |
| 30 | 26215～39321 |
| 40 | 39322～52428 |
| 50 | 52429～65535 |

(Range of random number value:0～65535)

FIG. 71

Symbol-array determination table

| Symbol array No. | Random number value |
|---|---|
| 1 | 0~13106 |
| 2 | 13107~26214 |
| 3 | 26215~39321 |
| 4 | 39322~52428 |
| 5 | 52429~65535 |

(Range of random number value:0~65535)

FIG. 72

Code-number determination table

| Random number value | Code No. |
|---|---|
| 0～2978 | 00 |
| 2979～5957 | 01 |
| 5958～8936 | 02 |
| 8937～11915 | 03 |
| 11916～14894 | 04 |
| 14895～17873 | 05 |
| 17874～20852 | 06 |
| 20853～23831 | 07 |
| 23832～26810 | 08 |
| 26811～29789 | 09 |
| 29790～32768 | 10 |
| 32769～35747 | 11 |
| 35748～38726 | 12 |
| 38727～41705 | 13 |
| 41706～44684 | 14 |
| 44685～47663 | 15 |
| 47664～50642 | 16 |
| 50643～53621 | 17 |
| 53622～56600 | 18 |
| 56601～59579 | 19 |
| 59580～62558 | 20 |
| 62559～65535 | End |

FIG. 73A

| First array | | | Second array | | | Third array | | |
|---|---|---|---|---|---|---|---|---|
| Code No. | Random number value | Symbol | Code No. | Random number value | Symbol | Code No. | Random number value | Symbol |
| 00 | 0~2849 | J | 00 | 0~3119 | WILD | 00 | 0~2978 | A |
| 01 | 2850~5700 | Q | 01 | 3120~6240 | A | 01 | 2979~5957 | J |
| 02 | 5701~8551 | FLOWER1 | 02 | 6241~9361 | Q | 02 | 5958~8936 | FLOWER1 |
| 03 | 8552~11402 | J | 03 | 9362~12482 | WILD | 03 | 8937~11915 | 10 |
| 04 | 11403~14253 | Q | 04 | 12483~15603 | WILD | 04 | 11916~14894 | FLOWER2 |
| 05 | 14254~17104 | FLOWER2 | 05 | 15604~18723 | WILD | 05 | 14895~17873 | FLOWER1 |
| 06 | 17105~19955 | A | 06 | 18724~21844 | FISH | 06 | 17874~20852 | WILD |
| 07 | 19956~22806 | BIRD | 07 | 21845~24965 | BIRD | 07 | 20853~23831 | FEATURE |
| 08 | 22807~25657 | 10 | 08 | 24966~28086 | K | 08 | 23832~26810 | A |
| 09 | 25658~28508 | 9 | 09 | 28087~31207 | FLOWER2 | 09 | 26811~29789 | J |
| 10 | 28509~31359 | A | 10 | 31208~34328 | WILD | 10 | 29790~32768 | 9 |
| 11 | 31360~34210 | Q | 11 | 34329~37449 | A | 11 | 32769~35747 | A |
| 12 | 34211~37061 | 10 | 12 | 37450~40570 | WILD | 12 | 35748~38726 | Q |
| 13 | 37062~39912 | WILD | 13 | 40571~43691 | 9 | 13 | 38727~41705 | WILD |
| 14 | 39913~42763 | FLOWER2 | 14 | 43692~46812 | BIRD | 14 | 41706~44684 | BIRD |
| 15 | 42764~45614 | K | 15 | 46813~49933 | J | 15 | 44685~47663 | K |
| 16 | 45615~48465 | A | 16 | 49934~53054 | WILD | 16 | 47664~50642 | FISH |
| 17 | 48466~51316 | WILD | 17 | 53055~56175 | 10 | 17 | 50643~53621 | Q |
| 18 | 51317~54167 | J | 18 | 56176~59296 | FLOWER1 | 18 | 53622~56600 | FEATURE |
| 19 | 54168~57018 | Q | 19 | 59297~62417 | WILD | 19 | 56601~59579 | A |
| 20 | 57019~59869 | FISH | 20 | 62418~65535 | FEATURE | 20 | 59580~62558 | WILD |
| 21 | 59870~62720 | WILD | | | | 21 | 62559~65535 | WILD |
| 22 | 62721~65535 | WILD | | | | | | |

(Range of random number value:0~65535)

FIG. 73B

| Fourth array | | | Fifth array | | |
|---|---|---|---|---|---|
| Code No. | Random number value | Symbol | Code No. | Random number value | Symbol |
| 00 | 0~2978 | Q | 00 | 0~2978 | J |
| 01 | 2979~5957 | J | 01 | 2979~5957 | A |
| 02 | 5958~8936 | FLOWER1 | 02 | 5958~8936 | FLOWER1 |
| 03 | 8937~11915 | Q | 03 | 8937~11915 | J |
| 04 | 11916~14894 | K | 04 | 11916~14894 | A |
| 05 | 14895~17873 | FLOWER1 | 05 | 14895~17873 | FISH |
| 06 | 17874~20852 | A | 06 | 17874~20852 | FLOWER2 |
| 07 | 20853~23831 | K | 07 | 20853~23831 | FEATURE |
| 08 | 23832~26810 | 9 | 08 | 23832~26810 | K |
| 09 | 26811~29789 | Q | 09 | 26811~29789 | 9 |
| 10 | 29790~32768 | BIRD | 10 | 29790~32768 | Q |
| 11 | 32769~35747 | WILD | 11 | 32769~35747 | FLOWER1 |
| 12 | 35748~38726 | WILD | 12 | 35748~38726 | K |
| 13 | 38727~41705 | 10 | 13 | 38727~41705 | BIRD |
| 14 | 41706~44684 | FEATURE | 14 | 41706~44684 | 10 |
| 15 | 44685~47663 | K | 15 | 44685~47663 | J |
| 16 | 47664~50642 | 10 | 16 | 47664~50642 | WILD |
| 17 | 50643~53621 | BIRD | 17 | 50643~53621 | WILD |
| 18 | 53622~56600 | A | 18 | 53622~56600 | WILD |
| 19 | 56601~59579 | WILD | 19 | 56601~59579 | WILD |
| 20 | 59580~62558 | FISH | 20 | 59580~62558 | WILD |
| 21 | 62559~65535 | FLOWER2 | 21 | 62559~65535 | Q |

(Range of random number value:0~65535)

SLOT MACHINE EXECUTING FREE GAME AND SLOT MACHINE THAT INCREASES THE NUMBER OF DISPLAYED SPECIAL SYMBOLS

CROSS-REFERENCE TO RELATED APPLICATIONS

This application claims benefit of priority based on U.S. Provisional Patent Application No. 61/103,812 filed on Oct. 8, 2008, U.S. Provisional Patent Application No. 61/104,013 filed on Oct. 9, 2008, and U.S. Provisional Patent Application No. 61/103,976 filed on Oct. 9, 2008. The contents of this application are incorporated herein by reference in their entirety.

BACKGROUND OF THE INVENTION

1. Field of the Invention

The present invention relates to a slot machine that executes a free game and a slot machine that increases the number of displayed special symbols.

2. Discussion of the Background

There have conventionally been known slot machines that scroll-display and then stop-display a plurality of kinds of symbols and provide a predetermined amount of game media (e.g. a predetermined number of coins, a predetermined amount of money) based upon a combination of the stop-displayed symbols. Such slot machines are disclosed in, for example, U.S. Pat. No. 6,960,133, U.S. Pat. No. 6,012,983, and U.S. Pat. No. 6,093,102.

Among such slot machines, there exists a slot machine executing a free game in a case where a predetermined condition (e.g. rearrangement of the specific symbol in a slot machine game) is established in a game. The free game is a game conducted without a BET of game media. For example, AU-1972901-A discloses a slot machine which executes a free game as a side game when a predetermined condition (specific rearrangement of symbols) has been established.

Since a player can play a game without consuming game media in the free game, the player is generally playing a game with strong expectations for generation of the free game. Further, a content of the free game, a condition for generation of the free game and the number of the free games are of great concerns for the player.

Accordingly, the inventors of the present invention have come to consider that adding a new feature concerning the content of the free game, the condition for generation of the free game and the number of the free games can enhance the player's interest and concern for the game.

The present invention was made in view of the aforementioned issue and an object thereof is to provide a slot machine capable of enhancing the player's interest and concern for the game, and a control method thereof.

There have conventionally been known slot machines that scroll-display and then stop-display a plurality of kinds of symbols and provide a predetermined amount of game media (e.g. a predetermined number of coins, a predetermined amount of money) based upon a combination of the stop-displayed symbols.

Among such slot machines, there exist slot machines having special symbols different from normal symbols. As one of the special symbols, a wild symbol is known which can be substituted for another symbol. Slot machines having the wild symbols are disclosed for example in US 2006/0084498-A1, US 2006/0264254-A1, and US 2008/0070673-A1. In the slot machine having the wild symbol, when the wild symbol is displayed on a pay line, the wild symbol is substituted for another symbol to form a combination establishing a prize, thus allowing a player to have great expectations.

Therefore, the inventors of the present invention have come to consider that adding a new function concerning the wild symbol to the slot machine can provide a more attractive game.

The present invention was made in view of the aforementioned issue and an object thereof is to provide a slot machine capable of providing a more attractive game, and a control method thereof.

The contents of U.S. Pat. No. 6,960,133, U.S. Pat. No. 6,012,983, U.S. Pat. No. 6,093,102, US 2006/0084498-A1, US 2006/0264254-A1, and US 2008/0070673-A1 are incorporated herein by reference in their entirety.

SUMMARY OF THE INVENTION

The present invention provides a slot machine having the following configuration.

Namely, the slot machine comprises a symbol display capable of variably displaying a plurality of symbols. Further, the slot machine comprises a controller programmed to execute processing of: (A) executing a normal game, in which the plurality of symbols are variably displayed and then stop-displayed to the symbol display after a BET of game media, and game media are paid out in an amount corresponding to the stop-displayed symbol or a combination of the stop-displayed symbols; (B) executing a first specific number of free games, when a first predetermined condition is established in the normal game executed in the processing (A), the free game being executed without a BET of game media; (C) executing a second specific number of free games, when a second predetermined condition different from the first predetermined condition is established; and (D) executing a third specific number of free games after executing the processing (C), when the first predetermined condition is established before completing the execution of the processing (C), the third specific number being larger than the first specific number.

According to the above-mentioned slot machine, when the first predetermined condition is established in the normal game, the first specific number of free games are conducted. Further, when the second specific condition is established, the second specific number of free games are conducted.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, according to the above-mentioned slot machine, when the first predetermined condition is established in the free game that is executed triggered by the establishment of the second predetermined condition, the third specific number of free games are further conducted after executing the second specific number of free games. Here, the third specific number is larger than the first specific number. Namely, compared to the number of the free games conducted when the first predetermined condition is established in the normal game (hereinafter, referred to as first free games), the number of the free games conducted when the first predetermined condition is established in the free game conducted triggered by the establishment of the second predetermined condition (hereinafter, referred to as second free games) is larger.

As above, according to the above-mentioned slot machine, even the identical condition of the first predetermined condition is established, the number of the free games to be offered to the player is larger in the case where the first predetermined condition has been established in the second free game, than in the case where the first predetermined condition has been established in the normal game. Accordingly, it is possible to have the player have great expectations for the establishment of the second predetermined condition and the establishment of the first predetermined condition in the second free game.

Further, since the number of the free games to be generated is different in accordance with the situation of the game at the time when the first predetermined condition is established even the identical condition of the first predetermined condition is established, it is possible to give a surprise to the player.

It is desirable that the slot machine further has the following configuration.

Namely, the processing (C) is the processing of executing the second specific number of free games, when the second predetermined condition different from the first predetermined condition is established, the second specific number being larger than the first specific number. The processing (D) is the processing of executing the second specific number of free games after executing the processing (C), when the first predetermined condition is established before completing the execution of the processing (C).

According to the above-mentioned slot machine, a first predetermined condition is established in the normal game, the first specific number (e.g. 20) of first free games are conducted. Further, when the second predetermined condition is established, the second specific number (e.g. 30) of second free games are conducted. Moreover, the first predetermined condition is established in the second free game, the second specific number (e.g. 30) of free games are further conducted after the execution of the second specific number of free games.

Namely, the number of the second free games is larger than the number of the first free games, and the number of the free games to be added when the first predetermined condition is established in the second free game is equal to the number of the second free games.

Accordingly, it is possible to give a strong impression to the player about whether the currently-conducted free game is the free game derived from the establishment of the first predetermined condition or the free game derived from the establishment of the second predetermined condition. As a result, it is possible to increase the player's interest and concern for each free game.

The present invention provides a slot machine having the following configuration.

Namely, the slot machine comprises a symbol display capable of variably displaying a plurality of symbols. Further, the slot machine comprises a controller programmed to execute processing of: (A) executing a normal game, in which the plurality of symbols are variably displayed and then stop-displayed to the symbol display after a BET of game media, and game media are paid out in an amount corresponding to the stop-displayed symbol or a combination of the stop-displayed symbols; (B) executing a first specific number of free games, in which the plurality of symbols are variably displayed and then stop-displayed to the symbol display, and game media are paid out in an amount corresponding to the stop-displayed symbol or a combination of the stop-displayed symbols without the BET of game media, when a first predetermined condition of stop-display of the symbols in a predetermined stopped state is established in the normal game executed in the processing (A); (C) executing a second specific number of free games, when a second predetermined condition different from the first predetermined condition is established; and (D) executing a third specific number of free games after executing the processing (C), when the symbols are stop-displayed in the predetermined stopped state in the free game before completing the execution of the processing (C), the third specific number being larger than the first specific number.

According to the above-mentioned slot machine, when the first predetermined condition is established in the normal game, the first specific number of free games are conducted. Further, when the second specific condition is established, the second specific number of free games are conducted.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, according to the above-mentioned slot machine, when the first predetermined condition is established in the free game that is executed triggered by the establishment of the second predetermined condition, the third specific number of free games are further conducted after executing the second specific number of free games. Here, the third specific number is larger than the first specific number. Namely, compared to the number of the free games conducted when the first predetermined condition is established in the normal game (hereinafter, referred to as first free games), the number of the free games conducted when the first predetermined condition is established in the free game conducted triggered by the establishment of the second predetermined condition (hereinafter, referred to as second free games) is larger.

As above, according to the above-mentioned slot machine, even the identical condition of the first predetermined condition is established, the number of the free games to be offered to the player is larger in the case where the first predetermined condition has been established in the second free game, than in the case where the first predetermined condition has been established in the normal game. Accordingly, it is possible to have the player have great expectations for the establishment of the second predetermined condition and the establishment of the first predetermined condition in the second free game.

Further, since the number of the free games to be generated is different in accordance with the situation of the game at the time when the first predetermined condition is established even the identical condition of the first predetermined condition is established, it is possible to give a surprise to the player.

Since the amount of the game media to be paid out to the player in the game is determined based on the symbol stop-displayed to the symbol display or the combination of the stop-displayed symbols, the player is generally concentrated on the symbol display during the game. According to the above-mentioned slot machine, since the condition that the symbols are stop-displayed to the symbol display in a predetermined stopped state is set as the condition for generation of the free game, it is easier to have the player visually understand that the free game is generated.

Further, because of this, it is easier to have the player figure out whether the first specific number of free games are generated or the third specific number of free games are generated triggered by the stop-display of the symbols in the predetermined stopped state. Accordingly, it is possible to give a strong impression to the player about the difference between the number of the free games generated in the case where the symbols are stop-displayed in the predetermined stopped state in the normal game and the number of the free games generated in the case where the symbols are stop-displayed in the predetermined stopped state in the second free game. As a result, it is possible to raise the player's expectations for the establishment of the second predetermined condition and the establishment of the first predetermined condition during the second free game.

It is desirable that the slot machine further has the following configuration.

Namely, the controller is further programmed to execute the processing of (E) counting the number of the normal game executed in the processing (A). The processing (C) is the processing of executing the second specific number of free games, when the number of the normal games counted in the processing (E) has reached a prescribed number.

According to the above-mentioned slot machine, the first free game is conducted on condition that the first predetermined condition is established in the normal game, and the second free game is conducted on condition that the number of the counted normal games has reached the prescribed number. Accordingly, it is possible to have the player play the game while having expectations for the establishment of the first predetermined condition and reaching of the number of the counted normal games to the prescribed number, during the normal game. As a result, it is possible to have the player more absorbed in the game.

Further, when the first predetermined condition is established after having continued the game until the number of the counted normal games reached the prescribed number, the player can receive the benefit of more free games, compared to the case where the first predetermined condition is established in the normal game. Accordingly, it is possible to have the player play the game for the longer time.

Furthermore, it is possible that the player having continued the game until the number of the counted normal games reached the prescribed number has consumed many game media. According to the above-mentioned slot machine, the profit of the free game is offered to such player, and therefore, it is possible to free the player of an irritation and boredom accompanying the consumption of many game media.

It is desirable that the slot machine further has the following configuration.

Namely, the processing (A) is the processing of executing the normal game, in which, the plurality of symbols are scroll-displayed and then stop-displayed to the symbol display after the BET of game media are betted in number equal to or less than a predetermined maximum number of BETs, and game media are paid out in an amount corresponding to the stop-displayed symbol or a combination of the stop-displayed symbols. The processing (E) includes the processing of counting the number of a maximum BET game, which is the number of the normal game played with the BET of the game media in the maximum number of BETs. Further, the processing (D) is the processing of executing the third specific number of free games after executing the processing (C), when the symbols are stop-displayed in the predetermined stopped state in the free game before completing the execution of the processing (C), the third specific number being larger than the first specific number and specified based on the number of the maximum BET game counted in the processing (E).

According to the above-mentioned slot machine, the number of the maximum BET games, which is the number of the normal games played with the BET of the game media in the maximum number of BETS. The third specific number is the number specified based on the number of the counted maximum BET games.

Accordingly, the larger the number of the maximum BET games is, the larger the third specific number may become, and therefore, it is possible to encourage the player to bet the game media in the maximum number of BETs. As a result, it is possible to aim the increase in the profit of the recreation facility.

Further, according to the above-mentioned slot machine, the player can enlarge the difference between the first specific number and the third specific number by betting the game media in the maximum number of BETs by his or herself. Accordingly, it is possible to have the player involved in the degree of the difference between the first specific number and the third specific number, and therefore, it is possible to strongly impress the player of the difference between the first specific number and the third specific number. Consequently, it is possible to raise the player's expectations for the establishment of the second specific condition and the establishment of the first predetermined condition in the second free game.

It is desirable that the slot machine further has the following configuration.

Namely, the controller is further programmed to execute the processing of (F) shifting a mode from a non-insurance mode to an insurance mode on condition that a predetermined number of game media has been inserted. The processing (E) is the processing of counting the number of the normal game executed in the processing (A) in the insurance mode.

According to the above-mentioned slot machine, the counting of the number of the normal games is started, on condition that the mode is shifted from the non-insurance mode to the insurance mode.

Accordingly, it is possible to have the player who is planning to play the game for a long time insert the predetermined number of game media. Thus, it is possible to aim the increase in the profit of the recreation facility.

On the other hand, it is also possible that the player who has not determined the time period to play the game at the start, shifts the mode to the insurance mode by inserting the predetermined number of game media just to be safe, in considering a possibility of receiving the benefit of the second free game. Further, as the counted number increases, such player is likely to feel that it is a waste to quit the game despite the insertion of the predetermined number of game media before the counted number reaching the prescribed number. As a result, the player may continue playing the game until the counted number reaches the prescribed number.

The present invention further provides a control method of a slot machine, the control method having the following configuration.

Namely, the control method of a slot machine comprises the steps of: (A) executing a normal game, in which a plurality of symbols are variably displayed and then stop-displayed to a symbol display after a BET of game media, and game media are paid out in an amount corresponding to the stop-displayed symbol or a combination of the stop-displayed symbols; (B) executing a first specific number of free games, when a first predetermined condition is established in the normal game executed in the step (A), the free game being executed without the BET of game media; (C) executing a second specific number of free games, when a second predetermined condition different from the first predetermined condition is established; and (D) executing a third specific number of free games after executing the step (C), when the first predetermined condition is established before completing the execution of the step (C), the third specific number being larger than the first specific number.

According to the above-mentioned control method of a slot machine, when the first predetermined condition is established in the normal game, the first specific number of free games are conducted. Further, when the second specific condition is established, the second specific number of free games are conducted.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, according to the above-mentioned control method of a slot machine, when the first predetermined condition is established in the free game that is executed triggered by the establishment of the second predetermined condition, the third specific number of free games are further conducted after executing the second specific number of free games. Here, the third specific number is larger than the first specific number. Namely, compared to the number of the free games conducted when the first predetermined condition is established in the normal game (hereinafter, referred to as first free games), the number of the free games conducted when the first predetermined condition is established in the free game conducted triggered by the establishment of the second predetermined condition (hereinafter, referred to as second free games) is larger.

As above, according to the above-mentioned slot machine, even the identical condition of the first predetermined condition is established, the number of the free games to be offered to the player is larger in the case where the first predetermined condition has been established in the second free game, than in the case where the first predetermined condition has been established in the normal game. Accordingly, it is possible to have the player have great expectations for the establishment of the second predetermined condition and the establishment of the first predetermined condition in the second free game.

Further, since the number of the free games to be generated is different in accordance with the situation of the game at the time when the first predetermined condition is established even the identical condition of the first predetermined condition is established, it is possible to give a surprise to the player.

The present invention further provides a control method of a slot machine, having the following configuration.

Namely, the control method of a slot machine comprises the steps of: (A) executing a normal game, in which a plurality of symbols are variably displayed and then stop-displayed to a symbol display after a BET of game media, and game media are paid out in an amount corresponding to the stop-displayed symbol or a combination of the stop-displayed symbols; (B) executing a first specific number of free games, in which the plurality of symbols are variably displayed and then stop-displayed to the symbol display, and game media are paid out in an amount corresponding to the stop-displayed symbol or a combination of the stop-displayed symbols without the BET of the game media, when a first predetermined condition of stop-display of the symbols in a predetermined stopped state is established in the normal game executed in the step (A); (C) executing a second specific number of free games, when a second predetermined condition different from the first predetermined condition is established; and (D) executing a third specific number of free games after executing the processing (C), when the symbols are stop-displayed in the predetermined stopped state in the free game before completing the execution of the step (C), the third specific number being larger than the first specific number.

According to the above-mentioned control method of a slot machine, when the first predetermined condition is established in the normal game, the first specific number of free games are conducted. Further, when the second specific condition is established, the second specific number of free games are conducted.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, according to the above-mentioned control method of a slot machine, when the first predetermined condition is established in the free game that is executed triggered by the establishment of the second predetermined condition, the third specific number of free games are further conducted after executing the second specific number of free games. Here, the third specific number is larger than the first specific number. Namely, compared to the number of the free games conducted when the first predetermined condition is established in the normal game (hereinafter, referred to as first free games), the number of the free games conducted when the first predetermined condition is established in the free game conducted triggered by the establishment of the second predetermined condition (hereinafter, referred to as second free games) is larger.

As above, according to the above-mentioned slot machine, even the identical condition of the first predetermined condition is established, the number of the free games to be offered to the player is larger in the case where the first predetermined condition has been established in the second free game, than in the case where the first predetermined condition has been established in the normal game. Accordingly, it is possible to have the player have great expectations for the establishment of the second predetermined condition and the establishment of the first predetermined condition in the second free game.

Further, since the number of the free games to be generated is different in accordance with the situation of the game at the time when the first predetermined condition is established even the identical condition of the first predetermined condition is established, it is possible to give a surprise to the player.

Since the amount of the game media to be paid out to the player in the game is determined based on the symbol stop-displayed to the symbol display or the combination of the stop-displayed symbols, the player is generally concentrated on the symbol display during the game. According to the above-mentioned control method of a slot machine, since the condition that the symbols are stop-displayed to the symbol display in a predetermined stopped state is set as the condition for generation of the free game, it is easier to have the player visually understand that the free game is generated.

Further, because of this, it is easier to have the player figure out whether the first specific number of free games are generated or the third specific number of free games are generated triggered by the stop-display of the symbols in the predetermined stopped state. Accordingly, it is possible to give a strong impression to the player about the difference between the number of the free games generated in the case where the symbols are stop-displayed in the predetermined stopped state in the normal game and the number of the free games generated in the case where the symbols are stop-displayed in the predetermined stopped state in the second free game. As a result, it is possible to raise the player's expectations for the establishment of the second predetermined condition and the establishment of the first predetermined condition during the second free game.

The present invention provides a slot machine having the following configuration.

Namely, the slot machine comprises: a symbol display capable of variably displaying symbols; and a controller programmed to execute processing of: (A) executing a normal game, in which the symbols are variably displayed and then stop-displayed to the symbol display after a BET of game media, and game media are paid out in an amount corresponding to the stop-displayed symbol or a combination of the stop-displayed symbols; (B) executing a normal free game when a first predetermined condition is established in the normal game executed in the processing (A), the normal free game being executed without the BET of game media; and (C) determining a payout of a predetermined amount of game media and executing a special free game, when a second predetermined condition different from the first predetermined condition is established, the special free game being executed without the BET of game media and being more advantageous than the normal free game.

According to the above-mentioned slot machine, the normal free game is executed when the first predetermined condition is established in the normal game. Further, the special free game is executed when the second predetermined condition is established.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, since there are two kinds of the free games comprising the normal free game and the special free game which is more advantageous than the normal free game, it is possible to increase the player's interest and concern for the free game.

Furthermore, when the second predetermined condition is established, the special free game is executed and a payout of the game media in a predetermined amount is determined. Accordingly, it is possible to give a satisfaction to the player.

It is desirable that the slot machine further has the following configuration.

Namely, the controller is further programmed to execute the processing of (D) counting a number of the normal games executed in the processing (A), and the processing (C) is the processing of determining the payout of the predetermined amount of game media and executing the special free game when the number of the counted normal games has reached a prescribed number, the special free game being executed without the BET of game media and more advantageous than the normal free game.

According to the above-mentioned slot machine, the normal free game is executed on condition that the first predetermined condition is established in the normal game, and the special free game is executed on condition that the number of the counted normal games has reached the prescribed number.

Accordingly, it is possible to have the player play the game while having expectations for the establishment of the first predetermined condition and reaching of the number of the counted normal games to the prescribed number, during the normal game. As a result it is possible to have the player more absorbed in the game.

Furthermore, it is possible that the player having continued the game until the number of the counted normal games reached the prescribed number has consumed many game media. According to the above-mentioned slot machine, a profit of the special free game which is more advantageous than the normal free game is offered to such player, as well as a payout of the game media in the predetermined amount to the player is determined, and therefore it is possible to free the player of an irritation and boredom accompanying the consumption of many game media.

The present invention provides a slot machine having the following configuration.

Namely, the slot machine comprises: a symbol display capable of variably displaying symbols; and a controller programmed to execute processing of: (A) executing a normal game, in which the symbols are variably displayed and then stop-displayed to the symbol display after a BET of game media, and game media are paid out in an amount corresponding to the stop-displayed symbol or a combination of the stop-displayed symbols; (B) executing a first specific number of free games when a first predetermined condition is established in the normal game executed in the processing (A), the free game being executed without the BET of game media; and (C) determining a payout of a predetermined amount of game media and executing a second specific number of free games, when a second predetermined condition different from the first predetermined condition is established, the second specific number being larger than the first specific number.

According to the above-mentioned slot machine, the first specific number of free games are executed when the first predetermined condition is established in the normal game. Further, the second specific number of free games are executed when the second predetermined condition is established.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, since the number of the free games to be executed is different in accordance with the generating condition, it is possible to increase the player's interest and concern for the free game.

Furthermore, when the second predetermined condition is established, the second specific number of free games are executed and a payout of the game media in a predetermined amount is determined. Accordingly, it is possible to give a satisfaction to the player.

It is desirable that the slot machine further has the following configuration.

Namely, the processing (B) is the processing of executing the first specific number of free games, in which the symbols are variably displayed and then stop-displayed to the symbol display without the BET of game media, and game media are paid out in an amount corresponding to the stop-displayed symbol or a combination of the stop-displayed symbols, when the first predetermined condition of a stop-display of the symbols in a predetermined stopped state is established in the normal game executed in the processing (A).

Since the amount of the game media to be paid out to the player in the game is determined based on the symbol stop-displayed to the symbol display or the combination of the stop-displayed symbols, the player is generally concentrated on the symbol display during the game. According to the above-mentioned slot machine, since the first predetermined condition that the symbols are stop-displayed to the symbol display in a predetermined stopped state is set as the condition for generation of the free game, it is easier to have the player visually understand that the free game is generated.

The present invention provides a slot machine having the following configuration.

Namely, the slot machine comprises: a symbol display capable of variably displaying symbols including a special symbol; and a controller programmed to execute processing of: (A) executing a normal game, in which the symbols including the special symbol are variably displayed and then stop-displayed to the symbol display after a BET of game media, and game media are paid out in an amount corresponding to the stop-displayed symbol or a combination of the stop-displayed symbols; (B) executing a normal free game when a first predetermined condition is established in the normal game executed in the processing (A), the normal free game being executed without the BET of game media; and (C) determining a payout of a predetermined amount of game media and executing a special free game when a second predetermined condition different from the first predetermined condition is established, the special free game being executed without the BET of game media and being more advantageous than the normal free game.

According to the above-mentioned slot machine, the normal free game is executed when the first predetermined condition is established in the normal game. Further, the special free game is executed when the second predetermined condition is established.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, since there are two kinds of the free games comprising the normal free game and the special free game which is more advantageous than the normal free game, it is possible to increase the player's interest and concern for the free game.

Furthermore, when the second predetermined condition is established, the special free game is executed and a payout of the game media in a predetermined amount is determined. Accordingly, it is possible to give a satisfaction to the player.

It is desirable that the slot machine further has the following configuration.

Namely, the processing (B) is the processing of executing the normal free game, in which the symbols including the special symbol are variably displayed and then stop-displayed to the symbol display, and game media are paid out in an amount corresponding to the stop-displayed symbol or a combination of the stop-displayed symbols without the BET of game media, when the first predetermined condition of the stop-display of the symbols in a predetermined stopped state is established in the normal game executed in the processing (A), and the processing (C) is the processing of: (C-1) increasing a number of the special symbols which can be displayed to the symbol display, when the second predetermined condition different from the first predetermined condition is established; and (C-2) determining the payout of the predetermined amount of game media and executing the special free game in which the symbols including the special symbol increased in said processing (C-1) are variably displayed and then stop-displayed to the symbol display and the game media are paid out in an amount corresponding to the stop-displayed symbol or a combination of the stop-displayed symbols.

Since the amount of the game media to be paid out to the player in the game is determined based on the symbol stop-displayed to the symbol display or the combination of the stop-displayed symbols, the player is generally concentrated on the symbol display during the game. According to the above-mentioned slot machine, since the first predetermined condition that the symbols are stop-displayed to the symbol display in a predetermined stopped state is set as the condition for generation of the normal free game, it is easier to have the player visually understand that the normal free game is generated.

Further, when the second predetermined condition is established, the number of the special symbols that can be displayed to the symbol display is increased.

Since not the number of the normal symbols, but the number of the special symbols is increased, it is possible to have the player have expectations, and consequently, it is possible to provide a more attractive game.

The present invention further provides a control method of a slot machine, the control method having the following configuration.

Namely, the control method of a slot machine comprises the steps of: (A) executing a normal game, in which symbols are variably displayed and then stop-displayed to a symbol display capable of variably displaying the symbols after a BET of game media, and game media are paid out in an amount corresponding to the stop-displayed symbol or a combination of the stop-displayed symbols; (B) executing a normal free game, when a first predetermined condition is established in the normal game executed in the step (A), the normal free game being executed without the BET of game media; and (C) determining a payout of a predetermined amount of game media and executing a special free game, when a second predetermined condition different from the first predetermined condition is established, the special free game being executed without the BET of game media and being more advantageous than the normal free game.

According to the above-mentioned control method of a slot machine, the normal free game is executed when the first predetermined condition is established in the normal game. Further, the special free game is executed when the second predetermined condition is established.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, since there are two kinds of the free games comprising the normal free game and the special free game which is more advantageous than the normal free game, it is possible to increase the player's interest and concern for the free game.

Furthermore, when the second predetermined condition is established, the special free game is executed and a payout of the game media in a predetermined amount is determined. Accordingly, it is possible to give a satisfaction to the player.

The present invention further provides a control method of a slot machine, having the following configuration.

Namely, the control method of a slot machine comprises the steps of: (A) executing a normal game, in which symbols are variably displayed and then stop-displayed to a symbol display capable of variably displaying the symbols after a BET of game media, and game media are paid out in an amount corresponding to the stop-displayed symbol or a combination of the stop-displayed symbols; (B) executing a first specific number of free games, when a first predetermined condition is established in the normal game executed in the step (A), the free game being executed without the BET of game media; and (C) determining a payout of a predetermined amount of game media and executing a second specific number of free games, when a second predetermined condition different from the first predetermined condition is established, the second specific number being larger than the first specific number.

According to the above-mentioned control method of a slot machine, the first specific number of free games are executed when the first predetermined condition is established in the normal game. Further, the second specific number of free games are executed when the second predetermined condition is established.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, since the number of the free games to be executed is different in accordance with the generating condition, it is possible to increase the player's interest and concern for the free game.

Furthermore, when the second predetermined condition is established, the second specific number of special free games are executed and a payout of the game media in a predetermined amount is determined. Accordingly, it is possible to give a satisfaction to the player.

The present invention further provides a control method of a slot machine, having the following configuration.

Namely, the control method of a slot machine comprises the steps of: (A) executing a normal game, in which symbols including a special symbol are variably displayed and then stop-displayed to a symbol display capable of variably displaying the symbols including the special symbol after a BET of game media, and game media are paid out in an amount corresponding to the stop-displayed symbol or a combination of the stop-displayed symbols; (B) executing a normal free game when a first predetermined condition is established in the normal game executed in the step (A), the normal free game being executed without the BET of game media; and (C) determining a payout of game media in a predetermined amount and executing a special free game when a second predetermined condition different from the first predetermined condition is established, the special free game being executed without the BET of game media and being more advantageous than the normal free game.

According to the above-mentioned control method of a slot machine, the normal free game is executed when the first predetermined condition is established in the normal game. Further, the special free game is executed when the second predetermined condition is established.

As thus described, since two different conditions comprising the first predetermined condition and the second predetermined condition are set as the conditions for generation of the free game, it is possible to shift the player's attention to the first predetermined condition and to the second predetermined condition. Namely, it is possible to switch the object for capturing the player's attention during the game, and therefore, it is possible to provide a game which is less likely to be monotonous for the player and hardly bores the player even after long hours of play.

Further, since there are two kinds of the free games comprising the normal free game and the special free game which is more advantageous than the normal free game, it is possible to increase the player's interest and concern for the free game.

Furthermore, when the second predetermined condition is established, the special free game is executed and a payout of the game media in a predetermined amount is determined. Accordingly, it is possible to give a satisfaction to the player.

The present invention provides a slot machine having the following configuration.

Namely, the slot machine comprises: a symbol display capable of variably displaying symbols including a special symbol; an input device; and a controller. The controller is programmed to execute processing of: (A) executing a normal game, in which the symbols including the special symbol are variably displayed and then stop-displayed to the symbol display, and game media are paid out in an amount corresponding to the stop-displayed symbol or a combination of the stop-displayed symbols; (B) increasing a number of the special symbols which can be displayed to the symbol display, based upon an input from the input device, when a predetermined condition is established in the normal game executed in the processing (A); and (C) executing a special game, in which the symbols including the special symbols increased in the processing (B) are variably displayed and then stop-displayed to the symbol display, and game media are paid out in an amount corresponding to the stop-displayed symbol or a combination of the stop-displayed symbols.

According to the above-mentioned slot machine, a normal game is executed, in which symbols including a special symbol are variably displayed and then stop-displayed to a symbol display, and game media are paid out in an amount corresponding to the stop-displayed symbol or a combination of the stop-displayed symbols. The number of the special symbols which can be displayed to the symbol display is increased based upon an input from an input device, when a predetermined condition is established in the normal game. Thereafter, a special game is executed, in which symbols including the increased special symbols are variably displayed and then stop-displayed to the symbol display, and game media are paid out in an amount corresponding to the stop-displayed symbol or a combination of the stop-displayed symbols.

Since the number of special symbols is increased, not the number of normal symbols, it is possible to make the player have expectations, and to provide a more attractive game.

Further, since the number of special symbols is increased based upon an input from the input device, it is possible to give the player an impression that the number of special symbols has been increased by the player's input, so as to make the player more absorbed in the game.

It is desirable that the slot machine further has the following configuration.

Namely, the processing (A) is processing of executing the normal game, in which a symbol array including the special symbol are scroll-displayed in a single direction and then stop-displayed to the symbol display, and game media are paid out in an amount corresponding to the stop-displayed symbol or a combination of the stop-displayed symbols, and the processing (B) includes the processing of: (B-1) executing display of the special symbol being added to the symbol array based upon an input from the input device, while scrolling the symbol array in a direction opposite to the single direction, when a predetermined condition is established in the normal game executed in the processing (A); and (B-2) displaying a number of added special symbols, along with the display of the special symbol being added to the symbol in the processing (B-1).

According to the above-mentioned slot machine, the normal game is executed in which a symbol array is scroll-displayed in a single direction and then stop-displayed, and game media are paid out in an amount corresponding to the stop-displayed symbol or a combination of the stop-displayed symbols. Then, when a predetermined condition (e.g. display of a predetermined number or more of special symbols on the pay line) is established in the normal game, display of the special symbol being added to the symbol array is executed while the symbol array is scrolled in a direction opposite to the single direction. Addition of the special symbol to the symbol array allows the player to have expectations that a new game using a new symbol array different from that in the normal game is started.

Further, scrolling of the symbol array at the time of adding the special symbol to the symbol array allows the player to see which position of the symbol arrays the special symbol has been added to. This facilitates the player having seen the position of the added special symbol in the symbol array, to predict as to whether or not the added special symbol will be stop-displayed on the pay line, during the scroll-display of the symbol array. Consequently, this can further raise the expectations generated by the addition of the special symbol.

Moreover, when conducting the display of the special symbol being added to the symbol array, the symbol array is scrolled in the direction opposite to the direction in the normal game. This allows the player to notice that the scroll-display during the display of the special symbol being added to the symbol array is not a part of a game but an effect to be conducted when adding the special symbol.

As thus described, when the predetermined condition is established in the normal game, the display of the special symbol being added to the symbol array is conducted while the symbol array is scrolled in the direction opposite to the direction in the normal game, so that it becomes possible to provide a more attractive game.

Furthermore, since the number of added special symbols is displayed, along with the display of the special symbol being added to the symbol array, it is possible to gradually raise the player's expectations.

It is desirable that the slot machine further has the following configuration.

The symbol display is further capable of displaying a plurality of selection images, the input device is capable of making an input indicating selection of a single selection image out of the plurality of selection images displayed to the symbol display, and the processing (B) is the processing of: (B-1) displaying the plurality of selection images to the symbol display when a predetermined condition is established in the normal game executed in the processing (A); and (B-2) increasing the number of the special symbols which can be displayed to the symbol display, based upon an input from the input device, the input indicating the selection of a single selection image out of the plurality of selection images displayed to the symbol display.

According to the above-mentioned slot machine, when a predetermined condition is established in the normal game, the plurality of selection images are displayed to the symbol display, and the number of special symbols which can be displayed to the symbol display is increased based upon an input from the input device, the input indicating selection of a single selection image out of the plurality of selection images.

Since the number of special symbols is increased based upon an input from the input device, the input indicating selection of a single selection image out of the plurality of selection images, it is possible to give the player an impression that the number of special symbols has been increased by the player's selection, so as to make the player more absorbed in the game.

Further, the number of special symbols is increased by a simple method of selecting a single selection image from a plurality of selection images, thereby allowing a variety of players to play games without having feelings of discomfort.

The present invention provides a slot machine having the following configuration.

Namely, the slot machine comprises: a symbol display capable of variably displaying symbols including a predetermined number of special symbols; an input device; and a controller. The controller is programmed to execute processing of: (A) executing a normal game, in which symbols including the predetermined number of special symbols are variably displayed and then stop-displayed to the symbol display, and game media are paid out in an amount corresponding to the stop-displayed symbol or a combination of the stop-displayed symbols; (B) determining a number of the special, symbols to be added, which can be displayed to the symbol display, based upon an input from the input device, when a predetermined condition is established in the normal game executed in the processing (A); and (C) executing a special game, in which symbols including the special symbols in a total number of the number of the special symbols to be added determined in the processing (B) and the predetermined number are variably displayed and then stop-displayed to the symbol display device, and game media are paid out in an amount corresponding to the stop-displayed symbol or a combination of the stop-displayed symbols.

According to the above-mentioned slot machine, a normal game is executed in which symbols including a predetermined number of special symbols are variably displayed and then stop-displayed to a symbol display, and game media are paid out in an amount corresponding to the stop-displayed symbol or a combination of the stop-displayed symbols. The number of the special symbols to be added, which can be displayed to the symbol display, is then determined based upon an input from an input device when a predetermined condition is established in the normal game. Thereafter, a special game is executed in which symbols including the special symbols in a total number of the determined number of the special symbols to be added and the predetermined number are variably displayed and then stop-displayed to the symbol display, and game media are paid out in an amount corresponding to the stop-displayed symbol or a combination of the stop-displayed symbols.

Since the number of special symbols is increased, not the number of normal symbols, it is possible to make the player have expectations, and to provide a more attractive game.

Further, since the number of the special symbols to be added is determined based upon an input from the input device, it is possible to give the player an impression that the number of special symbols has been increased by the player's input, so as to make the player more absorbed in the game.

It is desirable that the slot machine further has the following configuration.

The processing (A) is processing of executing the normal game, in which a symbol array including the special symbols are scroll-displayed in a single direction and then stop-displayed to the symbol display, and game media are paid out in an amount corresponding to the stop-displayed symbol or a combination of the stop-displayed symbols, and the processing (B) includes the processing of: (B-1) determining a number of the special symbols to be added, which can be displayed to the symbol display, based upon an input from the input device, when a predetermined condition is established in the normal game executed in the processing (A); (B-2) executing display of the special symbols being added to the symbol array by the number of the special symbols to be added determined in the processing (B-1), while scrolling the symbol array in a direction opposite to the single direction, when determining the number of the special symbols to be added in the processing (B-1); and (B-3) displaying a number of added special symbols, along with the display of the special symbol being added to the symbol array in the processing (B-2).

According to the above-mentioned slot machine, the normal game is executed in which a symbol array is scroll-displayed in a single direction and then stop-displayed, and game media are paid out in an amount corresponding to the stop-displayed symbol or a combination of the stop-displayed symbols. Then, when a predetermined condition (e.g. display of a predetermined number or more of special symbols on the pay line) is established in the normal game, display of the special symbol being added to the symbol array is executed while the symbol array is scrolled in a direction opposite to the single direction. Addition of the special symbol to the symbol array allows the player to have expectations that a new game using a new symbol array different from that in the normal game is started.

Further, scrolling of the symbol array at the time of adding the special symbol to the symbol array allows the player to see which position of the symbol array the special symbol has been added to. This facilitates the player having seen the position of the added special symbol in the symbol array, to predict as to whether or not the added special symbol will be stop-displayed on the pay line, during the scroll-display of the symbol array. Consequently, this can further raise the expectations generated by the addition of the special symbol.

Moreover, when conducting the display of the special symbol being added to the symbol array, the symbol array is scrolled in the direction opposite to the direction in the normal game. This allows the player to notice that the scroll-display during the display of the special symbol being added to the symbol array is not a part of a game but an effect to be conducted when adding the special symbol.

As thus described, when the predetermined condition is established in the normal game, the display of the special symbol being added to the symbol array is conducted while the symbol arrays are scrolled in the direction opposite to the direction in the normal game, so that it becomes possible to provide a more attractive game.

Furthermore, since the number of added special symbols is displayed, along with the display of the special symbol being added to the symbol array, it is possible to gradually raise the player's expectations.

It is desirable that the slot machine further has the following configuration.

The symbol display is further capable of displaying a plurality of selection images, the input device is capable of making an input indicating selection of a single selection image out of the plurality of selection images displayed to the symbol display, and the processing (B) is the processing of: (B-1) displaying the plurality of selection images to the symbol display when a predetermined condition is established in the normal game executed in the processing (A); and (B-2) determining the number of the special symbols to be added, which can be displayed to the symbol display device, based upon an input from the input device, the input indicating selection of a single selection image out of the plurality of selection images displayed to the symbol display.

According to the above-mentioned slot machine, when a predetermined condition is established in the normal game, a plurality of selection images are displayed to the symbol display, and the number of special symbols to be added, which can be displayed to the symbol display, is determined based upon an input from the input device, the input indicating selection of a single selection image out of the plurality of selection images displayed to the symbol display.

Since the number of the special symbols to be added is determined based upon an input from the input device, the input indicating selection of a single selection image out of the plurality of selection images, it is possible to give the player an impression that the number of special symbols has been increased by the player's selection, so as to make the player more absorbed in the game.

Further, the number of special symbols is increased by using a simple method of selecting a single selection image from a plurality of selection images, thereby allowing a variety of players to play games without having feelings of discomfort.

It is desirable that the slot machine further has the following configuration.

The symbol display is further capable of displaying an image, and the controller is further programmed to execute processing of (D) displaying an image indicative of the number of the special symbols to be added determined in the processing (B), to the symbol display.

According to the above-mentioned slot machine, an image indicative of the determined number of the special symbols to be added is displayed to the symbol display. Accordingly, it is possible to notify the player of the number of the special symbols to be added, so as to give the player an impression that the number of the special symbols is increased. Further, in a case where the to-be-added number is large, it is possible to have the player excited.

The present invention further provides a control method of a slot machine, the control method having the following configuration.

Namely, the control method of a slot machine comprises the steps of: (A) executing a normal game, in which symbols including a special symbol are variably displayed and then stop-displayed to a symbol display capable of variably displaying the symbols including the special symbol, and game media are paid out in an amount corresponding to the stop-displayed symbol or a combination of the stop-displayed symbols; (B) increasing a number of the special symbols which can be displayed to the symbol display, based upon an input from an input device, when a predetermined condition is established in the normal game executed in the step (A); and (C) executing a special game, in which symbols including the special symbols increased in the step (B) are variably displayed and then stop-displayed to the symbol display, and game media are paid out in an amount corresponding to the stop-displayed symbol or a combination of the stop-displayed symbols.

According to the above-mentioned control method of a slot machine, a normal game is executed, in which symbols including a special symbol are variably displayed and then stop-displayed to a symbol display, and game media are paid out in an amount corresponding to the stop-displayed symbol or a combination of the stop-displayed symbols. The number of the special symbols which can be displayed to the symbol display is increased based upon an input from an input device, when a predetermined condition is established in the normal game. Thereafter, a special game is executed, in which symbols including the increased special symbols are variably displayed and then stop-displayed to the symbol display, and game media are paid out in an amount corresponding to the stop-displayed symbol or a combination of the stop-displayed symbols.

Since the number of special symbols is increased, not the number of normal symbols, it is possible to make the player have expectations, and to provide a more attractive game.

Further, since the number of the special symbols is increased based upon an input from the input device, it is possible to give the player an impression that the number of special symbols has been increased by the player's input, so as to make the player more absorbed in the game.

The present invention further provides a control method of a slot machine, having the following configuration.

Namely, the control method of a slot machine comprises the steps of: (A) executing a normal game, in which symbols including a predetermined number of special symbols are variably displayed and then stop-displayed to a symbol display capable of variably displaying the symbols including the predetermined number of special symbols, and game media are paid out in an amount corresponding to the stop-displayed symbol or a combination of the stop-displayed symbols; (B) determining a number of the special symbols which can be displayed to the symbol display based upon an input from an input device, when a predetermined condition is established in the normal game executed in the step (A); and (C) executing a special game, in which symbols including the special symbols in a total number of the number of the special symbols to be added determined in the step (B) and the predetermined number are variably displayed and then stop-displayed to the symbol display, and game media are paid out in an amount corresponding to the stop-displayed symbol or a combination the stop-displayed symbols.

According to the above-mentioned control method of a slot machine, a normal game is executed, in which symbols including a predetermined number of special symbols are variably displayed and then stop-displayed to a symbol display, and game media are paid out in an amount corresponding to the stop-displayed symbol or a combination of the stop-displayed symbols. The number of the special symbols to be added, which can be displayed to the symbol display, is then determined based upon an input from an input device, when a predetermined condition is established in the normal game. Thereafter, a special game is executed, in which symbols including the special symbols in a total number of the determined number of the special symbols to be added and the predetermined number are variably displayed and then stop-displayed to the symbol display, and game media are paid out in an amount corresponding to the stop-displayed symbol or a combination of the stop-displayed symbols.

Since the number of the special symbols is increased, not the number of normal symbols, it is possible to make the player have expectations, and to provide a more attractive game.

Further, since the number of the special symbols to be added is determined based upon an input from the input device, it is possible to give the player an impression that the number of special symbols has been increased by the player's input, so as to make the player more absorbed in the game.

BRIEF DESCRIPTIONS OF THE DRAWINGS

FIG. 5 is a symbol table for a normal game, which shows a correspondence relationship among each symbol in each symbol array of display blocks, a code number and a random number value.

FIG. 7 is a view showing a correspondence relationship among a kind and the number of symbols rearranged on a pay line, and an amount of payout.

FIG. 13 is a view showing a table for determining the number of the to-be-added special symbols.

FIG. 15 is a view showing a symbol-array determination table.

FIG. 16 is a view showing a code-number determination table.

FIG. 17A is an example of a symbol table for a feature game, which shows a correspondence relationship among each symbol in each symbol array of the display blocks, the code number and the random number value.

FIG. 17B is an example of a symbol table for a feature game, which shows a correspondence relationship among each symbol in each symbol array of the display blocks, the code number and the random number value.

FIG. 26 is a view showing a third-specific-number determination table.

FIG. 34 is a symbol table for a normal game, which shows a correspondence relationship among each symbol in each symbol array of display blocks, a code number and a random number value.

FIG. 36 is a view showing a correspondence relationship among a kind and the number of symbols rearranged on a pay line, and an amount of payout.

FIG. 47 is a view showing a table for determining the number of the to-be-added special symbols.

FIG. 49 is a view showing a symbol-array determination table.

FIG. 50 is a view showing a code-number determination table.

FIG. 51A is an example of a symbol table for a feature game, which shows a correspondence relationship among each symbol in each symbol array of the display blocks, the code number and the random number value.

FIG. 51B is an example of a symbol table for a feature game, which shows a correspondence relationship among each symbol in each symbol array of the display blocks, the code number and the random number value.

FIG. 59 is a symbol table for a normal game, which shows a correspondence relationship among each symbol in each symbol array of display blocks, a code number and a random number value.

FIG. 61 is a view showing a correspondence relationship among a kind and the number of symbols rearranged on a pay line, and an amount of payout.

FIG. 66 is a view showing a number-of-games determination table.

FIG. 69 is a view showing a table for determining the number of to-be-added special symbols.

FIG. 71 is a view showing a symbol-array determination table.

FIG. 72 is a view showing a code-number determination table.

FIG. 73A is an example of a symbol table for a feature game, which shows a correspondence relationship among each symbol in each symbol array of the display blocks, the code number and the random number value.

FIG. 73B is an example of a symbol table for a feature game, which shows a correspondence relationship among each symbol in each symbol array of the display blocks, the code number and the random number value.

DESCRIPTION OF THE EMBODIMENTS

First Embodiment

A first embodiment of the present invention is described by using FIGS. 1A to 1F.

FIGS. 1A to 1F are views each showing an exemplary image displayed to a lower image display panel.

In a slot machine 10 (cf. FIG. 2) according to the first embodiment, a plurality of symbols are variably displayed and then stop-displayed (rearranged) in display blocks 28 in a lower image display panel 16.

Figure 1A:
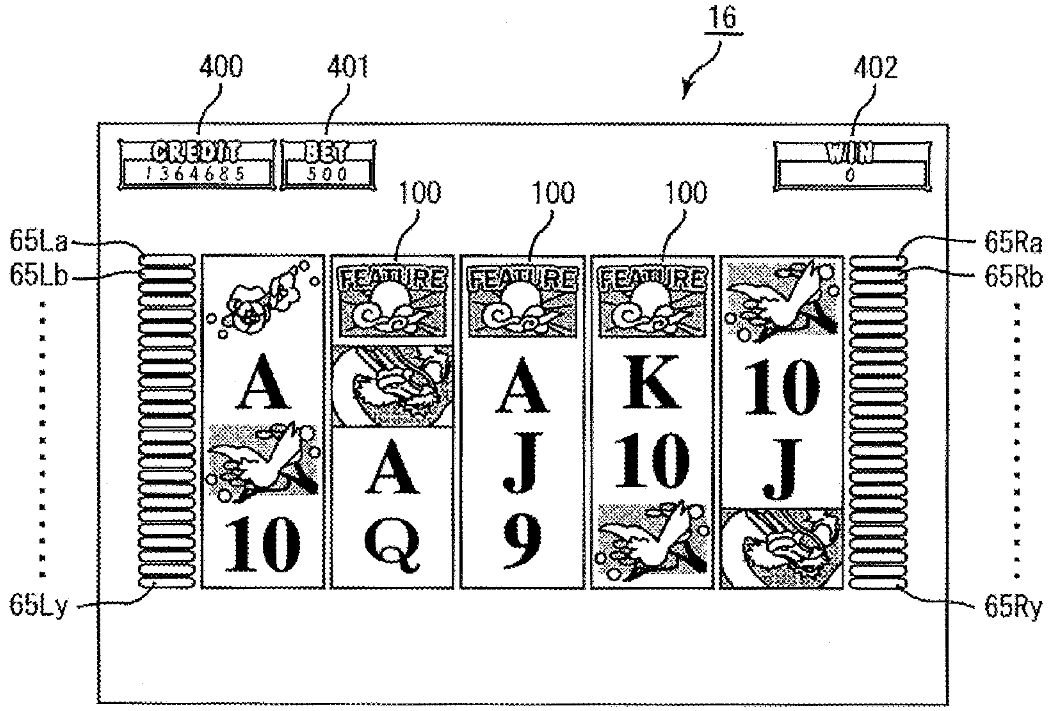
FIG. 1A is a view showing an exemplary image displayed to a lower image display panel provided in a slot machine according to one embodiment of the present invention.

FIG. 1A shows a state where three feature symbols 100 are stop-displayed. In the first embodiment, when three feature symbols 100 are stop-displayed, a free game is generated. The free game is a game that can be played without betting game media such as a coin.

Among games conducted in the slot machine 10, the game other than the free game is referred to as a normal game in the present specification. Further, the free game conducted when three or more feature symbols 100 are stop-displayed in the normal game is referred to as a first free game.

Figure 1B:
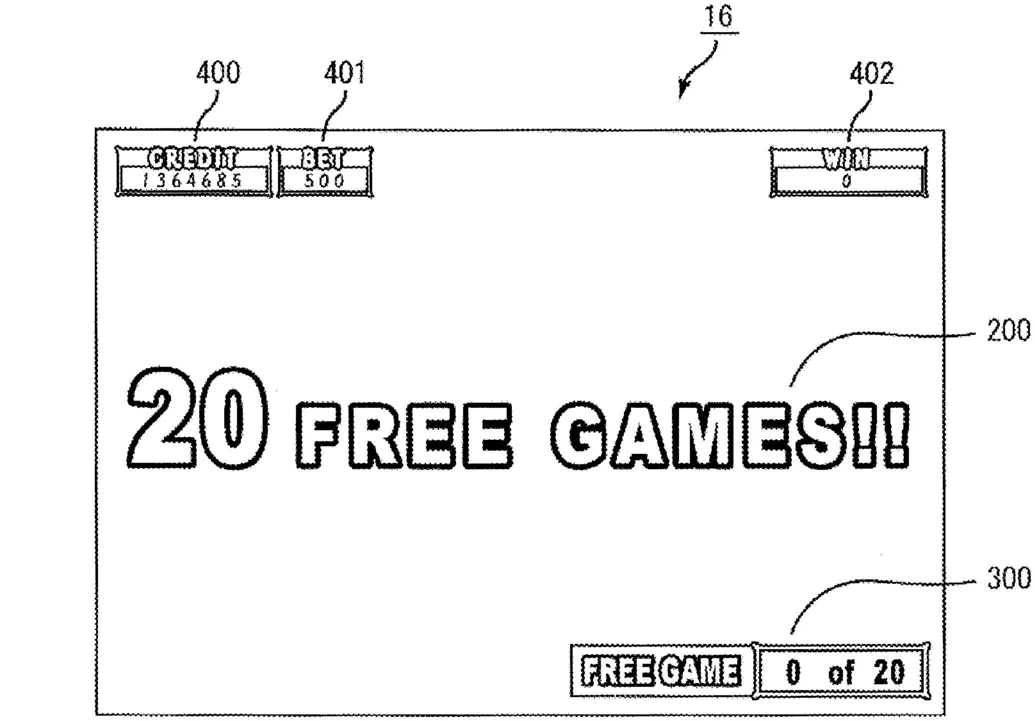
FIG. 1B is a view illustrating an exemplary image displayed to a lower image display panel provided in a slot machine according to one embodiment of the present invention.

FIG. 1B shows a state where a free-game-generated image 200 is displayed triggered by a stop-display of three feature symbols 100. The free-game-generated image 200 is showing the number of the generated free games. As shown in FIG. 1B, the number of the first free games (first specific number) generated when three or more feature symbols 100 are stop-displayed in the normal game is 20 in the first embodiment.

The stop-display of three or more feature symbols 100 corresponds to the first specific condition in the present invention.

Further, in FIG. 1B, a state that a number-of-free-games display portion 300 is provided on the lower image display panel 16. The number-of-free-games display portion 300 displays the number of the generated free games (hereinafter, also referred to as number of all free games) and the number of the already-conducted free games (hereinafter, also referred to as number of the conducted free games). The example in FIG. 1B shows that the number of all free games is 20 and the number of the conducted free games is 0.

Further, in the slot machine 10 according to the first embodiment, a mode is shifted from a non-insurance mode to an insurance mode triggered by an insurance BET button 90 (cf. FIG. 2) being pressed. Then, the number of the normal games conducted after the shift of the mode to the insurance mode is counted. When the number of the counted normal games has reached a prescribed number (1000), the free game is generated. The free game generated like this is referred to as a second free game in the present description. The number of the counted free games reaching the prescribed number corresponds to a second predetermined condition in the present invention.

Figure 1C:
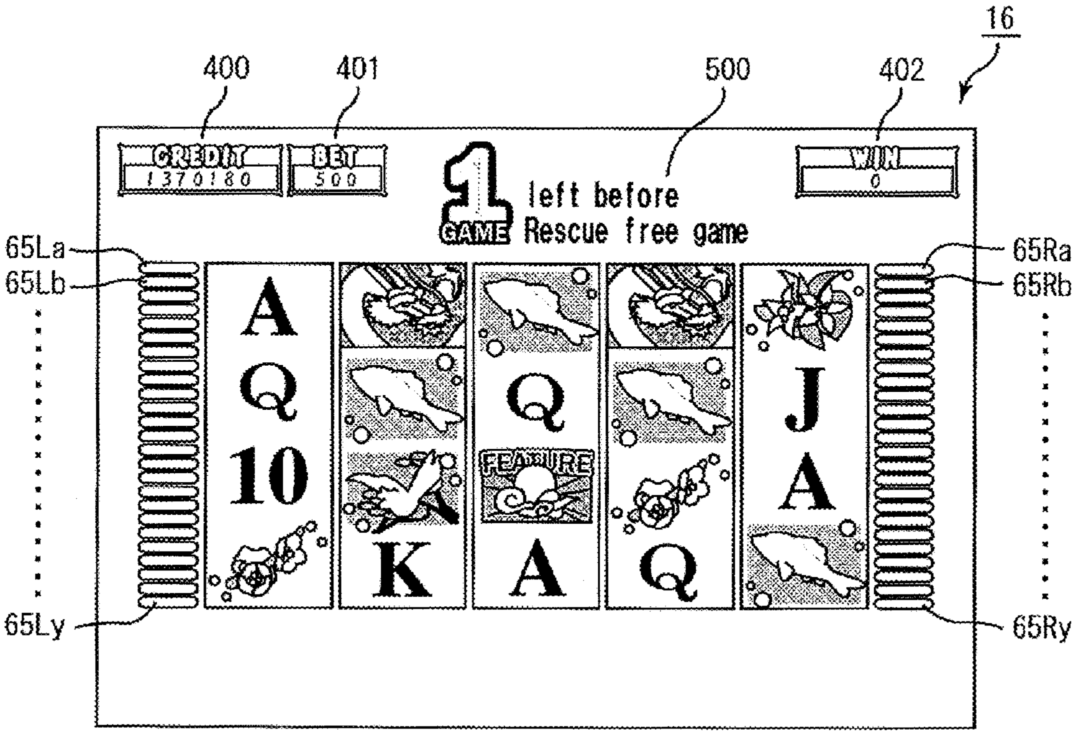
FIG. 1C is a view showing an exemplary image displayed to a lower image display panel provided in a slot machine according to one embodiment of the present invention.

As shown in FIG. 1C, a countdown image 500 is displayed to the lower image display panel 16. The countdown image 500 is an image showing the number of the games until the number of the counted normal games reaches the prescribed number (1000). The example in FIG. 1C shows that one game is left before the number of the counted normal games reaches the prescribed number (1000).

Figure 1D:
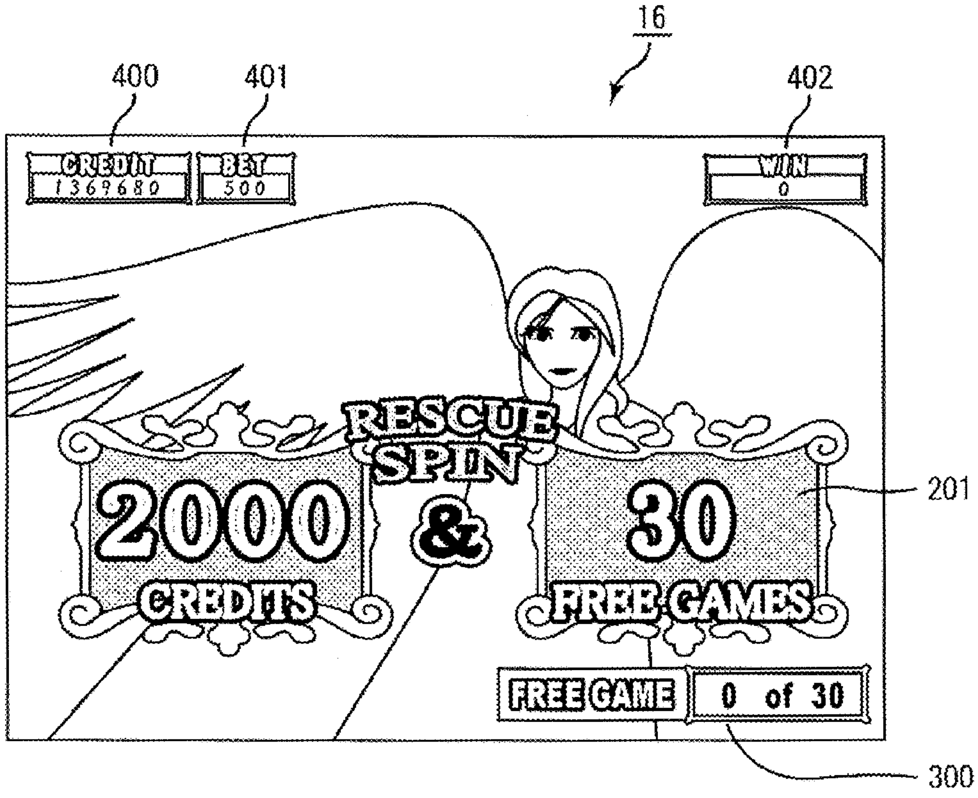
FIG. 1D is a view showing an exemplary image displayed to a lower image display panel provided in a slot machine according to one embodiment of the present invention.

In FIG. 1D, a state that a reaching effect image 201 is displayed triggered by the number of the counted normal games having reached the prescribed number is shown. The reaching effect image 201 shows contents of a benefit to be offered to the player triggered by the number of the counted normal games having reached the prescribed number.

As shown in FIG. 1D, in the first embodiment, the number of the second free games (second specific number) to be generated triggered by the number of the counted normal games having reached the prescribed number is 30.

Here, in addition to the second free games, a predetermined number of coins (2000 coins) are also offered.

Further, FIG. 1D shows a state that "30" as the number of all free games and "0" as the number of the conducted free games are displayed to the number-of-free-games display portion 300.

Subsequently, the second free game is conducted.

Figure 1E:
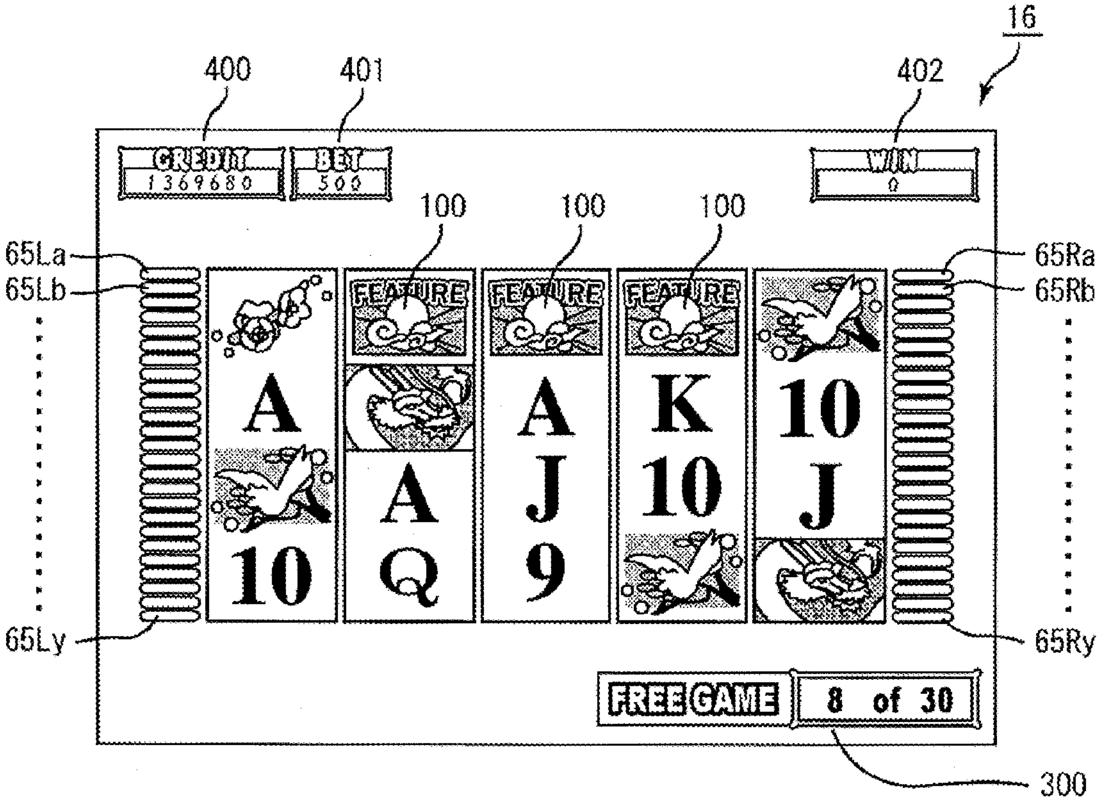
FIG. 1E is a view showing an exemplary image displayed to a lower image display panel provided in a slot machine according to one embodiment of the present invention.

In FIG. 1E, a state that three feature symbols are displayed in the second free game is shown. In the first embodiment, the remaining number of the free games is increased when three or more feature symbols 100 are displayed in the second free game.

Figure 1F:
FIG. 1F is a view showing an exemplary image displayed to a lower image display panel provided in a slot machine according to one embodiment of the present invention.

In FIG. 1F, a state that a free-game addition image 202 is displayed triggered by three feature symbols 100 displayed in the second free game is shown. The free-game addition image 202 shows the number of the free games to be added. As shown in FIG. 1F, the number of the free games (third specific number) to be added when three or more feature symbols are stop-displayed in the second free game is 30, in the first embodiment.

Further, FIG. 1F shows a state that the number of all free games displayed to the number-of-free-games display portion 300 is increased from 30 to 60 because of the stop-display of three feature symbols 100.

As above, the general description of the first embodiment has been given by using FIG. 1A to 1F.

It is to be noted that the free game is also referred to as a feature game in the following.

Further, each of FIGS. 1A to 1F also shows a state that a number-of-credits display portion 400, a number-of-BETs display portion 401 and a number-of-payouts display portion 402 are displayed to the lower image display panel 16. The number-of-credits display portion 400 is for displaying the number of credited coins. The number-of-BETs display portion 401 is for displaying the number of betted coins. The number-of-payouts display portion 402 is for displaying the number of coins to be paid out.

In the following, the first embodiment is described in more detail.

Figure 2:
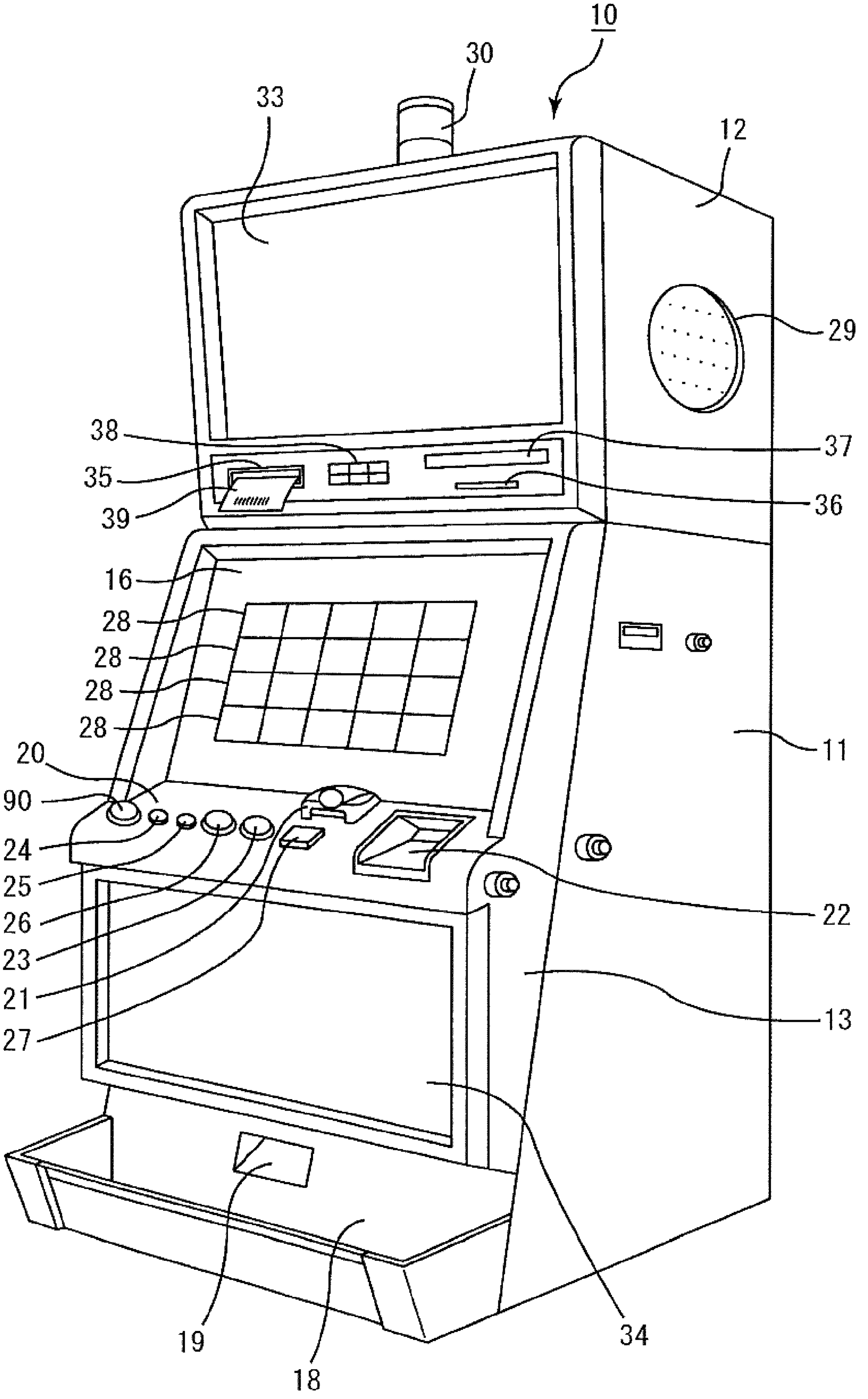
FIG. 2 is a perspective view showing an external view of a slot machine according to one embodiment of the present invention.

FIG. 2 is a perspective view showing an external view of a slot machine according to one embodiment of the present invention.

In the slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11.

On the main door 13, there is provided the lower image display panel 16. The lower image display panel 16 includes a transparent liquid crystal panel which displays twenty display blocks 28 along five columns and four rows. A single symbol is displayed in each display block 28. The lower image display panel 16 corresponds to the symbol display in the present invention.

Here, in the present embodiment, a case is described where the slot machine 10 is a so-called video slot machine. However, a slot machine of the present invention may be configured to stop-display the symbols by using a so-called mechanical reel.

Further, although not shown, various types of images relating to an effect, in addition to the aforementioned images, are displayed to the lower image display panel 16.

Moreover, although not shown, the touch panel 69 is provided at the front face of the lower image display panel 16. The player can operate the touch panel 69 to input a variety of commands.

When the touch panel 69 is operated, an input signal is transmitted from the touch panel 69 to a main CPU 41.

Below the lower image display panel 16, there are provided a control panel 20 including a plurality of buttons 23 to 27 and 90, with each of which a command according to game progress is inputted by the player, a coin receiving slot 21 through which a coin is accepted into the cabinet 11, and a bill validator 22.

The control panel 20 is provided with a start button 23, a change button 24, a CASHOUT button 25, a 1-BET button 26, a maximum BET button 27, and an insurance BET button 90. The start button 23 is for inputting a command to start scrolling of symbols. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (500 coins in the present embodiment) out of credited coins. The insurance BET button 90 is used for inputting a command to shift the mode from the non-insurance mode to the insurance mode.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely, below the control panel 20, there is provided a belly glass 34 on which a character or the like of the slot machine 10 is drawn.

An upper image display panel 33 is provided on the front surface of the top box 12. The upper image display panel 33 is provided with a liquid crystal panel and displays, for example, images indicative of introduction of contents of the game and explanation of the rule of the game.

Further, a speaker 29 is provided in the top box 12. Under the upper image display panel 33, there are provided a ticket printer 35, a card reader 36, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 37 includes a fluorescent display and the like, and displays, for example, data read by the card reader 36 or data inputted by the player via the key pad 38. The key pad 38 is used for inputting a command and data concerning issuing of a ticket, and the like.

Figure 3:
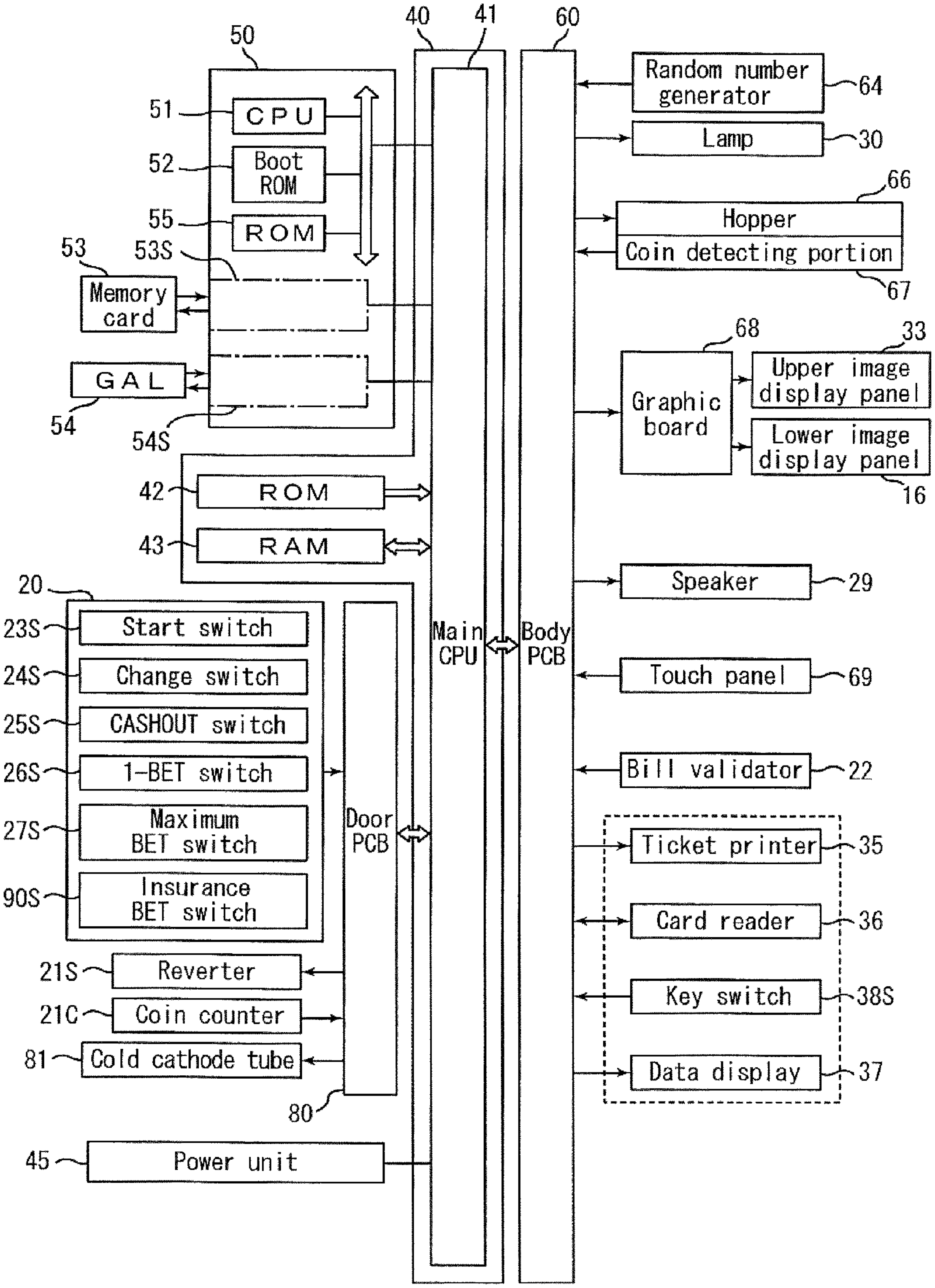
FIG. 3 is a block diagram showing an internal configuration of the slot machine shown in FIG. 2.

FIG. 3 is a block diagram showing an internal configuration of the slot machine shown in FIG. 2.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program. The game program includes a symbol determination program. The symbol determination program is a program for determining symbols to be rearranged in the display blocks 28.

Further, the card slot 53S is configured so as to allow the memory card 53 to be inserted thereinto or removed therefrom, and is connected to the mother board 40 by an IDE bus. Therefore, the memory card 53 can be removed from the card slot 53S, and then another game program is written into the memory card 53, and the memory card 53 can be inserted into the card slot 53S, to change the type and contents of the game played on the slot machine 10. The game program includes a program according to progress of the game. Further, the game program includes image data and sound data to be outputted during the game. The image data includes image data indicative of the free-game-generated image 200, the reaching effect image 201, the free-game addition image 202, and the like.

Further, the game program includes: symbol-table data for a normal game, showing a symbol table for a normal game (cf. FIG. 5) which shows the correspondence relationship among each symbol in each symbol array of the display blocks, the code number and the random number value; odds data showing the correspondence relationship (cf. FIG. 7) among the kind and the number of the symbols rearranged on a pay line 300 (cf. FIG. 6) and the amount of payout; determination table data of the number of the to-be-added special symbols which shows a table (cf. FIG. 13) for determining the number of the to-be-added special symbols; symbol-array determination table data showing a symbol-array determination table (cf. FIG. 15); and code-number determination-table data showing a code-number determination table (cf. FIG. 16), and the like.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and provided with the main CPU 41, a ROM (Read Only Memory) 42, and a RAM (Random Access Memory) 93. The mother board 40 corresponds to the controller in the present invention.

The ROM 42 comprises a memory device such as a flash memory, and stores a program such as a BIOS (Basic Input/Output System) executed by the main CPU 41 and permanent data. When the BIOS is executed by the main CPU 91, processing for initializing a predetermined peripheral device is conducted, concurrently with start of processing for loading the game program stored in the memory card 53 via the gaming board 50. It is to be noted that, in the present invention, the ROM 42 may or may not be data rewritable one.

The RAM 43 stores data and a program such as a symbol-determination program, which are used at the time of operation of the main CPU 41. Further, the RAM 93 is capable of storing a game program.

Moreover, the RAM 43 stores data of the number of credits, the numbers of coin-ins and coin-outs in one game, and the like. Further, the RAM 43 stores symbol-table data for a feature game, showing a symbol table for a feature game (cf. FIGS. 17A and 17B) which shows the correspondence relationship among each symbol in each symbol array of the display blocks, the code number and the random number value, and the like.

Further, the RAM 43 is provided with a number-of-free-games storage area, a number-of-all-games storage area, a total-amount-of-payout storage area, and a number-of-feature-symbols storage area.

The number-of-free-games storage area stores remaining-number data indicative of a remaining number T of the free games.

The number-of-all-games storage area stores number-of-all-games data indicative of the number C of all games. The number C of all games is the number of the normal games played after the shift of the mode to the insurance mode.

The total-amount-of-payout storage area stores total-amount-of-payout data indicative of the total amount of the payout in the second free game.

The number-of-feature-symbols storage area stores number-of-feature-symbols data indicative of the number of the feature symbols. The number of the features symbols is the total number of the feature symbols 100 rearranged in the display blocks 28 in the second free game.

Further, a storage area of an insurance flag is provided in the main RAM 43. The insurance flag is a flag to be set triggered by the insurance BET button 90 being pressed. The storage area of the insurance flag comprises, for example, a storage area of a predetermined number of bits, and the insurance flag is turned "ON" or "OFF" in accordance with a storage in the storage area. The state of "ON" of the insurance flag corresponds to the insurance mode. The state of "OFF" of the insurance flag corresponds to the non-insurance mode.

Moreover, the mother board 40 is connected with a later-described body PCB (Printed Circuit Board) 60 and a door PCB 80 through respective USBs. Further, the mother board 40 is connected with a power supply unit 45.

The body PCB 60 and the door PCB 80 are connected with equipment and a device that generate an input signal to be inputted into the main CPU 41, and equipment and a device operations of which are controlled by a control signal outputted from the main CPU 41. The main CPU 41 executes the game program stored in the RAM 43 based on the input signal inputted into the main CPU 41, and thereby executes the predetermined arithmetic processing and stores the result thereof into the RAM 43, or transmits a control signal to each equipment and device as processing for controlling each equipment and device.

The body PCB 60 is connected with a lamp 30, a hopper 66, a coin detecting portion 67, a graphic board 68, the speaker 29, the touch panel 69, the bill validator 22, the ticket printer 35, the card reader 36, a key switch 38S, the data display 37, and a random number generator 64. The lamp 30 is lighted in a predetermined pattern based on control signals outputted from the main CPU 41.

The hopper 66 is installed inside the cabinet 11, and pays out a predetermined number of coins based on the control signal outputted from the main CPU 41, from a coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. In the respective display blocks 28 on the lower image display panel 16, symbols are displayed in a scrolling manner or in a stopped state. The number of credits stored in the RAM 43 is displayed to the number-of-credits display portion 400 of the lower image display panel 16. Further, the number of betted coins is displayed to the number-of-bets display portion 401 of the lower image display panel 16. Furthermore, the number of coin-outs is displayed to the payout display portion 402 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35 prints on a ticket a barcode as coded data of the number of credits stored in the RAM 43, a date, and an identification number of the slot machine 10, and the like, based on the control signal outputted from the main CPU 41, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the key pad 38, based on the control signal outputted from the main CPU 41.

The random number generator 64 generates a random number at a predetermined timing. It is to be noted that the range of the random number generated by the random number generator 64 is from 0 to 65535.

The door PCB 80 is connected with the control panel 20, a reverter 21S, a coin counter 21C, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, a maximum BET switch 27S corresponding to the maximum BET button 27, and an insurance BET switch 90S corresponding to the insurance BET button 90. Each of the switches 23S to 27S and 90S outputs an input signal to the main CPU 41 when each of the buttons 23 to 27 and 90 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and is lighted up based on the control signal outputted from the main CPU 41.

Figure 4:
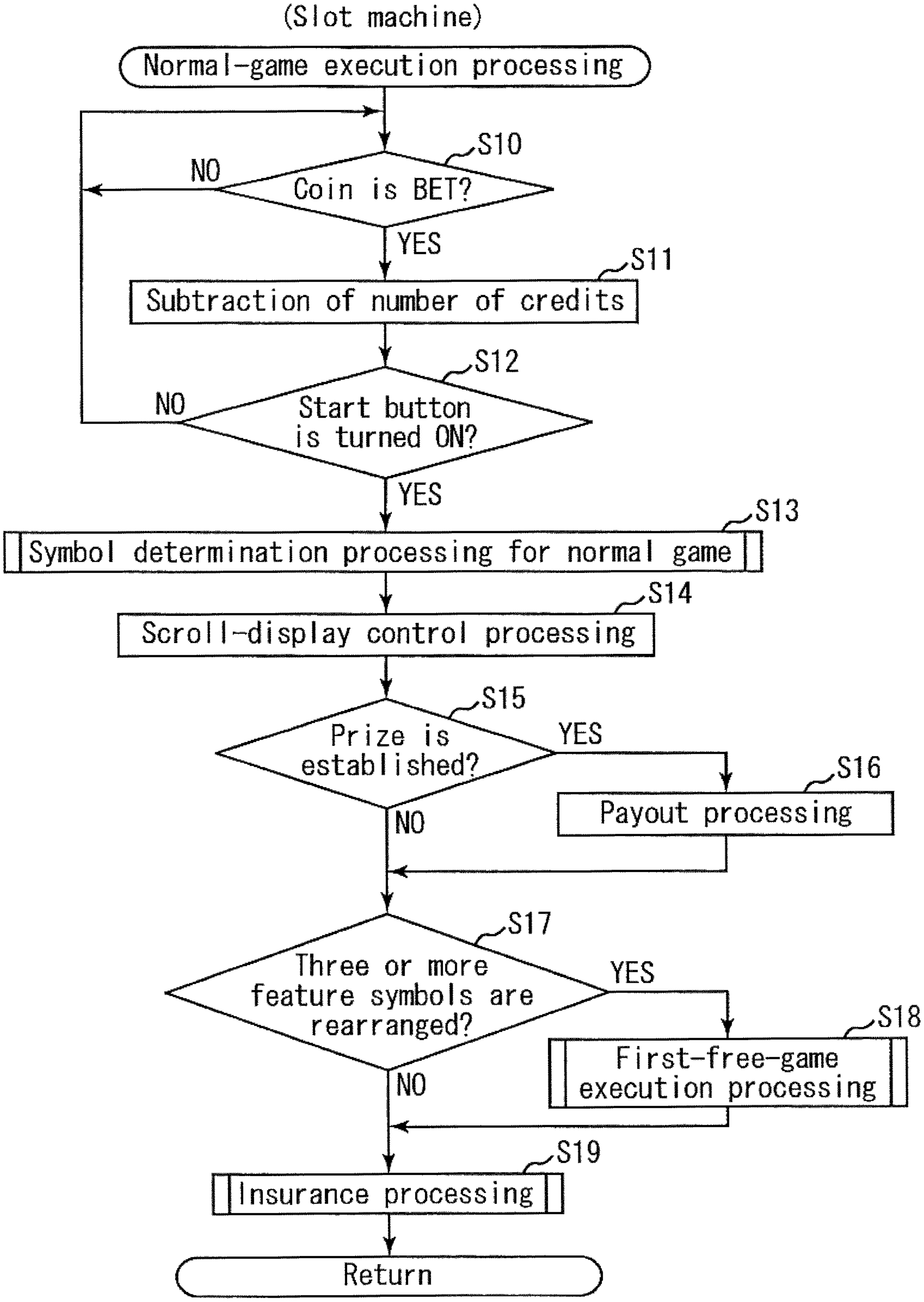
FIG. 4 is a flowchart showing normal-game execution processing.

FIG. 4 is a flowchart illustrating normal-game execution processing.

First, the main CPU 41 determines whether or not a coin has been betted (step S10). In this processing, the main CPU 41 determines whether or not to have received an input signal that is outputted from the 1-BET switch 26S when the 1-BET button 26 is operated, or an input signal that is outputted from the maximum BET switch 27S when the maximum BET button 27 is operated. When the main CPU 41 determines that the coin has not been betted, the processing is returned to step S10.

On the other hand, when determining that the coin has been betted in step S10, the main CPU 41 conducts processing for making a subtraction from the number of credits stored in the RAM 43 according to the number of betted coins (step S11). It is to be noted that, when the number of coins to be betted is larger than the number of credits stored in the RAM 43, the main CPU 41 does not conduct the processing for making a subtraction from the number of credits stored in the RAM 43, and the processing is returned to step S10. Further, when the number of coins to be betted exceeds the upper limit of the number of coins that can be betted in one game (500 coins in the present embodiment), the main CPU 41 does not conduct the processing for making a subtraction from the number of credits stored in the RAM 43, and the processing is proceeded to step S12.

Next, the main CPU 41 determines whether or not the start button 23 has been turned ON (step S12). In this processing, the main CPU 41 determines whether or not to have received an input signal that is outputted from the start switch 23S when the start button 23 is pressed.

When the main CPU 41 determines that the start button 23 has not been turned on, the processing is returned to step S10.

It is to be noted that, when the start button 23 is not turned ON (e.g. when the start button 23 is not turned ON and a command to end the game is inputted), the main CPU 41 cancels a subtraction result in step S11.

On the other hand, when determining in step S12 that the start button 23 is turned ON, the main CPU 41 executes the symbol determination processing for the normal game (step S13).

FIG. 5 is the symbol table for the normal game which shows the correspondence relationship among each symbol in each symbol array of the display blocks, the code number and the random number value. It is to be noted that the first array corresponds to the leftmost column of the display blocks 28.

In the symbol determination processing for the normal game, the main CPU 41 executes the symbol determination program stored in the RAM 43 to determine the code numbers at stopping the symbols. Specifically, random number values are acquired, and the code numbers at stopping the symbols in each symbol array of the display blocks 28 are determined, based upon the acquired random number values and the symbol table for the normal game. The symbol determination program for the normal game is later described in detail using the drawing.

As shown in FIG. 5, 14 wild symbols (also referred to as special symbols) are present in the symbol table for the normal game. The wild symbol is a symbol which can be substituted for another symbol.

Next, in step S14, the main CPU 41 performs scroll-display control processing. This processing is processing for controlling the display so as to rearrange the symbols determined in step S13 after starting scroll of the symbols.

Next, the main CPU 41 determines whether or not a prize has been established (step S15). Here, establishment of the prize in the present embodiment is described.

Figure 6:
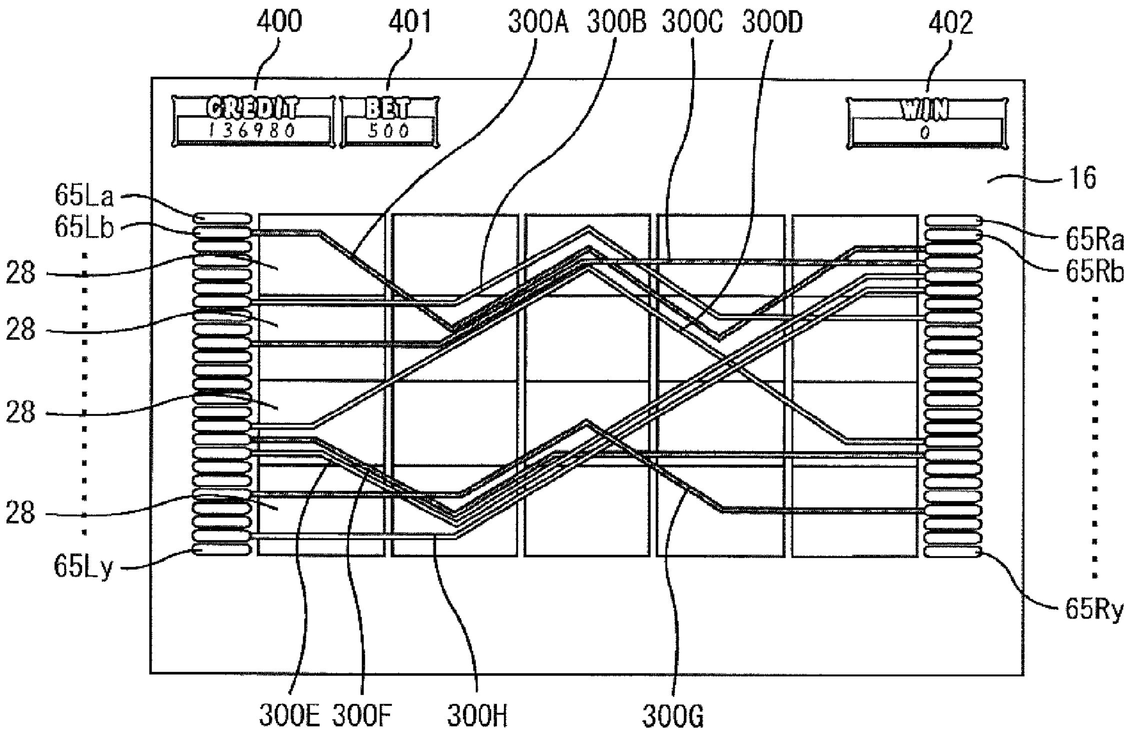
FIG. 6 is a view showing an exemplary image displayed to the lower image display panel provided in the slot machine according to one embodiment of the present invention.

FIG. 6 is a view showing an exemplary image displayed to the lower image display panel provided in the slot machine according to one embodiment of the present invention.

FIG. 7 is a view showing a correspondence relationship among the kind and the number of symbols rearranged on the pay line, and the amount of payout.

As shown in FIG. 6, on the left side of the display blocks 28, 25 pay-line generating portions 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, 65Ls, 65Lt, 65Lu, 65Le, 65Lw, 65Lx, 65Ly) are displayed.

Similarly, on the right side of the display blocks 28, 25 pay-line generating portions 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, 65Rs, 65Rt, 65Ru, 65Rv, 65Rw, 65Rx, 65Ry) are displayed.

Each of the pay-line generating portions 65L forms a pair with any one of the pay-line generating portions 65R. The pay line 300 is previously defined as a line from each pay-line generating portion 65L to the pay-line generating portion 65R which is paired with that pay-line generating portion 65L. The pay line 300A connects the pay-line generating portion 65Lb and the pay-line generating portion 65Rc. The pay line 300B connects the pay-line generating portion 65Lg and the pay-line generating portion 65Rh. The pay line 300C connects the pay-line generating portion 65Lj and the pay-line generating portion 65Rd. The pay line 300D connects the pay-line generating portion 65Lp and the pay-line generating portion 65Rq. The pay line 300E connects the pay-line generating portion 65Lr and the pay-line generating portion 65Re. The pay line 300F connects the pay-line generating portion 65Lg and the pay-line generating portion 65Rr. The pay line 300G connects the pay-line generating portion 65Lu and the pay-line generating portion 65Rv. The pay line 300H connects the pay-line generating portion 65Lx and the pay-line generating portion 65Rf.

It is to be noted that only eight pay lines 300 are drawn in FIG. 6 for the sake of facilitating the explanation. However, in the present embodiment, 25 pay lines 300 are defined.

Establishment of the prize in the present embodiment refers to a case where at least one combination of two or more symbols of the same type out of "10", "J", "Q", "K", "FLOWER 1", "FLOWER 2", "BIRD" and "FISH" are rearranged on one of the pay lines 300. It is to be noted that "WILD" as the wild symbol is a symbol which can be substituted for another symbol. Namely, in a case where one symbol of "10" and one symbol of "WILD" are displayed on the pay line, it is regarded as a display of two symbols of "10" on the pay line, and determined as winning of the prize.

In the processing of step S15, the main CPU 41 counts the number of symbols of each kind rearranged in step S14 on each pay line 300. The main CPU 41 then determines whether or not the number of counted symbols is equal to or more than two.

When determining that the prize has been established, the main CPU 41 executes processing relating to the payout of coins (step S16). In the processing, the main CPU 41 determines the amount of payout based on the numbers of symbols rearranged on the pay line 300 with reference to the odds data stored in the RAM 43. The odds data is data indicative of the correspondence relationship between the number of symbols rearranged on the pay line 300 and the amount of payout (see FIG. 7). It is to be noted that an amount of payout is doubled along with each "WILD" displayed on the pay line 300 where the prize has been established. Namely, when three "WILD" are displayed on the pay line 300 where the prize has been established, an amount of payout is octuplicated.

In the present embodiment, the case is described where the prize is determined to be established when at least one combination of two or more symbols of the same type out of "10", "J", "Q", "K", "FLOWER 1", "FLOWER 2", "BIRD" and "FISH" are rearranged on the pay line 300. However, in the present invention, the pay line is not necessarily provided, and a prize may be determined to be established when at least one combination of two or more symbols of the same type out of "10", "J", "Q", "K", "FLOWER 1", "FLOWER 2", "BIRD" and "FISH" are rearranged among symbols rearranged in the display blocks 28.

Figure 8A:
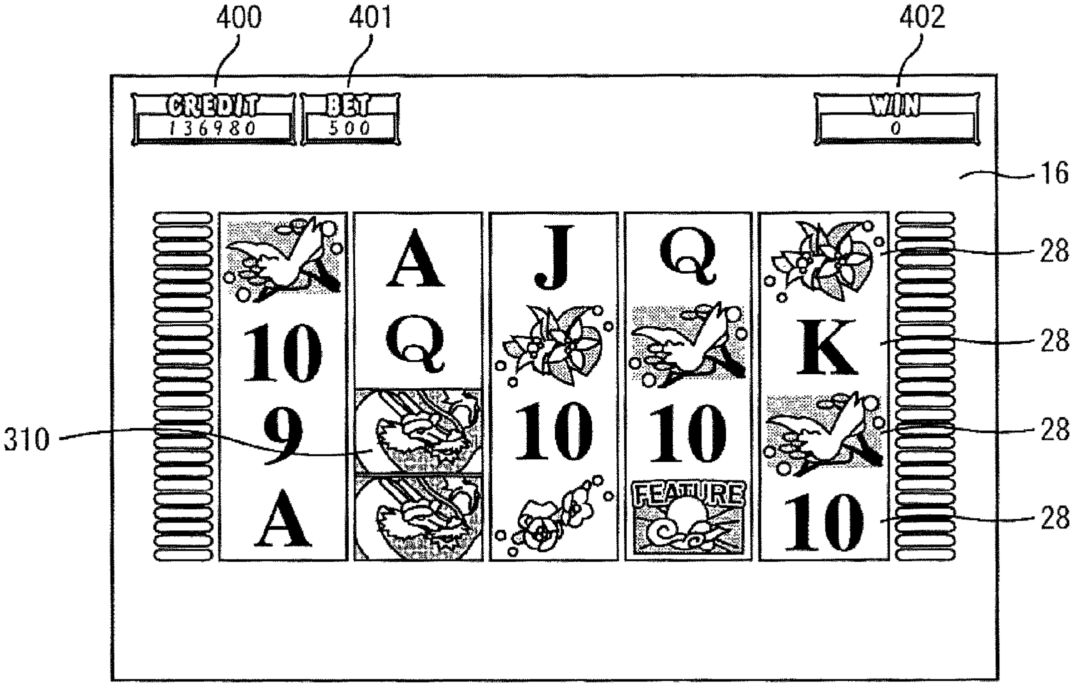
FIG. 8A is a view showing an exemplary image displayed to the lower image display panel provided in the slot machine according to one embodiment of the present invention.

FIG. 8A is a view showing an exemplary image displayed to the lower image display panel provided in the slot machine according to one embodiment of the present invention.

Figure 8B:
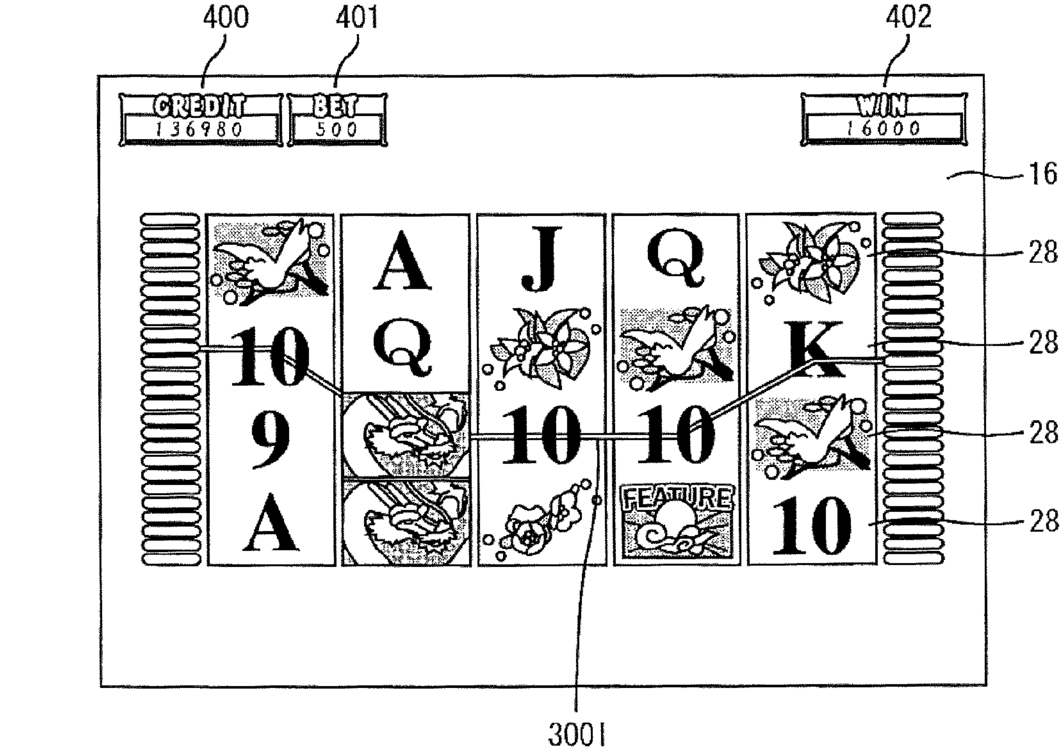
FIG. 8B is a view showing an exemplary image displayed to the lower image display panel provided in the slot machine according to one embodiment of the present invention.

FIG. 8B is a view showing an exemplary image displayed to the lower image display panel provided in the slot machine according to one embodiment of the present invention.

As a result of the scroll-display control processing in step S14, when the symbols shown in FIG. 8A are rearranged, the pay line 300I is displayed as shown in FIG. 8B. On the pay line 300I, three symbols of "10", one symbol of "WILD", and one symbol of "K" are rearranged.

In this case, it is considered that four symbols of "10" are rearranged and 3000 coins, obtained by multiplying "500" as the number of betted coins by "6", is determined as an amount of payout. Further, it is considered that two symbols of "K" are rearranged and 5000 coins, obtained by multiplying 500 as the number of betted coins by 10, is determined as the amount of payout. Moreover, since one symbol of "WILD" is displayed on the pay line 300I where the prize has been established, the amount of payout is doubled. Namely, 16000 coins, obtained by adding 5000 to 3000 to make 8000 and then multiplying 8000 by 2, are determined as the amount of payout.

In the case of accumulating coins, the main CPU 41 conducts processing for adding the number of credits corresponding to the determined amount of payout to the number of credits stored in the RAM 43. On the other hand, in the case of paying out coins, the main CPU 41 transmits a control signal to the hopper 66 in order to pay out coins in an amount corresponding to the determined amount, of payout.

When determining in step S15 that a prize has not been established, or after executing the processing of step S16, the main CPU 41 determines whether or not three or more feature symbols 100 (cf. FIG. 1A) have been rearranged (step S17). In this processing, the main CPU 91 determines whether or not three or more feature symbols 100 have been rearranged in the display blocks 28, without considering the pay line 300.

When determining in step S17 that three or more feature symbols 100 have been rearranged, the main CPU 41 executes the first-free-game execution processing (step S18). In the first-free-game execution processing, a free game with the number of wild symbols increased is executed. The first-free-game execution processing is later described in detail using FIG. 10.

When determining in step S17 that three or more feature symbols 100 are not rearranged or after executing the processing of step S18, the main CPU 41 executes insurance processing (step S19). The insurance processing is later described in detail using FIG. 19.

After executing the processing of step S19, the main CPU 41 completes the present subroutine.

Figure 9:
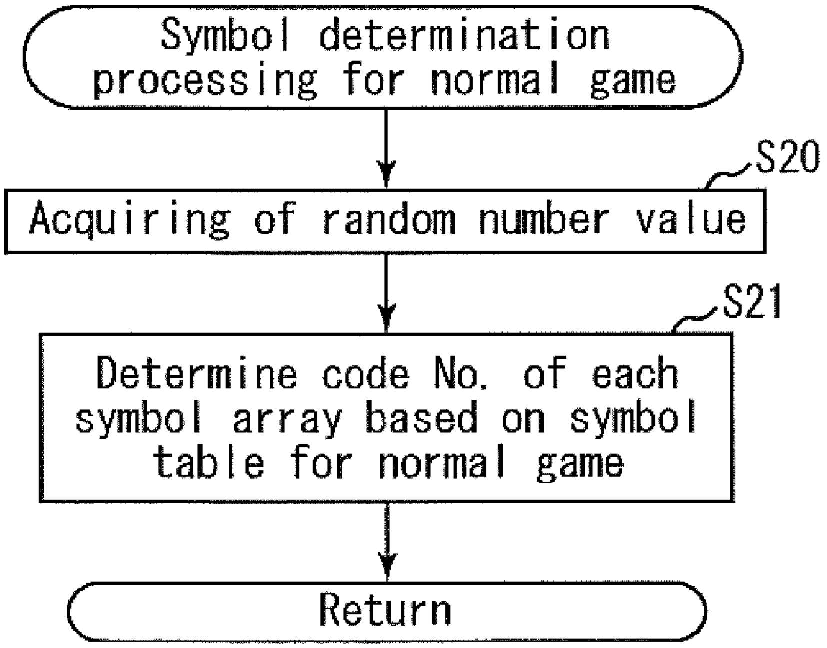
FIG. 9 is a flowchart showing a subroutine of symbol determination processing for a normal game.

FIG. 9 is a flowchart showing a subroutine of symbol determination processing for a normal game.

This processing is processing performed by the main CPU 41 executing the symbol determination program stored in the RAM 43.

First, the main CPU 41 acquires random number values from the random number generator 64 (step S20). In this processing, the main CPU 41 acquires five random number values corresponding to the respective symbol arrays of the display blocks 28.

Next, based upon the acquired five random number values and the symbol table for the normal game, the main CPU 41 determines a code number of each symbol array of the display blocks 28 at stopping the symbols (step S21). For example, in a case where the random number value for the first array is "23035", "07" is determined as the code number of the first array. It should be noted that a code number of a symbol array corresponds to the code numbers of symbols to be rearranged to the display blocks 28 in the first row out of the display blocks 28 that are put in four rows.

After executing the processing of step S21, the main CPU 41 completes the present subroutine.

In the present embodiment, the case has been described where the random number generator 64 is provided and a random number is extracted from the random number generator (a case of using a so-called hardware random number). However, in the present invention, a random number may be generated on the program (a case of using a so-called software random number).

Next, the first-free-game execution processing is described with reference to FIG. 10.

Figure 10:
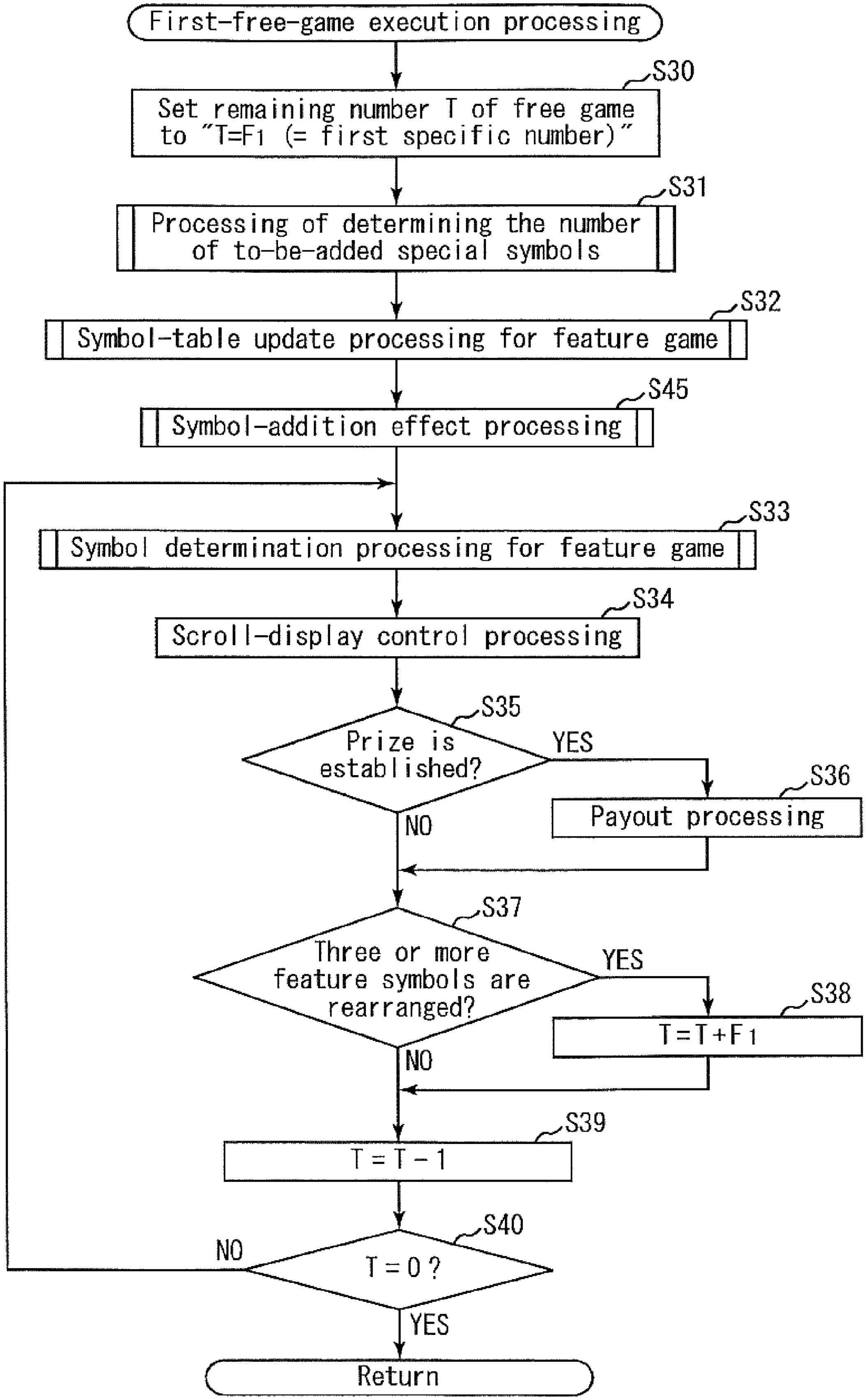
FIG. 10 is a flowchart showing a subroutine of first-free-game execution processing.

FIG. 10 is a flowchart showing a subroutine of first-free-game execution processing.

It should be noted that, in the first free game, the player can play the game without betting coins.

First, the main CPU 41 sets the remaining number T of the free game to "T=$F_1$ (=the first specific number=20)" in the number-of-free-games storage area in the RAM 43 (step S30).

Further, the main CPU 41 displays the free-game-generated image 200 (cf. FIG. 1B) to the lower image display panel 16.

Next, the main CPU 41 executes processing of determining the number of the to-be-added special symbols (step S31). In the processing of determining the to-be-added special symbols, the main CPU 41 determines the number of the to-be-added wild symbols based upon the selection image 302 (cf. FIG. 13A) selected by the player. The processing of determining the to-be-added special symbols is later described in detail using the drawing.

Next, the main CPU 41 executes the symbol-table update processing for the feature game (step S32). In the symbol-table update processing for the feature game, the main CPU 41 updates the symbol table for the feature game, based upon the number of the to-be-added wild symbols, which has been determined by the processing of determining the to-be-added special symbols. The symbol-table update processing for the feature game is later described in detail using the drawing.

Next, in step S45, the main CPU 41 executes symbol-addition effect processing.

The symbol-addition effect processing is described later using the drawing.

Next, the main CPU 41 executes the symbol determination processing for the feature game (step S33).

FIGS. 17A and 17B are examples of a symbol table for the feature game, each showing the correspondence relationship among each symbol in each symbol array of the display block, the code number and the random number value.

The symbol table for the feature game shown in each of FIGS. 17A and 178 is stored into the RAM 43 by later-described symbol-table update processing for the feature game.

In the symbol determination processing for the feature game, the main CPU 41 executes the symbol determination program stored in the RAM 43, to determine code numbers at stopping the symbols. Specifically, the main CPU 41 acquires random number values, and determines the code numbers of respective symbol arrays at the time of stopping the symbols based upon the acquired random number values and the symbol table for the feature game. The symbol determination processing for the feature game is later described in detail using the drawing.

Next, in step S34, the main CPU 41 performs the scroll-display control processing. This processing is processing for controlling the display so as to rearrange the symbols determined in step S33 after starting the scrolling of the symbols.

Next, the main CPU 41 determines whether or not a prize has been established (step S35).

As described above, establishment of the prize in the present embodiment refers to a case where at least one combination of two or more symbols of the same type out of "10", "J", "Q", "K", "FLOWER 1", "FLOWER 2", "BIRD" and "FISH" are rearranged on the pay line 300. It is to be noted that "WILD" as the wild symbol is a symbol which can be substituted for another symbol. In the feature game, since the number of the wild symbols has become larger than that in the normal game, the prize is more likely to be established compared to in the normal game.

In the processing of step S35, the main CPU 41 counts the number of symbols of each kind rearranged in step S34 on each pay line 300. The main CPU 41 then determines whether or not the counted number is equal to or more than two.

When determining that the prize has been established, the main CPU 41 executes processing relating to the payout of coins (step S36). Since this processing is the same as the processing of step S16, the description thereof is omitted here.

When determining that the prize has not been established in the processing of step S35, or after executing the processing of step S36, the main CPU 41 determines whether or not three or more feature symbols 100 (cf. FIG. 1A) are rearranged (step S37). In the processing, the main CPU 41 determines whether or not three or more feature symbols 100 are rearranged in the display blocks 28, without taking the pay line 300 into consideration.

When determining in step S37 that three or more feature symbols 100 are rearranged, the main CPU 41 sets the remaining number T of the free game to "$T=T+F_1$" ($F_1$=first specific number=20) in the number-of-free-games storage area in the RAM 43 (step S38).

When determining in step S37 that three or more feature symbols 100 are not rearranged, or after executing the processing of step S38, the main CPU 41 sets the remaining number T of the free game to "$T=T-1$" in the number-of-free-games storage area in the RAM 43 (step S39).

Next, the main CPU 41 determines whether or not T is "T=0" based on the remaining-number data stored in the number-of-free-games storage area in the RAM 43 (step S40).

When determining that T is not "T=0", the main CPU 41 returns the processing to step S33. On the other hand, when determining that T is "T=0", the main CPU 41 completes the present subroutine.

Subsequently, there is described processing of determining the number of to-be-added special symbols conducted in step S31 in FIG. 10 by using FIGS. 11 to 13.

Figure 11A:
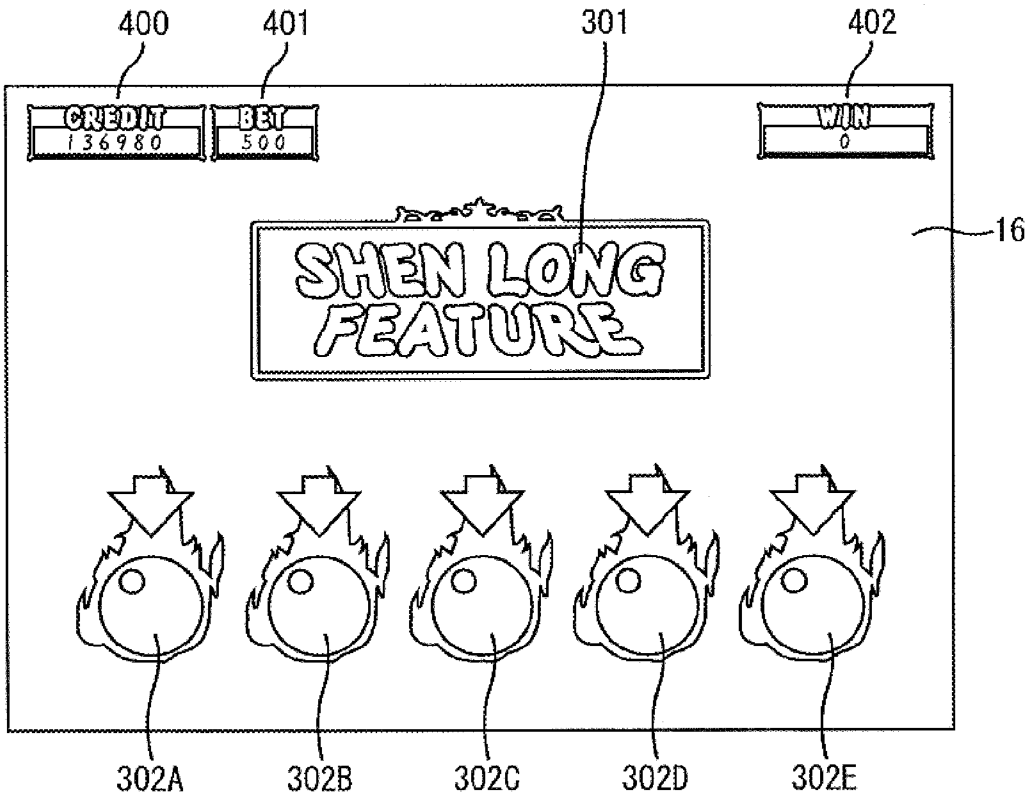
FIG. 11A is a view showing an exemplary image displayed to the lower image display panel provided in the slot machine according to one embodiment of the present invention.
Figure 11B:
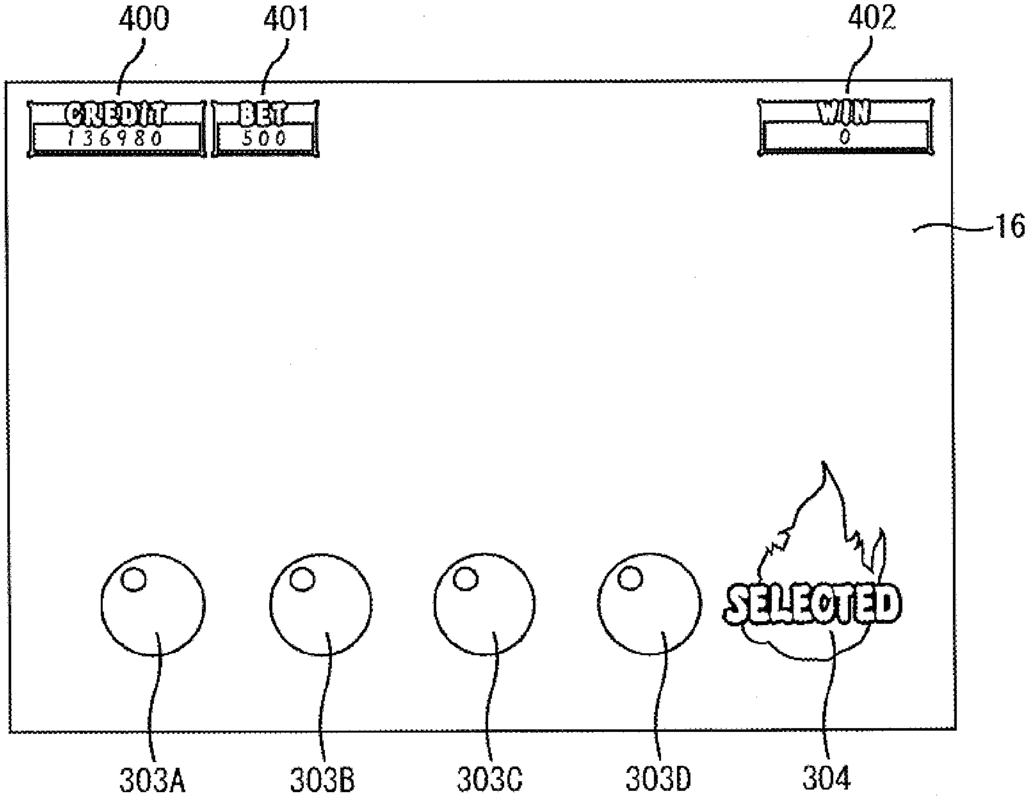
FIG. 11B is a view showing an exemplary image displayed to the lower image display panel provided in the slot machine according to one embodiment of the present invention.
Figure 11C:
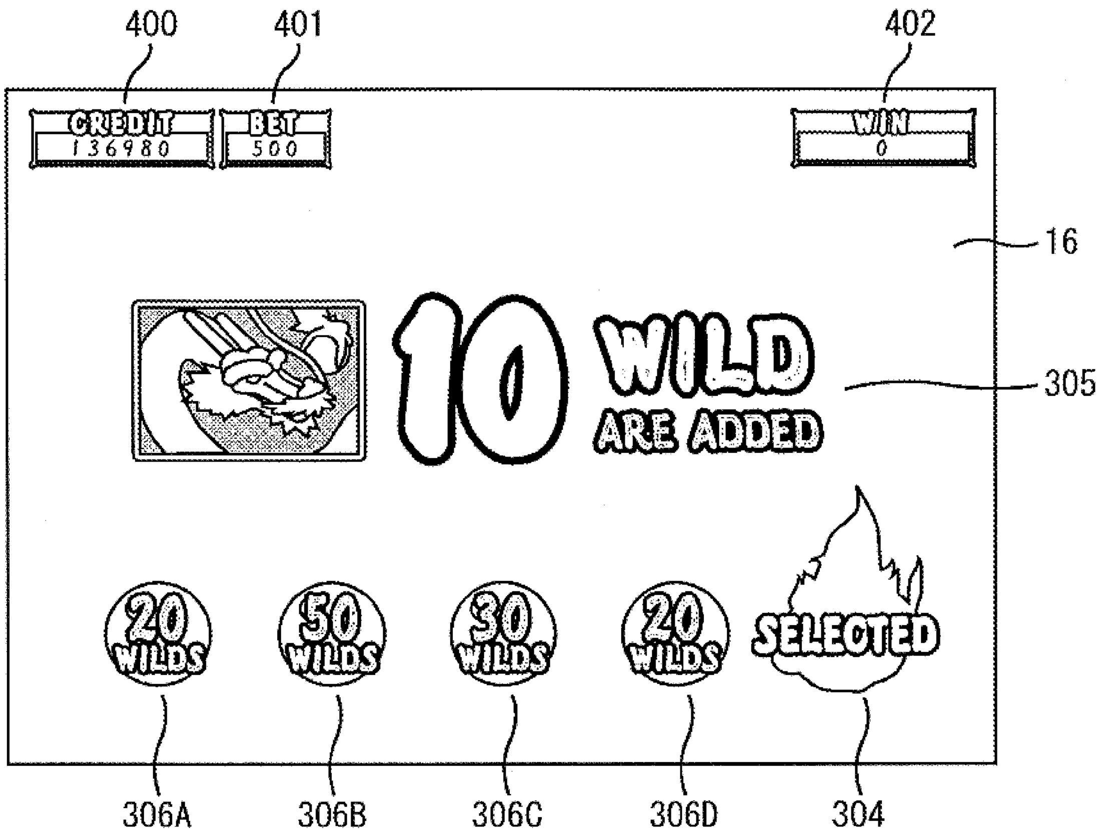
FIG. 11C is a view showing an exemplary image displayed to the lower image display panel provided in the slot machine according to one embodiment of the present invention.

FIGS. 11A to 11C are views each showing an exemplary image displayed to the lower image display panel provided in the slot machine according to one embodiment of the present invention.

When three or more feature symbols 100 are rearranged, the image shown in FIG. 11A is displayed to the lower image display panel 16.

As shown in FIG. 11A, a feature-game start image 301 showing the start of the feature game is displayed to the center part of the lower image display panel 16.

To the lower part of the lower image display panel 16, five selection images 302 (the selection image 302A, the selection image 302B, the selection image 302C, the selection image 302D, the selection image 302E) are displayed. The player can select the selection image 302 by touching the touch panel 69 (cf. FIG. 3) provided on the lower image display panel 16 with his or her finger or the like. Based on the selection image 302 selected by the player, the number of the to-be-added wild symbols is determined.

For example, when the selection image 302E is selected by the player, as shown in FIG. 11B, a selected image 304 is displayed at the position where a selection image 302E has been displayed on the lower image display panel 16. Further, at the positions where the unselected images 302 have been displayed, non-selected images 303 (the non-selected image 303A, the non-selected image 303B, the non-selected image 303C, the non-selected image 303D) are displayed.

After the image shown in FIG. 11B is displayed, as shown in FIG. 11C, the to-be-added number determination image 305 showing the number of the to-be-added wild symbols is displayed to the center part of the lower image display panel 16. In FIG. 11C, the to-be-added number determination image 305 shows that the wild symbols will be increased by ten. Further, the to-be-added number images 306 (the to-be-added number image 306A, the to-be-added number image 306B, the to-be-added number image 306C, the to-be-added number image 306D) are displayed to the lower part of the lower image display panel 16, each showing the number of the wild symbols which would have been increased if another selection image 302 had been selected. The to-be-added number image 306A, the to-be-added number image 306B, the to-be-added number image 306C and the to-be-added number image 306D respectively show that the wild symbols would have been increased by 20, 50, 30 and 20, if the selection image 302 displayed in the corresponding place had been selected.

Figure 12:
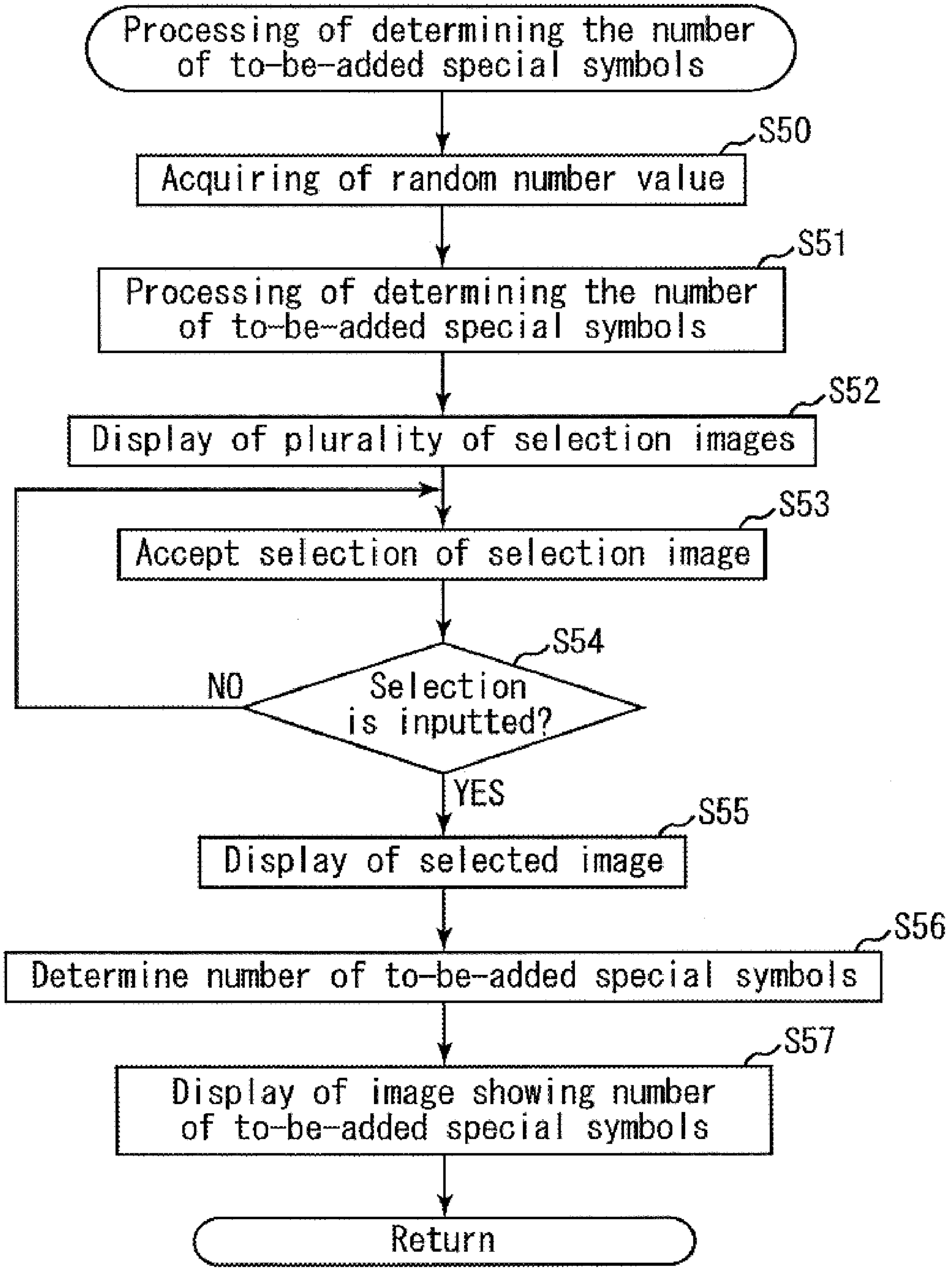
FIG. 12 is a flowchart showing a subroutine of processing of determining the number of to-be-added special symbols.

FIG. 12 is a flowchart showing a subroutine of processing of determining the number of the to-be-added special symbols.

First, the main CPU 91 acquires random number values from the random number generator 69 (step S50). In this processing, the main CPU 41 acquires five random number values corresponding to the respective selection images 302 (the selection image 302A, the selection image 302B, the selection image 302C, the selection image 302D and the selection image 302E (cf. FIG. 11A)).

Next, the main CPU 41 determines the number of the to-be-added special symbols corresponding to each selection image 302 (step S51). In this processing, the main CPU 41 determines the number of the to-be-added special symbols corresponding to each selection image 302, based upon the random number value obtained in step S50 and a table for determining the number of the to-be-added special symbols, which is shown in FIG. 13.

FIG. 13 is a view showing a table for determining the number of the to-be-added special symbols.

The table for determining the number of the to-be-added special symbols shows the correspondence relationship between the number of the to-be-added special symbols and the random number value.

For example, when random number value corresponding to the selection image 302A, the selection image 302B, the selection image 302C, the selection image 302D and the selection image 302E are respectively 17235, 63123, 32387, 22332, 3423, numbers of 20, 50, 30, 20 and 10 respectively correspond to the selection image 302A, the selection image 302B, the selection image 302C, the selection image 302D and the selection image 302E, as the number of the to-be-added special symbols.

Next, the main CPU 41 displays the selection image 302A, the selection image 302B, the selection image 302C, the selection image 302D and the selection image 302E to the lower part of the lower image display panel 16 (step S52). The main CPU 41 then accepts the selection of the selection image 302 made by the player (step S53).

Next, the main CPU 41 determines whether or not an input for selecting the selection image 302 has been made (step S54). In this processing, the main CPU 41 determines whether or not to have received an input signal for selecting the selection image 302 from the touch panel 69. By the player touching a place in the vicinity of where the selection image 302E is displayed on the lower image display panel 16 by his or her finger or the like, the input signal for selecting the selection image 302E is transmitted from the touch panel 69 to the main CPU 41. When determining not to have received the input for selecting the selection image 302, the main CPU 41 returns the processing to step S53.

On the other hand, when determining in step S54 that the input for selecting the selection image 302 has been made, the main CPU 41 displays the selected image 304 (cf. FIG. 11B) (step S55).

Next, the main CPU 41 determines the number of the to-be-added special symbols corresponding to the selection image 302 selected by the player, as the number of the special symbols to be added (step S56).

For example, in a case where 20, 50, 30, 20 and 10 as the number of the to-be-added special symbols respectively correspond to the selection image 302A, the selection image 302B, the selection image 302C, the selection image 302D and the selection image 302E, and when the selection image 302E is selected by the player, 10 is determined as the number of the to-be-added special symbols. Next, the main CPU 41 displays the to-be-added number determination image 305 (cf. FIG. 11C) showing the number of the to-be-added special symbols to the center part of the lower image display panel 16 (step S57).

After executing the processing of step S57, the main CPU 41 completes the present subroutine.

In the present embodiment, the case has been described where the number of the to-be-added special symbols corresponding to each selection image 302 is determined based upon the acquired random number value and the table for determining the number of the to-be-added special symbols, which is shown in FIG. 13. However, in the present invention, the number of the to-be-added special symbols corresponding to each selection image 302 may be previously determined.

Figure 14:
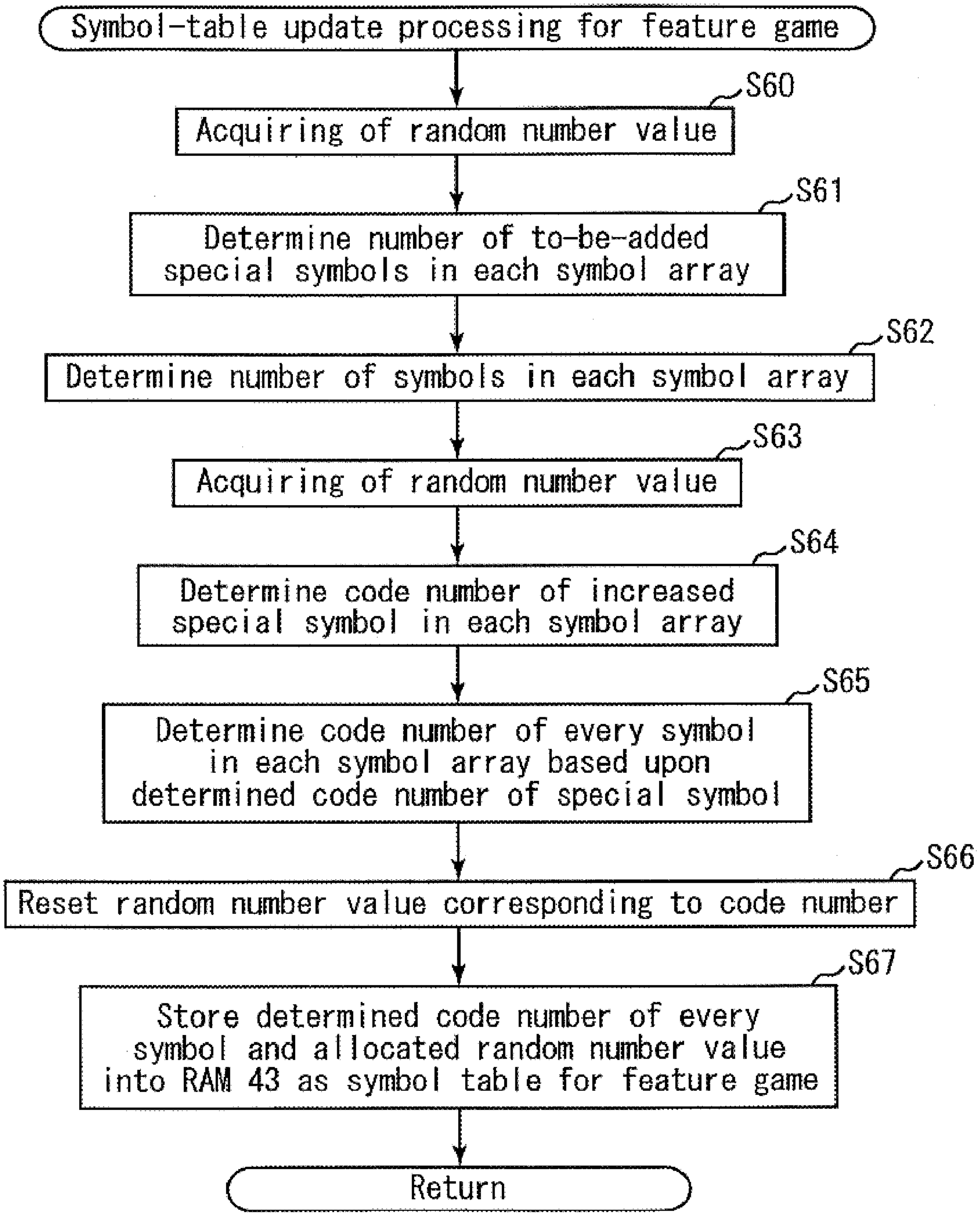
FIG. 14 is a flowchart showing a subroutine symbol-table update processing for a feature game.

FIG. 14 is a flowchart showing a subroutine of symbol-table update processing for a feature game.

First, the main CPU 41 acquires random number values from the random number generator 64 (step S60). In this processing, the main CPU 41 acquires random number values in the same number as the number of the to-be-added special symbols, which is determined in step S56.

Next, the main CPU 41 determines the number of the to-be-added special symbols in each symbol array (step S61). In this processing, the main CPU 41 determines the number of the to-be-added special symbols in each symbol array, based upon the random number value acquired in step S60 and the symbol-array determination table shown in FIG. 15.

FIG. 15 is a view showing the symbol-array determination table.

The symbol-array determination table shows the correspondence relationship between the symbol array No. and the random number value. It is to be noted that a symbol array No. 1 shows the first column of the display blocks 28, a symbol array No. 2 shows the second column of the display blocks 28, a symbol array No. 3 shows the third column of the display blocks 28, a symbol array No. 4 shows the fourth column of the display blocks 28, and a symbol array No. 5 shows the fifth column of the display blocks 28.

For example, when the random number values acquired in step S60 are 2313, 3123, 12382, 17325, 28768, 30223, 45235, 48766, 58776 and 62356, the number of the to-be-added special symbols in the symbol array No. 1 (the first column) is three, the number of the to-be-added special symbols in the symbol array No. 2 (the second column) is one, the number of the to-be-added special symbols in the symbol array No. 3 (the third column) is two, the number of the to-be-added special symbols in the symbol array No. 4 (the fourth column) is two, and the number of the to-be-added special symbols in the symbol array No. 5 (the fifth column) is two.

In the present embodiment, the case has been described where the number of special symbols to be added to each symbol array is determined based upon the acquired random number value and the symbol-array determination table shown in FIG. 15. However, in the present invention, the number of special symbols to be added to each symbol array may be previously determined according to each of the numbers of to-be-added special symbols, which is to be determined in the processing of determining the number of the to-be-added special symbols.

Next, the main CPU 41 determines the number of the symbols in each symbol array (step S62). In this processing, the main CPU 41 determines a total number of the symbols in each symbol array based upon the number of the to-be-added special symbols, which has been determined in step S61. Specifically, the total number of the symbols in each symbol array is a numeric value obtained by adding 20 as the number of the symbols in each symbol array shown by the symbol table for a normal game, to the number of the to-be-added special symbols in each symbol array, which has been determined in step S61.

Next, the main CPU 41 acquires random number values from the random number generator 64 (step S63). In this processing, the main CPU 41 acquires random number values in the same number as the number of the to-be-added special symbols in each symbol array, which has been determined in step S61. Namely, when the number of the to-be-added special symbols in the symbol array No. 1 (the first column) is three, the main CPU 41 acquires three random number values for the symbol array No. 1 (the first column).

Next, the main CPU 41 determines a code number of the special symbol to be added to each symbol array, based upon the random number value acquired in step S63 (step S64). In this processing, the main CPU 41 determines a code number of the special symbol to be added to each symbol array based upon the random number value acquired in step S63 and a code-number determination table shown in FIG. 16.

FIG. 16 is a view showing the code-number determination table.

The code-number determination table shows the correspondence relationship between the code number and the random number value.

For example, in a case where the random number values of the symbol array No. 1 (the first column) are 40567, 63535 and 65323, the code numbers are determined to be "13", "End" and "End".

In the present embodiment, the case has been described where a code number of the special symbol to be added to each symbol array is determined based upon the acquired random number value and the code-number determination table shown in FIG. 16. However, in the present invention, a code number of the special symbol to be added may be previously determined for each symbol array.

Next, the main CPU 41 determines a code number of every symbol in each symbol array based upon the code number of the special symbol determined in step S64 (step S65). In this processing, based upon the code number of the special symbol determined in step S64, the special symbol is added to each symbol array shown by the symbol table for a normal game in FIG. 5. For example, in a case where "13", "End" and "End" are determined in step S64 as the code numbers of the special symbols to be added to the symbol array No. 1 (the first column), the wild symbol of "WILD" as the special symbol is added to code No. 13 in the symbol array No. 1 (the first column) shown in the symbol table for a normal game, and "FLOWER 2" originally corresponding to code No. 13 is displaced to code No. 14. In the same manner, each symbol is displaced from its original code number. Further, since there are two special symbols determined to have the code number of "End", the symbols of "WILD" are added to code No. 21 and code No. 22 as the ends of the symbol array No. 1 (the first column). In the same manner, a code number of every symbol in each of the other symbol arrays is determined.

The main CPU 41 resets the random number values corresponding to the code numbers of each symbol array (step S66). In this processing, the main CPU 41 resets the correspondence relationship between the respective random number values from 0 to 65535 and the code numbers, based upon the total number of symbols in each symbol array which has been determined in step S62.

The main CPU 41 stores the correspondence relationship between the code number of every symbol in each symbol array, which has been determined in step S65, and the random number value corresponding to the code number of each symbol array, which has been determined in step S66, into the RAM 43 as the symbol table for a feature game (step S67). The symbol table for a feature game stored in the RAM 43 is referred to in executing the symbol determination processing for a feature game.

FIGS. 17A and 17B each are an example of the symbol table for a feature game, which shows the correspondence relationship among each symbol in each symbol array of the display blocks, the code number and the random number value.

In FIG. 17A, the wild symbols are added to code Nos. 13, 21 and 22 of the symbol array No. 1 (the first column). Further, the wild symbol is added to code No. 12 of the symbol array No. 2 (the second column). Furthermore, the wild symbols are added to code Nos. 6 and 13 of the symbol array No. 3 (the third column). Further, in FIG. 17B, the wild symbols are added to code Nos. 11 and 12 of the symbol array No. 4 (the fourth column). Moreover, the wild symbols are added to code Nos. 19 and 20 of the symbol array No. 5 (the fifth column).

After executing the processing of step S67, the main CPU 41 completes the present subroutine.

Figure 28:
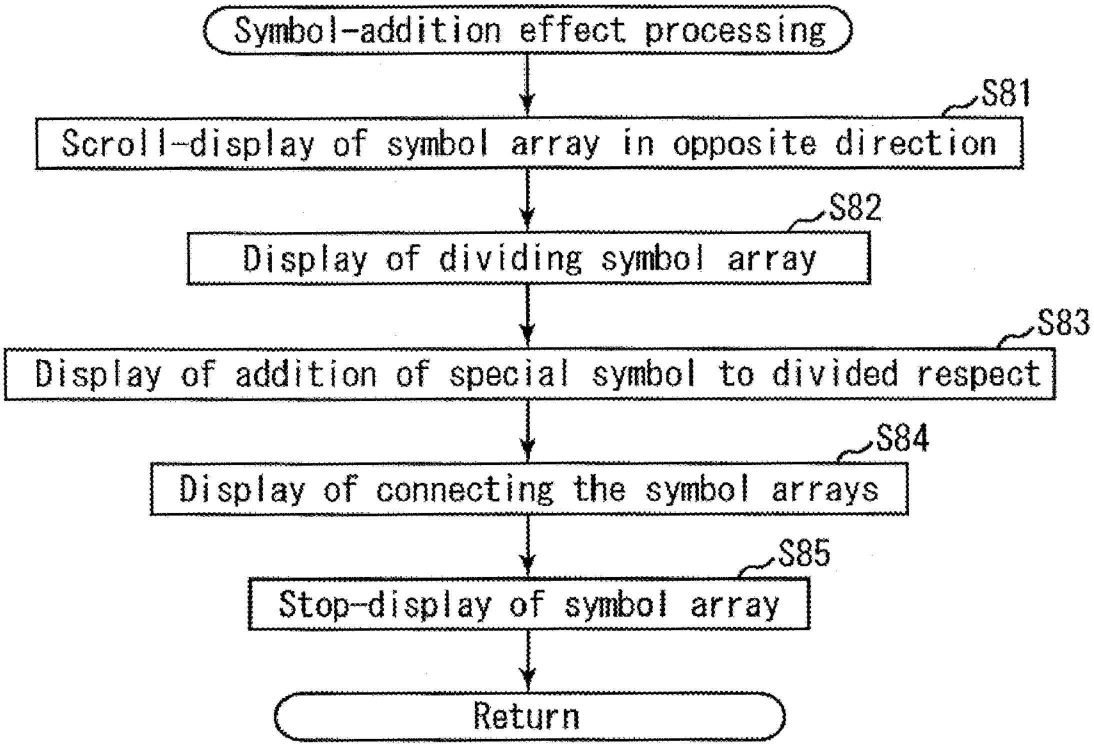
FIG. 28 is a flowchart showing a subroutine of symbol-addition effect processing.

FIG. 28 is a flowchart showing a subroutine of the symbol-addition effect processing.

FIGS. 29A to 29F are views each showing an exemplary image displayed to the lower image display panel provided in the slot machine according to one embodiment of the present invention.

Figure 29A:
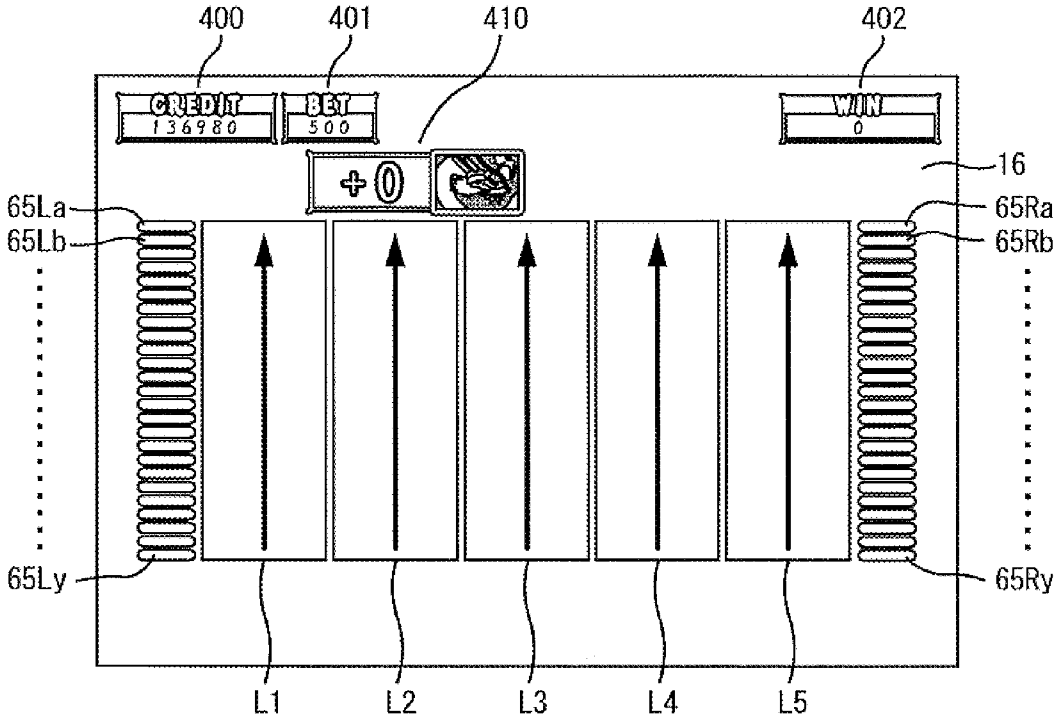
FIG. 29A is a view showing an exemplary image displayed to the lower image display panel provided in the slot machine according to one embodiment of the present invention.

First, in step S81, the main CPU 41 scroll-displays the symbol arrays L1 to L5 in the direction from the bottom to the top, namely, the direction opposite to the scrolling direction in the normal game (cf. FIG. 29A). This scroll-display in the opposite direction is conducted at a lower speed than that of the scroll-display in the normal game. It is to be noted that the symbol array L1 means the leftmost column of the display blocks 28.

As shown in FIG. 29A, the symbol arrays L1 to L5 are scroll-displayed in the direction from the bottom to the top, namely, the direction opposite to the scrolling direction in the normal game. This scroll-display in the opposite direction is conducted at a lower speed than that of the scroll-display in the normal game. Further, a display portion 410 of the number of the to-be-added wild symbols is displayed in the vicinity of the upper center of the lower image display panel 16. To the display portion 410 of the number of the to-be-added wild symbols, "0" is displayed indicating that the number of the added wild symbols is 0.

Figure 29B:
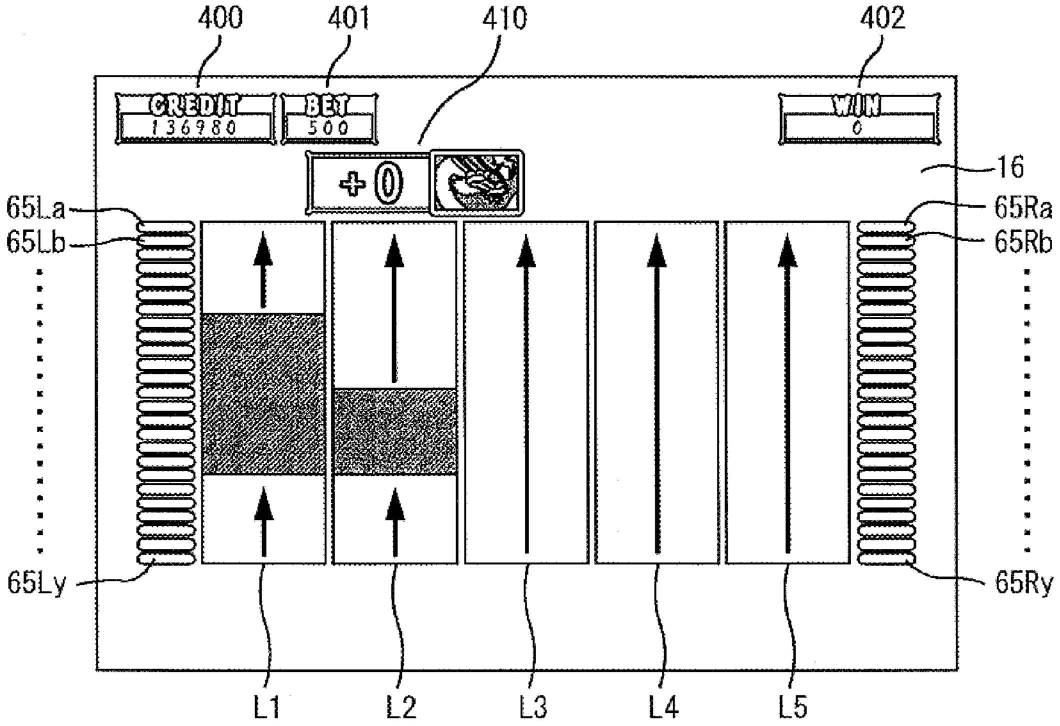
FIG. 29B is a view showing an exemplary image displayed to the lower image display panel provided in the slot machine according to one embodiment of the present invention.

Next, in step S82, the main CPU 41 conducts a display of dividing the symbol array L (cf. FIG. 29B). In this processing, the main CPU 41 conducts a display of dividing the symbol array L between the symbol of the code number determined in step S64 in FIG. 14 and the symbol of a code number smaller than the determined code number by one. For example, when determining to add the wild symbol to code No. 13 of the symbol array L1, the main CPU 41 conducts a display of dividing the symbol array L1 between the symbol "FLOWER 2" of code No. 13 and the symbol "10" of code No. 12.

As shown in FIG. 29B, the display of dividing the symbol array L is conducted on the lower image display panel 16. In FIG. 29B, a state of dividing the symbol array L1 and the symbol array L2 is displayed.

Figure 29C:
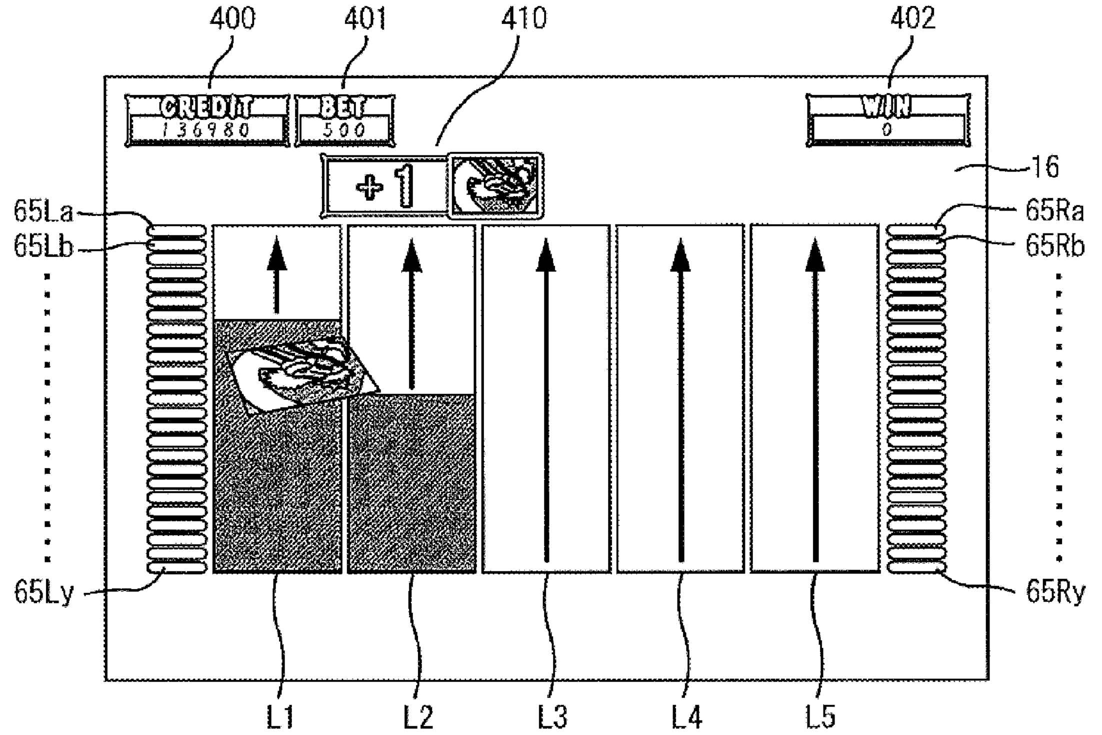
FIG. 29C is a view showing an exemplary image displayed to the lower image display panel provided in the slot machine according to one embodiment of the present invention.
Figure 29D:
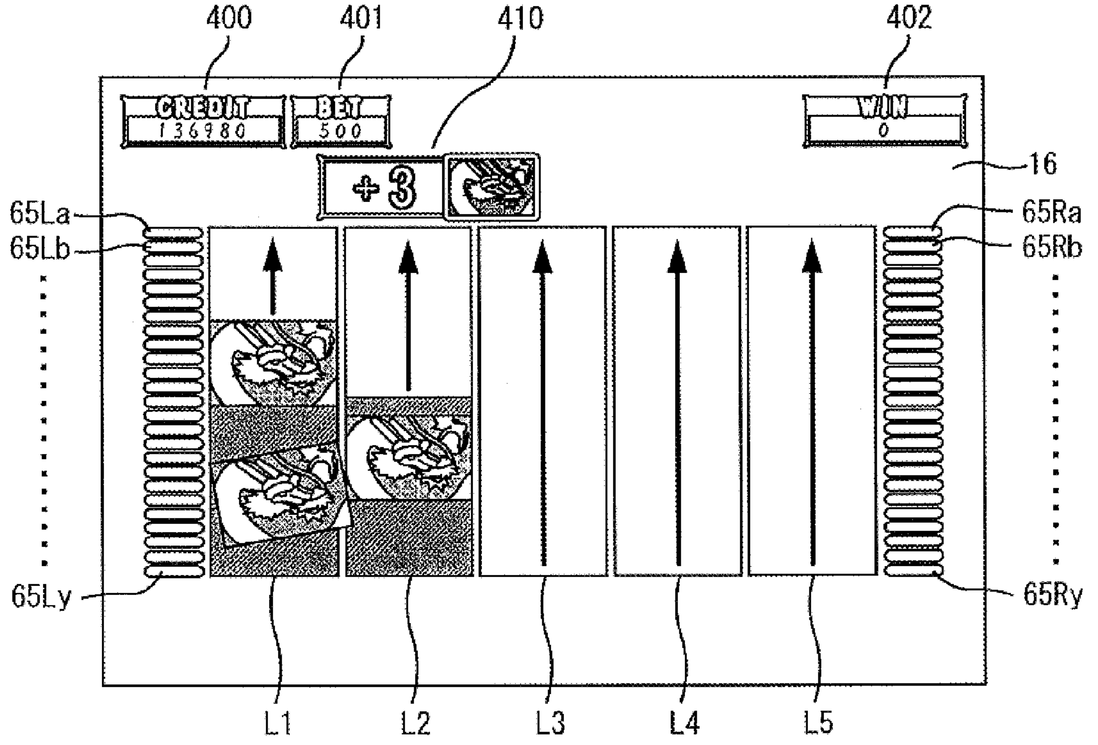
FIG. 29D is a view showing an exemplary image displayed to the lower image display panel provided in the slot machine according to one embodiment of the present invention.

Next, in step S83, the main CPU 41 displays addition of the wild symbol to the divided respect (cf. FIGS. 29C and 29D). As shown in FIGS. 29C and 29D, states of adding the wild symbols to the divided respects of the symbol arrays are displayed. In FIG. 29C, "1" is displayed in the display portion 410 of the number of the to-be-added wild symbols, indicating that the number of the added wild symbols is one. In FIG. 290, "3" is displayed in the display portion 410 of the number of the to-be-added wild symbols, indicating that the number of the added wild symbols is 3.

Figure 29E:
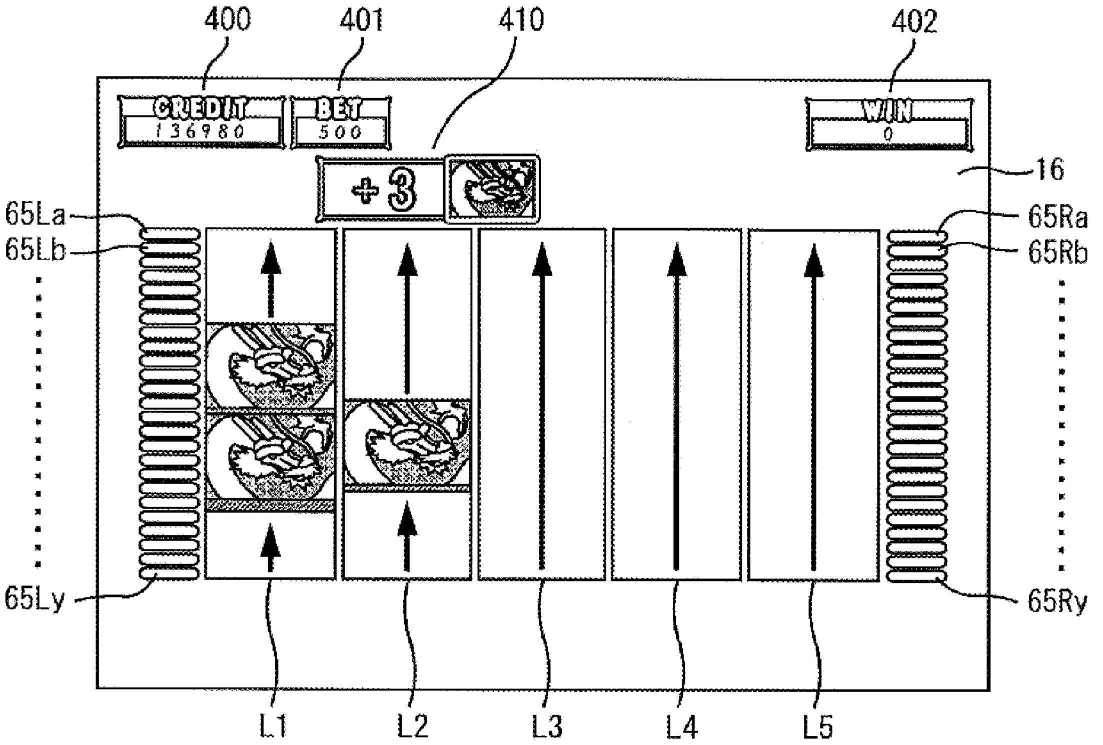
FIG. 29E is a view showing an exemplary image displayed to the lower image display panel provided in the slot machine according to one embodiment of the present invention.
Figure 29F:
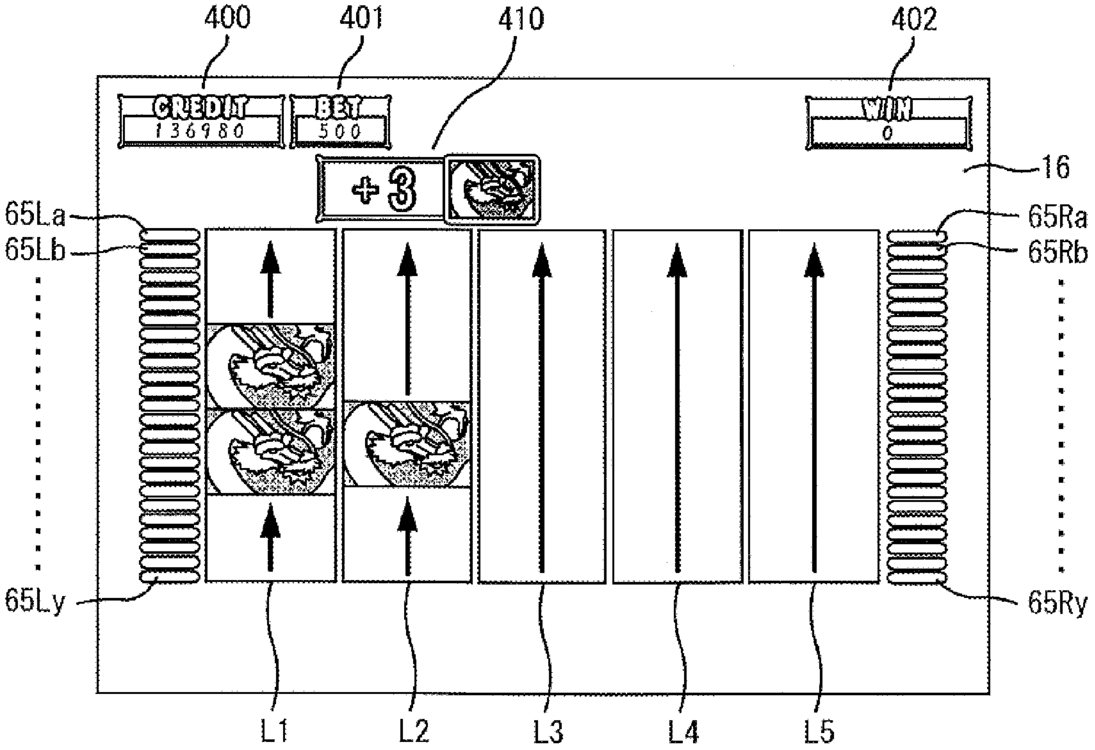
FIG. 29F is a view showing an exemplary image displayed to the lower image display panel provided in the slot machine according to one embodiment of the present invention.

Next, in step S84, the main CPU 41 conducts a display of connecting the symbol arrays L (cf. FIGS. 29E and 29F). As shown in FIGS. 29E and 29F, the display of connecting the divided symbol arrays is conducted.

Next, in step S85, the main CPU 41 stop-displays the scroll-display (scroll-display in the direction opposite to the direction in the normal game) of the symbol sequences L1 to L5, and completes the present subroutine.

Figure 18:
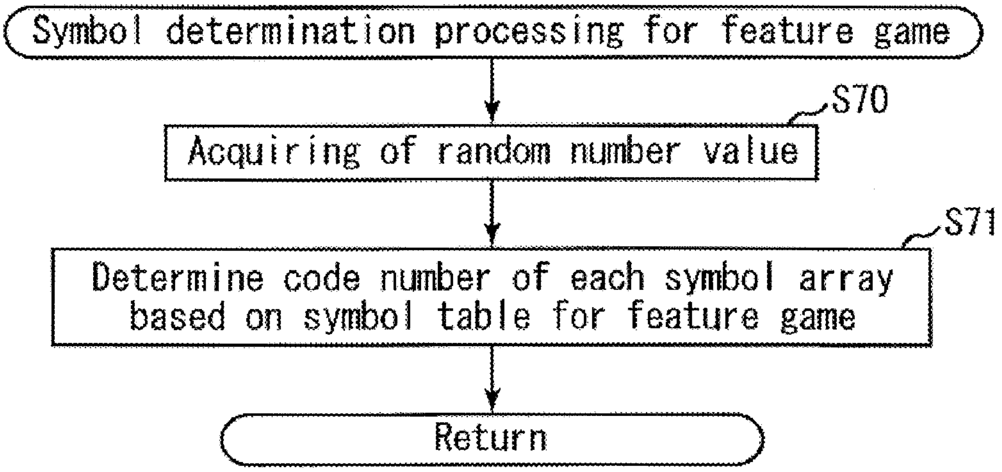
FIG. 18 is a flowchart showing a subroutine of symbol determination processing for a feature game.

FIG. 18 is a flowchart showing a subroutine of the symbol determination processing for a feature game.

This processing is processing performed by the main CPU 41 executing the symbol determination program stored in the RAM 43.

First, the main CPU 41 acquires random number values from the random number generator 64 (step S70). In this processing, the main CPU 41 acquires five random number values corresponding to the respective symbol arrays of the display blocks 28.

Next, the main CPU 41 determines a code number at stopping the symbols in each symbol array of the display blocks 28, based upon the acquired five random number values and the symbol table for a feature game (step S71). For example, in a case where the random number value of the first array is "23035", the number of "08" is determined as the code number of the first array. It should be noted that a code number of a symbol array corresponds to a code number of a symbol rearranged in the first array of the display blocks 28 out of the four columns arrayed in the display blocks 28.

After executing the processing of step S71, the main CPU 41 completes the present subroutine.

Subsequently, the insurance processing conducted in step S19 in FIG. 4 is described, by using FIGS. 19 to 23.

Figure 19:
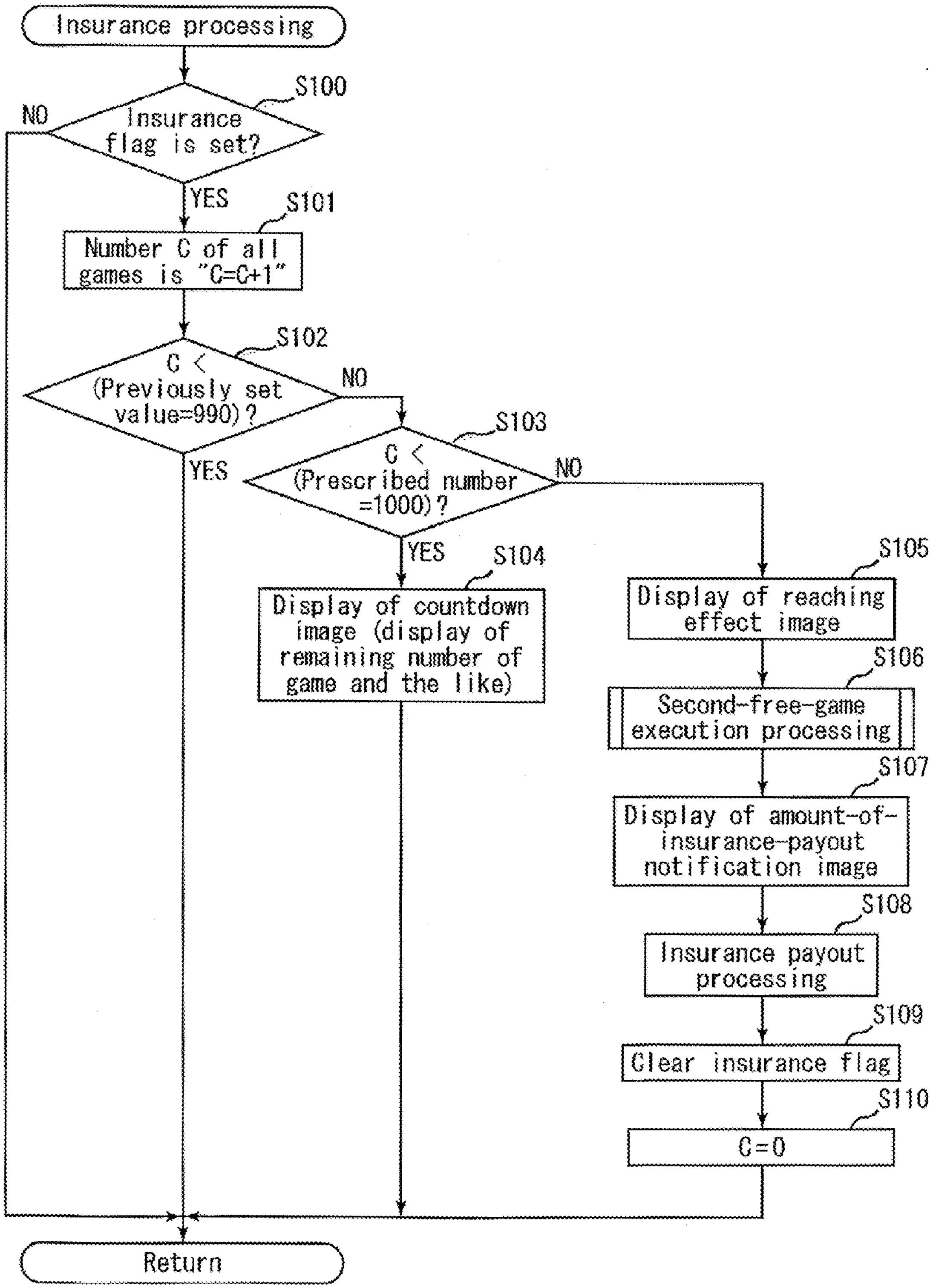
FIG. 19 is a flowchart showing a subroutine of insurance processing according to a first embodiment.

FIG. 19 is a flowchart showing a subroutine of the insurance processing according to the first embodiment.

First, the main CPU 41 determines whether or not the insurance flag is set (step S100). The insurance flag is a flag to be set triggered by the insurance BET button 90 being pressed (cf. step S122 in FIG. 20).

Figure 20:
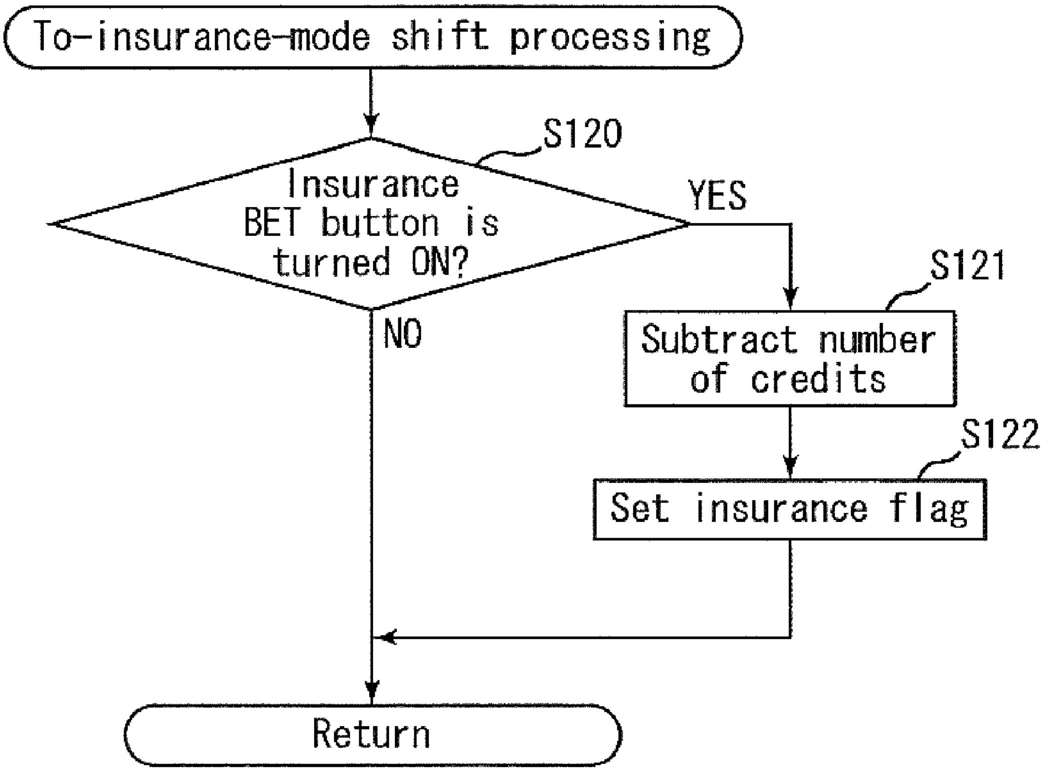
FIG. 20 is a flowchart showing a subroutine of to-insurance-mode shift processing.

Here, the insurance flag is described by using FIG. 20.

FIG. 20 is a flowchart showing a subroutine of to-insurance-mode shift processing.

First, the main CPU 41 determines whether or not the insurance BET button 90 is turned ON at a predetermined timing (step S120). In this processing, the main CPU 41 determines whether or not to have received an input signal outputted from the insurance BET switch 90S when the insurance BET button 90 is pressed.

When determining that the insurance BET button 90 is not turned ON, the main CPU 41 completes the present subroutine.

On the other hand, when determining the insurance BET button 90 is turned ON, the main CPU 41 subtracts a predetermined amount (10 dollars in the present embodiment) from the amount of credits stored in the RAM 43 (step S121).

Then, the main CPU 41 sets the insurance flag (step S122) and completes the present subroutine.

It is to be noted that when the predetermined amount is larger than the amount of credits stored in the RAM 43, the main CPU 41 completes the present subroutine without conducting the processing of step S121 and step S122.

As above, the insurance flag has been described by using FIG. 21.

The description is returned to FIG. 19.

When determining in step S100 that the insurance flag is not set, the main CPU 41 completes the present subroutine.

On the other hand, when determining in step S100 that the insurance flag is set, the main CPU 41 sets the number C of all games to "C=C+1" in the number-of-all-games storage area in the RAM 43 (step S101).

Next, the main CPU 41 determines whether or not the number C of all games is smaller than a previously set value (990) based on the number-of-all-games data stored in the number-of-all-games storage area in the RAM 43 (step S203).

When determining that the number C of all games is smaller than the previously set value (990), the main CPU 41 completes the present subroutine.

On the other hand, when determining that the number C of all games is equal to or more than the previously set value (990), the main CPU 41 determines whether or not the number C of all games is smaller than the prescribed number (1000) (step S103).

When determining that the number C of all games is smaller than the prescribed number (1000), the main CPU 41 displays the countdown image 500 to the lower image display panel 16.

As described by using FIG. 1C, the countdown image 500 is an image showing the number of the games until the number of the counted normal games reaches the prescribed number (1000).

Figure 21A:
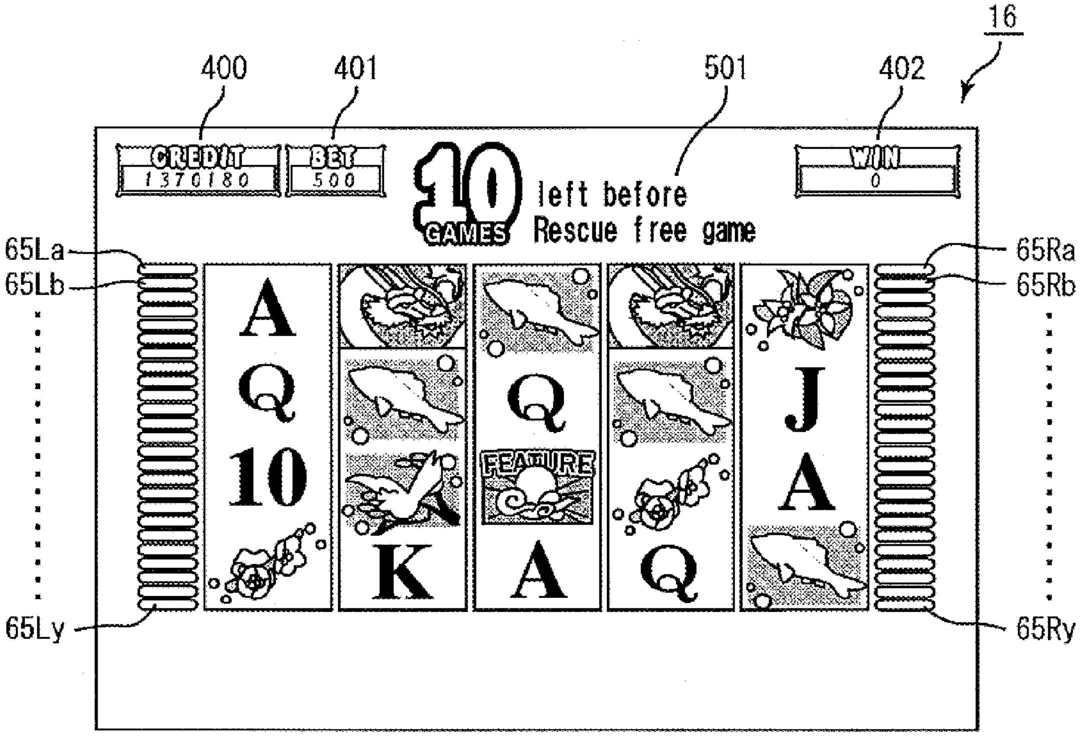
FIG. 21A is a view showing an exemplary image displayed to the lower image display panel provided in the slot machine according to one embodiment of the present invention.
Figure 21B:
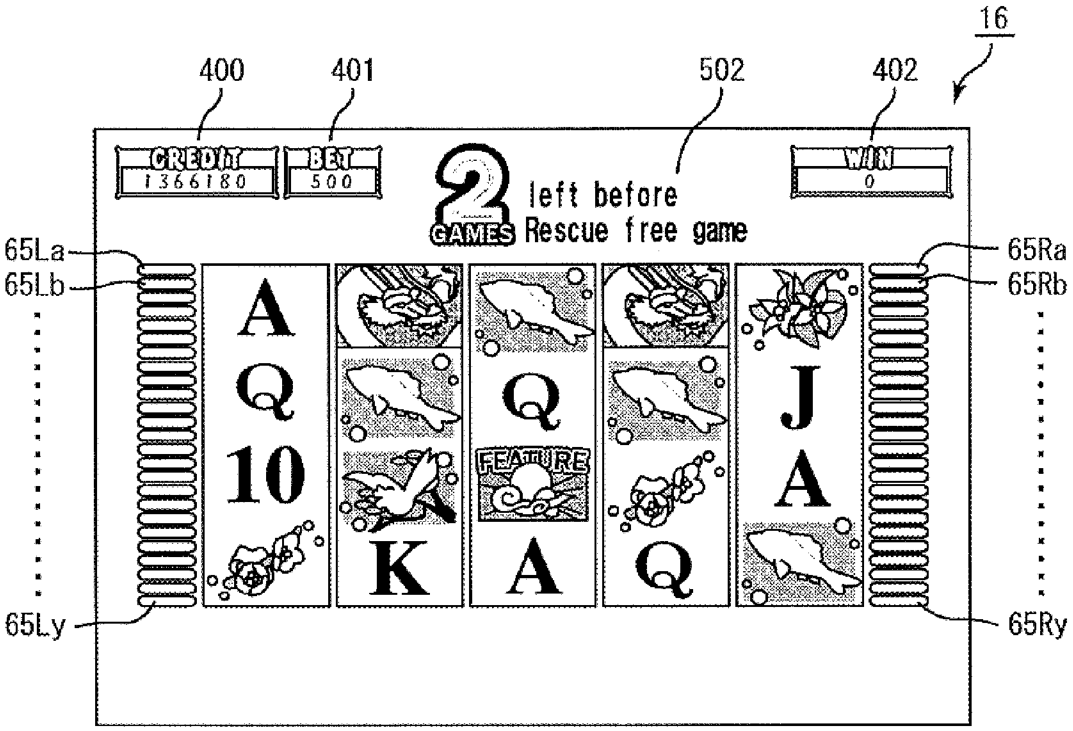
FIG. 21B is a view showing an exemplary image displayed to the lower image display panel provided in the slot machine according to one embodiment of the present invention.
Figure 21C:
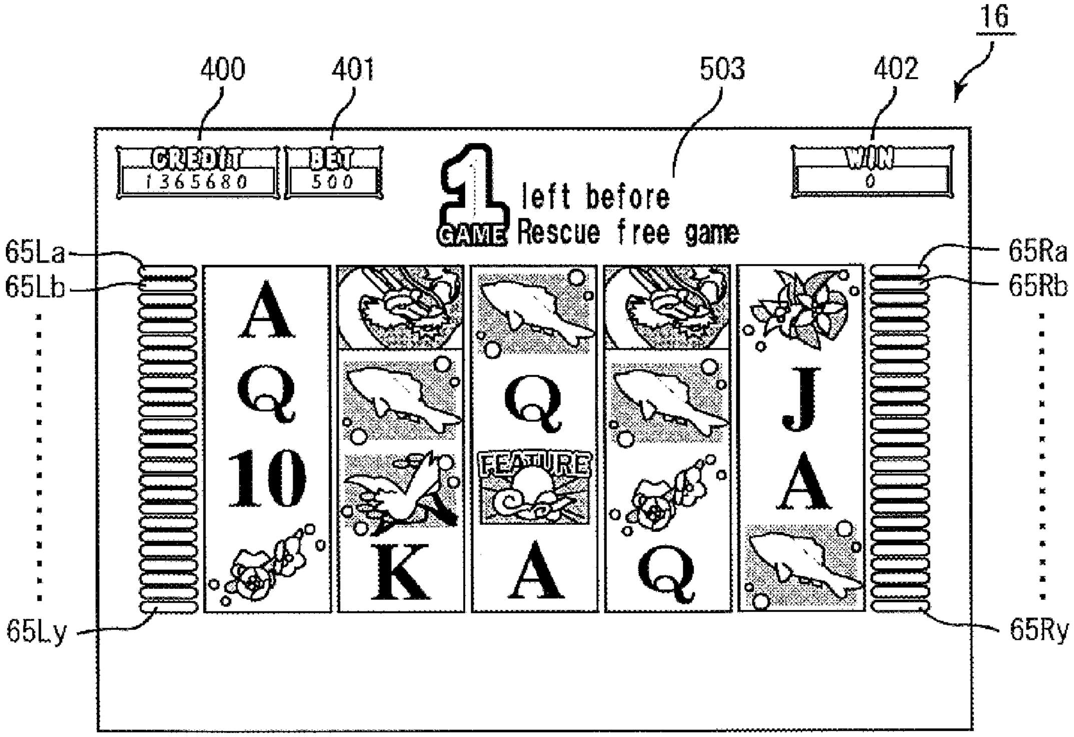
FIG. 21C is a view showing an exemplary image displayed to the lower image display panel provided in the slot machine according to one embodiment of the present invention.

By using FIGS. 21A to 21C, a state is shown, where the number of the games is decreased until the number of the counted normal games reaches the prescribed number (1000).

FIGS. 21A to 21C are views each showing an exemplary image displayed to the lower image display panel.

In FIG. 21A, a state is shown, where 10 games are left until the number of the counted normal games reaches the prescribed number (1000). In FIG. 21B, a state is shown, where 2 games are left until the number of the counted normal games reaches the prescribed number (1000). In FIG. 21C, a state is shown, where 1 game is left until the number of the counted normal games reaches the prescribed number (1000).

After executing the processing of step S104, the main CPU 41 completes the present subroutine.

When determining in step S103 that the number C of all games is the prescribed number (1000), the main CPU 41 displays the reaching effect image 201 (cf. FIG. 1D) to the lower image display panel 16.

Next, the main CPU 41 executes second-free-game execution processing (step S106).

Figure 22:
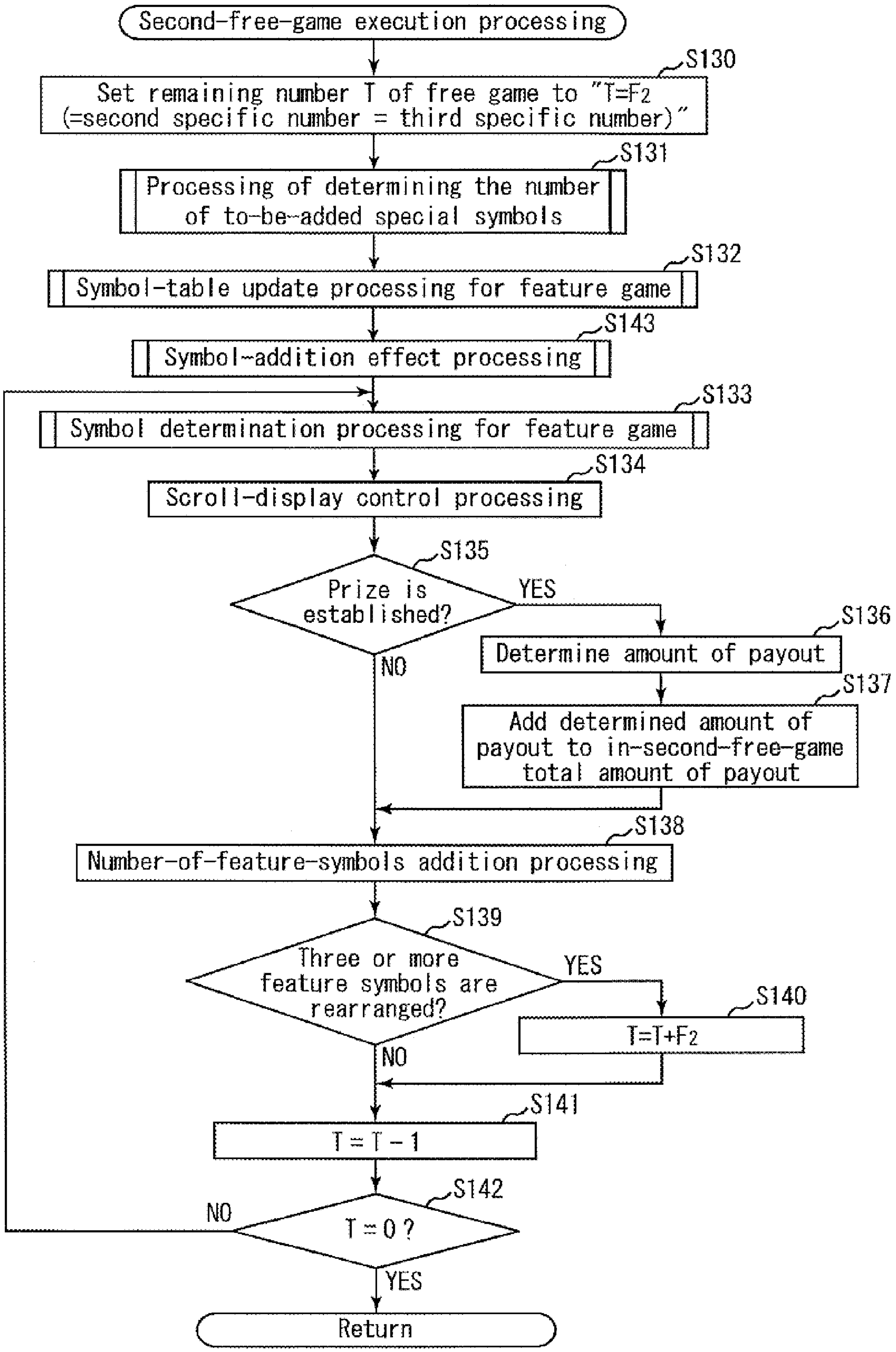
FIG. 22 is a flowchart showing a subroutine of second-free-game execution processing according to the first embodiment.

Here, the second-free-game execution processing is described by using FIG. 22.

FIG. 22 is a flowchart showing a subroutine of second-free-game execution processing according to the first embodiment.

First, the main CPU 41 sets the remaining number T of the free games to "T=$F_2$ (=second specific number=third specific number=30)" (step S130).

Subsequently, the main CPU 41 executes the processing of steps S131 to S135 and step S143. Since these processing are the same as the processing of steps S30 to S35 and step S45 in FIG. 10, the description thereof is omitted here.

When determining in step S135 that the prize has been established, the main CPU 41 determines an amount of payout (step S136). This processing is as described in step S16 in FIG. 4. However, in this processing, the main CPU 41 only determines the amount of payout, and the main CPU 41 neither add the number of credits corresponding to the determined amount of payout nor conduct payout of coins in an amount corresponding to the determined amount of payout.

Next, the main CPU 41 adds the amount of payout determined in step S136 to an in-second-free-game total amount of payout shown by total-amount-of-payout data stored in the total-amount-of-payout storage area of the RAM 43 (step S137).

When determining in step S135 that the prize has not been established, or after executing the processing of step S137, the main CPU 41 executes number-of-feature-symbols addition processing (step S138). In this processing, the main CPU 41 adds the number of the feature symbols 100 rearranged in the display blocks 28 in this game to the number of the feature symbols indicated by the number-of-feature-symbols data stored in the number-of-feature-symbols storage area of the RAM 43.

Next, the main CPU 41 determines whether or not three or more feature symbols 100 are rearranged (step S139). In this processing, the main CPU 41 determines whether or not three or more feature symbols 100 are rearranged in the display blocks 28, without taking the pay line 300 into consideration.

When determining in step S139 that three or more feature symbols are rearranged, the main CPU 41 sets the remaining number T of the free games to "$T=T+F_2$" ($F_2$=second specific number=third specific number=30) in the number-of-free-games storage area of the RAM 43 (step S140).

Further, the main CPU 41 displays the free-game addition image 202 (cf. FIG. 1F) to the lower image display panel 16.

When determining in step S139 that three or more feature symbols 100 are not rearranged, or after executing the processing of step S140, the main CPU 41 sets the remaining number T of the free games to "$T=T-1$" in the number-of-free-games storage area of the RAM 43 (step S141).

Next, the main CPU 41 determines whether or not T is "T=0" based on the remaining-number data stored in the number-of-free-games storage area of the RAM 43 (step S142).

When determining that T is not "T=0", the main CPU 41 returns the processing to step S133.

On the other hand, when determining that T is "T=0", the main CPU 41 completes the present subroutine.

As above, the second-free-game execution processing executed in step S106 in FIG. 20 has been described by using FIG. 20.

Subsequently, the main CPU 41 displays an amount-of-insurance-payout notification image (cf. FIG. 23) to the lower image display panel 16.

Figure 23:
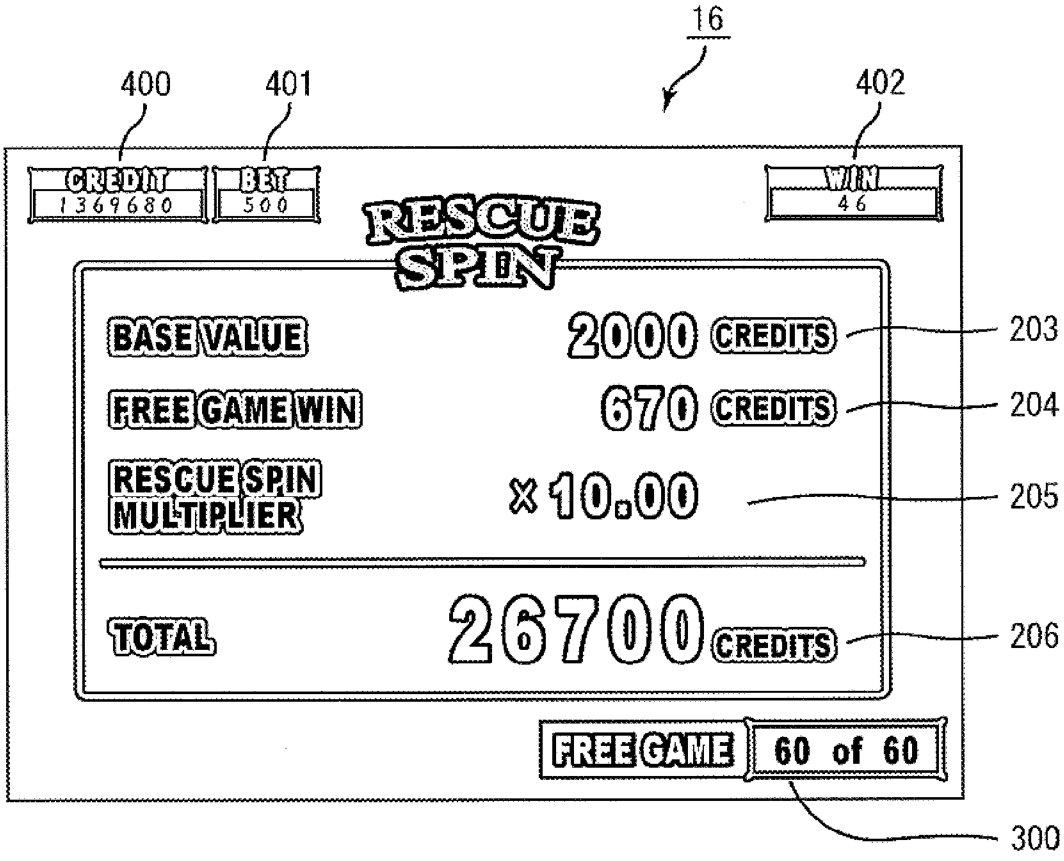
FIG. 23 is a view showing an exemplary image displayed to the lower image display panel provided in the slot machine according to one embodiment of the present invention.

Here, the amount-of-insurance-payout notification image is described by using FIG. 23.

FIG. 23 is a view showing an exemplary image displayed to the lower image display panel.

The amount-of-insurance-payout notification image includes a fixed-amount-of-payout image 203, an in-second-free-game total-amount-of-payout image 204, a rescue-multiplier image 205, and an amount-of-insurance-payout image 206.

The fixed-amount-of-payout image 203 indicates a prescribed number (2000). This number is also referred to as "BASE VALUE".

The in-second-free-game total-amount-of-payout image 204 indicates the number of coins corresponding to the in-second-free-game total amount of payout. This number is also referred to as "FREE GAME WIN".

The rescue-multiplier image 205 indicates a total sum of the feature symbols 100 (number of the feature symbols) rearranged during the second free games. This number is also referred to as "RESCUE MULTIPLIER".

The amount-of-insurance-payout image 206 indicates the total of the number of the coins to be paid out (amount of insurance payout) triggered by the number of the counted normal games having reached the prescribed number (1000).

In the present embodiment, the amount of insurance payout is the number of the coins obtained by multiplying the total value of "BASE VALUE" and "FREE GAME WIN" by "RESCUE MULTIPLIER".

In the example shown in FIG. 23, "BASE VALUE" is 2000, "FREE GAME WIN" is 670, and "RESCUE MULTIPLIER" is 10. Accordingly, the amount of insurance payout is 26700 (=(2000+670)×10).

As above, the amount-of-insurance-payout notification image displayed in step S107 in FIG. 22 has been described by using FIG. 23. In step S107, the main CPU 41 calculates the amount of insurance payout, based on the total-amount-of-payout data stored in the total-amount-of-payout storage area of the RAM 43 and the number-of-feature-symbols data stored in the number-of-feature-symbols storage area of the RAM 43. Then, the main CPU 41 displays the image indicative of the calculated amount of insurance payout as the amount-of-insurance-payout image 206, to the lower image display panel 16.

After executing the processing of step S107, the main CPU 41 executes the processing relating to the payout of coins in number corresponding to the calculated amount of insurance payout (step S108).

In the case of accumulating the coins, the main CPU 41 executes the processing of adding the number of credits corresponding to the determined amount of payout. On the other hand, in the case of conducting the payout of coins, the main CPU 41 transmits a control signal to the hopper 66 and conducts the payout of coins corresponding to the determined amount of payout.

Next, the main CPU 41 clears the insurance flag (step S109).

Then, the main CPU 41 sets the number C of all games to "C=0" in the number-of-all-games storage area of the RAM 43 (step S110).

As above, there has been described the first embodiment.

In accordance with the slot machine 10 according to the first embodiment, it is possible to shift the player's attention to the condition of "three or more feature symbols 100 are rearranged in the display blocks 28", and to the condition of "the number of the normal games conducted after the mode was shifted to the insurance mode has reached the prescribed number (1000)". Namely, it is possible to switch the object for capturing the player's attention during the game, and therefore, it is possible to provide a game which is less likely to be monotonous for the player and hardly bores the player even after long hours of play.

Further, in accordance with the slot machine 10 according to the first embodiment, even the identical condition of "three or more feature symbols 100 are rearranged in the display blocks 28" is established, the number of the free games to be offered to the player is larger in the case where this condition has been established in the second free game, than in the case where this condition has been established in the normal game. Accordingly, it is possible to have the player have great expectations for reaching of the number of the normal games conducted after the mode was shifted to the insurance mode to the prescribed number (1000), and the rearrangement of three or more feature symbols 100 in the second free game.

Further, since the number of the free games to be generated is different in accordance with the situation of the game at the time when the condition is established even the identical condition of "three or more feature symbols 100 are rearranged in the display blocks 28" is established, it is possible to give a surprise to the player.

Further, in accordance with the slot machine 10 according to the first embodiment, the condition that three or more feature symbols 100 are rearranged to the lower image display panel 16 on which the player's attention may be concentrated is set as the condition for generation of the free game. Accordingly, it is possible to give a strong impression to the player about the difference between the number of the free games generated in the case where three or more feature symbols 100 are rearranged in the normal game and the number of the free games generated in the case where three or more feature symbols 100 are rearranged in the second free game. As a result, it is possible to raise the player's expectations for reaching of the number of the normal games conducted after the mode was shifted to the insurance mode to the prescribed number (1000) and the rearrangement of three or more feature symbols 100 are rearranged in the second free game.

In accordance with the slot machine 10 according to the first embodiment, it is possible to have the player play the game while having expectations for the rearrangement of three or more feature symbols 100 and reaching of the number of the counted normal games to the prescribed number (1000), during the normal game. As a result, it is possible to have the player more absorbed in the game.

Further, when three or more feature symbols 100 are rearranged after having continued the game until the number of the counted normal games reached the prescribed number (1000), the player can receive the benefit of more free games, compared to the case where three or more feature symbols 100 are rearranged in the normal game. Accordingly, it is possible to have the player play the game for the longer time.

Furthermore, in accordance with the slot machine 10 according to the first embodiment, it is possible to free the player who has consumed much game media, of an irritation and boredom accompanying the consumption of many game media.

Further, in accordance with the slot machine 10 according to the first embodiment, it is possible to have the player who is planning to play the game for a long time press the insurance BET button 90. Thus, it is possible to aim the increase in the profit of the recreation facility.

On the other hand, it is also possible to have the player who has not determined the time period to play the game at the start, continue playing the game until the counted number reaches the prescribed number.

Moreover, in accordance with the slot machine 10 according to the first embodiment, the number of the second free games is larger than the number of the first free games, and the number of the free games to be added when three or more feature symbols are rearranged in the second free game is equal to the number of the second free games.

Accordingly, it is possible to give a strong impression to the player about whether the currently-conducted free game is the free game derived from the establishment of the condition of "three or more feature symbols 100 are rearranged in the display blocks 28" or the free game derived from the establishment of the condition of "the number of the normal games conducted after the mode was shifted to the insurance mode has reached the prescribed number (1000)". As a result, it is possible to increase the player's interest and concern for each free game.

Second Embodiment

There has been described a case where the number of the normal games to be counted is the number C of all games, in the first embodiment. However, in the present invention, the number of the normal games to be counted is not limited to this example.

In the second embodiment, the number M of the maximum BET game is counted, in addition to the number C of all games. Based on the counted number M of the maximum BET game, the number of the free games to be added when three or more feature symbols 100 are rearrange during the second free games (third specific number) is determined.

The number M of the maximum BET game is the number of the normal games played with a BET of coins in the maximum number of BETs. The maximum number of BETs is the maximum number of coins (500 coins in the present embodiment) which can be betted in one game.

Number-of-maximum-BET-games data indicative of the number M of the maximum BET games is stored in number-of-maximum-BET-games storage area of the RAM 43.

Figure 24:
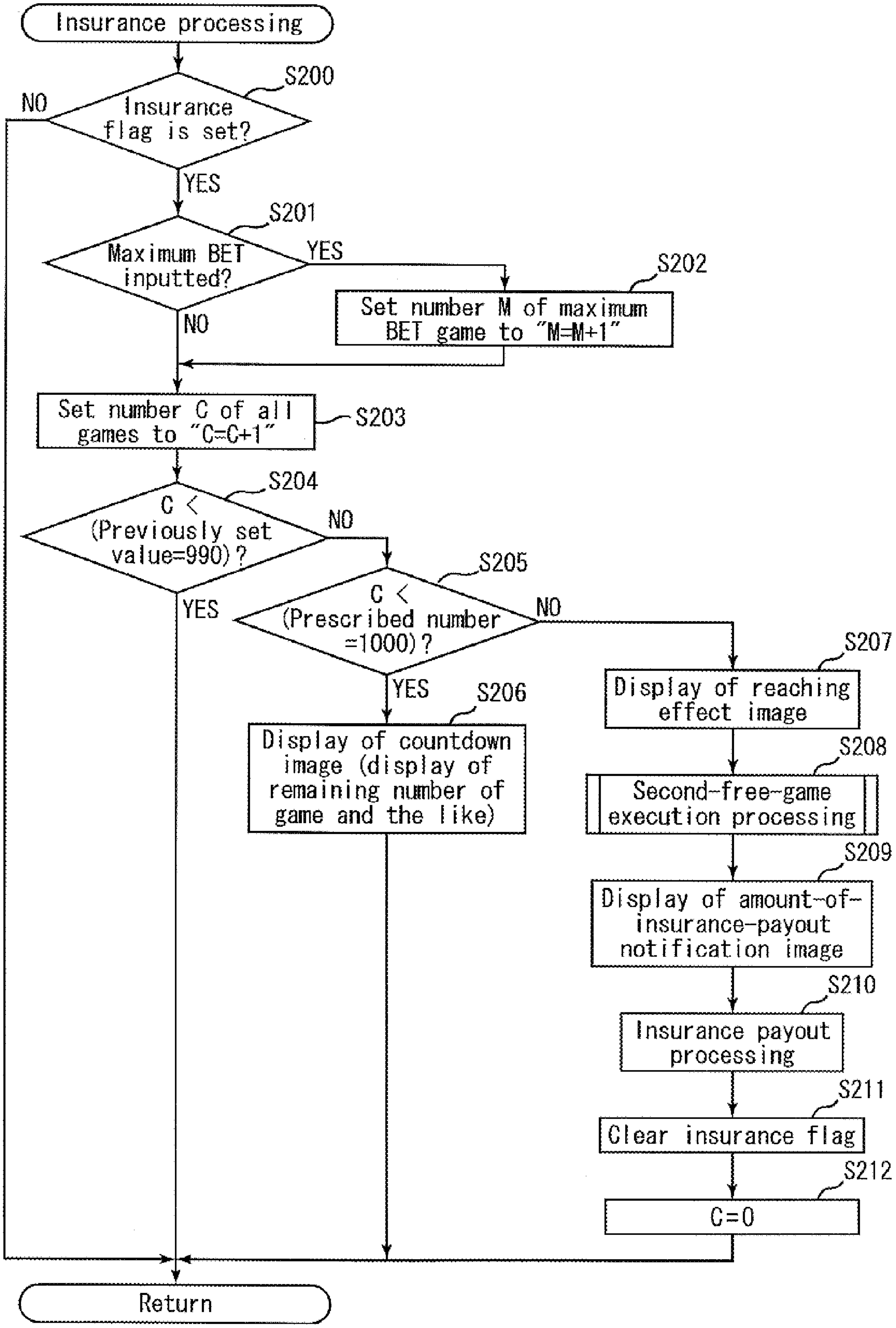
FIG. 24 is a flowchart showing a subroutine of insurance processing according to a second embodiment.

FIG. 24 is a flowchart showing a subroutine of insurance processing according to the second embodiment.

First, the main CPU 41 determines whether or not the insurance flag is set (step S200). This processing is the same processing as step S100 in FIG. 19, and therefore, the description thereof is omitted here.

When determining that the insurance flag is set, the main CPU 41 determines whether or not coins in the maximum number of BETs are betted (step S201). In this processing, the main CPU 41 determines whether or not a maximum BET flag is set.

The maximum BET flag is set in the case described in the following.

Namely, the main CPU 41 determines in step S10 of the normal-game execution processing (cf. FIG. 4) whether or not to have received an input signal outputted from the maximum BET switch 27S when the maximum BET button 27 is pressed. Then, when determining to have, received the input signal outputted from the maximum BET switch 27S when the maximum BET button 27 is pressed, the main CPU 41 sets the maximum BET flag.

When determining in step S201 that the maximum BET flag is set, the main CPU 41 determines that coins in the maximum number of BETS are betted.

When determining that coins in the maximum number of BETs are betted, the main CPU 41 sets the number M of the maximum BET games to "M=M+1" in the number-of-maximum-BET-games storage area of the RAM 43 (step S202).

When determining that coins in the maximum number of BETs are not betted, or after executing the processing of step S202, the main CPU 41 shifts the processing to step S203.

Then, the main CPU 41 executes the processing of steps S203 to S212. These processing are the same as the processing of steps S101 to S110, and therefore, the description thereof is omitted here.

Figure 25:
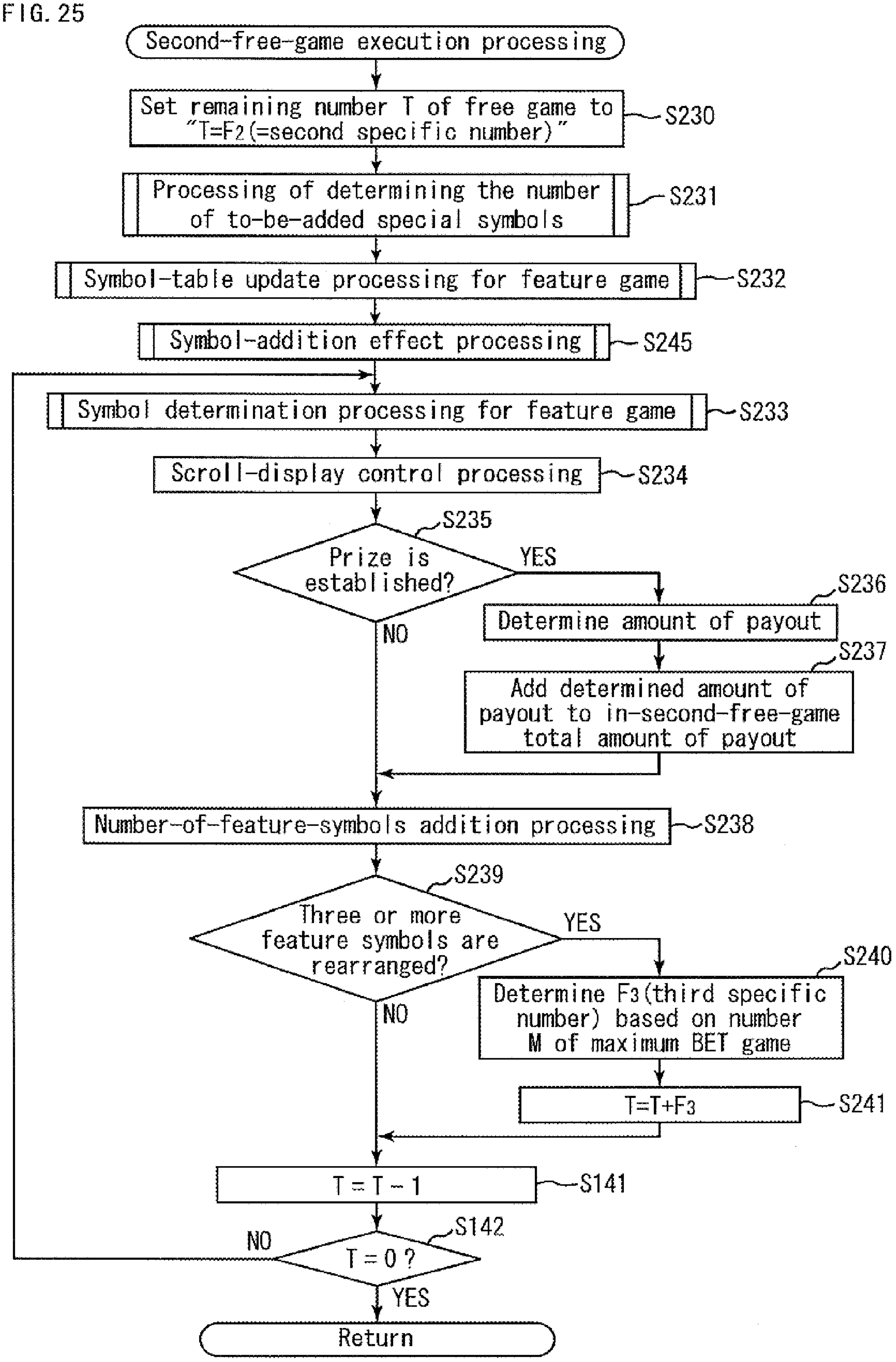
FIG. 25 is a flowchart showing a subroutine of second-free-game execution processing according to the second embodiment.

FIG. 25 is a flowchart showing a subroutine of second-free-game execution processing according to the second embodiment.

FIG. 26 is a view showing a third-specific-number determination table.

Figure 27:
FIG. 27 is a view showing an exemplary image displayed to the lower image display panel provided in the slot machine according to one embodiment of the present invention.

FIG. 27 is a view showing an exemplary image displayed to the lower image display panel.

First, the main CPU 41 executes the processing of steps S230 to S239 and step S245. These processing are the same as the processing of steps S130 to S139 and step S143 in FIG. 22, and therefore, the description thereof is omitted here.

When determining in step S239 that three or more feature symbols 100 are rearranged, the main CPU 41 determines $F_3$ (=third specific number) based on the number-of-maximum-BET-games data stored in the number-of-maximum-BET-games storage area of the RAM 43 and determination table data of the third specific number stored in the RAM 43 (step S240).

In the third-specific-number determination table (cf. FIG. 26), a numerical range to which the number M of the maximum BET games may belong and a possible value of the third specific number are associated with each other.

In the case where the number M of the maximum BET games is 450, for example, the main CPU 41 determines in step S240 that the value "35" associated with the numerical range "400 to 599" to which 450 belongs are determined as $F_3$ (=third specific number).

Next, the main CPU 41 sets the remaining number T of the free games to "$T=T+F_3$" in the number-of-free-games storage area of the RAM 43, based on $F_3$ (=third specific number) determined in step S240.

Further, the main CPU 41 displays a number-of-maximum-BET-games image 207 and a free-game addition image 208 to the lower image display panel 16 (cf. FIG. 27).

The number-of-maximum-BET-games image 207 shows the number M of the maximum BET games. The number M of the maximum BET games is a number of the normal games played by the coins in the maximum number of BETs being betted after the mode is shifted to the insurance mode.

The free-game addition image 208 shows the number $F_3$ of the free games to be added triggered by the rearrangement of three or more feature symbols 100 in the second free games.

In the example in FIG. 27, the number-of-maximum-BET-games image 207 and the free-game addition image 208 show that 35 times of the free games are added because the number M of the maximum BET games is 450.

When determining in step S239 that three or more feature symbols 100 are not rearranged, or after executing the processing of step S241, the main CPU 91 executes the processing of steps S242 to S243. These processing are the same as the processing of steps S141 to S142, and therefore, the description thereof is omitted here.

As above, the second embodiment has been described.

In the second embodiment, there has been described a case where the number of the normal games to be counted is the number C of all games and the number M of the maximum BET games. However, in the present invention, only the number M of the maximum BET games may be counted. In such a case, the second free game may be configured to be generated when the number M of the maximum BET games has reached the prescribed number. Accordingly, it is possible to encourage the player to bet the game media in the maximum number of BETs.

Further, in the second embodiment, there has been described a case where the third specific number is determined directly based on the number M of the maximum BET games. However, in the present invention, the third specific number may be configured to be determined by determining the difference between the first specific number and the third specific number first based on the number M of the maximum BET games, and then adding that difference to the first specific number.

Furthermore, in the present invention, the number of the normal games other than the number C of all games and the number M of the maximum BET games may be counted. Examples of such number of the normal games may include the number of the normal games in which the symbols are stop-displayed in a predetermined stopped state. In such a case, a configuration may be adopted, in which the second free game is generated when the number of the normal games in which the symbols are stop-displayed in the predetermined stopped state has reached the prescribed number. Furthermore, a configuration may also be adopted, in which the third specific number is determined based on the number of the normal games in which the symbols are stop-displayed in the predetermined stopped state. By adopting such configurations, it is possible to have the player have expectations for the stop-display of the symbols in the predetermined stopped state.

In accordance with the slot machine 10 according to the second embodiment, the larger the number M of the maximum BET games is, the larger the third specific number $F_3$ may become, and therefore, it is possible to encourage the player to bet the game media in the maximum number of BETs. As a result, it is possible to aim the increase in the profit of the recreation facility.

Further, in accordance with the slot machine 10 according to the second embodiment, the player can enlarge the difference between the first specific number $F_1$ (20) and the third specific number $F_3$ by betting the game media in the maximum number of BETs by his or herself. Accordingly, it is possible to have the player involved in the degree of the difference between the first specific number $F_1$ and the third specific number $F_3$. Consequently, it is possible to raise the player's expectations for reaching of the number of the normal games conducted after the mode was shifted to the insurance mode to the prescribed number (1000) and the rearrangement of three or more feature symbols 100 in the second free game.

In the present embodiment, the case where the number of the pay lines 300 is 25 has been described. However, the number of the pay lines is not particularly limited in the present invention, and for example, it may be 30.

In the present embodiment, the case has been described where the first predetermined condition is that three or more feature symbols are rearranged. However, the first predetermined condition in the present invention is not particularly limited.

Examples of the first predetermined condition may include the elapse of the predetermined time period after completion of the previous feature game. Further, the examples may also include a condition that a random number is extracted for every prescribed number of games being conducted, and the extracted random number belongs to the predetermined numerical range.

Further, in the present embodiment, there has been described the case where the second predetermined condition is the number of the counted normal games reaching the prescribed number (1000). However, the present invention is not limited to this example. For example, a condition that a random number is extracted for every prescribed number of games being conducted, and the extracted random number belongs to the predetermined numerical range, may be adopted as the second predetermined condition. Further, the second predetermined condition may be a condition that the difference between the amount of the betted game media and the amount of the paid-out game media reaches the predetermined amount.

Furthermore, a condition that points are offered based on the stop-displayed symbol or a combination of the stop-displayed symbols and the offered points reaches the prescribed number may be adopted as the second predetermined condition.

Further, in the present embodiment, there has been described the case where only the number of the normal games is counted. However, in the present invention, the number of the free games may also be counted. For example, the second free game may be configured to be generated, when a total of the number of the normal games and the number of the first free games has reached the prescribed number.

Furthermore, in the present embodiment, there has been described the case where the prescribed number is 1000 only. However, in the present invention, the prescribed number may be set stepwise. For example, 500, 1000, and 2000 may be set as the prescribed numbers. When the mode is shifted to the insurance mode, any of the prescribed numbers may be selected.

In such a case, the following configuration is desirably adopted.

Namely, a first insurance BET button for setting 500 as the prescribed number, a second insurance BET button for setting 1000 as the prescribed number, a third insurance BET button for setting 2000 as the prescribed number are provided. Further, the number of credits subtracted when the first insurance BET button is pressed, the number of credits subtracted when the second insurance BET button is pressed, and the number of credits subtracted when the third insurance BET button is pressed are different from each other. Further, the third specific number (second specific number) in the case where the first insurance BET button is pressed, the third specific number (second specific number) in the case where the second insurance BET button is pressed and the third specific number (second specific number) in the case where the third insurance BET button is pressed are different from each other.

Accordingly, it is possible to have the player think about which insurance BET button is more beneficial to press in shifting the mode to insurance mode. Further, through this process, it is possible to have the player absorbed in the game.

Further, in the present embodiment, a game content of the free game is a game, in which a plurality of symbols are variably displayed and then stop-displayed in the display blocks 28, and the amount of payout is determined based on the stop-displayed symbol or a combination of the stop-displayed symbols (a game normally played on the slot machine).

However, the free game in the present invention is not limited to this example, and a game different from the slot machine game may be conducted. Examples of the game to be conducted may include a card game such as poker, and a game such as a shooting game, a fighting game and the like. The free game may be a game in which the game media are paid out, or alternatively, may be a game in which the game media are not paid out.

Further, after the free game is conducted based on the number of the counted normal games having reached the prescribed number in the insurance mode, when the number of the counted normal games has reached the prescribed number again in the insurance mode, a free game having a content different from that of the previous free game may be conducted.

The free game in the present invention is not particularly limited as long as it is a game played without a BET of game media, and can be designed as appropriate.

Third Embodiment

A general description of a present embodiment of the present invention is given by using FIGS. 30A to 30F.

FIGS. 30A to 30F are views each showing an exemplary image displayed to a lower image display panel.

In a slot machine 1010 (cf. FIG. 31) according to the present embodiment, a plurality of symbols are variably displayed and then stop-displayed (rearranged) in display blocks 1028 in a lower image display panel 1016.

Figure 30A:
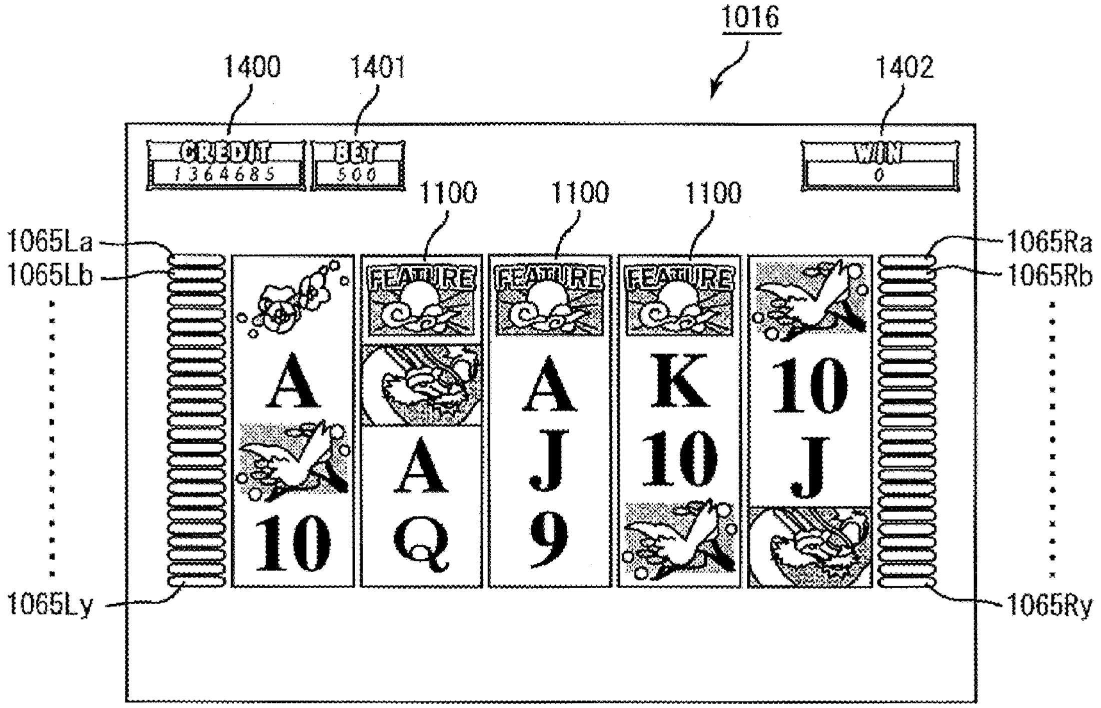
FIG. 30A is a view showing an exemplary image displayed to a lower image display panel provided in a slot machine according to one embodiment of the present invention.

FIG. 30A shows a state where three feature symbols 1100 are stop-displayed. In the present embodiment, when three feature symbols 1100 are stop-displayed, a free game is generated. The free game is a game that can be played without betting game media such as a coin.

Among games conducted in the slot machine 1010, the game other than the free game is referred to as a normal game in the present description. Further, the free game conducted when three or more feature symbols 1100 are stop-displayed in the normal game is referred to as a first free game.

The first free game corresponds to the normal free game in the present invention.

Figure 30B:
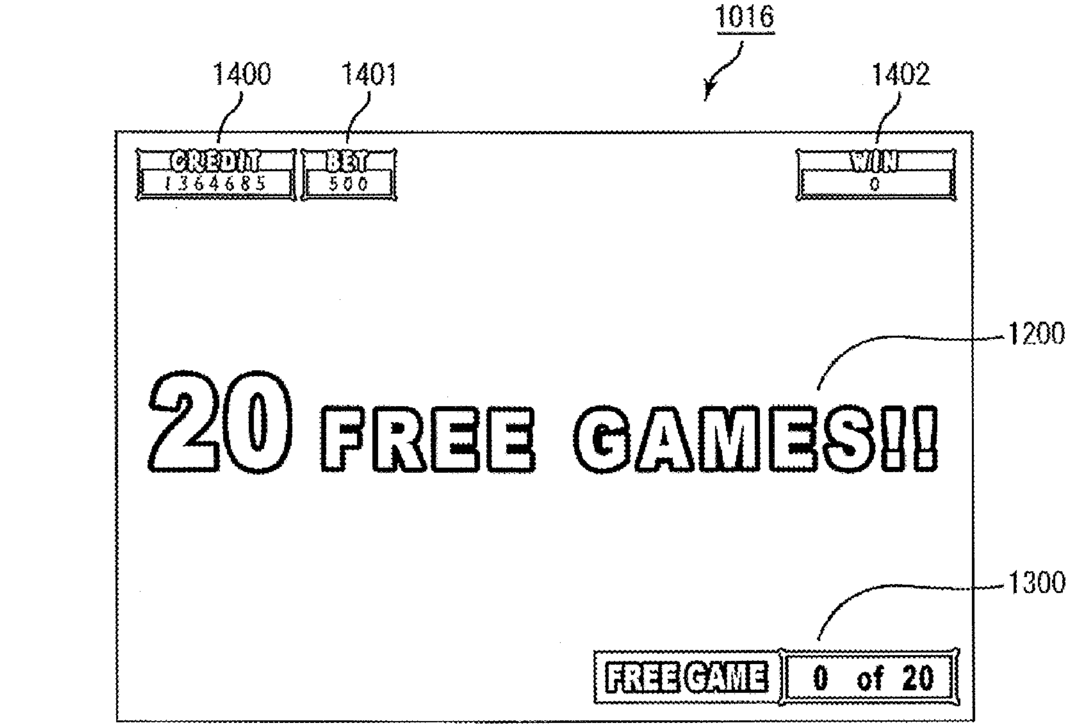
FIG. 30B is a view illustrating an exemplary image displayed to a lower image display panel provided in a slot machine according to one embodiment of the present invention.

FIG. 30B shows a state where a free-game-generated image 1200 is displayed triggered by a stop-display of three feature symbols 1100. The free-game-generated image 1200 is showing the number of the generated free games. As shown in FIG. 308, the number of the first free games (first specific number) generated when three or more feature symbols 1100 are stop-displayed in the normal game is 20 in the present embodiment.

The stop-display of three or more feature symbols 1100 corresponds to the first predetermined condition in the present invention.

Further, in FIG. 30B, a state that a number-of-free-games display portion 1300 is provided on the lower image display panel 1016. The number-of-free-games display portion 1300 displays the number of the generated free games (hereinafter, also referred to as number of all free games) and the number of the already-conducted free games (hereinafter, also referred to as number of the conducted free games). The example in FIG. 30B shows that the number of all free games is 20 and the number of the conducted free games is 0.

Further, in the slot machine 1010 according to the present embodiment, a mode is shifted from a non-insurance mode to an insurance mode, triggered by an insurance BET button 1090 (cf. FIG. 31) being pressed. Then, the number of the normal games conducted after the shift of the mode to the insurance mode is counted. When the number of the counted normal games has reached a prescribed number (1000), the free game is generated. The free game generated like this is referred to as a second free game in the present description. In the following, when the free game is referred, both of the first free game and the second free game are included. The number of the counted free games reaching the prescribed number corresponds to a second predetermined condition in the present invention.

The second free game corresponds to the special free game in the present invention.

Figure 30C:
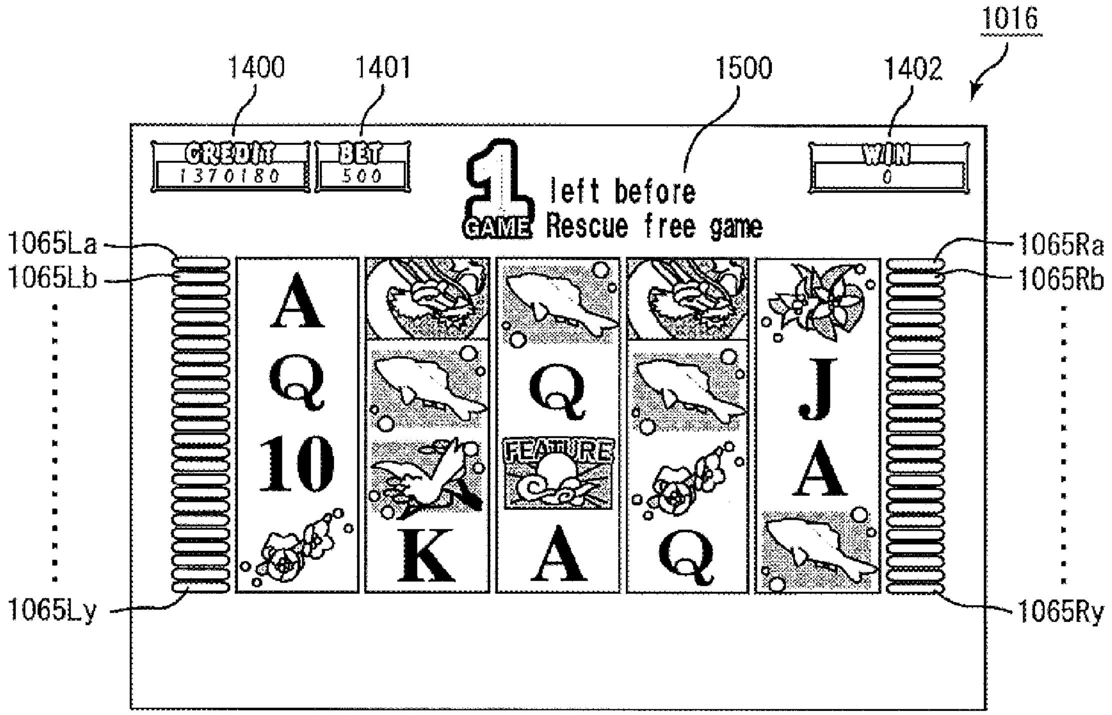
FIG. 30C is a view showing an exemplary image displayed to a lower image display panel provided in a slot machine according to one embodiment of the present invention.

As shown in FIG. 30C, a countdown image 1500 is displayed to the lower image display panel 1016. The countdown image 1500 is an image showing the number of the games until the number of the counted normal games reaches the prescribed number (1000). The example in FIG. 30C shows that one game is left before the number of the counted normal games reaches the prescribed number (1000).

Figure 30D:
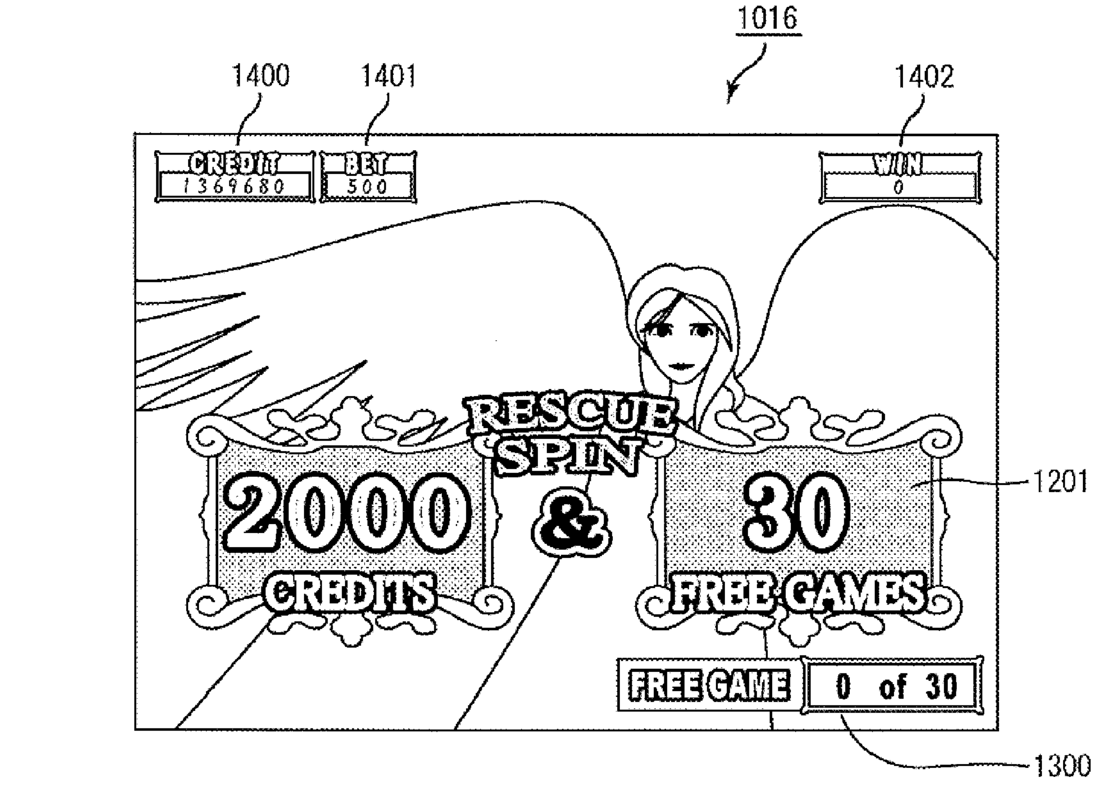
FIG. 30D is a view showing an exemplary image displayed to a lower image display panel provided in a slot machine according to one embodiment of the present invention.

In FIG. 30D, a state that a reaching effect image 1201 is displayed triggered by the number of the counted normal games having reached the prescribed number is shown. The reaching effect image 1201 shows contents of a benefit to be offered to the player triggered by the number of the counted normal games having reached the prescribed number.

As shown in FIG. 30D, in the present embodiment, the number of the second free games (second specific number) to be generated triggered by the number of the counted normal games having reached the prescribed number is 30.

Here, in addition to the second free games, a predetermined number of coins (2000 coins) are also offered.

The predetermined number of coins (2000 coins) correspond to the predetermined amount of game media in the present invention.

In the present embodiment, the second specific number (30) is larger than the first specific number (20). Namely, the number of the second free games is larger than the number of the first free games.

Further, in the second free game, the number of the wild symbols which can be substituted for other symbols is increased. Accordingly, in the second free game, a prize is more likely to be established compared to the normal game and the first free game, and therefore, it is more advantageous for the player.

The wild symbol corresponds to the special symbol in the present invention.

Further, FIG. 30D shows a state that "30" as the number of all free games and "0" as the number of the conducted free games are displayed to the number-of-free-games display portion 1300.

Subsequently, the second free game is conducted.

Figure 30E:
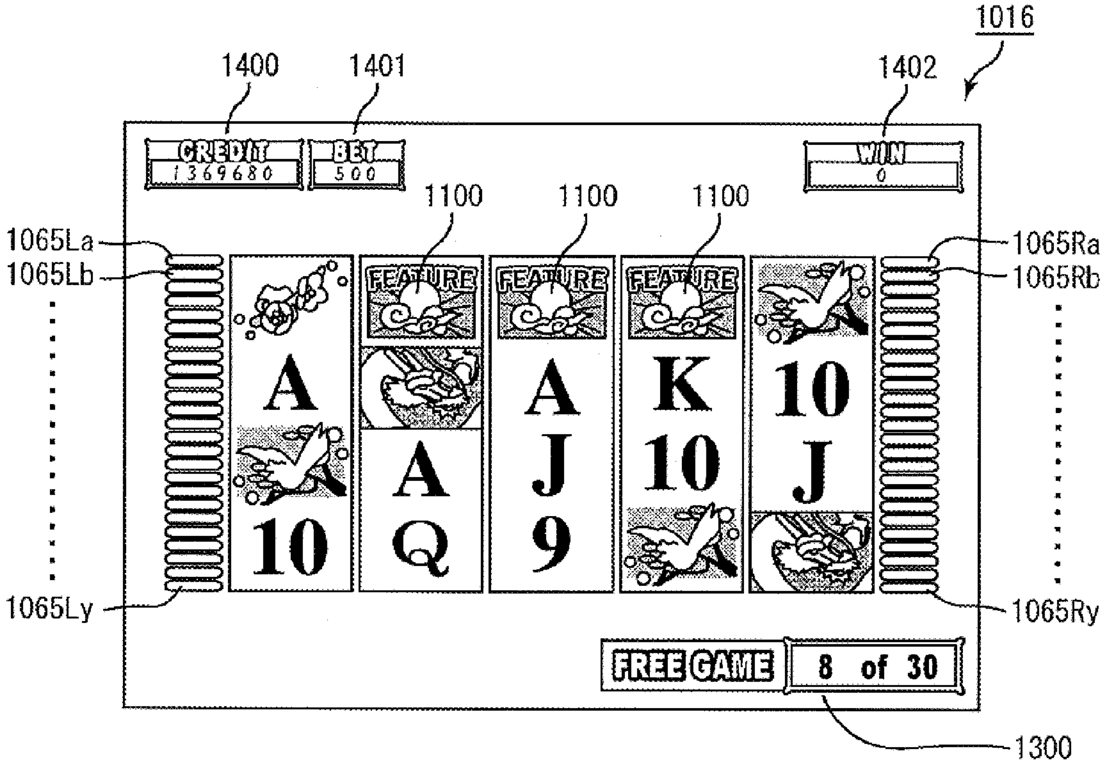
FIG. 30E is a view showing an exemplary image displayed to a lower image display panel provided in a slot machine according to one embodiment of the present invention.

In FIG. 30E, a state that three feature symbols are displayed in the second free game is shown. In the present embodiment, the remaining number of the free games is increased when three or more feature symbols 1100 are displayed in the second free game.

Figure 30F:
FIG. 30F is a view showing an exemplary image displayed to a lower image display panel provided in a slot machine according to one embodiment of the present invention.

In FIG. 30F, a state that a free-game addition image 1202 is displayed triggered by three feature symbols 1100 displayed in the second free game is shown. The free-game addition image 1202 shows the number of the free games to be added. As shown in FIG. 30F, the number of the free games (third specific number) to be added when three or more feature symbols are stop-displayed in the second free game is 30, in the present embodiment.

Further, FIG. 30F shows a state that the number of all free games displayed to the number-of-free-games display portion 1300 is increased from 30 to 60 because of the stop-display of three feature symbols 1100.

As above, the general description of the present embodiment has been given by using FIG. 30A to 30F.

It is to be noted that the free game is also referred to as a feature game in the following.

Further, each of FIGS. 30A to 30F also shows a state that a number-of-credits display portion 1400, a number-of-BETs display portion 1401 and a number-of-payouts display portion 1402 are displayed to the lower image display panel 1016. The number-of-credits display portion 1400 is for displaying the number of credited coins. The number-of-BETs display portion 1401 is for displaying the number of betted coins. The number-of-payouts display portion 1402 is for displaying the number of coins to be paid out.

In the following, the present embodiment is described in more detail.

Figure 31:
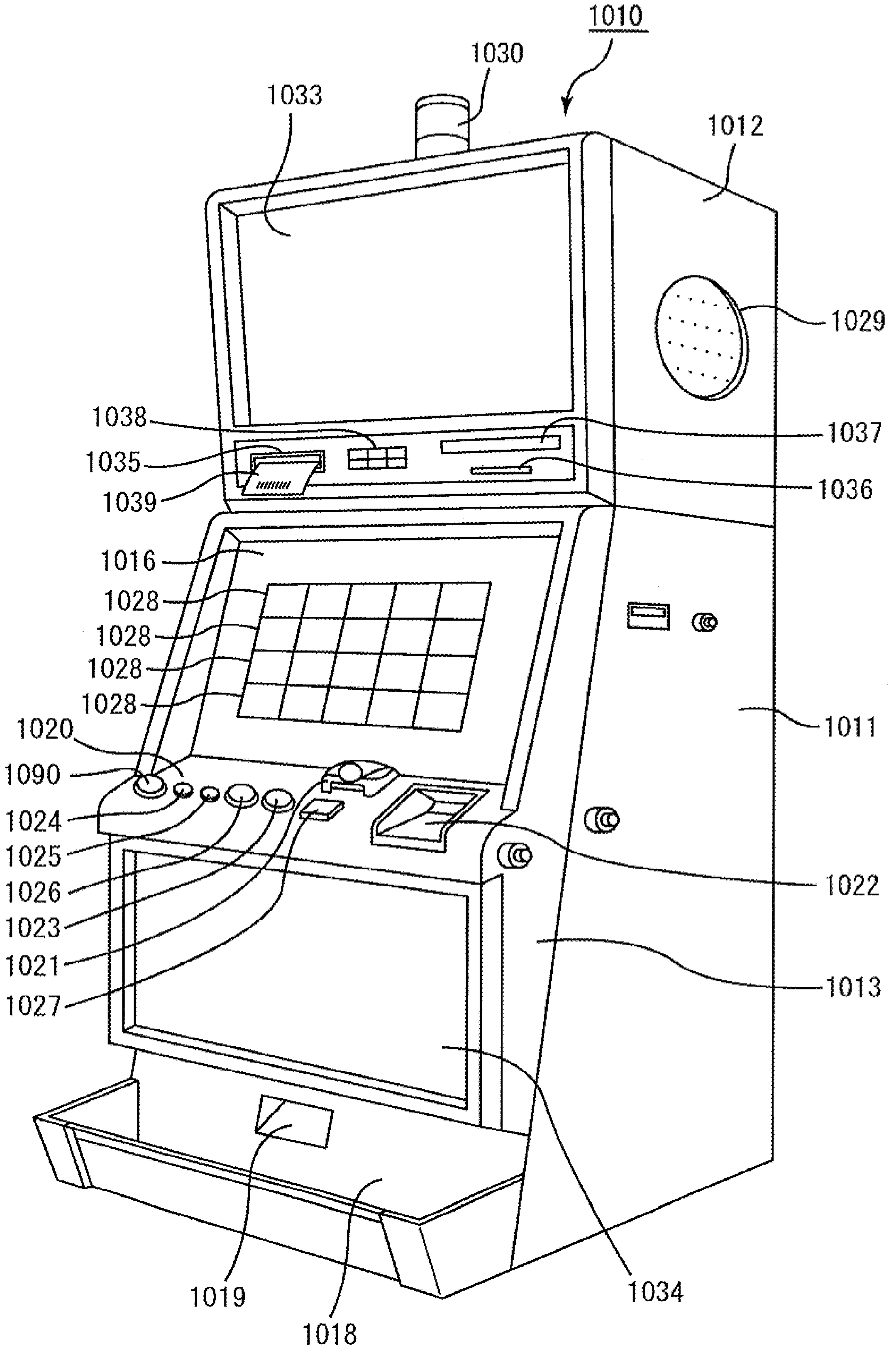
FIG. 31 is a perspective view showing an external view of a slot machine according to one embodiment of the present invention.

FIG. 31 is a perspective view showing an external view of a slot machine according to one embodiment of the present invention.

In the slot machine 1010, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 1010 comprises a cabinet 1011, a top box 1012 installed on the upper side of the cabinet 1011, and a main door 1013 provided at the front face of the cabinet 1011.

On the main door 1013, there is provided the lower image display panel 1016. The lower image display panel 1016 includes a transparent liquid crystal panel which displays twenty display blocks 1028 along five columns and four rows. A single symbol is displayed in each display block 1028. The lower image display panel 1016 corresponds to the symbol display in the present invention.

Further, although not shown, various types of images relating to an effect, in addition to the aforementioned images, are displayed to the lower image display panel 1016.

Moreover, although not shown, the touch panel 1069 is provided at the front face of the lower image display panel 1016. The player can operate the touch panel 1069 to input a variety of commands.

When the touch panel 1069 is operated, an input signal is transmitted from the touch panel 1069 to a main CPU 1041.

Below the lower image display panel 1016, there are provided a control panel 1020 including a plurality of buttons 1023 to 1027 and 1090, with each of which a command according to game progress is inputted by the player, a coin receiving slot 1021 through which a coin is accepted into the cabinet 1011, and a bill validator 1022.

The control panel 1020 is provided with a start button 1023, a change button 1024, a CASHOUT button 1025, a 1-BET button 1026, a maximum BET button 1027, and an insurance BET button 1090. The start button 1023 is for inputting a command to start scrolling of symbols. The change button 1024 is used for making a request of staff in the recreation facility for exchange. The CASHOUT button 1025 is used for inputting a command to pay out credited coins to a coin tray 1018.

The 1-BET button 1026 is used for inputting a command to bet one coin on a game out of credited coins. The maximum BET button 1027 is used for inputting a command to bet the maximum number of coins that can be bet on one game (500 coins in the present embodiment) out of credited coins. The insurance BET button 1090 is used for inputting a command to shift the mode from the non-insurance mode to the insurance mode.

The bill validator 1022 not only discriminates a regular bill from a false bill, but also accepts the regular bill into the cabinet 1011. It is to be noted that the bill validator 1022 may be configured so as to be capable of reading a later-described ticket 1039 with a barcode. At the lower front of the main door 1013, namely, below the control panel 1020, there is provided a belly glass 1034 on which a character or the like of the slot machine 1010 is drawn.

An upper image display panel 1033 is provided on the front surface of the top box 1012. The upper image display panel 1033 is provided with a liquid crystal panel and displays, for example, images indicative of introduction of contents of the game and explanation of the rule of the game.

Further, a speaker 1029 is provided in the top box 1012. Under the upper image display panel 1033, there are provided a ticket printer 1035, a card reader 1036, a data display 1037, and a key pad 1038. The ticket printer 1035 prints on a ticket a barcode as coded data of the number of credits, a date, an identification number of the slot machine 1010, and the like, and outputs the ticket as the ticket 1039 with a barcode. The player can make another slot machine read the ticket 1039 with a barcode to play a game thereon, or exchange the ticket 1039 with a barcode with a bill or the like at a predetermined place in the recreation facility (e.g. a cashier in a casino).

The card reader 1036 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 1037 includes a fluorescent display and the like, and displays, for example, data read by the card reader 1036 or data inputted by the player via the key pad 1038. The key pad 1038 is used for inputting a command and data concerning issuing of a ticket, and the like.

Figure 32:
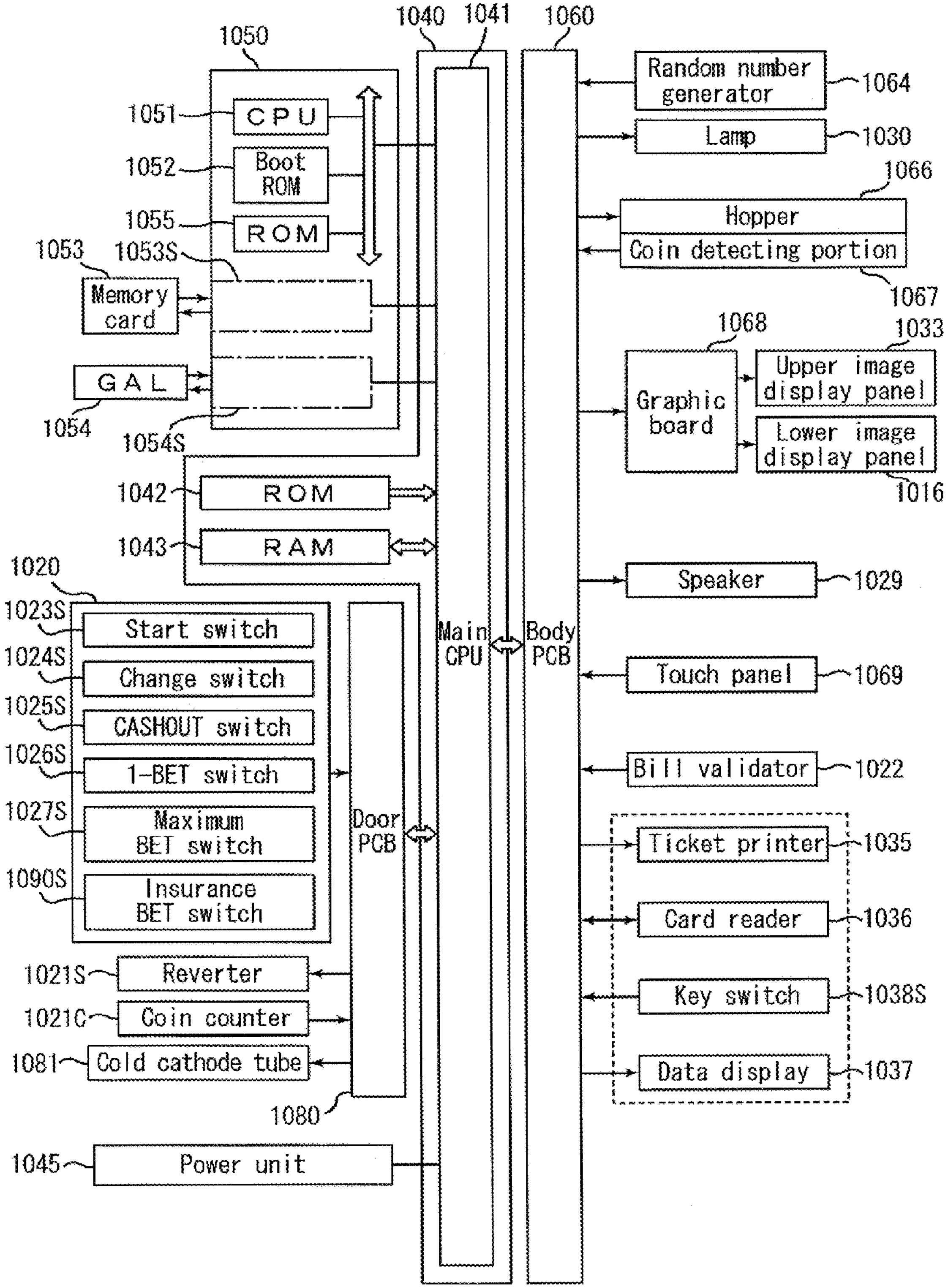
FIG. 32 is a block diagram showing an internal configuration of the slot machine shown in FIG. 31.

FIG. 32 is a block diagram showing an internal configuration of the slot machine shown in FIG. 31.

A gaming board 1050 is provided with a CPU (Central Processing Unit) 1051, a ROM 1055, and a boot ROM 1052 which are interconnected to one another by an internal bus, a card slot 53S corresponding to a memory card 1053, and an IC socket 1054S corresponding to a GAL (Generic Array Logic) 1054.

The memory card 1053 includes a nonvolatile memory such as CompactFlash (registered trade mark), and stores a game program. The game program includes a symbol determination program. The symbol determination program is a program for determining symbols to be rearranged in the display blocks 1028.

Further, the card slot 53S is configured so as to allow the memory card 1053 to be inserted thereinto or removed therefrom, and is connected to the mother board 1040 by an IDE bus. Therefore, the memory card 1053 can be removed from the card slot 53S, and then another game program is written into the memory card 1053, and the memory card 1053 can be inserted into the card slot 53S, to change the type and contents of the game played on the slot machine 1010. The game program includes a program according to progress of the game. Further, the game program includes image data and sound data to be outputted during the game. The image data includes image data indicative of the free-game-generated image 1200, the reaching effect image 1201, the free-game addition image 1202, and the like. Further, the game program includes: symbol-table data for a normal game, showing a symbol table for a normal game (cf. FIG. 34) which shows the correspondence relationship among each symbol in each symbol array of the display blocks, the code number and the random number value; odds data showing the correspondence relationship (cf. FIG. 36) among the kind and the number of the symbols rearranged on a pay line 1300 (cf. FIG. 35) and the amount of payout; determination table data of the number of the to-be-added special symbols which shows a table (cf. FIG. 47) for determining the number of the to-be-added special symbols; symbol-array determination table data showing a symbol-array determination table (cf. FIG. 49); and code-number determination-table data showing a code-number determination table (cf. FIG. 50), and the like.

The CPU 1051, the ROM 1055 and the boot ROM 1052 interconnected to one another by an internal bus are connected to the mother board 1040 through the PCI bus. The PCI bus not only conducts signal transmission between the mother board 1040 and the gaming board 1050, but also supplies power from the mother board 1040 to the gaming board 1050.

The motherboard 1040 is configured using a commercially available general-purpose mother board (a print wiring board on which fundamental components of a personal computer are mounted), and provided with the main CPU 1041, a ROM (Read Only Memory) 1042, and a RAM (Random Access Memory) 1043. The mother board 1040 corresponds to the controller in the present invention.

The ROM 1042 comprises a memory device such as a flash memory, and stores a program such as a BIOS (Basic Input/Output System) executed by the main CPU 1091 and permanent data. When the BIOS is executed by the main CPU 1091, processing for initializing a predetermined peripheral device is conducted, concurrently with start of processing for loading the game program stored in the memory card 1053 via the gaming board 1050. It is to be noted that, in the present invention, the ROM 1042 may or may not be data rewritable one.

The RAM 1043 stores data and a program such as a symbol-determination program, which are used at the time of operation of the main CPU 1091. Further, the RAM 1043 is capable of storing a game program.

Moreover, the RAM 1043 stores data of the number of credits, the numbers of coin-ins and coin-outs in one game, and the like. Further, the RAM 1043 stores symbol-table data for a feature game, showing a symbol table for a feature game (cf. FIGS. 51A and 51B) which shows the correspondence relationship among each symbol in each symbol array of the display blocks, the code number and the random number value, and the like.

Further, the RAM 1043 is provided with a number-of-free-games storage area, a number-of-all-games storage area, a total-amount-of-payout storage area, and a number-of-feature-symbols storage area.

The number-of-free-games storage area stores remaining-number data indicative of a remaining number T of the free games.

The number-of-all-games storage area stores number-of-all-games data indicative of the number C of all games. The number C of all games is the number of the normal games played after the shift of the mode to the insurance mode.

The total-amount-of-payout storage area stores total-amount-of-payout data indicative of the total amount of the payout in the second free game.

The number-of-feature-symbols storage area stores number-of-feature-symbols data indicative of the number of the feature symbols. The number of the features symbols is the total number of the feature symbols 1100 rearranged in the display blocks 1028 in the second free game.

Further, a storage area of an insurance flag is provided in the main RAM 1043. The insurance flag is a flag to be set triggered by the insurance BET button 1090 being pressed. The storage area of the insurance flag comprises, for example, a storage area of a predetermined number of bits, and the insurance flag is turned "ON" or "OFF" in accordance with a storage in the storage area. The state of "ON" of the insurance flag corresponds to the insurance mode. The state of "OFF" of the insurance flag corresponds to the non-insurance mode.

Moreover, the mother board 1040 is connected with a later-described body PCB (Printed Circuit Board) 1060 and a door PCB 1080 through respective USBs. Further, the mother board 1040 is connected with a power supply unit 45.

The body PCB 1060 and the door PCB 1080 are connected with equipment and a device that generate an input signal to be inputted into the main CPU 1091, and equipment and a device operations of which are controlled by a control signal outputted from the main CPU 1041. The main CPU 1041 executes the game program stored in the RAM 1093 based on the input signal inputted into the main CPU 1041, and thereby executes the predetermined arithmetic processing and stores the result thereof into the RAM 1043, or transmits a control signal to each equipment and device as processing for controlling each equipment and device.

The body PCB 1060 is connected with a lamp 1030, a hopper 1066, a coin detecting portion 1067, a graphic board 1068, the speaker 1029, the touch panel 1069, the bill validator 1022, the ticket printer 1035, the card reader 1036, a key switch 1038S, the data display 1037, and a random number generator 1064. The lamp 1030 is lighted in a predetermined pattern based on control signals outputted from the main CPU 1041.

The hopper 1066 is installed inside the cabinet 1011, and pays out a predetermined number of coins based on the control signal outputted from the main CPU 1041, from a coin payout exit 1019 to the coin tray 1018. The coin detecting portion 1067 is provided inside the coin payout exit 1019, and outputs an input signal to the main CPU 1041 in the case of detecting payout of the predetermined number of coins from the coin payout exit 1019.

The graphic board 1068 controls image display to the upper image display panel 1033 and the lower image display panel 1016 based on the control signal outputted from the main CPU 1041. In the respective display blocks 1028 on the lower image display panel 1016, symbols are displayed in a scrolling manner or in a stopped state. The number of credits stored in the RAM 1043 is displayed to the number-of-credits display portion 1400 of the lower image display panel 1016. Further, the number of betted coins is displayed to the number-of-BETs display portion 1401 of the lower image display panel 1016. Furthermore, the number of coin-outs is displayed to the payout display portion 402 of the lower image display panel 1016.

The graphic board 1068 comprises a VDP (Video Display Processor) for generating image data based on the control signal outputted from the main CPU 1041, a video RAM for temporarily storing image data generated by the VDP, and the like. It is to be noted that image data used in generation of the image data by the VDP is included in the game program read from the memory card 1053 and stored into the RAM 1043.

The bill validator 1022 not only discriminates a regular bill from a false bill, but also accepts the regular bill into the cabinet 1011. Upon acceptance of the regular bill, the bill validator 1022 outputs an input signal to the main CPU 1041 based on a face amount of the bill. The main CPU 1041 stores in the RAM 1043 the number of credits corresponding to the face amount of the bill transmitted with the input signal.

The ticket printer 1035 prints on a ticket a barcode as coded data of the number of credits stored in the RAM 1043, a date, and an identification number of the slot machine 1010, and the like, based on the control signal outputted from the main CPU 1041, and outputs the ticket as the ticket 1039 with a barcode. The card reader 1036 reads data from the smart card and transmits the read data to the main CPU 1041, and writes data onto the smart card based on the control signal from the main CPU 1041. The key switch 1038S is provided on the key pad 1038, and outputs a predetermined input signal to the main CPU 1041 when the key pad 1038 is operated by the player. The data display 1037 displays data read by the card reader 1036 and data inputted by the player via the key pad 1038, based on the control signal outputted from the main CPU 1041.

The random number generator 1064 generates a random number at a predetermined timing. It is to be noted that the range of the random number generated by the random number generator 1064 is from 0 to 65535.

The door PCB 1080 is connected with the control panel 1020, a reverter 1021S, a coin counter 1021C, and a cold cathode tube 1081. The control panel 1020 is provided with a start switch 1023S corresponding to the start button 1023, a change switch 1024S corresponding to the change button 1024, a CASHOUT switch 1025S corresponding to the CASHOUT button 1025, a 1-BET switch 1026S corresponding to the 1-BET button 1026, a maximum BET switch 1027S corresponding to the maximum BET button 1027, and an insurance BET switch 1090S corresponding to the insurance BET button 1090. Each of the switches 1023S to 1027S and 1090S outputs an input signal to the main CPU 1041 when each of the buttons 1023 to 1027 and 1090 corresponding thereto is operated by the player.

The coin counter 1021C is provided inside the coin receiving slot 1021, and discriminates a regular coin from a false coin inserted into the coin receiving slot 1021 by the player. Coins other than the regular coin are discharged from the coin payout exit 1019. Further, the coin counter 1021C outputs an input signal to the main CPU 1041 in detection of the regular coin.

The reverter 1021S operates based on the control signal outputted from the main CPU 1041, and distributes a coin recognized by the coin counter 1021C as the regular coin into a cash box (not shown) or the hopper 1066, which are disposed in the slot machine 1010. Namely, when the hopper 1066 is filled with coins, the regular coin is distributed into the cash box by the reverter 1021S. On the other hand, when the hopper 1066 is not filled with coins, the regular coin is distributed into the hopper 1066. The cold cathode tube 1081 functions as a back light installed on the rear face side of the lower image display panel 1016 and the upper image display panel 1033, and is lighted up based on the control signal outputted from the main CPU 1041.

Figure 33:
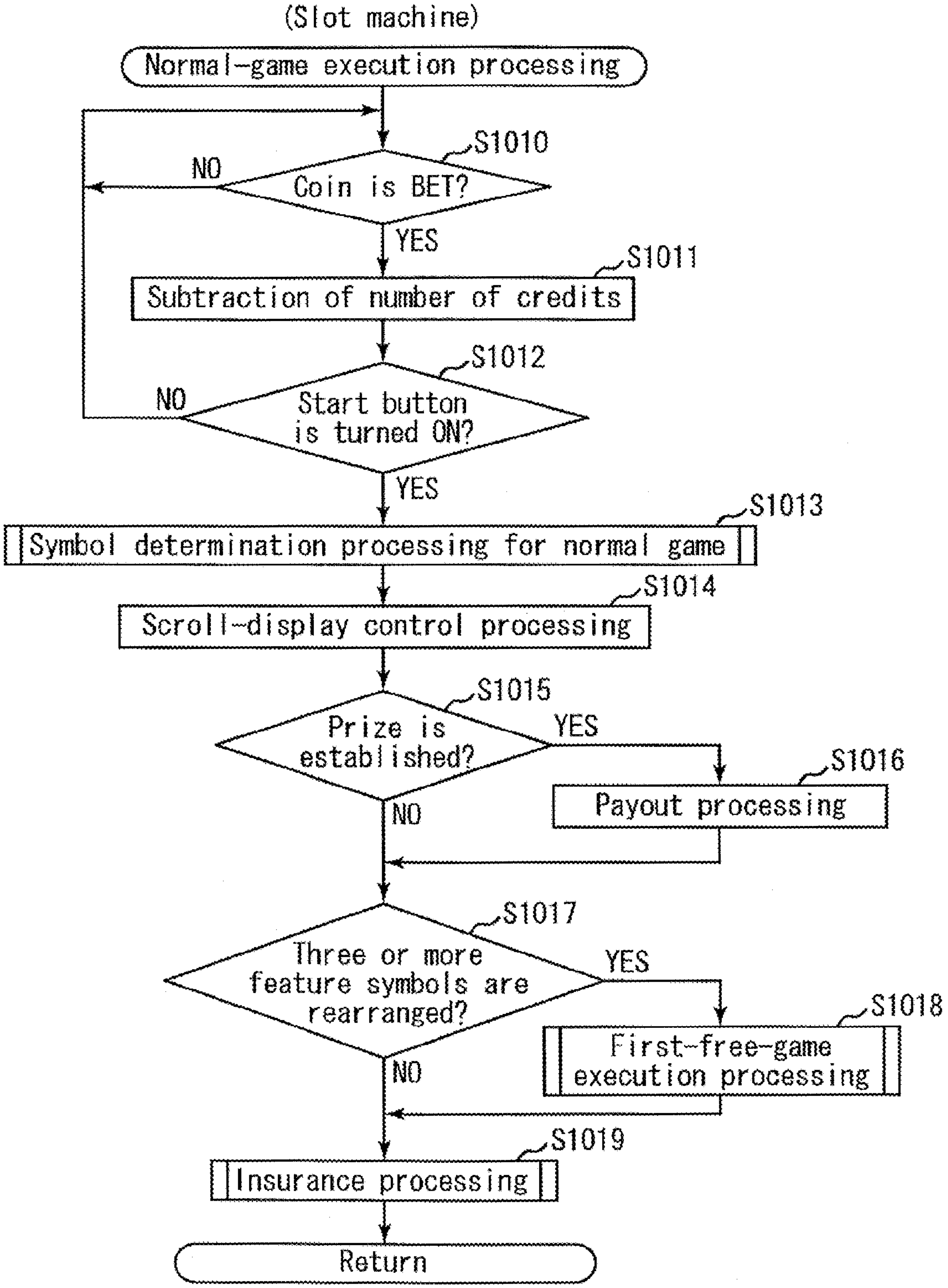
FIG. 33 is a flowchart showing normal-game execution processing.

FIG. 33 is a flowchart illustrating normal-game execution processing.

First, the main CPU 1041 determines whether or not a coin has been betted (step s1010). In this processing, the main CPU 1091 determines whether or not to have received an input signal that is outputted from the 1-BET switch 1026S when the 1-BET button 1026 is operated, or an input signal that is outputted from the maximum BET switch 1027S when the maximum BET button 1027 is operated. When the main CPU 1091 determines that the coin has not been betted, the processing is returned to step s1010.

On the other hand, when determining that the coin has been betted in step s1010, the main CPU 1041 conducts processing for making a subtraction from the number of credits stored in the RAM 1043 according to the number of betted coins (step s1011). It is to be noted that, when the number of coins to be betted is larger than the number of credits stored in the RAM 1043, the main CPU 1041 does not conduct the processing for making a subtraction from the number of credits stored in the RAM 1043, and the processing is returned to step s1010. Further, when the number of coins to be betted exceeds the upper limit of the number of coins that can be betted in one game (500 coins in the present embodiment), the main CPU 1041 does not conduct the processing for making a subtraction from the number of credits stored in the RAM 1043, and the processing is proceeded to step s1012.

Next, the main CPU 1091 determines whether or not the start button 1023 has been turned ON (step s1012). In this processing, the main CPU 1041 determines whether or not to have received an input signal that is outputted from the start switch 1023S when the start button 1023 is pressed.

When the main CPU 1041 determines that the start button 1023 has not been turned on, the processing is returned to step s1010.

It is to be noted that, when the start button 1023 is not turned ON (e.g. when the start button 1023 is not turned ON and a command to end the game is inputted), the main CPU 1041 cancels a subtraction result in step s1011.

On the other hand, when determining in step s1012 that the start button 1023 is turned ON, the main CPU 1041 executes the symbol determination processing for the normal game (step s1013).

FIG. 34 is the symbol table for the normal game which shows the correspondence relationship among each symbol in each symbol array of the display blocks, the code number and the random number value. It is to be noted that the first array corresponds to the leftmost column of the display blocks 1028.

In the symbol determination processing for the normal game, the main CPU 1041 executes the symbol determination program stored in the RAM 1043, to determine the code numbers at stopping the symbols. Specifically, random number values are acquired, and the code numbers at stopping the symbols in each symbol array of the display blocks 1028 are determined, based upon the acquired random number values and the symbol table for the normal game. The symbol determination program for the normal game is later described in detail using the drawing.

As shown in FIG. 34, 14 wild symbols (also referred to as special symbols) are present in the symbol table for the normal game.

Next, in step s1014, the main CPU 1041 performs scroll-display control processing. This processing is processing for controlling the display so as to rearrange the symbols determined in step s1013 after starting scroll of the symbols.

Next, the main CPU 1041 determines whether or not a prize has been established (step s1015). Here, establishment of the prize in the present embodiment is described.

Figure 35:
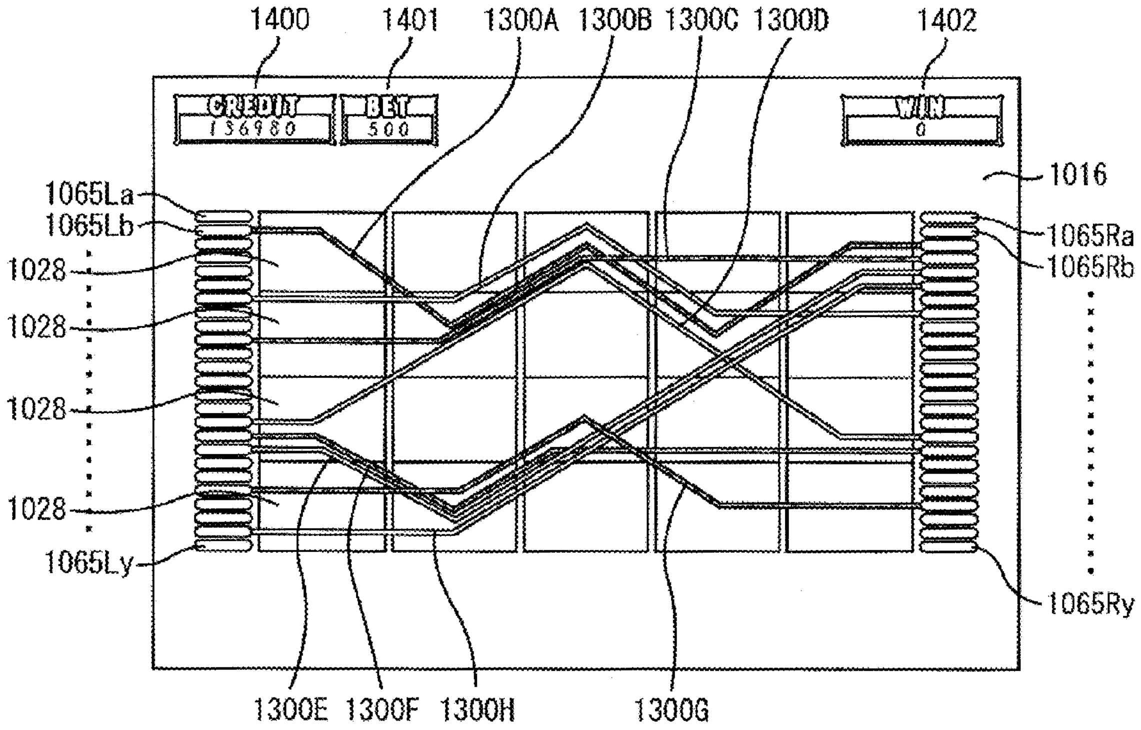
FIG. 35 is a view showing an exemplary image displayed to the lower image display panel provided in the slot machine according to one embodiment of the present invention.

FIG. 35 is a view showing an exemplary image displayed to the lower image display panel provided in the slot machine according to one embodiment of the present invention.

FIG. 36 is a view showing a correspondence relationship among the kind and the number of symbols rearranged on the pay line, and the amount of payout.

As shown in FIG. 37, on the left side of the display blocks 1028, 25 pay-line generating portions 1065L (1065La, 1065Lb, 1065Lc, 1065Ld, 1065Le, 1065Lf, 1065Lg, 1065Lh, 1065Li, 1065Lj, 1065Lk, 1065Ll, 1065Lm, 1065Ln, 1065Lo, 1065Lp, 1065Lq, 1065Lr, 1065Ls, 1065Lt, 1065Lu, 1065Lv, 1065Lw, 1065Lx, 1065Ly) are displayed.

Similarly, on the right side of the display blocks 1028, 25 pay-line generating portions 1065R (1065Ra, 1065Rb, 1065Rc, 1065Rd, 1065Re, 1065Rf, 1065Rg, 1065Rh, 1065Ri, 1065Rj, 1065Rk, 1065Rl, 1065Rm, 1065Rn, 1065Ro, 1065Rp, 1065Rq, 1065Rr, 1065Rs, 1065Rt, 1065Ru, 1065Rv, 1065Rw, 1065Rx, 1065Ry) are displayed.

Each of the pay-line generating portions 1065L forms a pair with any one of the pay-line generating portions 1065R. The pay line 1300 is previously defined as a line from each pay-line generating portion 1065L to the pay-line generating portion 1065R which is paired with that pay-line generating portion 1065L. The pay line 1300A connects the pay-line generating portion 1065Lb and the pay-line generating portion 1065Rc. The pay line 13008 connects the pay-line generating portion 1065Lg and the pay-line generating portion 1065Rh. The pay line 1300C connects the pay-line generating portion 1065Lj and the pay-line generating portion 1065Rd. The pay line 1300D connects the pay-line generating portion 1065Lp and the pay-line generating portion 1065Rq. The pay line 1300E connects the pay-line generating portion 1065Lr and the pay-line generating portion 1065Re. The pay line 1300F connects the pay-line generating portion 1065Lq and the pay-line generating portion 1065Rr. The pay line 1300G connects the pay-line generating portion 1065Lu and the pay-line generating portion 1065Rv. The pay line 1300H connects the pay-line generating portion 1065Lx and the pay-line generating portion 1065Rf.

It is to be noted that only eight pay lines 1300 are drawn in FIG. 35 for the sake of facilitating the explanation. However, in the present embodiment, 25 pay lines 1300 are defined.

Establishment of the prize in the present embodiment refers to a case where at least one combination of two or more symbols of the same type out of "10", "J", "Q", "K", "FLOWER 1", "FLOWER 2", "BIRD" and "FISH" are rearranged on one of the pay lines 1300. It is to be noted that "WILD" as the wild symbol is a symbol which can be substituted for another symbol. Namely, in a case where one symbol of "10" and one symbol of "WILD" are displayed on the pay line, it is regarded as a display of two symbols of "10" on the pay line, and determined as winning of the prize.

In the processing of step s1015, the main CPU 1041 counts the number of symbols of each kind rearranged in step s1014 on each pay line 1300. The main CPU 1041 then determines whether or not the number of counted symbols is equal to or more than two.

When determining that the prize has been established, the main CPU 1041 executes processing relating to the payout of coins (step s1016). In the processing, the main CPU 1041 determines the amount of payout based on the numbers of symbols rearranged on the pay line 1300 with reference to the odds data stored in the RAM 1043. The odds data is data indicative of the correspondence relationship between the number of symbols rearranged on the pay line 1300 and the amount of payout (see FIG. 36). It is to be noted that an amount of payout is doubled along with each "WILD" displayed on the pay line 1300 where the prize has been established. Namely, when three symbols of "WILD" are displayed on the pay line 1300 where the prize has been established, an amount of payout is octuplicated.

In the present embodiment, the case is described where the prize is determined to be established when at least one combination of two or more symbols of the same type of "10", "J", "Q", "K", "FLOWER 1", "FLOWER 2", "BIRD" and "FISH" are rearranged on the pay line 1300. However, in the present invention, the pay line is not necessarily provided, and a prize may be determined to be established when at least one combination of two or more symbols of the same type out of "10", "J", "Q", "K", "FLOWER 1", "FLOWER 2", "BIRD" and "FISH" are rearranged among symbols rearranged in the display blocks 1028.

Figure 37A:
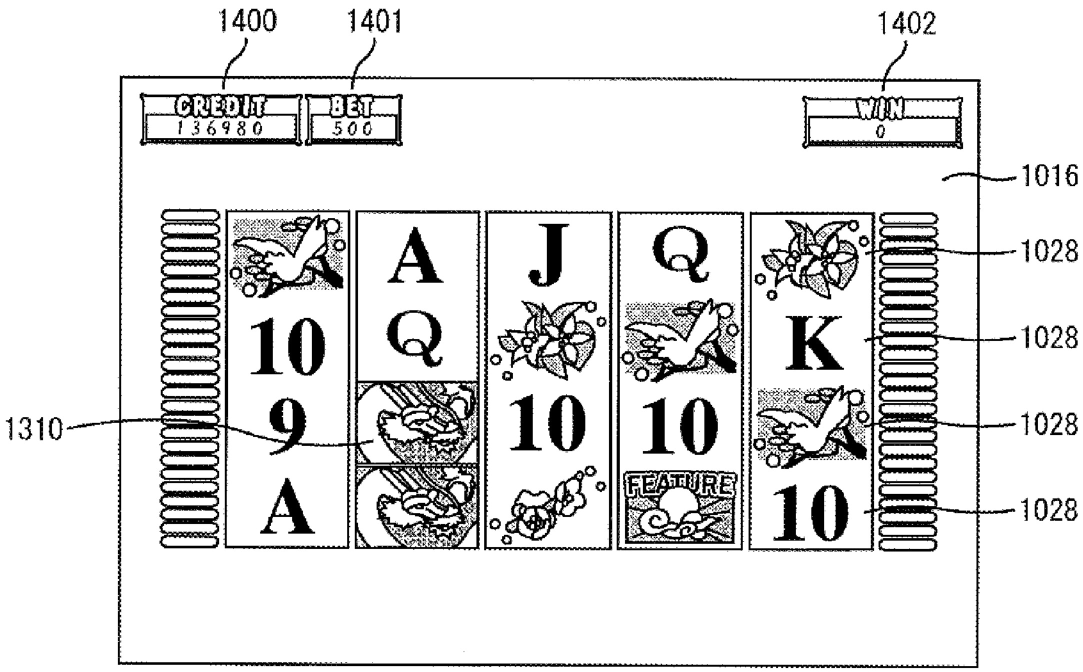
FIG. 37A is a view showing an exemplary image displayed to the lower image display panel provided in the slot machine according to one embodiment of the present invention.

FIG. 37A is a view showing an exemplary image displayed to the lower image display panel provided in the slot machine according to one embodiment of the present invention.

Figure 37B:
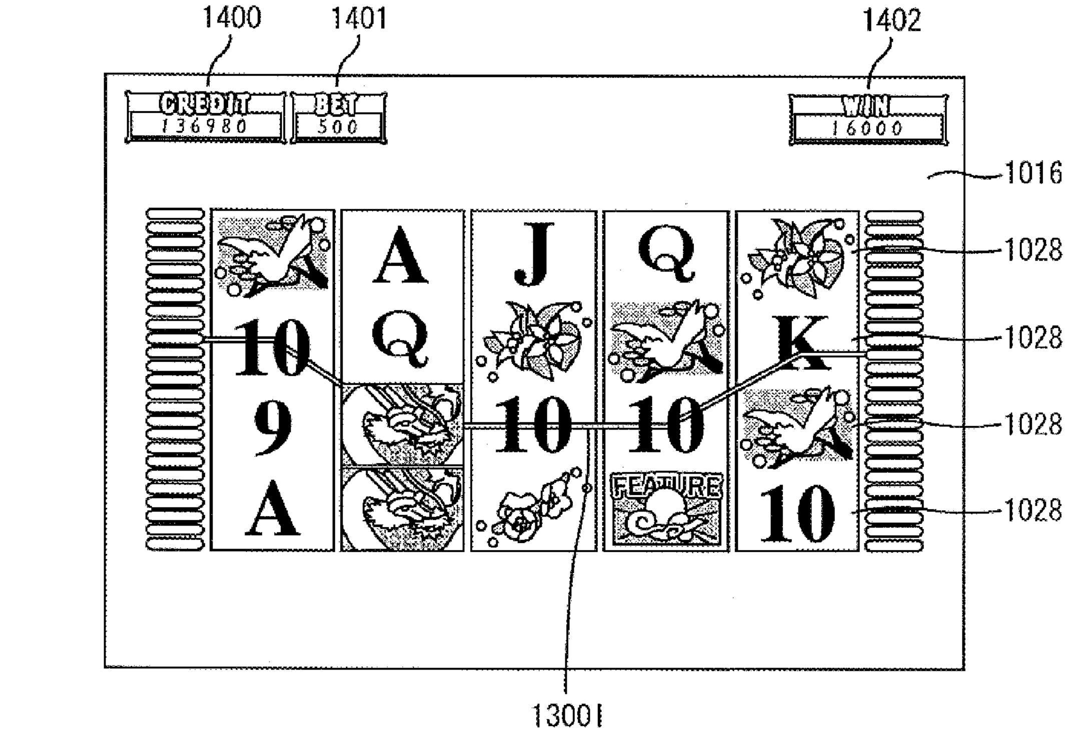
FIG. 37B is a view showing an exemplary image displayed to the lower image display panel provided in the slot machine according to one embodiment of the present invention.

FIG. 37B is a view showing an exemplary image displayed to the lower image display panel provided in the slot machine according to one embodiment of the present invention.

As a result of the scroll-display control processing in step s1014, when the symbols shown in FIG. 37A are rearranged, the pay line 1300I is displayed as shown in FIG. 37B. On the pay line 1300I, three symbols of "10", one symbol of "WILD", and one symbol of "K" are rearranged.

In this case, it is regarded that four symbols of "10" are rearranged and 3000 coins, obtained by multiplying 500 as the number of betted coins by 6, is determined as an amount of payout. Further, it is regarded that two symbols of "K" are rearranged and 5000 coins, obtained by multiplying 500 as the number of betted coins by 10, is determined as the amount of payout. Moreover, since one symbol of "WILD" is displayed on the pay line 1300I where the prize has been established, the amount of payout is doubled. Namely, 16000 coins, obtained by adding 5000 to 3000 to make 8000 and then multiplying 8000 by 2, are determined as the amount of payout.

In the case of accumulating coins, the main CPU 1041 conducts processing for adding the number of credits corresponding to the determined amount of payout to the number of credits stored in the RAM 1043. On the other hand, in the case of paying out coins, the main CPU 1041 transmits a control signal to the hopper 1066 in order to pay out coins in an amount corresponding to the determined amount of payout.

When determining in step s1015 that a prize has not been established, or after executing the processing of step s1016, the main CPU 1041 determines whether or not three or more feature symbols 1100 (cf. FIG. 30A) have been rearranged (step s1017). In this processing, the main CPU 1041 determines whether or not three or more feature symbols 1100 have been rearranged in the display blocks 1028, without considering the pay line 1300.

When determining in step s1017 that three or more feature symbols 1100 have been rearranged, the main CPU 1041 executes the first-free-game execution processing (step s1047). In the first-free-game execution processing, a free game is executed. The first-free-game execution processing is later described in detail using the drawing.

When determining in step s1017 that three or more feature symbols 1100 are not rearranged or after executing the processing of step s1018, the main CPU 1041 executes insurance processing (step s1019). The insurance processing is later described in detail using the drawing.

After executing the processing of step s1019, the main CPU 1041 completes the present subroutine.

Figure 38:
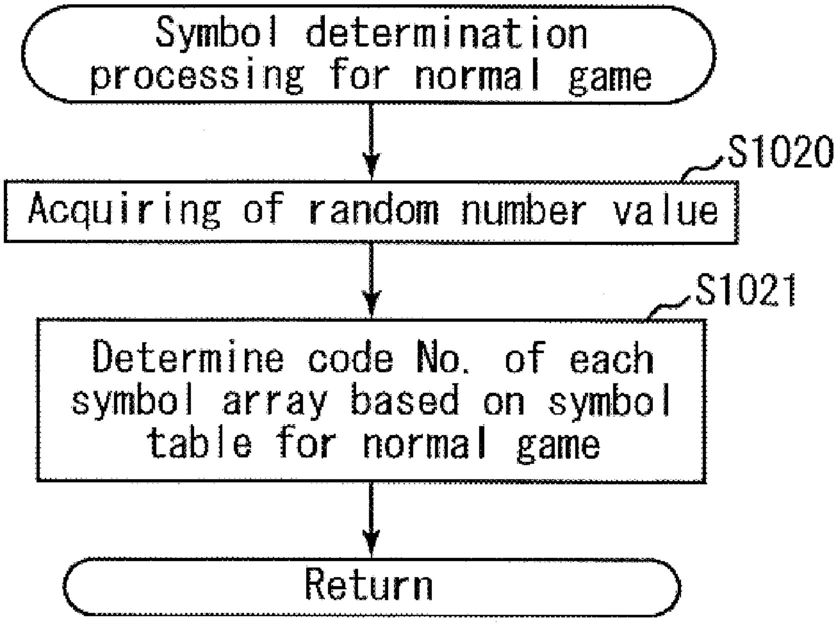
FIG. 38 is a flowchart showing a subroutine of symbol determination processing for a normal game.

FIG. 38 is a flowchart showing a subroutine of symbol determination processing for a normal game.

This processing is processing performed by the main CPU 1041 executing the symbol determination program stored in the RAM 1043.

First, the main CPU 1041 acquires random number values from the random number generator 1064 (step s1020). In this processing, the main CPU 1041 acquires five random number values corresponding to the respective symbol arrays of the display blocks 1028.

Next, based upon the acquired five random number values and the symbol table for the normal game, the main CPU 1041 determines a code number of each symbol array of the display blocks 1028 at stopping the symbols (step s1021). For example, in a case where the random number value for the first array is "23035", "07" is determined as the code number of the first array. It should be noted that a code number of a symbol array corresponds to the code numbers of symbols to be rearranged to the display blocks 1028 in the first row out of the display blocks 1028 that are put in four rows.

After executing the processing of step s1021, the main CPU 1041 completes the present subroutine.

In the present embodiment, the case has been described where the random number generator 1064 is provided and a random number is extracted from the random number generator (a case of using a so-called hardware random number). However, in the present invention, a random number may be generated on the program (a case of using a so-called software random number).

Next, the first-free-game execution processing is described with reference to FIG. 39.

Figure 39:
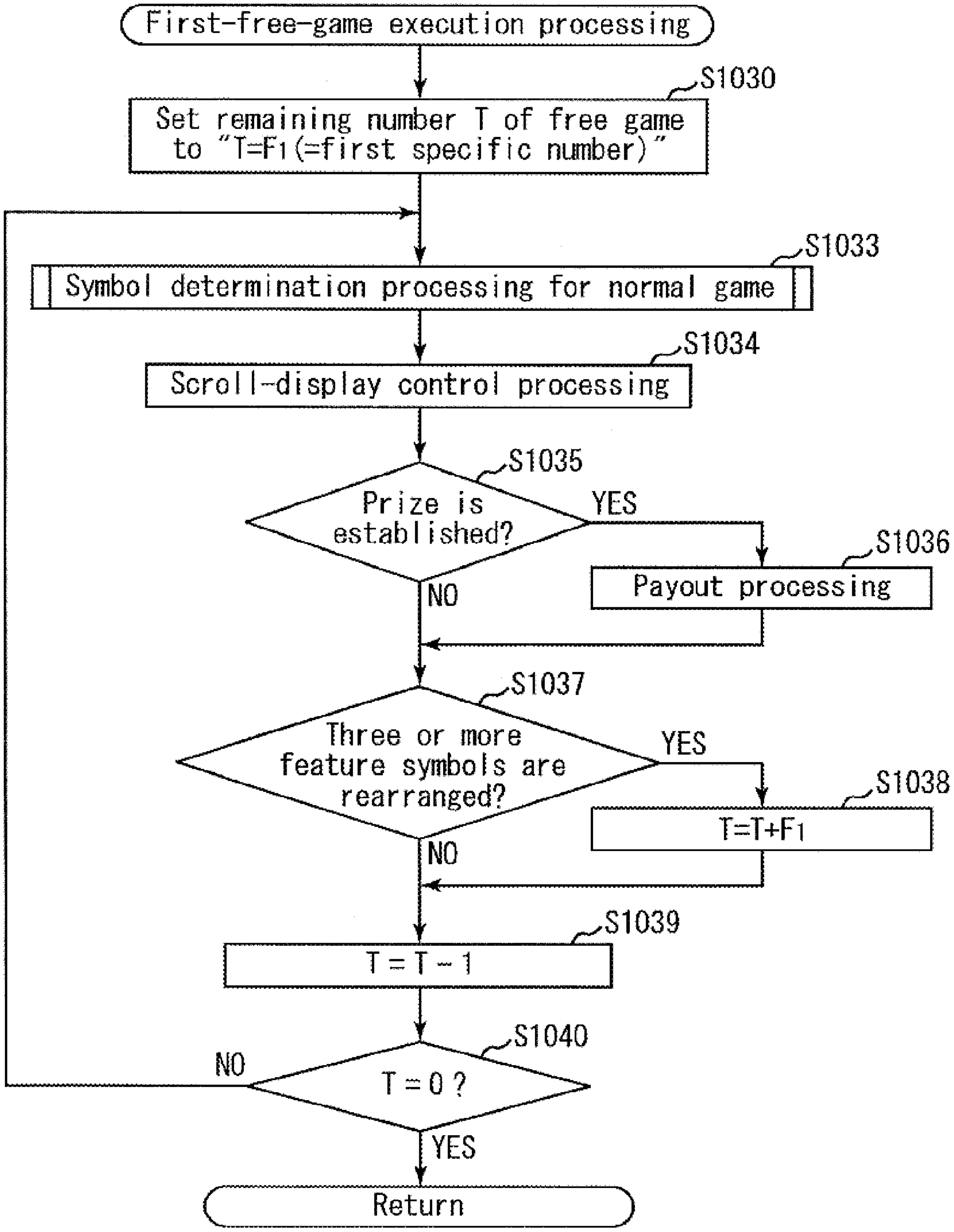
FIG. 39 is a flowchart showing a subroutine of first-free-game execution processing.

FIG. 39 is a flowchart showing a subroutine of first-free-game execution processing.

It should be noted that, in the first free game, the player can play the game without betting coins.

First, the main CPU 1041 sets the remaining number T of the free game to "T=$F_1$ (=the first specific number=20)" in the number-of-free-games storage area in RAM 1043 (step s1030).

Further, the main CPU 1041 displays the free-game-generated image 1200 (cf. FIG. 30B) to the lower image display panel 1016.

Next, the main CPU 1091 executes the symbol determination processing for the normal game (step s1033).

In the symbol determination processing for the normal game, the main CPU 1041 executes the symbol determination program stored in the RAM 1043, to determine code numbers at stopping the symbols. Specifically, the main CPU 1041 acquires random number values, and determines the code numbers of respective symbol arrays at the time of stopping the symbols based upon the acquired random number values and the symbol table for the normal game (cf. FIG. 34).

Next, in step s1034, the main CPU 1041 performs the scroll-display control processing. This processing is processing for controlling the display so as to rearrange the symbols determined in step s1033 after starting the scrolling of the symbols.

Next, the main CPU 1041 determines whether or not a prize has been established (step s1035).

As described above, establishment of the prize in the present embodiment refers to a case where at least one combination of two or more symbols of the same type out of "10", "J", "Q", "K", "FLOWER 1", "FLOWER 2", "BIRD" and "FISH" are rearranged on the pay line 1300. It is to be noted that "WILD" as the wild symbol is a symbol which can be substituted for another symbol.

In the processing of step s1035, the main CPU 1041 counts the number of symbols of each kind rearranged in step s1034 on each pay line 1300. The main CPU 1041 then determines whether or not the counted number is equal to or more than two.

When determining that the prize has been established, the main CPU 1041 executes processing relating to the payout of coins (step s1036). Since this processing is the same as the processing of step s1016, the description thereof is omitted here.

When determining that the prize has not been established in the processing of step s1035, or after executing the processing of step s1036, the main CPU 1041 determines whether or not three or more feature symbols 1100 (cf. FIG. 30A) are rearranged (step s1037). In the processing, the main CPU 1041 determines whether or not three or more feature symbols 1100 are rearranged in the display blocks 1028, without taking the pay line 1300 into consideration.

When determining in step s1037 that three or more feature symbols 1100 are rearranged, the main CPU 1041 sets the remaining number T of the free game to "T=T+$F_1$" ($F_1$=first specific number=20) in the number-of-free-games storage area in the RAM 1043 (step s1038).

When determining in step s1037 that three or more feature symbols 1100 are not rearranged, or after executing the processing of step s1038, the main CPU 1041 sets the remaining number T of the free games to "T=T−1" in the number-of-free-games storage area in the RAM 1043 (step s1039).

Next, the main CPU 1041 determines whether or not T is "T=0" based on the remaining-number data stored in the number-of-free-games storage area in the RAM 1043 (step s1040). When determining that T is not "T=0", the main CPU 1041 returns the processing to step s1033. On the other hand, when determining that T is "T=0", the main CPU 1041 completes the present subroutine.

Subsequently, the insurance processing conducted in step s1019 in FIG. 33 is described, by using FIGS. 40 to 43.

Figure 40:
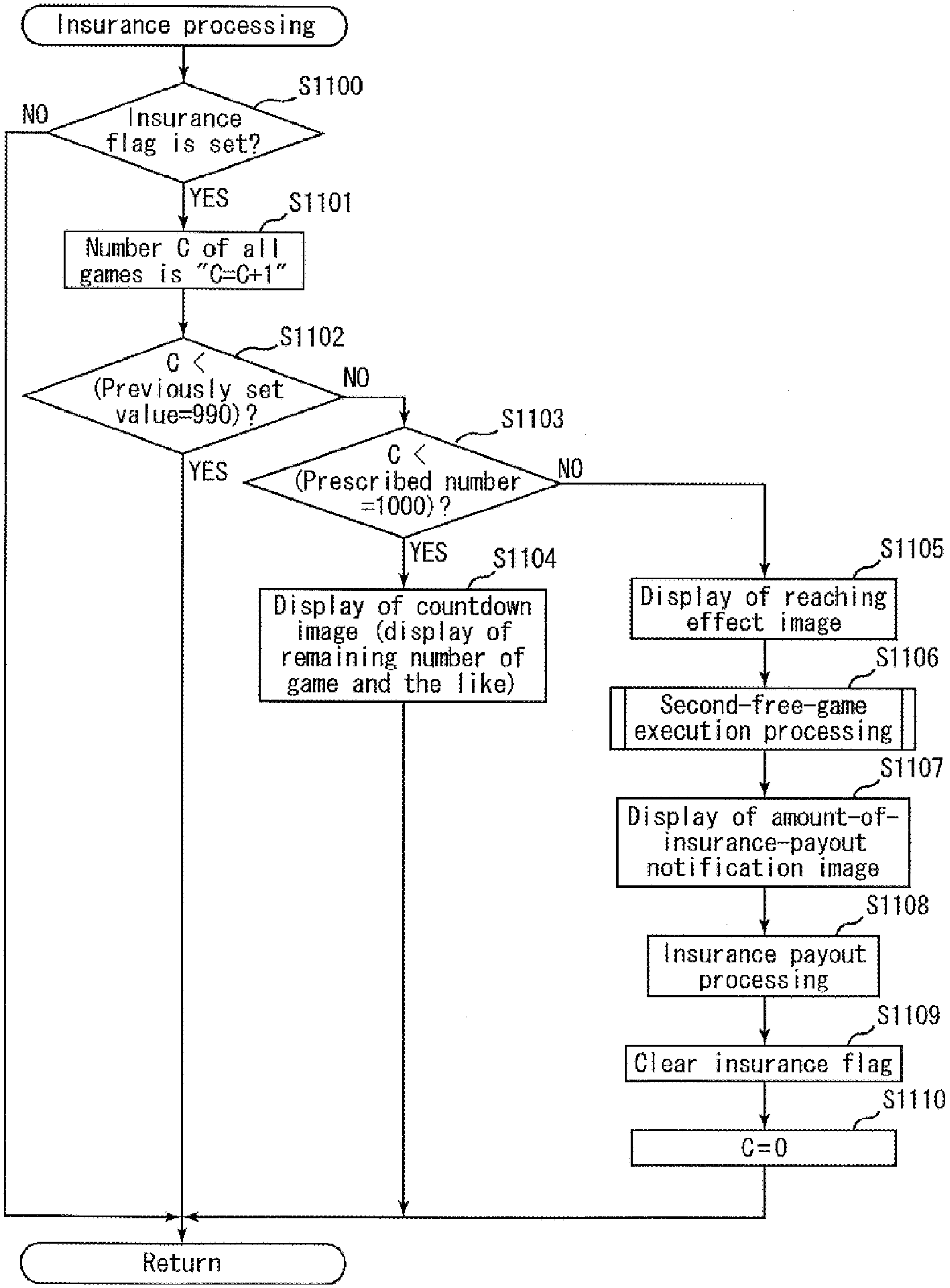
FIG. 40 is a flowchart showing insurance processing.

FIG. 40 is a flowchart showing a subroutine of the insurance processing.

First, the main CPU 1041 determines whether or not the insurance flag is set (step s1100). The insurance flag is a flag to be set triggered by the insurance BET button 1090 being pressed (cf. step s1122 in FIG. 41).

Figure 41:
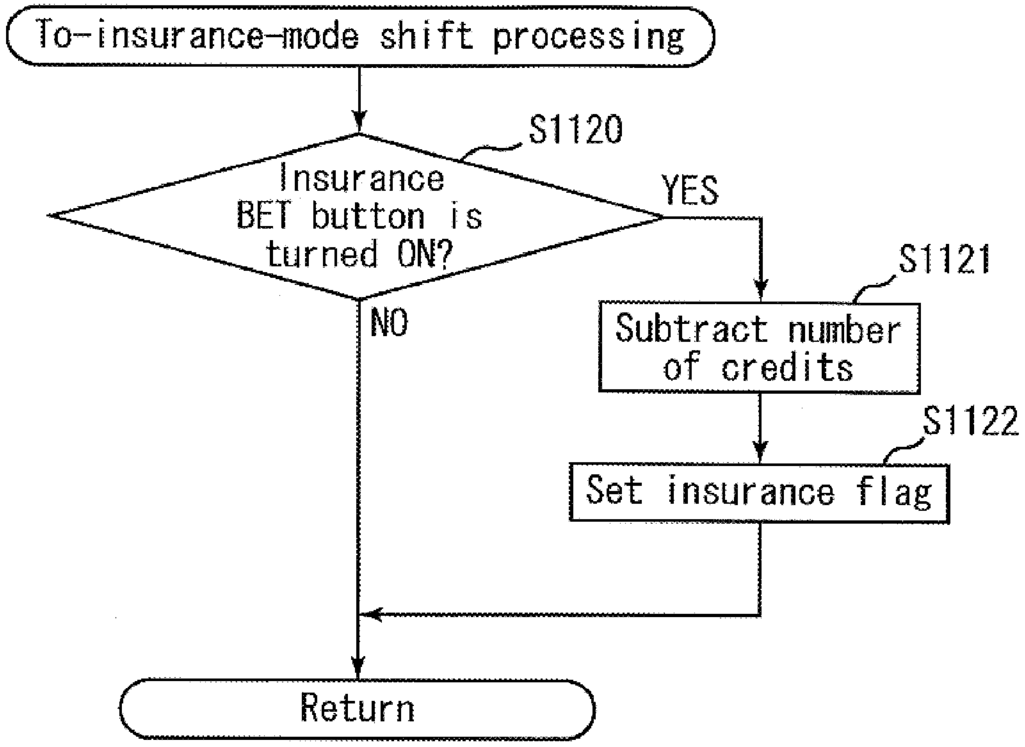
FIG. 41 is a flowchart showing to-insurance-mode shift processing.

Here, the insurance flag is described by using FIG. 41.

FIG. 41 is a flowchart showing a subroutine of to-insurance-mode shift processing.

First, the main CPU 1041 determines whether or not the insurance BET button 1090 is turned ON at a predetermined timing (step s1120). In this processing, the main CPU 1041 determines whether or not to have received an input signal outputted from the insurance BET switch 1090S when the insurance BET button 1090 is pressed.

When determining that the insurance BET button 1090 is not turned ON, the main CPU 1041 completes the present subroutine.

On the other hand, when determining the insurance BET button 1090 is turned ON, the main CPU 1041 subtracts a predetermined amount (10 dollars in the present embodiment) from the amount of credits stored in the RAM 1043 (step s1121).

Then, the main CPU 1041 sets the insurance flag (step s1122) and completes the present subroutine.

It is to be noted that when the predetermined amount is larger than the amount of credits stored in the RAM 1043, the main CPU 1091 completes the present subroutine without conducting the processing of step s1121 and step s1122.

As above, the insurance flag has been described by using FIG. 41.

The description is returned to FIG. 50.

When determining in step s1100 that the insurance flag is not set, the main CPU 1041 completes the present subroutine.

On the other hand, when determining in step s1100 that the insurance flag is set, the main CPU 1041 sets the number C of all games to "C=C+1" in the number-of-all-games storage area in the RAM 1043 (step s1101).

Next, the main CPU 1041 determines whether or not the number C of all games is smaller than a previously set value (990) based on the number-of-all-games data stored in the number-of-all-games storage area in the RAM 1043 (step s1203).

When determining that the number C of all games is smaller than the previously set value (990), the main CPU 1041 completes the present subroutine.

On the other hand, when determining that the number C of all games is equal to or more than the previously set value (990), the main CPU 1041 determines whether or not the number C of all games is smaller than the prescribed number (1000) (step s1103).

When determining that the number C of all games is smaller than the prescribed number (1000), the main CPU 1041 displays the countdown image 1500 to the lower image display panel 1016.

As described by using FIG. 30C, the countdown image 1500 is an image showing the number of the games until the number of the counted normal games reaches the prescribed number (1000).

By using FIGS. 42A to 92C, a state is shown, where the number of the games is decreased until the number of the counted normal games reaches the prescribed number (1000).

Figure 42A:
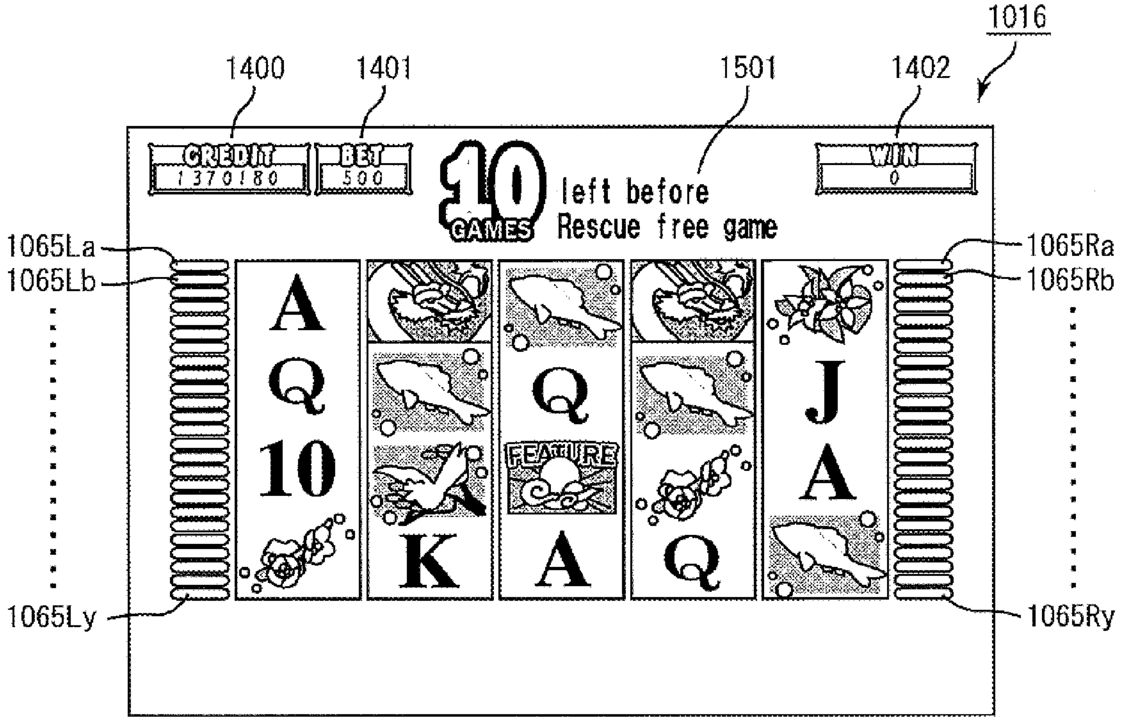
FIG. 42A is a view showing an exemplary image displayed to the lower image display panel provided in the slot machine according to one embodiment of the present invention.
Figure 42B:
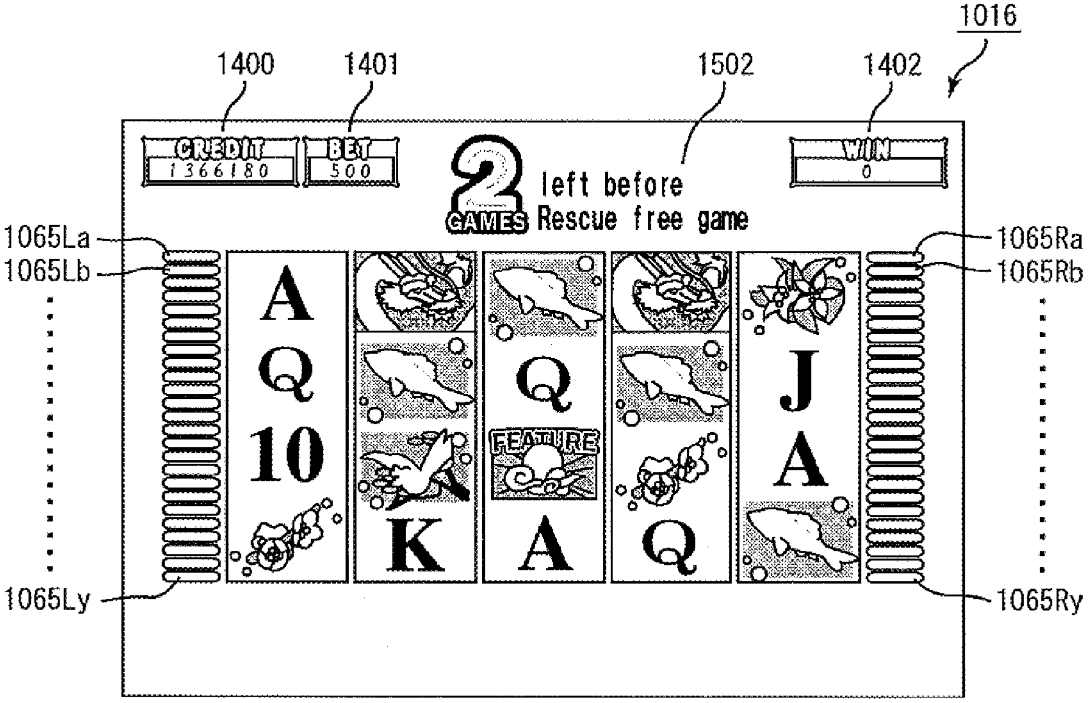
FIG. 42B is a view showing an exemplary image displayed to the lower image display panel provided in the slot machine according to one embodiment of the present invention.
Figure 42C:
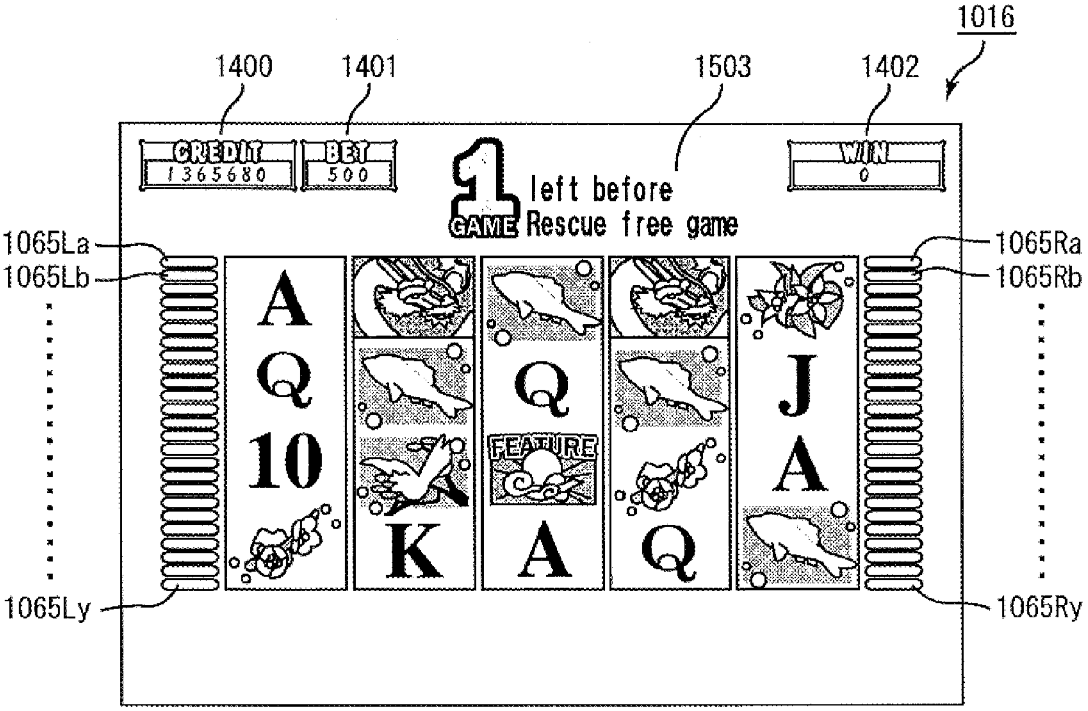
FIG. 42C is a view showing an exemplary image displayed to the lower image display panel provided in the slot machine according to one embodiment of the present invention.

FIGS. 42A to 42C are views each showing an exemplary image displayed to the lower image display panel.

In FIG. 42A, a state is shown, where 10 games are left until the number of the counted normal games reaches the prescribed number (1000). In FIG. 42B, a state is shown, where 2 games are left until the number of the counted normal games reaches the prescribed number (1000). In FIG. 42C, a state is shown, where 1 game is left until the number of the counted normal games reaches the prescribed number (1000).

After executing the processing of step s1104, the main CPU 1041 completes the present subroutine.

When determining in step s1103 that the number C of all games is the prescribed number (1000), the main CPU 1041 displays the reaching effect image 1201 (cf. FIG. 30D) to the lower image display panel 1016.

Next, the main CPU 1041 executes second-free-game execution processing (step s1106). In the second-free-game execution processing, the free game is executed. In the free game executed by the second-free-game execution processing, the prize is more likely to be established compared to in the normal game, as the number of the wild symbols is increased compared to the number in the normal game. In the second-free-game execution processing, when determining that the prize has been established, the main CPU 1041 determines the amount of payout. Then, the main CPU 1041 adds the determined amount of payout to the in-second-free-game total amount of payout shown by total-amount-of-payout data stored in the total-amount-of-payout storage area in the RAM 1043.

The second-free-game execution processing is later described in detail using the drawing.

Subsequently, the main CPU 1041 displays an amount-of-insurance-payout notification image (cf. FIG. 51) to the lower image display panel 1016 (step s1107).

Figure 43:
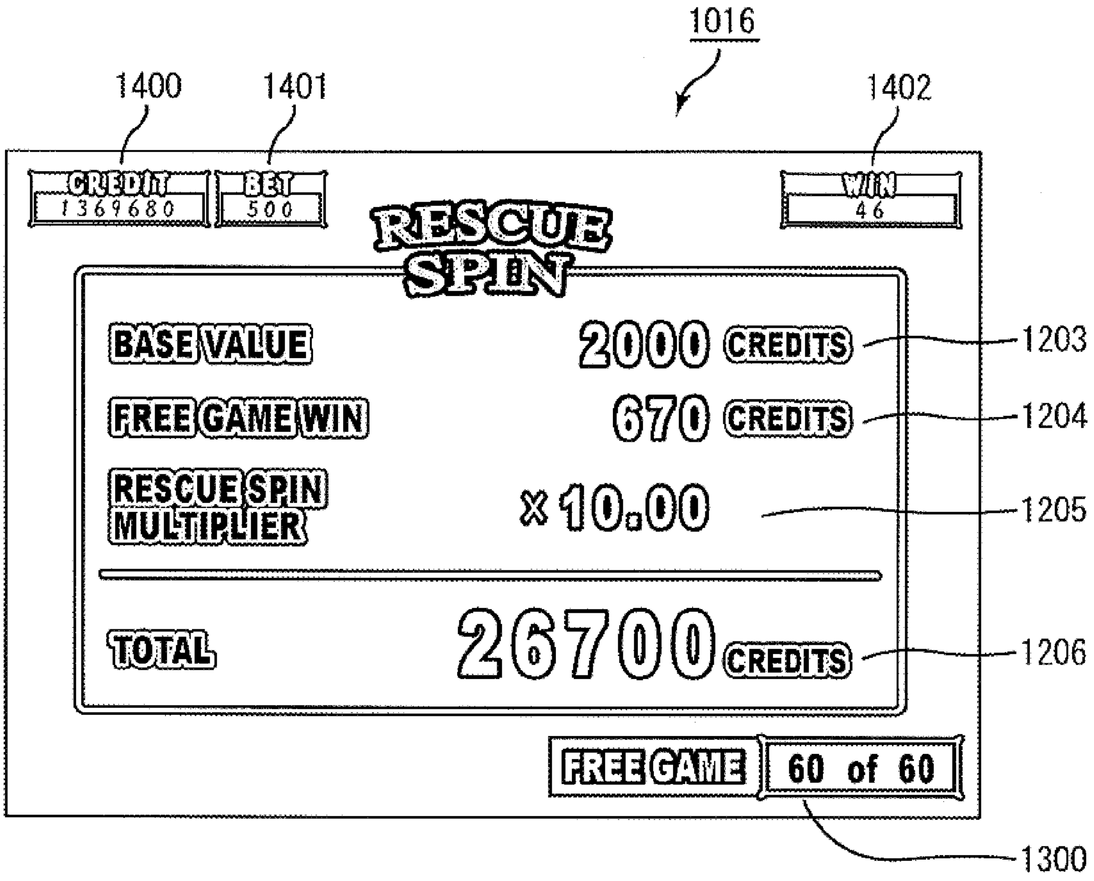
FIG. 43 is an exemplary image displayed to the lower image display panel provided in the slot machine according to one embodiment of the present invention.

Here, the amount-of-insurance-payout notification image is described by using FIG. 43.

FIG. 43 is a view showing an exemplary image displayed to the lower image display panel.

The amount-of-insurance-payout notification image includes a fixed-amount-of-payout image 1203, an in-second-free-game total-amount-of-payout image 1204, a rescue-multiplier image 1205, and an amount-of-insurance-payout image 1206.

The fixed-amount-of-payout image 1203 indicates a prescribed number (2000). This number is also referred to as "BASE VALUE".

The in-second-free-game total-amount-of-payout image 1204 indicates the number of coins corresponding to the in-second-free-game total amount of payout. This number is also referred to as "FREE GAME WIN".

The rescue-multiplier image 1205 indicates a total sum of the feature symbols 1100 (number of the feature symbols) rearranged during the second free games. This number is also referred to as "RESCUE MULTIPLIER".

The amount-of-insurance-payout image 1206 indicates the total of the number of the coins to be paid out (amount of insurance payout) triggered by the number of the counted normal games having reached the prescribed number (1000).

In the present embodiment, the amount of insurance payout is the number of the coins obtained by multiplying the total value of "BASE VALUE" and "FREE GAME WIN" by "RESCUE MULTIPLIER".

In the example shown in FIG. 43, "BASE VALUE" is 2000, "FREE GAME WIN" is 670, and "RESCUE MULTIPLIER" is 10. Accordingly, the amount of insurance payout is 26700 (=(2000+670)×10).

As above, the amount-of-insurance-payout notification image displayed in step s1107 in FIG. 40 has been described by using FIG. 43. In step s1107, the main CPU 1041 calculates the amount of insurance payout, based on the total-amount-of-payout data stored in the total-amount-of-payout storage area in the RAM 1043 and the number-of-feature-symbols data stored in the number-of-feature-symbols storage area in the RAM 1043. Then, the main CPU 1041 displays the image indicative of the calculated amount of insurance payout as the amount-of-insurance-payout image 1206, to the lower image display panel 1016.

After executing the processing of step s1107, the main CPU 1041 executes the processing relating to the payout of coins in number corresponding to the calculated amount of insurance payout (step s1108).

In the case of accumulating the coins, the main CPU 1041 executes the processing of adding the number of credits corresponding to the determined amount of payout. On the other hand, in the case of conducting the payout of coins, the main CPU 1041 transmits a control signal to the hopper 1066 and conducts the payout of coins corresponding to the determined amount of payout.

Next, the main CPU 1041 clears the insurance flag (step s1109).

Then, the main CPU 1041 sets the number C of all games to "C=0" in the number-of-all-games storage area in the RAM 1043 (step s1110).

Figure 44:
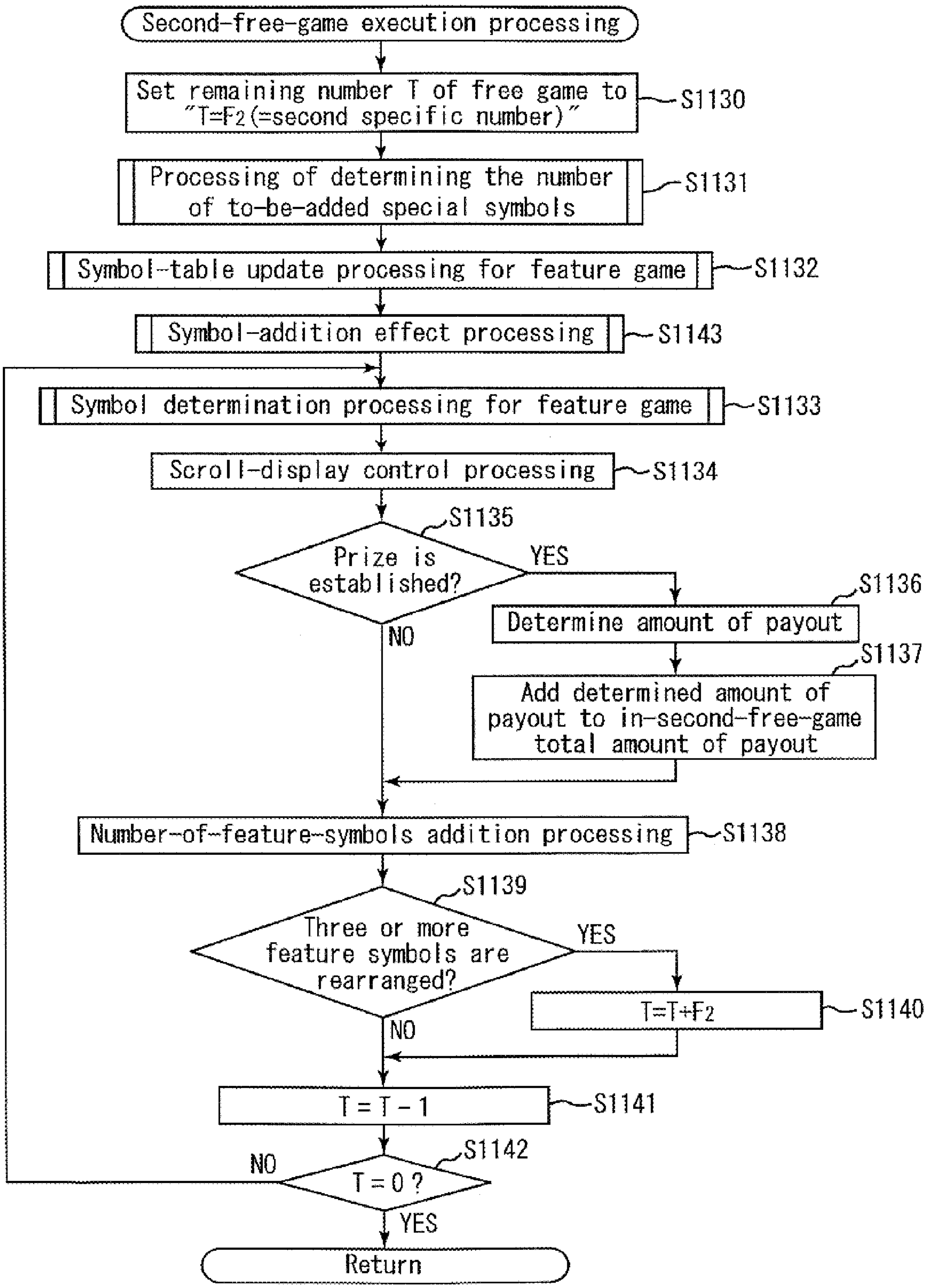
FIG. 44 is a flowchart showing a subroutine of second-free-game execution processing.

Next, the second-free-game execution processing is described by using FIG. 44.

FIG. 44 is a flowchart showing a subroutine of second-free-game execution processing.

First, the main CPU 1041 sets the remaining number T of the free game to "T=$F_2$ (=the second specific number=the third specific number=30)" in the number-of-free-games storage area in the RAM 1043 (step s1130).

Next, the main CPU 1041 executes processing of determining the number of the to-be-added special symbols (step s1131). In the processing of determining the number of the to-be-added special symbols, the main CPU 1041 determines the number of the to-be-added wild symbols based upon the selection image 1302 (cf. FIG. 45A) selected by the player. The processing of determining the number of the to-be-added special symbols is later described in detail by using the drawing.

Next, the main CPU 1041 executes the symbol-table update processing for the feature game (step s1132). In the symbol-table update processing for the feature game, the main CPU 1041 updates the symbol table for the feature game, based upon the number of the to-be-added wild symbols, which has been determined by the processing of determining the number of the to-be-added special symbols. The symbol-table update processing for the feature game is later described in detail using the drawing.

Next, in step s1143, the main CPU 1041 executes symbol-addition effect processing. The symbol-addition effect processing is described later using the drawing.

Next, the main CPU 1091 executes the symbol determination processing for the feature game (step s1133).

FIGS. 51A and 51B are examples of a symbol table for the feature game, each showing the correspondence relationship among each symbol in each symbol array of the display block, the code number and the random number value.

The symbol table for the feature game shown in each of FIGS. 51A and 51B is stored into the RAM 1043 by later-described symbol-table update processing for the feature game.

In the symbol determination processing for the feature game, the main CPU 1041 executes the symbol determination program stored in the RAM 1043, to determine code numbers at stopping the symbols. Specifically, the main CPU 1041 acquires random number values, and determines the code numbers of respective symbol arrays at the time of stopping the symbols based upon the acquired random number values and the symbol table for the feature game. The symbol determination processing for the feature game is later described in detail using the drawing.

Subsequently, the main CPU 1041 executes the processing of step s1134 to S1135. Since these processing are the same as the processing of step s1034 to S1035 in FIG. 39, the description thereof is omitted here.

When determining in step s1135 that the prize has been established, the main CPU 1041 determines an amount of payout (step s1136). This processing is as described in step s1016 in FIG. 33. However, in this processing, the main CPU 1041 only determines the amount of payout, and the main CPU 1041 neither add the number of credits corresponding to the determined amount of payout nor conduct payout of coins in an amount corresponding to the determined amount of payout.

Next, the main CPU 1041 adds the amount of payout determined in step s1136 to an in-second-free-game total amount of payout shown by total-amount-of-payout data stored in the total-amount-of-payout storage area in the RAM 1043 (step s1137).

When determining in step s1135 that the prize has not been established, or after executing the processing of step s1137, the main CPU 1041 executes number-of-feature-symbols addition processing (step s1138). In this processing, the main CPU 1041 adds the number of the feature symbols 1100 rearranged in the display blocks 1028 in this game to the number of the feature symbols indicated by the number-of-feature-symbols data stored in the number-of-feature-symbols storage area of the RAM 1043.

Next, the main CPU 1041 determines whether or not three or more feature symbols 1100 are rearranged (step s1139). In this processing, the main CPU 1041 determines whether or not three or more feature symbols 1100 are rearranged in the display blocks 1028, without taking the pay line 1300 into consideration.

When determining in step s1139 that three or more feature symbols are rearranged, the main CPU 1041 sets the remaining number T of the free games to "T=T+$F_2$" ($F_2$=second specific number=third specific number=30) in the number-of-free-games storage area of the RAM 1043 (step s1140).

Further, the main CPU 1041 displays the free-game addition image 1202 (cf. FIG. 30F) to the lower image display panel 1016.

When determining in step s1139 that three or more feature symbols 1100 are not rearranged, or after executing the processing of step s1140, the main CPU 1041 set the remaining number T of the free games to "T=T−1" in the number-of-free-games storage area of the RAM 1043 (step s1141).

Next, the main CPU 1041 determines whether or not T is "T=0" based on the remaining-number data stored in the number-of-free-games storage area in the RAM 1043 (step s1142).

When determining that T is not "T=0", the main CPU 1041 returns the processing to step s1133.

On the other hand, when determining that T is "T=0", the main CPU 1041 completes the present subroutine.

Subsequently, there is described processing of determining the number of the to-be-added special symbols by using FIGS. 45A to 47.

Figure 45A:
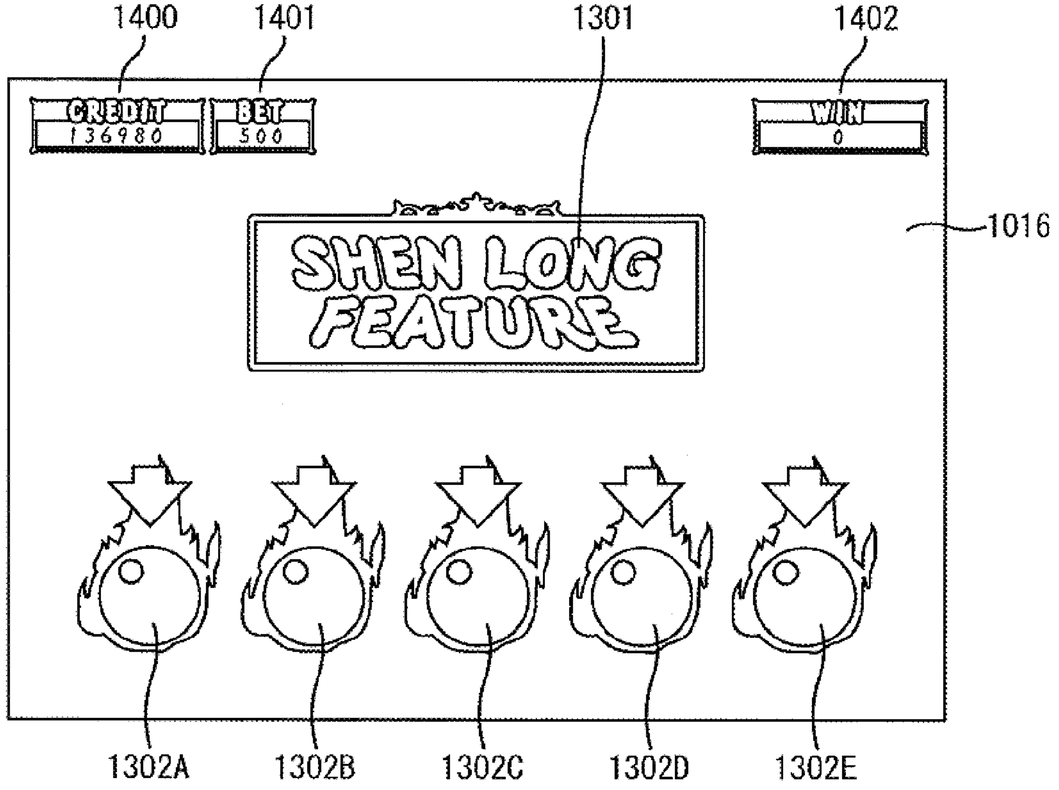
FIG. 45A is an exemplary image displayed to the lower image display panel provided in the slot machine according to one embodiment of the present invention.
Figure 45B:
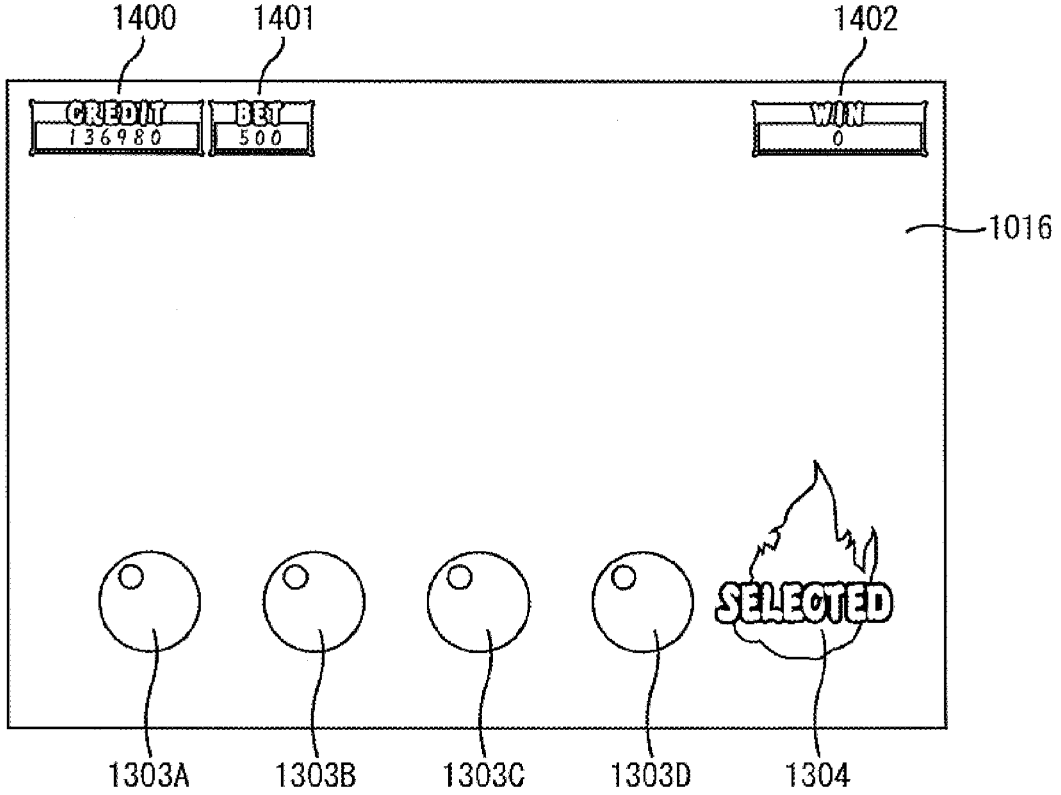
FIG. 45B is an exemplary image displayed to the lower image display panel provided in the slot machine according to one embodiment of the present invention.
Figure 45C:
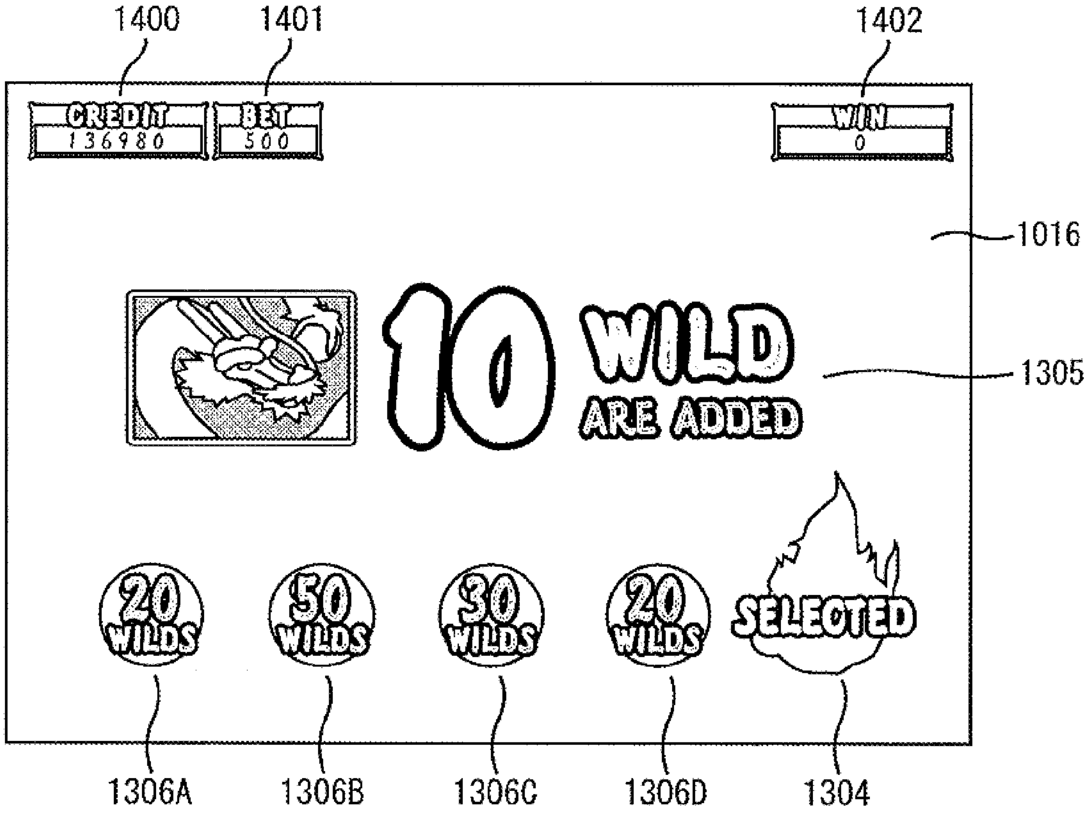
FIG. 45C is an exemplary image displayed to the lower image display panel provided in the slot machine according to one embodiment of the present invention.

FIGS. 45A to 45C are views each showing an exemplary image displayed to the lower image display panel provided in the slot machine according to one embodiment of the present invention.

When three or more feature symbols 1100 are rearranged, the image shown in FIG. 45A is displayed to the lower image display panel 1016.

As shown in FIG. 45A, a feature-game start image 301 showing the start of the feature game is displayed to the center part of the lower image display panel 1016.

To the lower part of the lower image display panel 1016, five selection images 1302 (the selection image 1302A, the selection image 1302B, the selection image 1302C, the selection image 1302D, the selection image 1302E) are displayed. The player can select the selection image 1302 by touching the touch panel 1069 (cf. FIG. 32) provided on the lower image display panel 1016 with his or her finger or the like. Based on the selection image 1302 selected by the player, the number of the to-be-added wild symbols is determined.

For example, when the selection image 1302E is selected by the player, as shown in FIG. 45B, a selected image 1304 is displayed at the position where a selection image 1302E has been displayed on the lower image display panel 1016. Further, at the positions where the unselected selection images 1302 have been displayed, non-selected images 1303 (the non-selected image 1303A, the non-selected image 1303B, the non-selected image 1303C, the non-selected image 1303D) are displayed.

After the image shown in FIG. 45B is displayed, as shown in FIG. 45C, the to-be-added number determination image 305 showing the number of the to-be-added wild symbols is displayed to the center part of the lower image display panel 1016. In FIG. 45C, the to-be-added number determination image 305 shows that the wild symbols will be increased by ten. Further, the to-be-added number images 306 (the to-be-added number image 306A, the to-be-added number image 3068, the to-be-added number image 306C, the to-be-added number image 306D) are displayed to the lower part of the lower image display panel 1016, each showing the number of the wild symbols which would have been increased if another selection image 1302 had been selected. The to-be-added number image 306A, the to-be-added number image 306B, the to-be-added number image 306C and the to-be-added number image 306D respectively show that the wild symbols would have been increased by 20, 50, 30 and 20, if the selection image 1302 displayed in the corresponding place had been selected.

Figure 46:
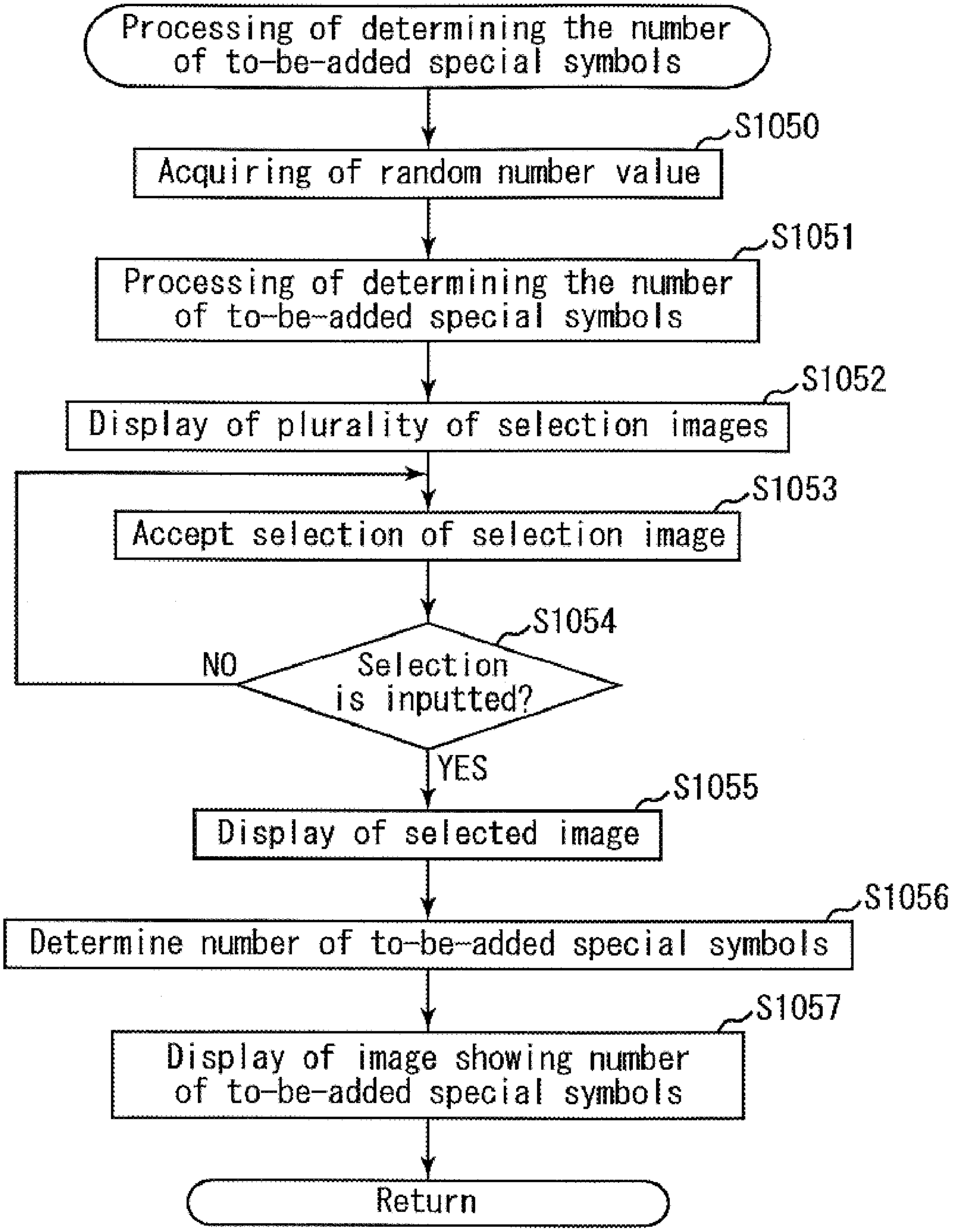
FIG. 46 is a flowchart showing a subroutine of processing of determining the number of to-be-added special symbols.

FIG. 46 is a flowchart showing a subroutine of processing of determining the number of the to-be-added special symbols.

First, the main CPU 1041 acquires random number values from the random number generator 1064 (step s1050). In this processing, the main CPU 1041 acquires five random number values corresponding to the respective selection images 1302 (the selection image 1302A, the selection image 1302B, the selection image 1302C, the selection image 1302D and the selection image 1302E (cf. FIG. 45A)).

Next, the main CPU 1041 determines the number of the to-be-added special symbols corresponding to each selection image 1302 (step s1051). In this processing, the main CPU 1041 determines the number of the to-be-added special symbols corresponding to each selection image 1302, based upon the random number value obtained in step s1050 and a table for determining the number of the to-be-added special symbols, which is shown in FIG. 47.

FIG. 47 is a view showing a table for determining the number of the to-be-added special symbols.

The table for determining the number of the to-be-added special symbols shows the correspondence relationship between the number of the to-be-added special symbols and the random number value.

For example, when random number value corresponding to the selection image 1302A, the selection image 1302B, the selection image 1302C, the selection image 1302D and the selection image 1302E are respectively 17235, 63123, 32387, 22332, 3423, numbers of 20, 50, 30, 20 and 10 respectively correspond to the selection image 1302A, the selection image 13028, the selection image 1302C, the selection image 1302D and the selection image 1302E, as the number of the to-be-added special symbols.

Next, the main CPU 1041 displays the selection image 1302A, the selection image 1302B, the selection image 1302C, the selection image 1302D and the selection image 1302E to the lower part of the lower image display panel 1016 (step s1052). The main CPU 1041 then accepts the selection of the selection image 1302 made by the player (step s1053).

Next, the main CPU 1041 determines whether or not an input for selecting the selection image 1302 has been made (step s1054). In this processing, the main CPU 1041 determines whether or not to have received an input signal for selecting the selection image 1302 from the touch panel 1069. By the player touching a place in the vicinity of where the selection image 1302E is displayed on the lower image display panel 1016 by his or her finger or the like, the input signal for selecting the selection image 1302E is transmitted from the touch panel 1069 to the main CPU 1041. When determining not to have received the input for selecting the selection image 1302, the main CPU 1041 returns the processing to step s1053.

On the other hand, when determining in step s1054 that the input for selecting the selection image 1302 has been made, the main CPU 1041 displays the selected image 1304 (cf. FIG. 45B) (step s1055).

Next, the main CPU 1041 determines the number of the to-be-added special symbols corresponding to the selection image 1302 selected by the player, as the number of the special symbols to be added (step s1056).

For example, in a case where 20, 50, 30, 20 and 10 as the number of the to-be-added special symbols respectively correspond to the selection image 1302A, the selection image 1302B, the selection image 1302C, the selection image 1302D and the selection image 1302E, and when the selection image 1302E is selected by the player, 10 is determined as the number of the to-be-added special symbols. Next, the main CPU 1041 displays the to-be-added number determination image 305 (cf. FIG. 45C) showing the number of the to-be-added special symbols to the center part of the lower image display panel 1016 (step s1057).

After executing the processing of step s1057, the main CPU 1041 completes the present subroutine.

In the present embodiment, the case has been described where the number of the to-be-added special symbols corresponding to each selection image 1302 is determined based upon the acquired random number value and the table for determining the number of the to-be-added special symbols, which is shown in FIG. 47. However, in the present invention, the number of the to-be-added special symbols corresponding to each selection image 1302 may be previously determined.

Figure 48:
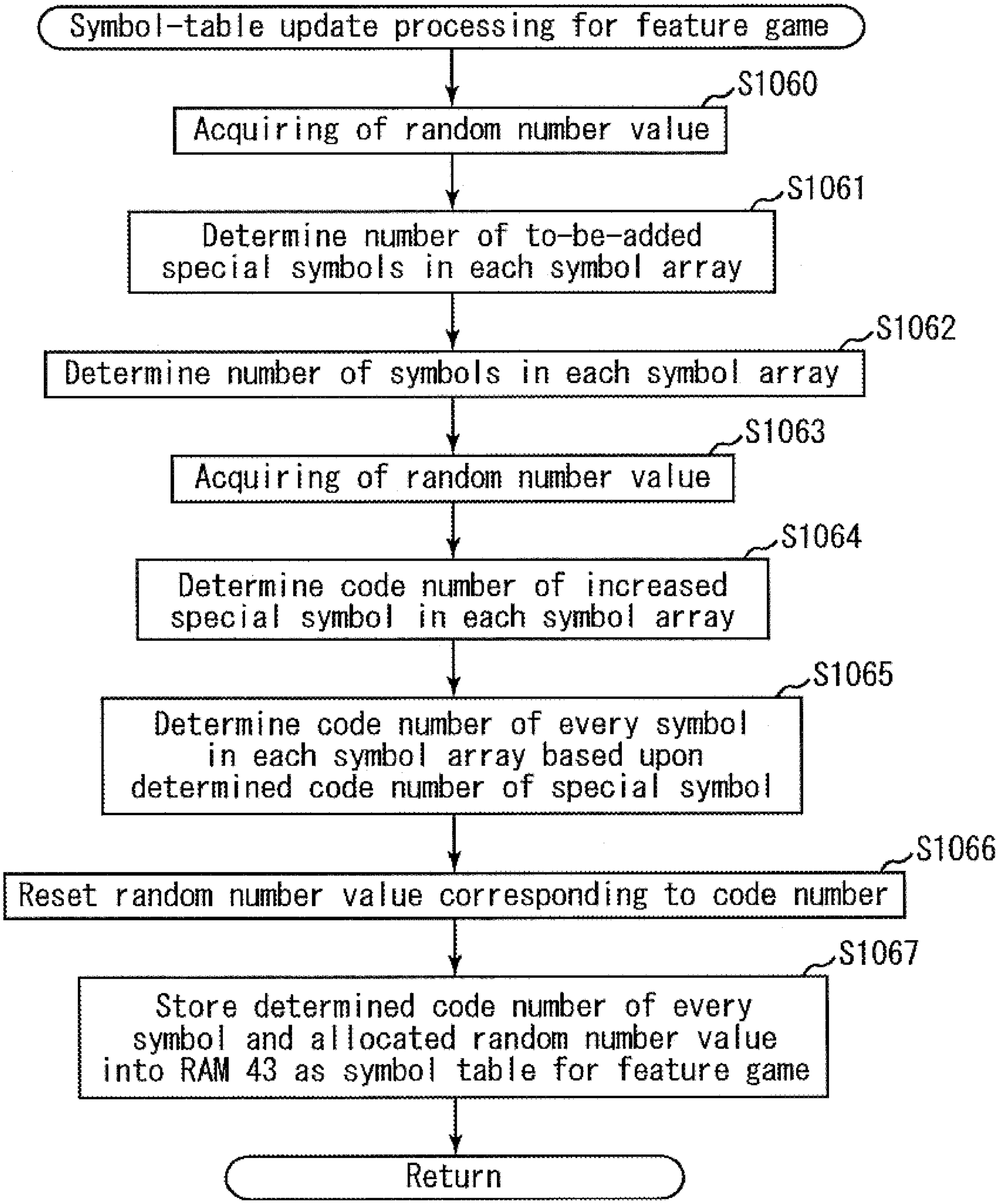
FIG. 48 is a flowchart showing a subroutine of symbol-table update processing for a feature game.

FIG. 48 is a flowchart showing a subroutine of symbol-table update processing for a feature game.

First, the main CPU 1091 acquires random number values from the random number generator 1064 (step s1060). In this processing, the main CPU 1091 acquires random number values in the same number as the number of the to-be-added special symbols, which is determined in step s1056.

Next, the main CPU 1041 determines the number of the to-be-added special symbols in each symbol array (step s1061). In this processing, the main CPU 1041 determines the number of the to-be-added special symbols in each symbol array, based upon the random number value acquired in step s1060 and the symbol-array determination table shown in FIG. 49.

FIG. 49 is a view showing the symbol-array determination table.

The symbol-array determination table shows the correspondence relationship between the symbol array No. and the random number value. It is to be noted that a symbol array No. 1 shows the first column of the display blocks 1028, a symbol array No. 2 shows the second column of the display blocks 1028, a symbol array No. 3 shows the third column of the display blocks 1028, a symbol array No. 4 shows the fourth column of the display blocks 1028, and a symbol array No. 5 shows the fifth column of the display blocks 1028.

For example, when the random number values acquired in step s1060 are 2313, 3123, 12382, 17325, 28768, 30223, 45235, 48766, 58776 and 62356, the number of the to-be-added special symbols in the symbol array No. 1 (the first column) is three, the number of the to-be-added special symbols in the symbol array No. 2 (the second column) is one, the number of the to-be-added special symbols in the symbol array No. 3 (the third column) is two, the number of the to-be-added special symbols in the symbol array No. 4 (the fourth column) is two, and the number of the to-be-added special symbols in the symbol array No. 5 (the fifth column) is two.

In the present embodiment, the case has been described where the number of special symbols to be added to each symbol array is determined based upon the acquired random number value and the symbol-array determination table shown in FIG. 49. However, in the present invention, the number of special symbols to be added to each symbol array may be previously determined according to each of the numbers of the to-be-added special symbols, which is to be determined in the processing for determining the number of the to-be-added special symbols.

Next, the main CPU 1041 determines the number of the symbols in each symbol array (step s1062). In this processing, the main CPU 1041 determines a total number of the symbols in each symbol array based upon the number of the to-be-added special symbols, which has been determined in step s1061. Specifically, the total number of the symbols in each symbol array is a numeric value obtained by adding 20 as the number of the symbols in each symbol array shown by the symbol table for a normal game, to the number of the to-be-added special symbols in each symbol array, which has been determined in step s1061.

Next, the main CPU 1041 acquires random number values from the random number generator 1064 (step s1063). In this processing, the main CPU 1041 acquires random number values in the same number as the number of the to-be-added special symbols in each symbol array, which has been determined in step s1061. Namely, when the number of the to-be-added special symbols in the symbol array No. 1 (the first column) is three, the main CPU 1041 acquires three random number values for the symbol array No. 1 (the first column).

Next, the main CPU 1041 determines a code number of the special symbol to be added in each symbol array, based upon the random number value acquired in step s1063 (step s1064). In this processing, the main CPU 1041 determines a code number of the special symbol to be added in each symbol array based upon the random number value acquired in step s1063 and a code-number determination table shown in FIG. 50.

FIG. 50 is a view showing the code-number determination table.

The code-number determination table shows the correspondence relationship between the code number and the random number value.

For example, in a case where the random number values of the symbol array No. 1 (the first column) are 40567, 63535 and 65323, the code numbers are determined to be "13", "End" and "End".

In the present embodiment, the case has been described where a code number of the special symbol to be added in each symbol array is determined based upon the acquired random number value and the code-number determination table shown in FIG. 50. However, in the present invention, a code number of the special symbol to be added may be previously determined for each symbol array.

Next, the main CPU 1041 determines a code number of every symbol in each symbol array based upon the code number of the special symbol determined in step s1064 (step s1065). In this processing, based upon the code number of the special symbol determined in step s1064, the special symbol is added to each symbol array shown by the symbol table for a normal game in FIG. 34. For example, in a case where "13", "End" and "End" are determined in step s1064 as the code numbers of the special symbols to be added in the symbol array No. 1 (the first column), the wild symbol of "WILD" as the special symbol is added to code No. 13 in the symbol array No. 1 (the first column) shown in the symbol table for a normal game, and "FLOWER 2" originally corresponding to code No. 13 is displaced to code No. 14. In the same manner, each symbol is displaced from its original code number. Further, since there are two special symbols determined to have the code number of "End", the symbols of "WILD" are added to code No. 21 and code No. 22 as the ends of the symbol array No. 1 (the first column). In the same manner, a code number of every symbol in each of the other symbol arrays is determined.

The main CPU 1041 resets the random number values corresponding to the code numbers of each symbol array (step s1066). In this processing, the main CPU 1041 resets the correspondence relationship between the respective random number values from 0 to 65535 and the code numbers, based upon the total number of symbols in each symbol array which has been determined in step s1062.

The main CPU 1041 stores the correspondence relationship between the code number of every symbol in each symbol array, which has been determined in step s1065, and the random number value corresponding to the code number of each symbol array, which has been determined in step s1066, into the RAM 1043 as the symbol table for a feature game (step s1067). The symbol table for a feature game stored in the RAM 1043 is referred to in executing the symbol determination processing for a feature game.

FIGS. 51A and 51B each are an example of the symbol table for a feature game, which shows the correspondence relationship among each symbol in each symbol array of the display blocks, the code number and the random number value.

In FIG. 51A, the wild symbols are added to code Nos. 13, 50 and 51 of the symbol array No. 1 (the first column). Further, the wild symbol is added to code No. 12 of the symbol array No. 2 (the second column). Furthermore, the wild symbols are added to code Nos. 6 and 13 of the symbol array No. 3 (the third column). Further, in FIG. 51B, the wild symbols are added to code Nos. 11 and 12 of the symbol array No. 4 (the fourth column). Moreover, the wild symbols are added to code Nos. 19 and 20 of the symbol array No. 5 (the fifth column).

After executing the processing of step s1067, the main CPU 1041 completes the present subroutine.

Figure 52:
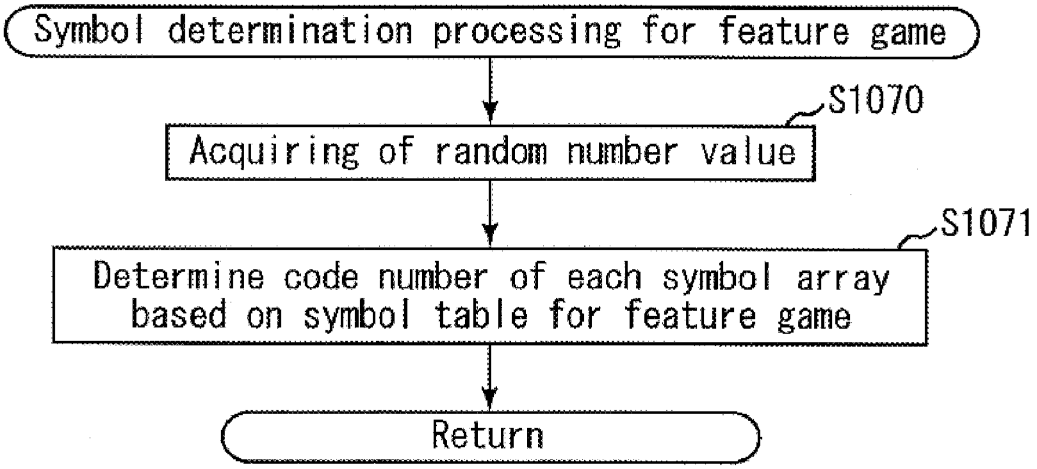
FIG. 52 is a flowchart showing a subroutine of symbol determination processing for a feature game.

FIG. 52 is a flowchart showing a subroutine of the symbol determination processing for a feature game.

This processing is processing performed by the main CPU 1091 executing the symbol determination program stored in the RAM 1043.

First, the main CPU 1041 acquires random number values from the random number generator 1069 (step s1070). In this processing, the main CPU 1091 acquires five random number values corresponding to the respective symbol arrays of the display blocks 1028.

Next, the main CPU 1041 determines a code number at stopping the symbols in each symbol array of the display blocks 1028, based upon the acquired five random number values and the symbol table for a feature game (step s1071). For example, in a case where the random number value of the first array is "23035", the number of "08" is determined as the code number of the first array. It should be noted that a code number of a symbol array corresponds to a code number of a symbol rearranged in the first array of the display blocks 1028 out of the four columns arrayed in the display blocks 1028.

After executing the processing of step s1071, the main CPU 1041 completes the present subroutine.

Figure 53:
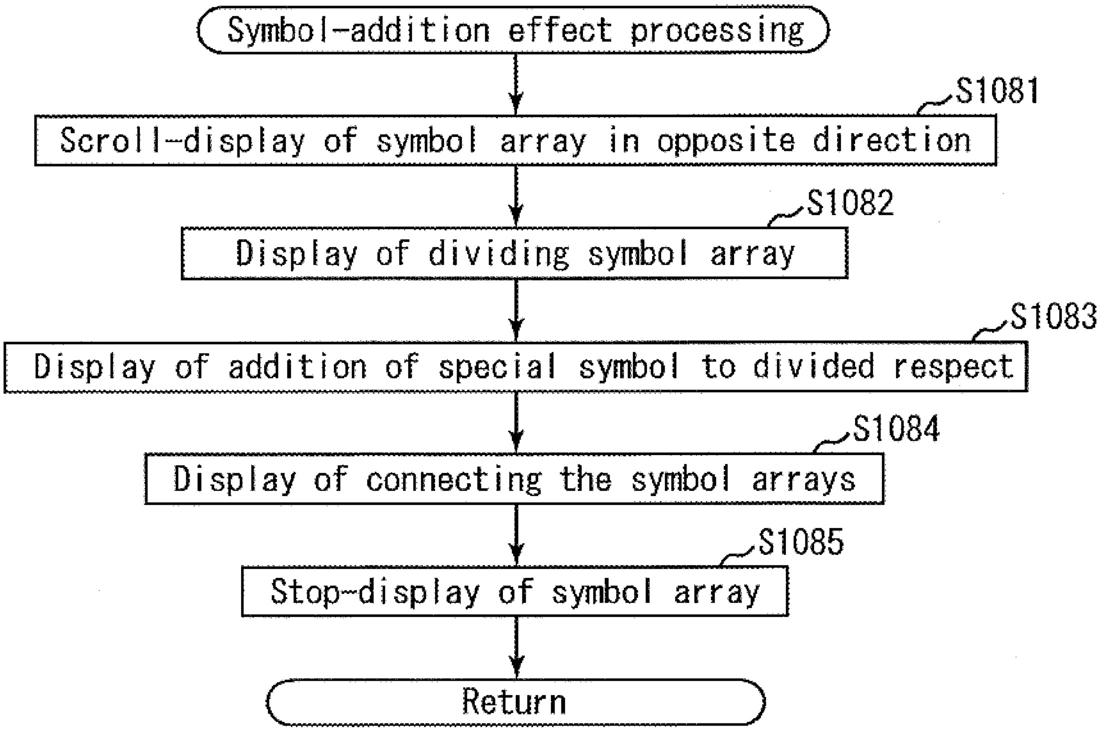
FIG. 53 is a flowchart showing a subroutine of symbol-addition effect processing.

FIG. 53 is a flowchart showing a subroutine of the symbol-addition effect processing.

FIGS. 54A to 54F are views each showing an exemplary image displayed to the lower image display panel provided in the slot machine according to one embodiment of the present invention.

Figure 54A:
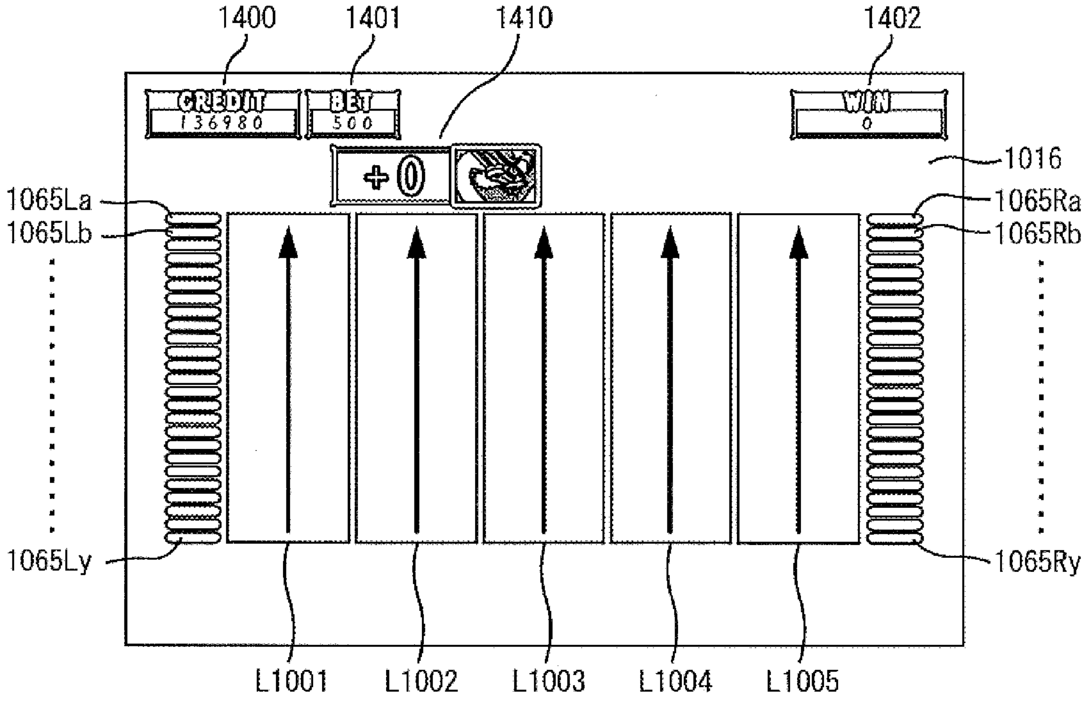
FIG. 54A is a view showing an exemplary image displayed to the lower image display panel provided in the slot machine according to one embodiment of the present invention.

First, in step s1081, the main CPU 1041 scroll-displays the symbol arrays L1001 to L1005 in the direction from the bottom to the top, namely, the direction opposite to the scrolling direction in the normal game (cf. FIG. 54A). This scroll-display in the opposite direction is conducted at a lower speed than that of the scroll-display in the normal game. It is to be noted that the symbol array L1001 means the leftmost column of the display blocks 1028.

As shown in FIG. 54A, the symbol arrays L1001 to L1005 are scroll-displayed in the direction from the bottom to the top, namely, the direction opposite to the scrolling direction in the normal game. This scroll-display in the opposite direction is conducted at a lower speed than that of the scroll-display in the normal game. Further, a display portion 1910 of the number of the to-be-added wild symbols is displayed in the vicinity of the upper center of the lower image display panel 1016. To the display portion 1410 of the number of the to-be-added wild symbols, "0" is displayed indicating that the number of the added wild symbols is 0.

Figure 54B:
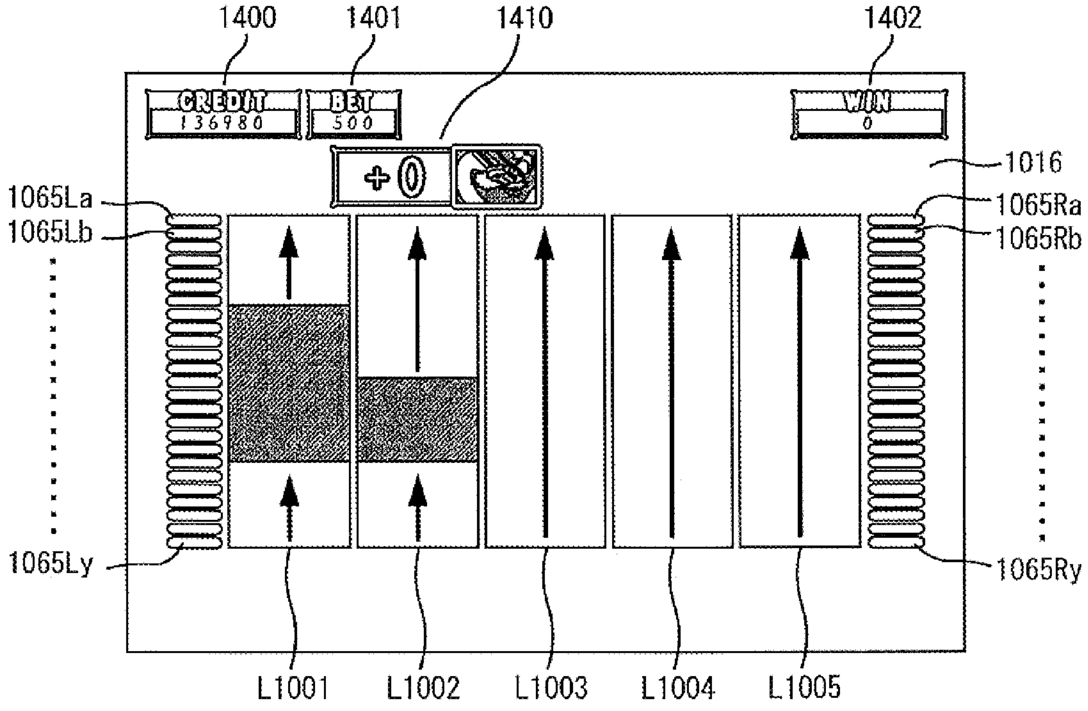
FIG. 54B is a view showing an exemplary image displayed to the lower image display panel provided in the slot machine according to one embodiment of the present invention.

Next, in step s1082, the main CPU 1041 conducts a display of dividing the symbol array L (cf. FIG. 54B). In this processing, the main CPU 1041 conducts a display of dividing the symbol array L between the symbol of the code number determined in step s1064 in FIG. 48 and the symbol of a code number smaller than the determined code number by one. For example, when determining to add the wild symbol to code No. 13 of the symbol array L1001, the main CPU 1041 conducts a display of dividing the symbol array L1001 between the symbol "FLOWER 2" of code No. 13 and the symbol "10" of code No. 12.

As shown in FIG. 54B, the display of dividing the symbol array L is conducted on the lower image display panel 1016. In FIG. 54B, a state of dividing the symbol array L1001 and the symbol array L1002 is displayed.

Figure 54C:
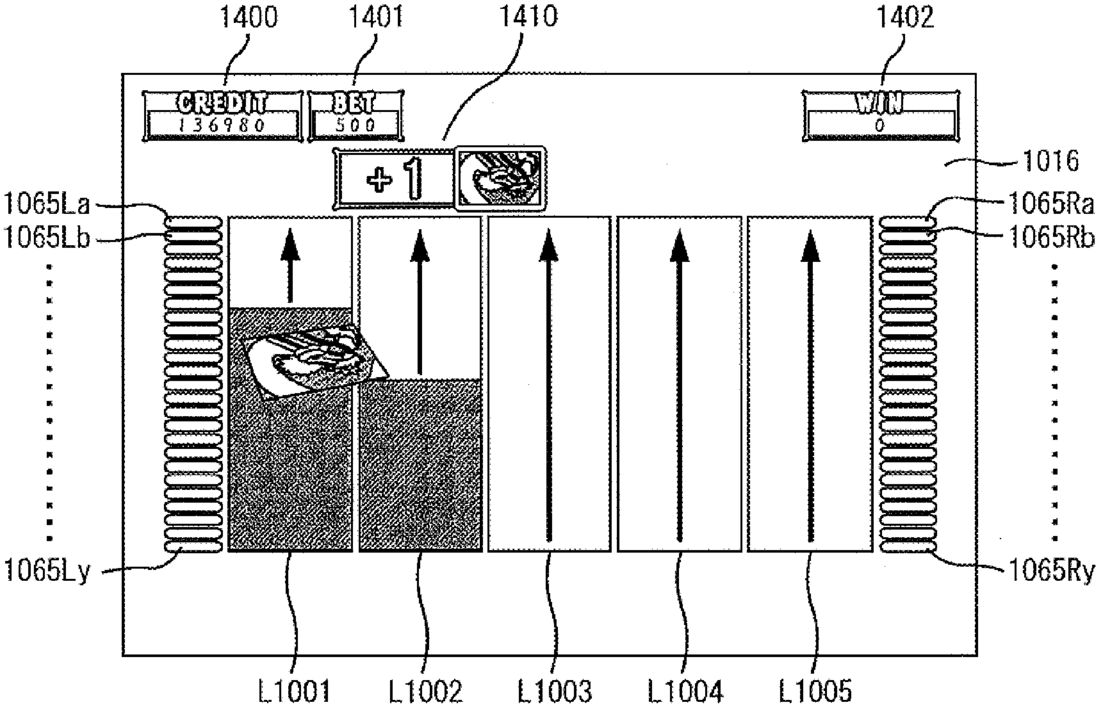
FIG. 54C is a view showing an exemplary image displayed to the lower image display panel provided in the slot machine according to one embodiment of the present invention.
Figure 54D:
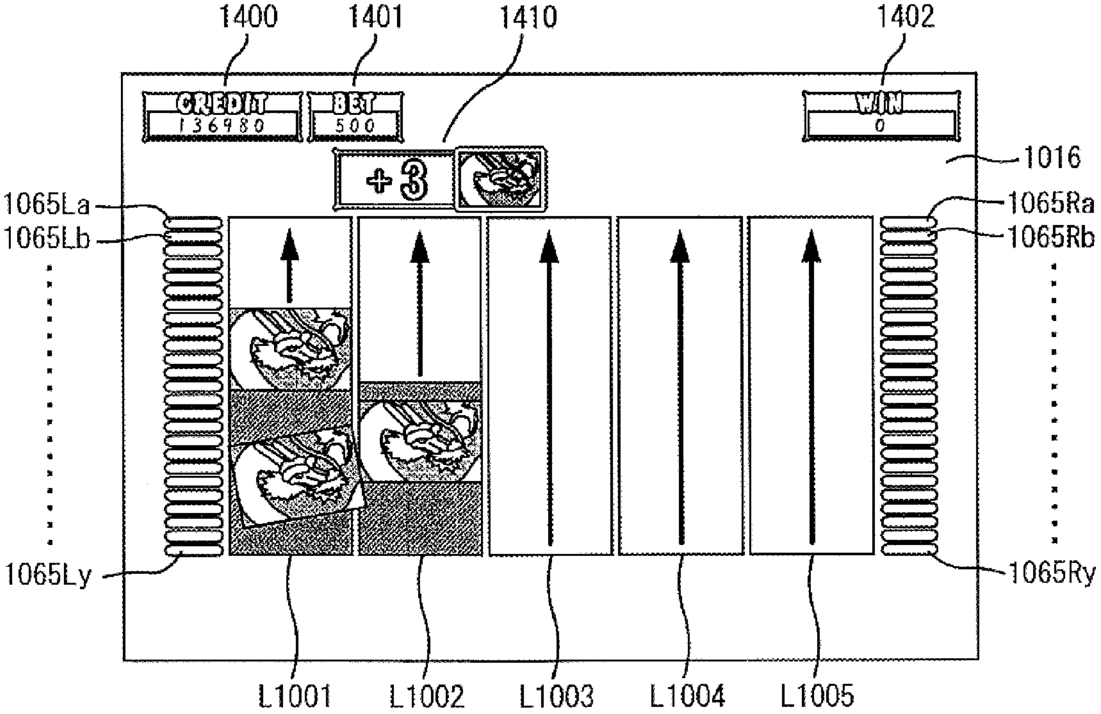
FIG. 54D is a view showing an exemplary image displayed to the lower image display panel provided in the slot machine according to one embodiment of the present invention.

Next, in step s1083, the main CPU 1041 displays addition of the wild symbol to the divided respect (cf. FIGS. 54C and 54D). As shown in FIGS. 54C and 54D, states of adding the wild symbols to the divided respects of the symbol arrays are displayed. In FIG. 54C, "1" is displayed in the display portion 1410 of the number of the to-be-added wild symbols, indicating that the number of the added wild symbols is one. In FIG. 54D, "3" is displayed in the display portion 1410 of the number of the to-be-added wild symbols, indicating that the number of the added wild symbols is 3.

Figure 54E:
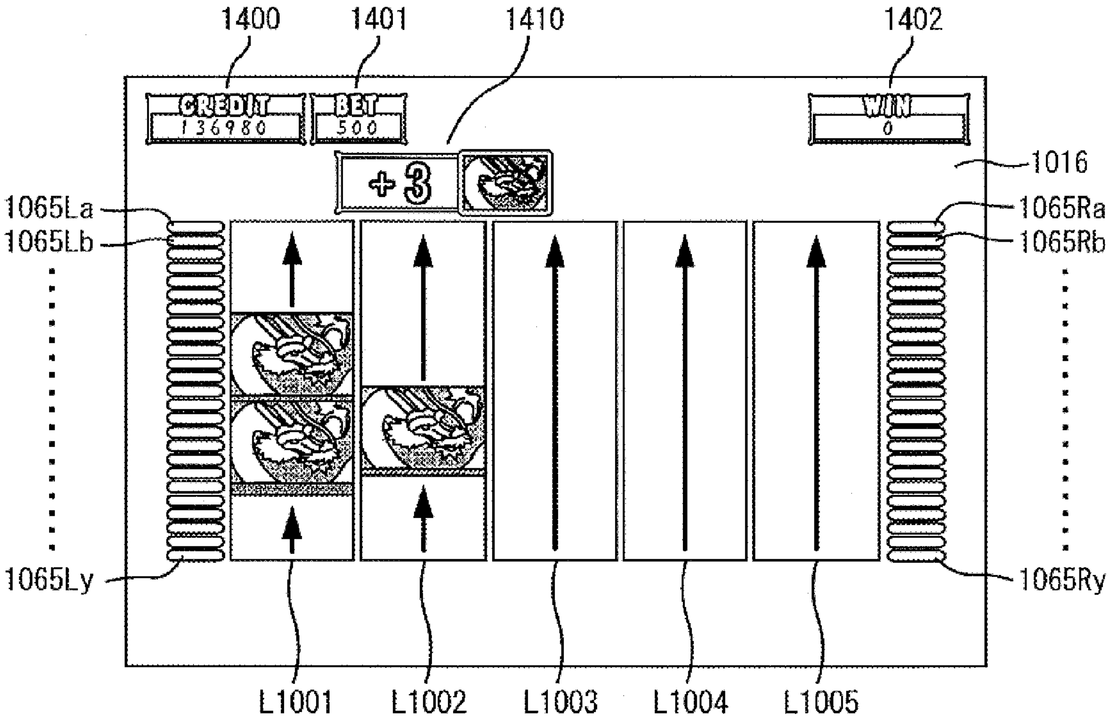
FIG. 54E is a view showing an exemplary image displayed to the lower image display panel provided in the slot machine according to one embodiment of the present invention.
Figure 54F:
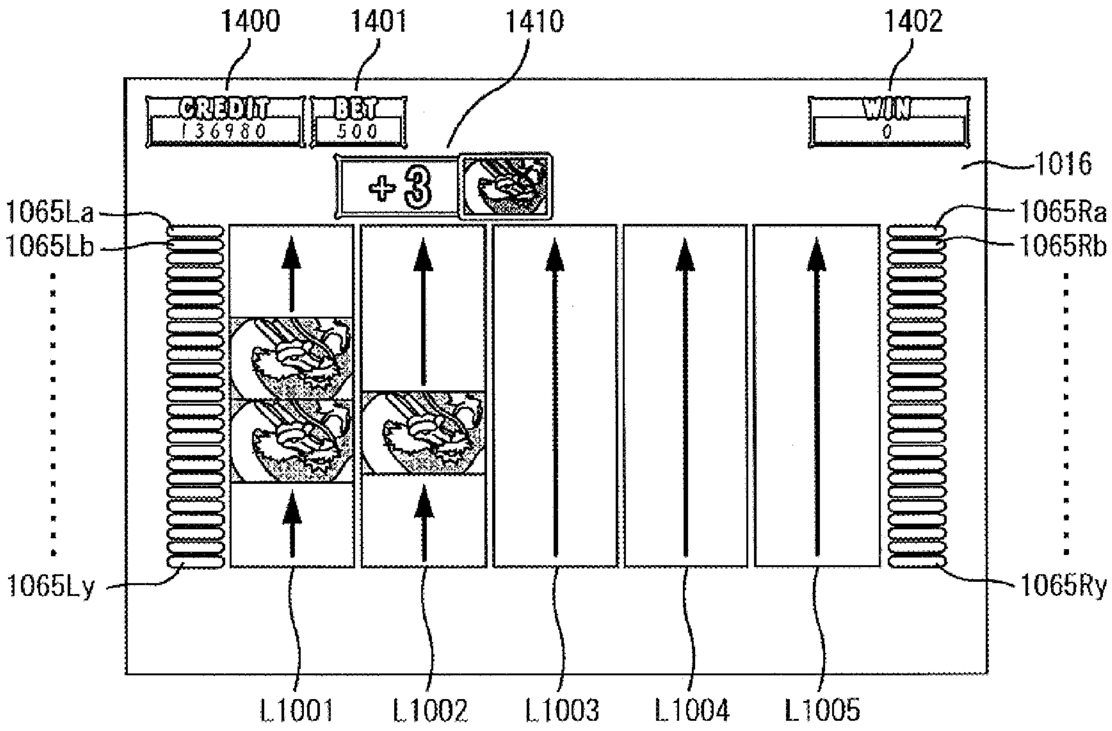
FIG. 54F is a view showing an exemplary image displayed to the lower image display panel provided in the slot machine according to one embodiment of the present invention.

Next, in step s1084, the main CPU 1041 conducts a display of connecting the symbol arrays L (cf. FIGS. 54E and 54F). As shown in FIGS. 54E and 54F, the display of connecting the divided symbol arrays is conducted.

Next, in step s1085, the main CPU 1041 stop-displays the scroll-display (scroll-display in the direction opposite to the direction in the normal game) of the symbol sequences L1001 to L1005, and completes the present subroutine.

As above, there has been described the present embodiment.

In accordance with the slot machine 1010 according to the present embodiment and the control method thereof, it is possible to shift the player's attention to the condition of "three or more feature symbols 1100 are rearranged in the display blocks 1028", and to the condition of "the number of the normal games conducted after the mode was shifted to the insurance mode has reached the prescribed number (1000)". Namely, it is possible to switch the object for capturing the player's attention during the game, and therefore, it is possible to provide a game which is less likely to be monotonous for the player and hardly bores the player even after long hours of play.

Further, since there are two kinds of the free games comprising the first free game and the second free game which is more advantageous than the first free game, it is possible to increase the player's interest and concern for the free game.

Further, in accordance with the slot machine 1010 according to the present embodiment, even the identical condition of "three or more feature symbols 1100 are rearranged in the display blocks 1028" is established, the number of the free games to be offered to the player is larger in the case where this condition has been established in the second free game, than in the case where this condition has been established in the normal game. Accordingly, it is possible to have the player have great expectations for reaching of the number of the normal games conducted after the mode was shifted to the insurance mode to the prescribed number (1000), and the rearrangement of three or more feature symbols 1100 in the second free game.

Further, since the number of the free games to be generated is different in accordance with the situation of the game at the time when the condition is established even the identical condition of "three or more feature symbols 1100 are rearranged in the display blocks 1028" is established, it is possible to give a surprise to the player.

Since the amount of game media to be paid out to the player in the game is determined based on the symbol stop-displayed to the lower image display panel 1016 or the combination of the stop-displayed symbols, the player is generally concentrated on the lower image display panel 1016 during the game. In accordance with the above-mentioned slot machine 1010 and the control method thereof, since the first predetermined condition that three or more feature symbols 1100 are rearranged to such lower image display panel 1016 is set as the condition for generation of the first free game, it is easier to have the player visually understand that the first free game is generated.

In accordance with the slot machine 1010 according to the present embodiment, it is possible to have the player play the game while having expectations for the rearrangement of three or more feature symbols 1100 and reaching of the number of the counted normal games to the prescribed number (1000), during the normal game. As a result it is possible to have the player more absorbed in the game.

Further, it is possible that the player having continued the game until the number of the counted normal games reached the prescribed number has consumed many game media. According to the above-mentioned slot machine 1010 and the control method thereof, a payout of the game media in the predetermined amount to the player is determined and the profit of the second free game which is more advantageous than the first free game is offered to such player, and therefore, it is possible to free the player of an irritation and boredom accompanying the consumption of many game media.

In the present embodiment, the number of the second free games is larger than the number of the first free games. Further, in the second free game, since the number of the wild symbols which can be substituted for other symbols is increased. Namely since the prize is more likely to be established in the second free game compared to in the normal game, it is more advantageous for the player. Accordingly, by executing the second free game, it is possible to have the player have expectations, and consequently, it is possible to provide a more attractive game.

Further, in accordance with the slot machine 1010 according to the present embodiment, it is possible to have the player who is planning to play the game for a long time press the insurance BET button 1090. Thus, it is possible to aim the increase in the profit of the recreation facility.

On the other hand, it is also possible to have the player who has not determined the time period to play the game at the start, continue playing the game until the counted number reaches the prescribed number.

Moreover, in accordance with the slot machine 1010 according to the present embodiment, the number of the second free games is larger than the number of the first free games, and the number of the free games to be added when three or more feature symbols are rearranged in the second free game is equal to the number of the second free games.

Accordingly, it is possible to give a strong impression to the player about whether the currently-conducted free game is the free game derived from the establishment of the condition of "three or more feature symbols 1100 are rearranged in the display blocks 1028" or the free game derived from the establishment of the condition of "the number of the normal games conducted after the mode was shifted to the insurance mode has reached the prescribed number (1000)". As a result, it is possible to increase the player's interest and concern for each free game.

Furthermore, in the present invention, the number of the normal games other than the number C of all games may be counted. Examples of such number of the normal games may include the number of the normal games in which the symbols are stop-displayed in a predetermined stopped state. In such a case, a configuration may be adopted, in which the second free game is generated when the number of the normal games in which the symbols are stop-displayed in the predetermined stopped state has reached the prescribed number. Furthermore, a configuration may also be adopted, in which the third specific number is determined based on the number of the normal games in which the symbols are stop-displayed in the predetermined stopped state. By adopting such configurations, it is possible to have the player have expectations for the stop-display of the symbols in the predetermined stopped state.

In the present embodiment, the case where the number of the pay lines 1300 is 25 has been described. However, the number of the pay lines is not particularly limited in the present invention, and for example, it may be 30.

In the present embodiment, the case has been described where the first predetermined condition is that three or more feature symbols are rearranged. However, the first predetermined condition in the present invention is not particularly limited.

Examples of the first predetermined condition may include the elapse of the predetermined time period after completion of the previous feature game. Further, the examples may also include a condition that a random number is extracted for every prescribed number of games being conducted, and the extracted random number belongs to the predetermined numerical range.

Further, in the present embodiment, there has been described the case where the second predetermined condition is the number of the counted normal games reaching the prescribed number (1000). However, the present invention is not limited to this example. For example, a condition that a random number is extracted for every prescribed number of games being conducted, and the extracted random number belongs to the predetermined numerical range, may be adopted as the second predetermined condition. Further, the second predetermined condition may be a condition that the difference between the amount of the betted game media and the amount of the paid-out game media reaches the predetermined amount.

Furthermore, a condition that points are offered based on the stop-displayed symbol or a combination of the stop-displayed symbols and the offered points reaches the prescribed number may be adopted as the second predetermined condition.

Further, in the present embodiment, there has been described the case where only the number of the normal games is counted. However, in the present invention, the number of the free games may also be counted. For example, the second free game may be configured to be generated, when a total of the number of the normal games and the number of the first free games has reached the prescribed number.

Furthermore, in the present embodiment, there has been described the case where the prescribed number is 1000 only. However, in the present invention, the prescribed number may be set stepwise. For example, 500, 1000, and 2000 may be set as the prescribed numbers. When the mode is shifted to the insurance mode, any of the prescribed numbers may be selected.

In such a case, the following configuration is desirably adopted.

Namely, a first insurance BET button for setting 500 as the prescribed number, a second insurance BET button for setting 1000 as the prescribed number, a third insurance BET button for setting 2000 as the prescribed number are provided. Further, the number of credits subtracted when the first insurance BET button is pressed, the number of credits subtracted when the second insurance BET button is pressed, and the number of credits subtracted when the third insurance BET button is pressed are different from each other. Further, the third specific number (second specific number) in the case where the first insurance BET button is pressed, the third specific number (second specific number) in the case where the second insurance BET button is pressed and the third specific number (second specific number) in the case where the third insurance BET button is pressed are different from each other.

Accordingly, it is possible to have the player think about which insurance BET button is more beneficial to press in shifting the mode to insurance mode. Further, through this process, it is possible to have the player absorbed in the game.

Further, in the present embodiment, a game content of the free game is a game, in which a plurality of symbols are variably displayed and then stop-displayed in the display blocks 1028, and the amount of payout is determined based on the stop-displayed symbol or a combination of the stop-displayed symbols (a game normally played on the slot machine).

However, the free game in the present invention is not limited to this example, and a game different from the slot machine game may be conducted. Examples of the game to be conducted may include a card game such as poker, and a game such as a shooting game, a fighting game and the like. The free game may be a game in which the game media are paid out, or alternatively, may be a game in which the game media are not paid out.

Further, after the free game is conducted based on the number of the counted normal games having reached the prescribed number in the insurance mode, when the number of the counted normal games has reached the prescribed number again in the insurance mode, a free game having a content different from that of the previous free game may be conducted.

The free game in the present invention is not particularly limited as long as it is a game played even without a BET of game media, and can be designed as appropriate.

Fourth Embodiment

An embodiment of the present invention is described based on the drawings.

At first, with reference to FIGS. 55A to 55C, there will be given a general description of the present embodiment.

Figure 55A:
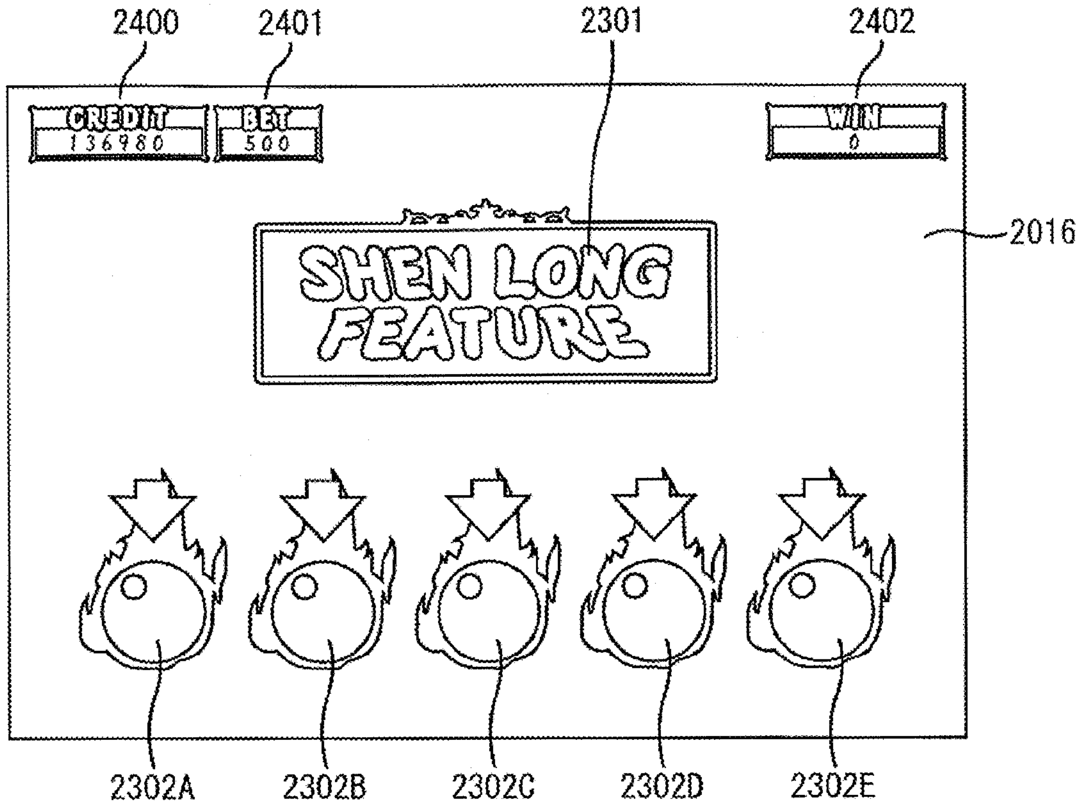
FIG. 55A is a view showing an exemplary image displayed to a lower image display panel provided in a slot machine according to one embodiment of the present invention.

FIG. 55A is a view showing an exemplary image displayed to a lower image display panel provided in a slot machine according to one embodiment of the present invention.

Figure 55B:
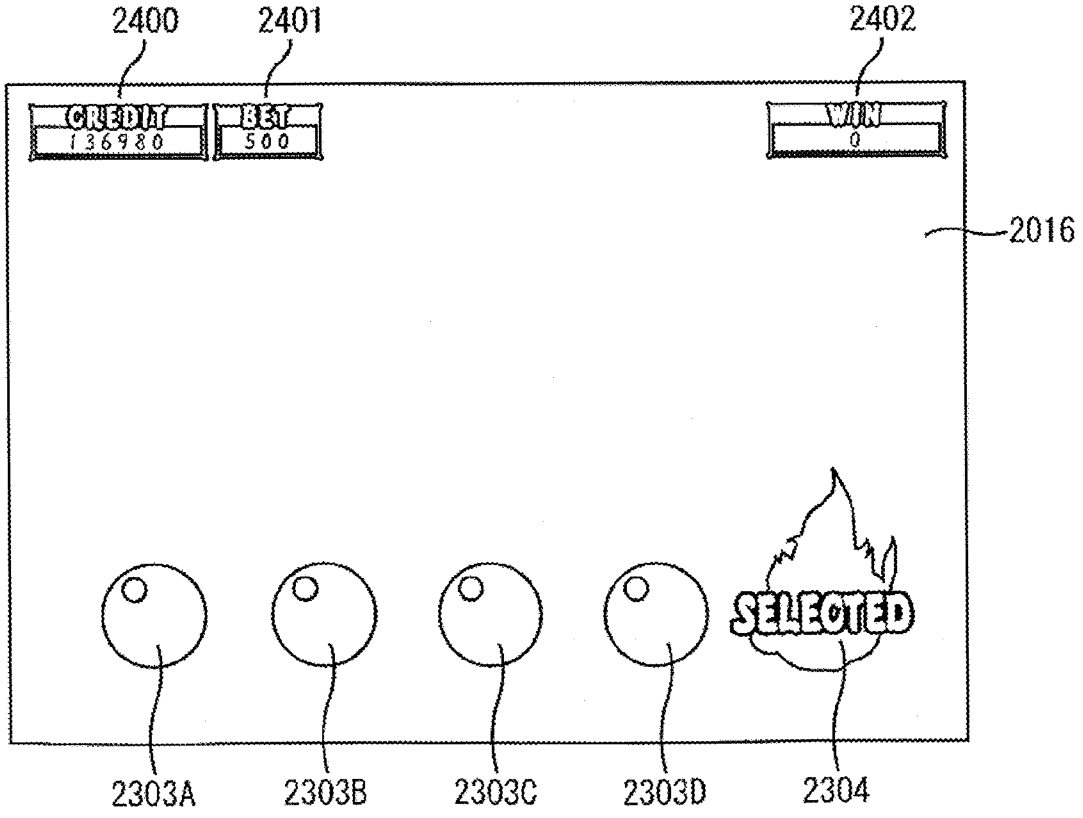
FIG. 55B is a view illustrating an exemplary image displayed to a lower image display panel provided in a slot machine according to one embodiment of the present invention.

FIG. 55B is a view showing an exemplary image displayed to a lower image display panel provided in a slot machine according to one embodiment of the present invention.

Figure 55C:
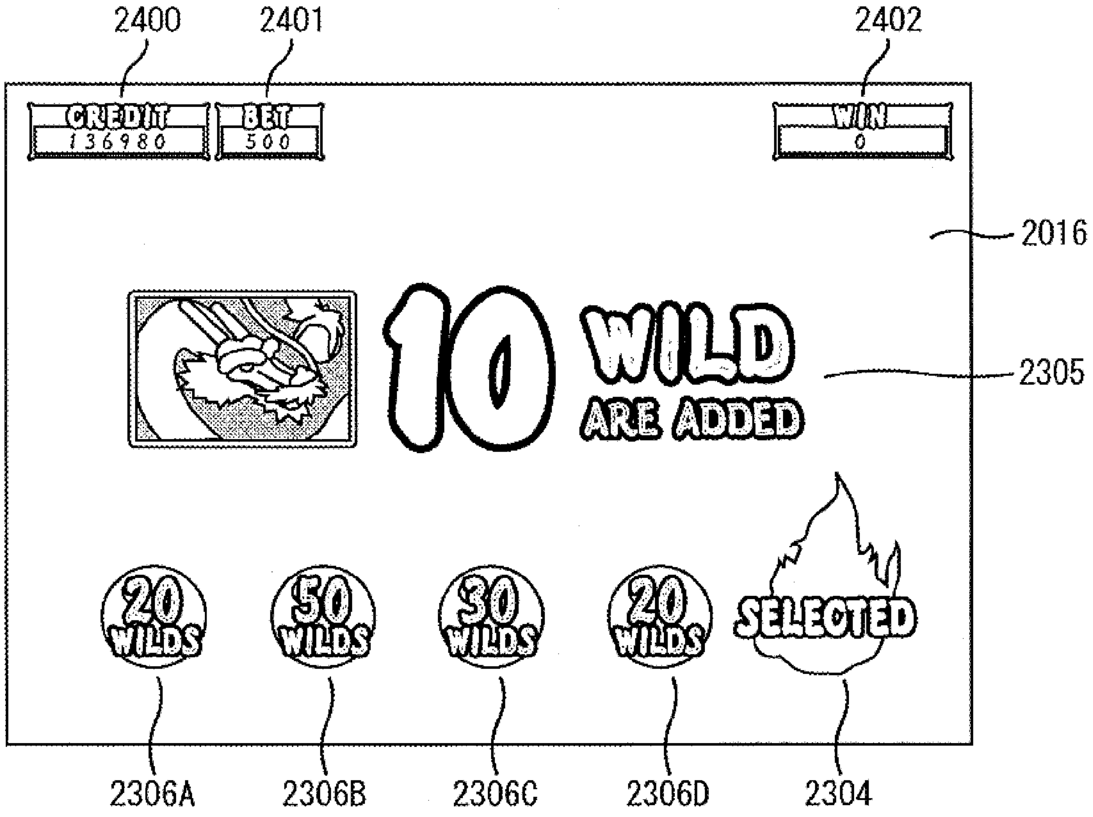
FIG. 55C is a view showing an exemplary image displayed to a lower image display panel provided in a slot machine according to one embodiment of the present invention.

FIG. 55C is a view showing an exemplary image displayed to a lower image display panel provided in a slot machine according to one embodiment of the present invention.

In a slot machine 2010 according to the present embodiment, when three or more feature symbols are stop-displayed to display blocks 2028 (cf. FIG. 56) in a lower image display panel 2016, a feature game as a game which can be played without betting coins as game media (hereinafter also referred to as a free game) is executed (cf. FIGS. 58 and 64). When the feature game is started, an image shown in FIG. 55A is displayed to the lower image display panel 2016.

As shown in FIG. 55A, a feature-game start image 2301 showing the start of the feature game is displayed to the center part of the lower image display panel 2016.

To the lower part of the lower image display panel 2016, five selection images 2302 (a selection image 2302A, a selection image 2302B, a selection image 23020, a selection image 2302D, a selection image 2302E) are displayed. A player can select the selection image 2302 by touching a touch panel 2069 (cf. FIG. 57) provided on the lower image display panel 2016 with his or her finger or the like. Based upon the selection image 2302 selected by the player, the number of to-be-added wild symbols as special symbols is determined. It is to be noted that the wild symbol is a symbol that can be substituted for another symbol.

For example, when the selection image 2302E is selected by the player, as shown in FIG. 55B, a selected image 2304 is displayed at the position where the selection image 2302E has been displayed on the lower-side image display panel 2016. Further, at the positions where the selection images 2302 having not been selected have been displayed, non-selected images 2303 (a non-selected image 2303A, a non-selected image 2303B, a non-selected image 2303C, a non-selected image 2303D) are displayed.

After the display of the images shown in FIG. 55B, as shown in FIG. 55C, a to-be-added number determination image 2305 showing the number of the to-be-added wild symbols is displayed to the center part of the lower image display panel 2016. In FIG. 55C, the to-be-added number determination image 2305 shows that the wild symbols will be added by ten. Further, to-be-added number images 2306 (a to-be-added number image 2306A, a to-be-added number image 2306B, a to-be-added number image 2306C, a to-be-added number image 2306D) are displayed in the lower part of the lower image display panel 2016, each showing the number of the wild symbols which would have been increased if another selection image 2302 had been selected. The to-be-added number image 2306A, the to-be-added number image 2306B, the to-be-added number image 2306C and the to-be-added number image 2306D respectively show that the wild symbols would have been increased by 20, 50, 30 and 20, if the selection image 2302 displayed in the corresponding place had been selected.

Further, as shown in FIGS. 55A to 55C, to the upper part of the lower image display panel 2016, a number-of-credits display portion 2400 showing the number of credited coins, a number-of-bets display portion 2401 showing the number of betted coins, and a payout display portion 2402 showing the number of coins to be paid out are displayed.

As thus described, in the slot machine 2010 according to the present embodiment, when the feature game is started, the number of the to-be-added wild symbols is determined based upon the selection image 2302 selected by the player. The feature game with the number of wild symbols increased is then executed.

The wild symbol corresponds to the special symbol in the present invention.

The selection images 2302 (the selection image 2302A, the selection image 23028, the selection image 2302C, the selection image 2302D, the selection image 2302E) correspond to the selection images in the present invention.

As above, there has been given the general description of the present embodiment, with reference to FIGS. 55A to 55C.

Hereinafter, the present embodiment is described in more detail.

Next, a configuration of the slot machine 2010 is described.

Figure 56:
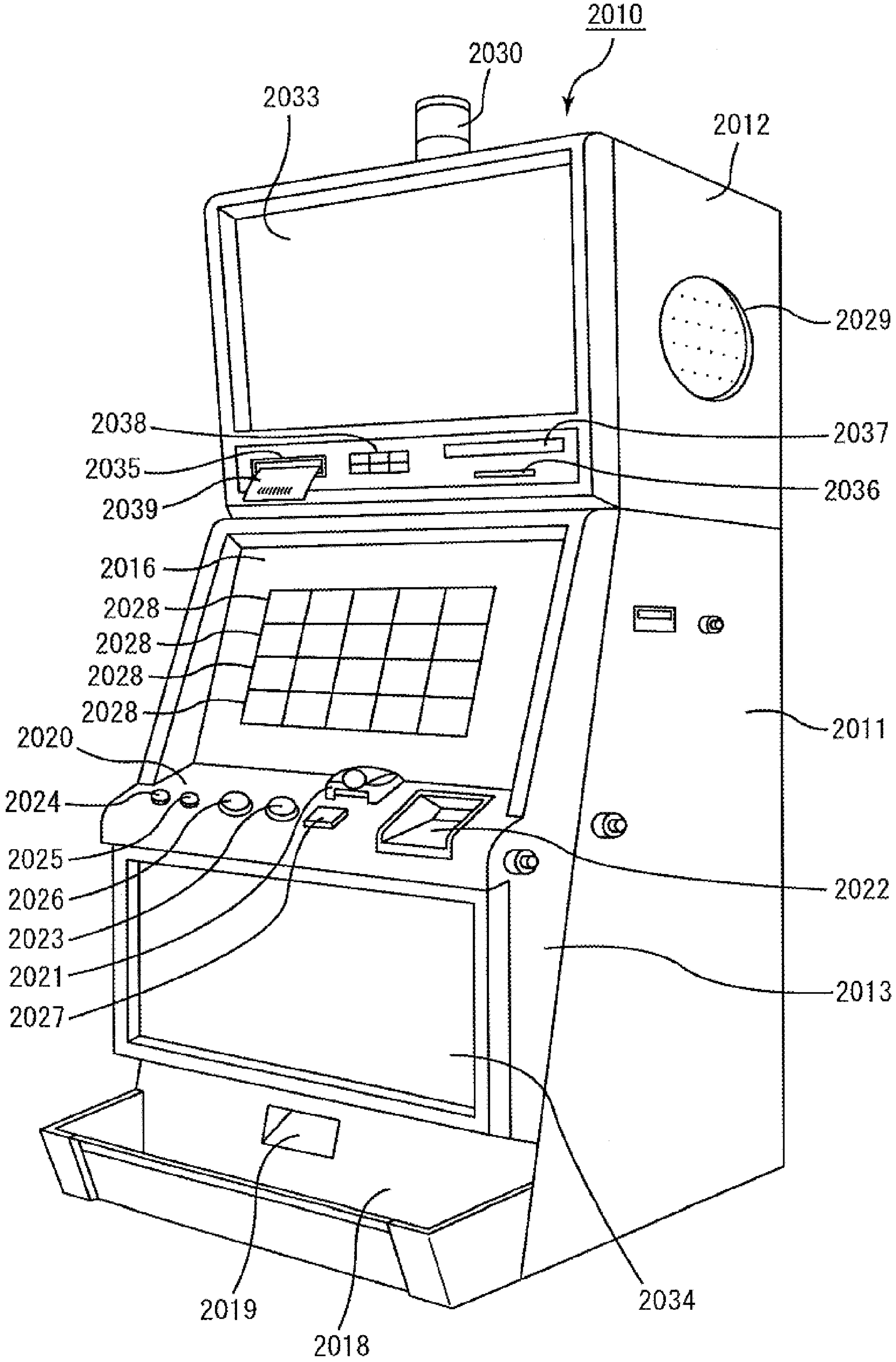
FIG. 56 is a perspective view showing an external view of a slot machine according to one embodiment of the present invention.

FIG. 56 is a perspective view showing an external view of a slot machine according to one embodiment of the present invention.

In the slot machine 2010, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 2010 comprises a cabinet 2011, a top box 2012 installed on the upper side of the cabinet 2011, and a main door 2013 provided at the front face of the cabinet 2011.

On the main door 2013, there is provided the lower image display panel 2016 as a display. The lower image display panel 2016 includes a transparent liquid crystal panel which displays twenty display blocks 2028 along five columns and four rows. A single symbol is displayed in each display block 2028. Further, although not shown, various types of images relating to an effect, in addition to the aforementioned images, are displayed to the lower image display panel 2016.

The lower image display panel 2016 corresponds to the symbol display in the present invention.

Moreover, although not shown, the touch panel 2069 is provided at the front face of the lower image display panel 2016. The player can operate the touch panel 2069 to input a variety of commands.

When the touch panel 2069 is operated, an input signal is transmitted from the touch panel 2069 to a main CPU 2041.

The touch panel 2069 corresponds to the input device in the present invention.

Below the lower image display panel 2016, there are provided a control panel 2020 including a plurality of buttons 2023 to 2027 with each of which a command according to game progress is inputted by the player, a coin receiving slot 2021 through which a coin is accepted into the cabinet 2011, and a bill validator 2022.

The control panel 2020 is provided with a start button 2023, a change button 2024, a CASHOUT button 2025, a 1-BET button 2026 and a maximum BET button 2027. The start button 2023 is for inputting a command to start scrolling of symbols. The change button 2024 is used for making a request of staff in the recreation facility for exchange. The CASHOUT button 2025 is used for inputting a command to pay out credited coins to a coin tray 2018.

The 1-BET button 2026 is used for inputting a command to bet one coin on a game out of credited coins. The maximum BET button 2027 is used for inputting a command to bet the maximum number of coins that can be bet on one game (500 coins in the present embodiment) out of credited coins.

The bill validator 2022 not only discriminates a regular bill from a false bill, but also accepts the regular bill into the cabinet 2011. It is to be noted that the bill validator 2022 may be configured so as to be capable of reading a later-described ticket 2039 with a barcode. At the lower front of the main door 2013, namely, below the control panel 2020, there is provided a belly glass 34 on which a character or the like of the slot machine 2010 is drawn.

An upper image display panel 2033 is provided on the front surface of the top box 2012. The upper image display panel 2033 is provided with a liquid crystal panel and displays, for example, images indicative of introduction of contents of the game and explanation of the rule of the game.

Further, a speaker 2029 is provided in the top box 2012. Under the upper image display panel 2033, there are provided a ticket printer 2035, a card reader 2036, a data display 2037, and a key pad 2038. The ticket printer 2035 prints on a ticket a barcode as coded data of the number of credits, a date, an identification number of the slot machine 2010, and the like, and outputs the ticket as the ticket 2039 with a barcode. The player can make another slot machine read the ticket 2039 with a barcode to play a game thereon, or exchange the ticket 2039 with a barcode with a bill or the like at a predetermined place in the recreation facility (e.g. a cashier in a casino).

The card reader 2036 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 2037 includes a fluorescent display and the like, and displays, for example, data read by the card reader 2036 or data inputted by the player via the key pad 2038. The key pad 2038 is used for inputting a command and data concerning issuing of a ticket, and the like.

Figure 57:
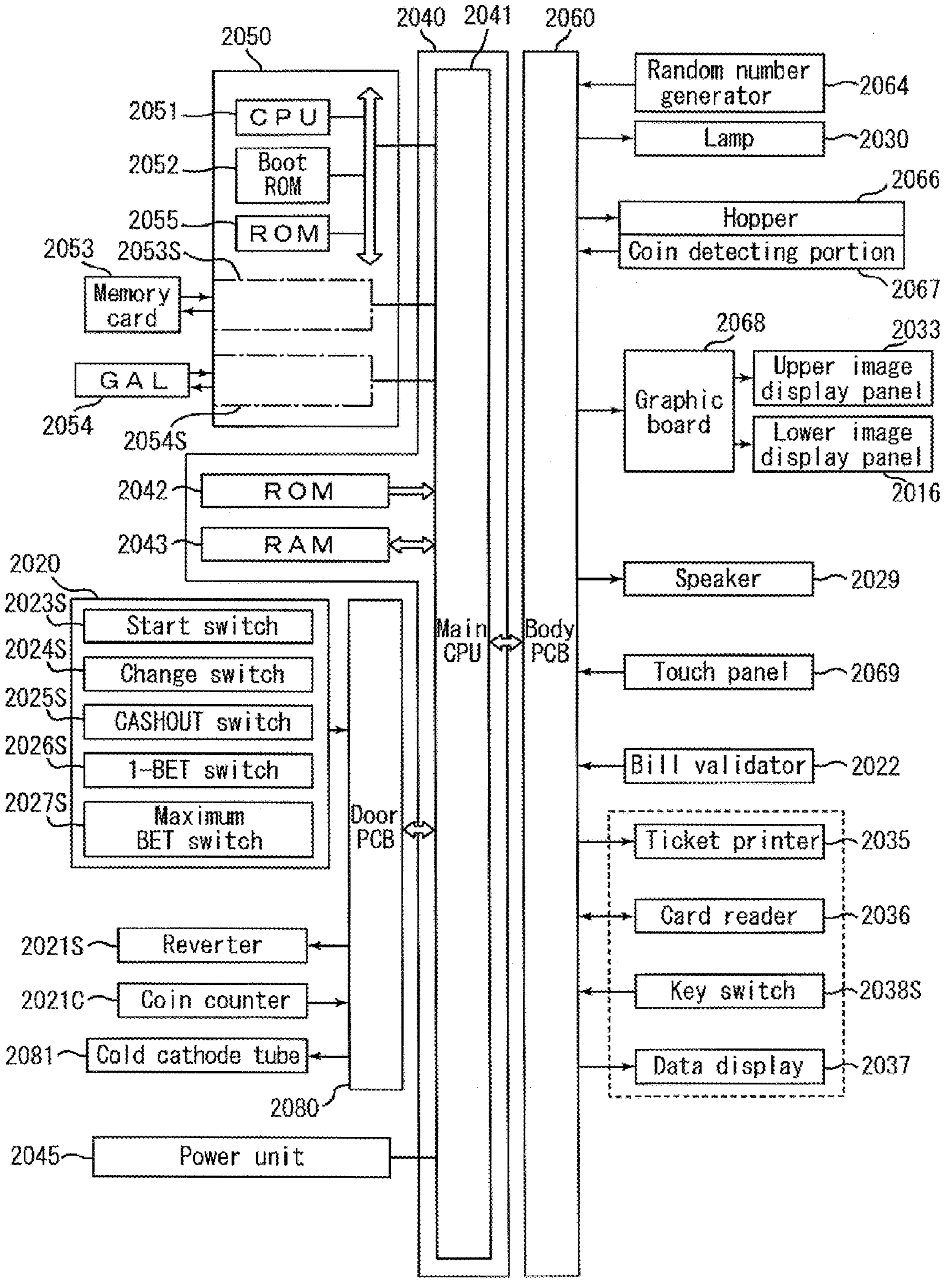
FIG. 57 is a block diagram showing an internal configuration of the slot machine shown in FIG. 56.

FIG. 57 is a block diagram showing an internal configuration of the slot machine shown in FIG. 56.

A gaming board 2050 is provided with a CPU (Central Processing Unit) 2051, a ROM 2055, and a boot ROM 2052 which are interconnected to one another by an internal bus, a card slot 2053S corresponding to a memory card 2053, and an IC socket 2054S corresponding to a GAL (Generic Array Logic) 2054.

The memory card 2053 includes a nonvolatile memory such as CompactFlash (registered trade mark), and stores a game program. The game program includes a symbol determination program. The symbol determination program is a program for determining symbols to be rearranged in the display blocks 2028.

Further, the card slot 2053S is configured so as to allow the memory card 2053 to be inserted thereinto or removed therefrom, and is connected to the mother board 2040 by an IDE bus. Therefore, the memory card 2053 can be removed from the card slot 2053S, and then another game program is written into the memory card 2053, and the memory card 2053 can be inserted into the card slot 2053S, to change the type and contents of the game played on the slot machine 2010. The game program includes a program according to progress of the game. Further, the game program includes image data and sound data to be outputted during the game. The game program includes image data showing the selection images 2302, and the like. Further, the game program includes: symbol-table data for a normal game, showing a symbol table for a normal game (cf. FIG. 59) which shows the correspondence relationship among each symbol in each symbol array of the display blocks, the code number and the random number value; odds data showing the correspondence relationship (cf. FIG. 61) among the kind and the number of the symbols rearranged on a pay line 2300 (cf. FIG. 60) and the amount of payout; number-of-games determination table data showing a number-of-games determination table (cf. FIG. 66); determination table data of number of the to-be-added special symbols which shows a table (cf. FIG. 69) for determining the number of the to-be-added special symbols; symbol-array determination table data showing a symbol-array determination table (cf. FIG. 71); and code-number determination-table data showing a code-number determination table (cf. FIG. 72), and the like.

The CPU 2051, the ROM 2055 and the boot ROM 2052 interconnected to one another by an internal bus are connected to the mother board 2040 through the PCI bus. The PCI bus not only conducts signal transmission between the mother board 2040 and the gaming board 2050, but also supplies power from the mother board 2040 to the gaming board 2050.

The mother board 2040 is configured using a commercially available general-purpose mother board (a print wiring board on which fundamental components of a personal computer are mounted), and provided with the main CPU 2041, a ROM (Read Only Memory) 2042, and a RAM (Random Access Memory) 2043. The mother board 2040 corresponds to the controller in the present invention.

The ROM 2092 comprises a memory device such as a flash memory, and stores a program such as a BIOS (Basic Input/Output System) executed by the main CPU 2041 and permanent data. When the BIOS is executed by the main CPU 2091, processing for initializing a predetermined peripheral device is conducted, concurrently with start of processing for loading the game program stored in the memory card 2053 via the gaming board 2050. It is to be noted that, in the present invention, the ROM 2042 may or may not be data rewritable one.

The RAM 2043 stores data and a program such as a symbol-determination program, which are used at the time of operation of the main CPU 2041. Further, the RAM 2043 is capable of storing a game program.

Moreover, the RAM 2043 stores data of the number of credits, the numbers of coin-ins and coin-outs in one game, and the like. Further, the RAM 2043 stores symbol-table data for a feature game, showing a symbol table for a feature game (cf. FIGS. 73A and 73B) which shows the correspondence relationship among each symbol on each symbol array of the display blocks, the code number and the random number value, data showing the number T of games, and the like.

Moreover, the mother board 2040 is connected with a later-described body PCB (Printed Circuit Board) 2060 and a door PCB 2080 through respective USBs. Further, the mother board 2090 is connected with a power supply unit 2095.

The body PCB 2060 and the door PCB 2080 are connected with equipment and a device that generate an input signal to be inputted into the main CPU 2041, and equipment and a device operations of which are controlled by a control signal outputted from the main CPU 2041. The main CPU 2091 executes the game program stored in the RAM 2043 based on the input signal inputted into the main CPU 2041, and thereby executes the predetermined arithmetic processing and stores the result thereof into the RAM 2043, or transmits a control signal to each equipment and device as processing for controlling each equipment and device.

The body PCB 2060 is connected with a lamp 2030, a hopper 2066, a coin detecting portion 2067, a graphic board 2068, the speaker 2029, the touch panel 2069, the bill validator 2022, the ticket printer 2035, the card reader 2036, a key switch 2038S, the data display 2037, and a random number generator 2064. The lamp 2030 is lighted in a predetermined pattern based on control signals outputted from the main CPU 2041.

The hopper 2066 is installed inside the cabinet 2011, and pays out a predetermined number of coins based on the control signal outputted from the main CPU 2041, from a coin payout exit 2019 to the coin tray 2018. The coin detecting portion 2067 is provided inside the coin payout exit 2019, and outputs an input signal to the main CPU 2041 in the case of detecting payout of the predetermined number of coins from the coin payout exit 2019.

The graphic board 2068 controls image display to the upper image display panel 2033 and the lower image display panel 2016 based on the control signal outputted from the main CPU 2041. In the respective display blocks 2028 on the lower image display panel 2016, symbols are displayed in a scrolling manner or in a stopped state. The number of credits stored in the RAM 2043 is displayed to the number-of-credits display portion 2400 of the lower image display panel 2016. Further, the number of betted coins is displayed to the number-of-bets display portion 2901 of the lower image display panel 2016. Furthermore, the number of coin-outs is displayed to the payout display portion 2402 of the lower image display panel 2016.

The graphic board 2068 comprises a VDP (Video Display Processor) for generating image data based on the control signal outputted from the main CPU 2041, a video RAM for temporarily storing image data generated by the VDP, and the like. It is to be noted that image data used in generation of the image data by the VDP is included in the game program read from the memory card 2053 and stored into the RAM 2093.

The bill validator 2022 not only discriminates a regular bill from a false bill, but also accepts the regular bill into the cabinet 2011. Upon acceptance of the regular bill, the bill validator 2022 outputs an input signal to the main CPU 2041 based on a face amount of the bill. The main CPU 2041 stores in the RAM 2043 the number of credits corresponding to the face amount of the bill transmitted with the input signal.

The ticket printer 2035 prints on a ticket a barcode as coded data of the number of credits stored in the RAM 2043, a date, and an identification number of the slot machine 2010, and the like, based on the control signal outputted from the main CPU 2041, and outputs the ticket as the ticket 2039 with a barcode. The card reader 2036 reads data from the smart card and transmits the read data to the main CPU 2041, and writes data onto the smart card based on the control signal from the main CPU 2041. The key switch 2038S is provided on the key pad 2038, and outputs a predetermined input signal to the main CPU 2041 when the key pad 2038 is operated by the player. The data display 2037 displays data read by the card reader 2036 and data inputted by the player via the key pad 2038, based on the control signal outputted from the main CPU 2091.

The random number generator 2064 generates a random number at a predetermined timing. It is to be noted that the range of the random number generated by the random number generator 2064 is from 0 to 65535.

The door PCB 2080 is connected with the control panel 2020, a reverter 2021S, a coin counter 2021C, and a cold cathode tube 2081. The control panel 2020 is provided with a start switch 23S corresponding to the start button 2023, a change switch 2024S corresponding to the change button 2024, a CASHOUT switch 2025S corresponding to the CASHOUT button 2025, a 1-BET switch 2026S corresponding to the 1-BET button 2026, and a maximum BET switch 2027S corresponding to the maximum BET button 2027. Each of the switches 2023S to 2027S outputs an input signal to the main CPU 2041 when each of the buttons 2023 to 2027 corresponding thereto is operated by the player.

The coin counter 2021C is provided inside the coin receiving slot 2021, and discriminates a regular coin from a false coin inserted into the coin receiving slot 2021 by the player. Coins other than the regular Coin are discharged from the coin payout exit 2019. Further, the coin counter 2021C outputs an input signal to the main CPU 2041 in detection of the regular coin.

The reverter 2021S operates based on the control signal outputted from the main CPU 2041, and distributes a coin recognized by the coin counter 2021C as the regular coin into a cash box (not shown) or the hopper 2066, which are disposed in the slot machine 2010. Namely, when the hopper 2066 is filled with coins, the regular coin is distributed into the cash box by the reverter 2021S. On the other hand, when the hopper 2066 is not filled with coins, the regular coin is distributed into the hopper 2066. The cold cathode tube 2081 functions as a back light installed on the rear face side of the lower image display panel 2016 and the upper image display panel 2033, and is lighted up based on the control signal outputted from the main CPU 2041.

Figure 58:
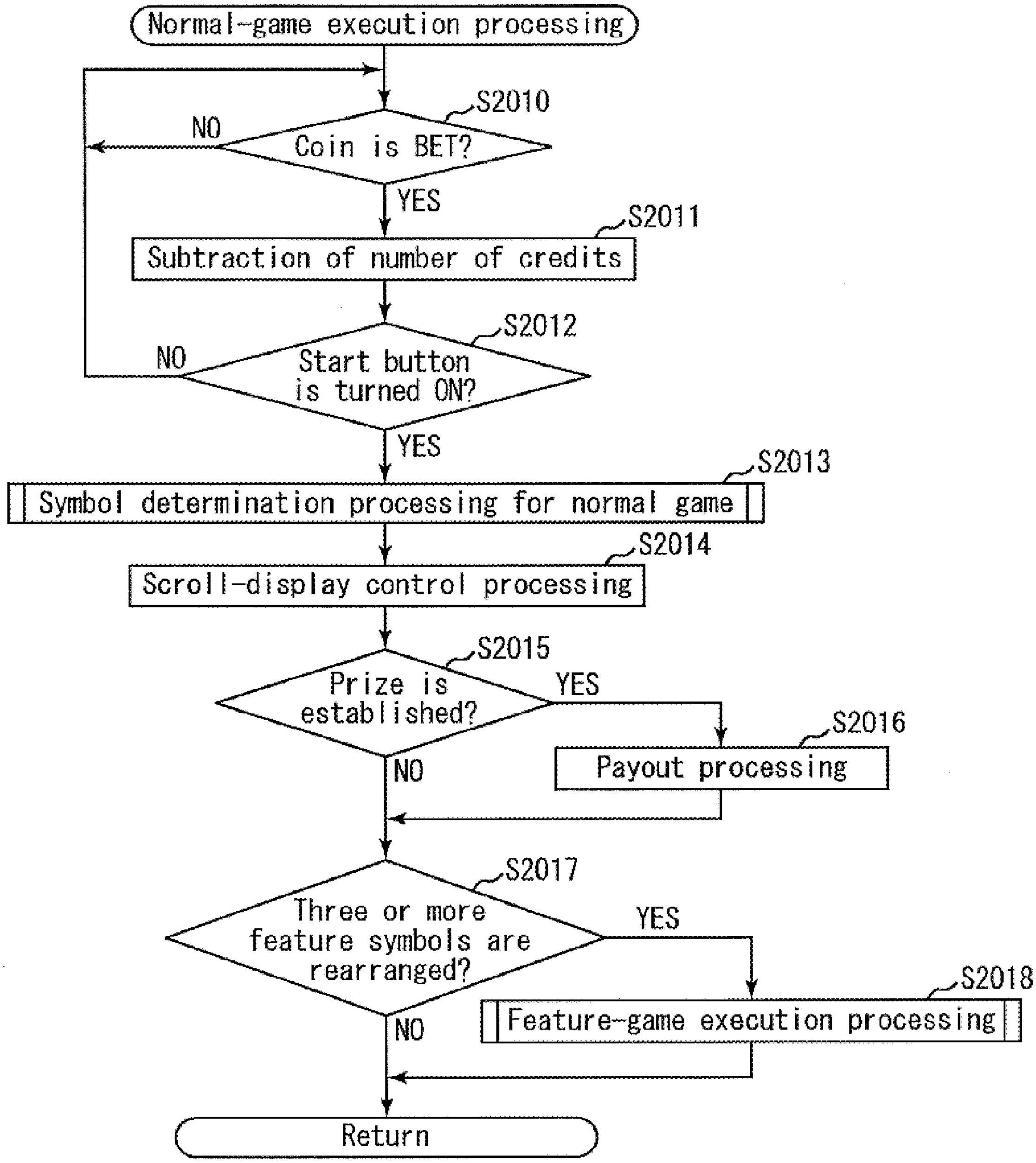
FIG. 58 is a flowchart showing normal-game execution processing.

FIG. 58 is a flowchart illustrating normal-game execution processing.

The game executed by the normal-game execution processing (except for the case where feature-game execution processing is executed in step s2018) corresponds to the normal game in the present invention.

The game executed by the feature-game execution processing in step s2018 corresponds to the special game in the present invention.

First, the main CPU 2041 determines whether or not a coin has been betted (step s2010). In this processing, the main CPU 2041 determines whether or not to have received an input signal that is outputted from the 1-BET switch 2026S when the 1-BET button 2026 is operated, or an input signal that is outputted from the maximum BET switch 2027S when the maximum BET button 2027 is operated. When the main CPU 2041 determines that the coin has not been betted, the processing is returned to step s2010.

On the other hand, when determining that the coin has been betted in step s2010, the main CPU 2041 conducts processing for making a subtraction from the number of credits stored in the RAM 2043 according to the number of betted coins (step s2011). It is to be noted that, when the number of coins to be betted is larger than the number of credits stored in the RAM 2043, the main CPU 2041 does not conduct the processing for making a subtraction from the number of credits stored in the RAM 2043, and the processing is returned to step s2010. Further, when the number of coins to be betted exceeds the upper limit of the number of coins that can be betted in one game (500 coins in the present embodiment), the main CPU 2041 does not conduct the processing for making a subtraction from the number of credits stored in the RAM 2043, and the processing is proceeded to step s2012.

Next, the main CPU 2041 determines whether or not the start button 2023 has been turned ON (step s2012). In this processing, the main CPU 2041 determines whether or not to have received an input signal that is outputted from the start switch 23S when the start button 2023 is pressed.

When the main CPU 2041 determines that the start button 2023 has not been turned on, the processing is returned to step s2010.

It is to be noted that, when the start button 2023 is not turned ON (e.g. when the start button 2023 is not turned ON and a command to end the game is inputted), the main CPU 2041 cancels a subtraction result in step s2011.

On the other hand, when determining in step s2012 that the start button 2023 is turned ON, the main CPU 2041 executes the symbol determination processing for the normal game (step s2013).

FIG. 59 is the symbol table for the normal game which shows the correspondence relationship among each symbol in each Symbol array of the display blocks, the code number and the random number value. It is to be noted that the first array means the leftmost column of the display blocks 2028.

In the symbol determination processing for the normal game, the main CPU 2041 executes the symbol determination program stored in the RAM 2043, to determine the code numbers at stopping the symbols. Specifically, random number values are acquired, and the code numbers at stopping the symbols in each symbol array of the display blocks 2028 are determined, based upon the acquired random number values and the symbol table for the normal game. The symbol determination program for the normal game is later described in detail using the drawing.

As shown in FIG. 59, 14 wild symbols are present in the symbol table for the normal game.

A number of 14 wild symbols correspond to the predetermined number of special symbols in the present invention.

Although the case where the predetermined number is 14 is described in the present embodiment, the predetermined number in the present invention is not particularly limited, and may be 20, for example.

Next, in step s2014, the main CPU 2041 performs scroll-display control processing. This processing is processing for controlling the display so as to rearrange the symbols determined in step s2013 after starting scroll of the symbols.

Next, the main CPU 2041 determines whether or not a prize has been established (step s2015). Here, establishment of the prize in the present embodiment is described.

Figure 60:
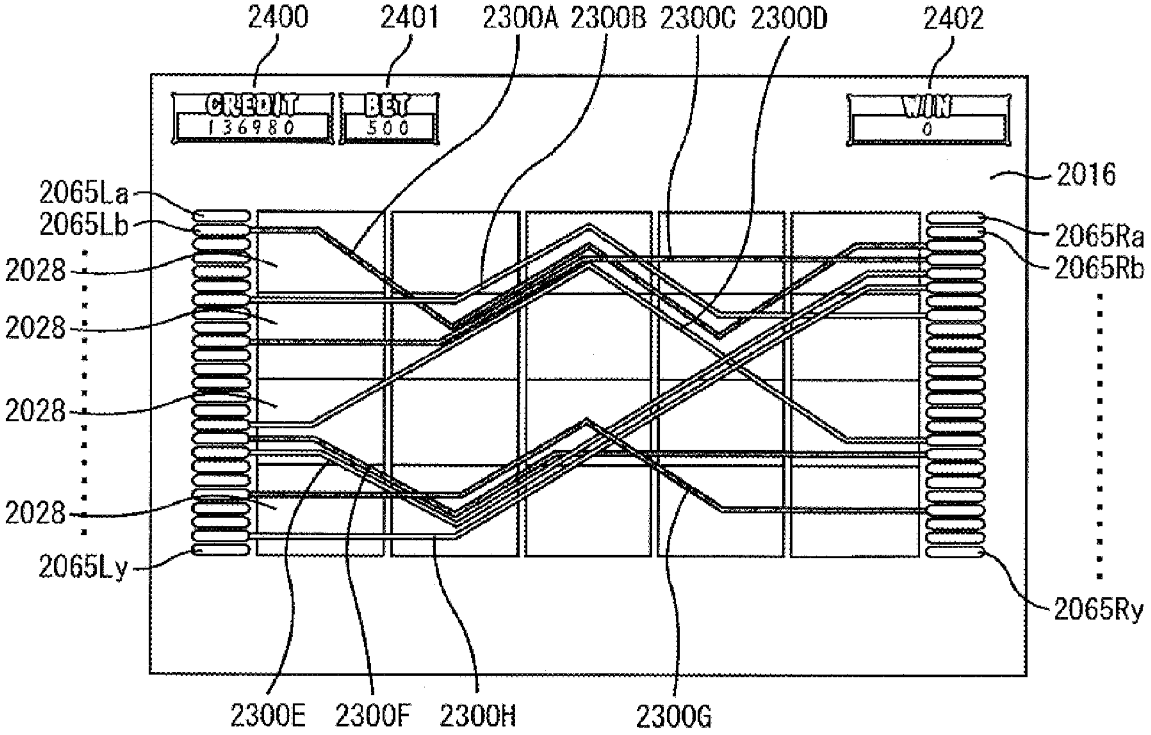
FIG. 60 is a view showing an exemplary image displayed to a lower image display panel provided in the slot machine according to one embodiment of the present invention.

FIG. 60 is a view showing an exemplary image displayed to the lower image display panel provided in the slot machine according to one embodiment of the present invention.

FIG. 61 is a view showing a correspondence relationship among the kind and the number of symbols rearranged on the pay line, and the amount of payout.

As shown in FIG. 60, on the left side of the display blocks 2028, 25 pay-line generating portions 2065L (2065La, 2065Lb, 2065Lc, 2065Ld, 2065Le, 2065Lf, 2065Lg, 2065Lh, 2065Li, 2065Lj, 2065Lk, 2065Ll, 2065Lm, 2065Ln, 2065Lo, 2065Lp, 2065Lq, 2065Lr, 2065Ls, 2065Lt, 2065Lu, 2065Lv, 2065Lw, 2065Lx, 2065Ly) are displayed.

Similarly, on the right side of the display blocks 2028, 25 pay-line generating portions 2065R (2065Ra, 2065Rb, 2065Rc, 2065Rd, 2065Re, 2065Rf, 2065Rg, 2065Rh, 2065Ri, 2065Rj, 2065Rk, 2065Rl, 2065Rm, 2065Rn, 2065Ro, 2065Rp, 2065Rq, 2065Rr, 2065Rs, 2065Rt, 2065Ru, 2065Rv, 2065Rw, 2065Rx, 2065Ry) are displayed.

Each of the pay-line generating portions 2065L forms a pair with any one of the pay-line generating portions 2065R. The pay line 2300 is previously defined as a line from each pay-line generating portion 2065L to the pay-line generating portion 2065R which is paired with that pay-line generating portion 2065L. The pay line 2300A connects the pay-line generating portion 2065Lb and the pay-line generating portion 2065Rc. The pay line 2300B connects the pay-line generating portion 2065Lg and the pay-line generating portion 2065Rh. The pay line 2300C connects the pay-line generating portion 2065Lj and the pay-line generating portion 2065Rd. The pay line 2300D connects the pay-line generating portion 2065Lp and the pay-line generating portion 2065Rq. The pay line 2300E connects the pay-line generating portion 2065Lr and the pay-line generating portion 2065Re. The pay line 2300F connects the pay-line generating portion 2065Lq and the pay-line generating portion 2065Rr. The pay line 2300G connects the pay-line generating portion 2065Lu and the pay-line generating portion 2065Rv. The pay line 2300H connects the pay-line generating portion 2065Lx and the pay-line generating portion 2065Rf.

It is to be noted that only eight pay lines 2300 are drawn in FIG. 60 for the sake of facilitating the explanation. However, in the present embodiment, 25 pay lines 2300 are defined.

Establishment of the prize in the present embodiment refers to a case where at least one combination of two or more symbols of the same type out of "10", "J", "4", "K", "FLOWER 1", "FLOWER 2", "BIRD" and "FISH" are rearranged on one of the pay lines 2300. It is to be noted that "WILD" as the wild symbol is a symbol which can be substituted for another symbol. Namely, in a case where one symbol of "10" and one symbol of "WILD" are displayed on the pay line, it is regarded as a display of two symbols of "10" on the pay line, and determined as winning of the prize.

In the processing of step s2015, the main CPU 2041 counts the number of symbols of each kind rearranged in step s2014 on each pay line 2300. The main CPU 2041 then determines whether or not the number of counted symbols is equal to or more than two.

When determining that the prize has been established, the main CPU 2041 executes processing relating to the payout of coins (step s2016). In the processing, the main CPU 2041 determines the amount of payout based on the numbers of symbols rearranged on the pay line 2300 with reference to the odds data stored in the RAM 2043. The odds data is data indicative of the correspondence relationship between the number of symbols rearranged on the pay line 2300 and the amount of payout (see FIG. 61). It is to be noted that an amount of payout is doubled along with each "WILD" displayed on the pay line 2300 where the prize has been established. Namely, when three symbols of "WILD" are displayed on the pay line 2300 where the prize has been established, an amount of payout is octuplicated.

In the present embodiment, the case is described where the prize is determined to be established when at least one combination of two or more symbols of the same type out of "10", "J", "Q", "K", "FLOWER 1", "FLOWER 2", "BIRD" and "FISH" are rearranged on one of the pay lines 2300. However, in the present invention, the pay line may not be provided, and a prize may be determined to be established when at least one combination of two or more symbols of the same type out of "10", "J", "Q", "K", "FLOWER 1", "FLOWER 2", "BIRD" and "FISH" are rearranged among symbols rearranged in the display blocks 2028.

Figure 62A:
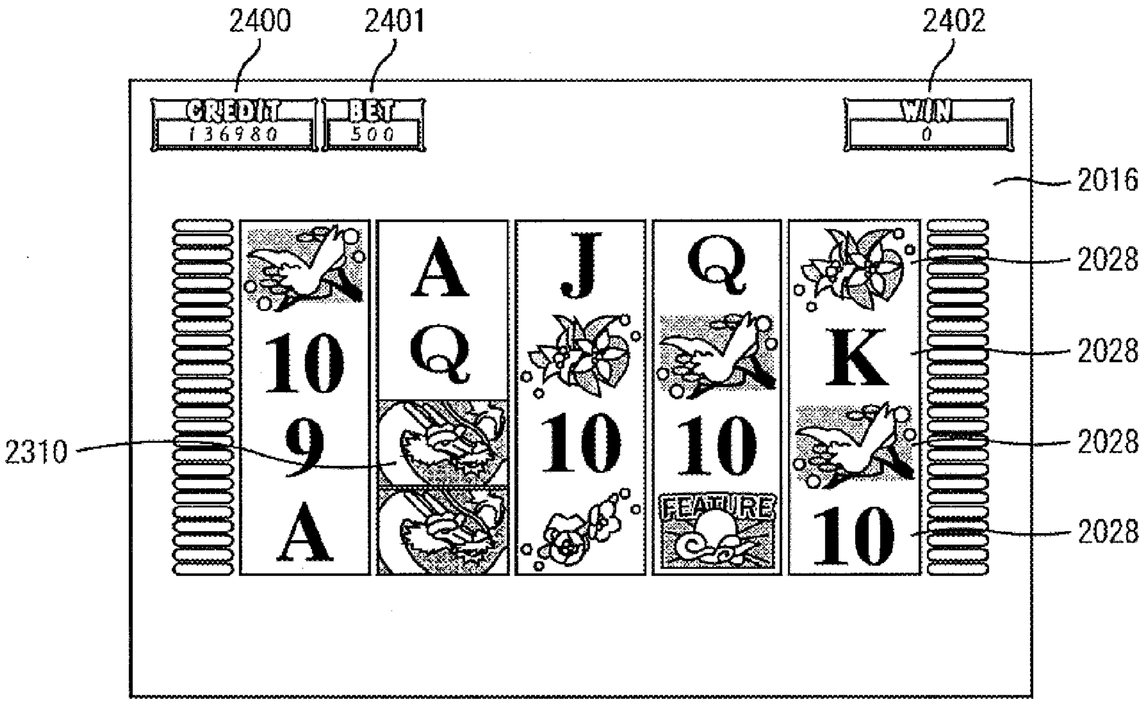
FIG. 62A is a view showing an exemplary image displayed to the lower image display panel provided in the slot machine according to one embodiment of the present invention.

FIG. 62A is a view showing an exemplary image displayed to the lower image display panel provided in the slot machine according to one embodiment of the present invention.

Figure 62B:
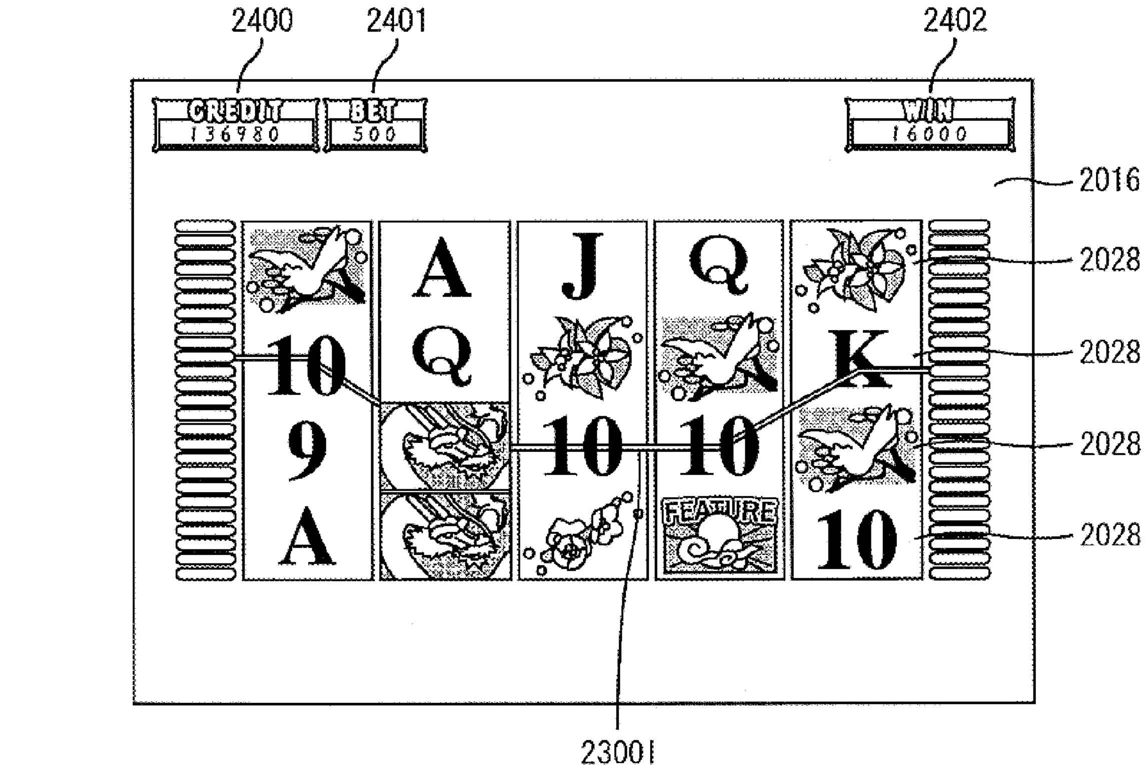
FIG. 62B is a view showing an exemplary image displayed to the lower image display panel provided in the slot machine according to one embodiment of the present invention.

FIG. 62B is a view showing an exemplary image displayed to the lower image display panel provided in the slot machine according to one embodiment of the present invention.

As a result of the scroll-display control processing in step s2014, when the symbols shown in FIG. 62A are rearranged, the pay line 2300I is displayed as shown in FIG. 62B. On the pay line 2300I, three symbols of "10", one symbol of "WILD", and one symbol of "K" are rearranged.

In this case, it is considered that four symbols of "10" are rearranged and 3000 coins, obtained by multiplying 500 as the number of betted coins by 6, is determined as an amount of payout. Further, it is considered that two symbols of "K" are rearranged and 5000 coins, obtained by multiplying 500 as the number of betted coins by 10, is determined as the amount of payout. Moreover, since one symbol of "WILD" is displayed on the pay line 2300I where the prize has been established, the amount of payout is doubled. Namely, 16000 coins, obtained by adding 5000 to 3000 to make 8000 and then multiplying 8000 by 2, are determined as the amount of payout.

In the case of accumulating coins, the main CPU 2041 conducts processing for adding the number of credits corresponding to the determined amount of payout to the number of credits stored in the RAM 2043. On the other hand, in the case of paying out coins, the main CPU 2041 transmits a control signal to the hopper 2066 in order to pay out coins in an amount corresponding to the determined amount of payout.

When determining in step s2015 that a prize has not been established, or after executing the processing of step s2016, the main CPU 2091 determines whether or not three or more feature symbols have been rearranged (step s2017). In this processing, the main CPU 2041 determines whether or not three or more feature symbols have been rearranged in the display blocks 2028, without considering the pay line 2300.

When determining in step s2017 that three or more feature symbols have been rearranged, the main CPU 2041 executes the feature-game execution processing (step s2018). In the feature-game execution processing, a free game with the number of wild symbols increased is executed. The feature-game execution processing is later described in detail using the drawing.

The rearrangement of three or more feature symbols corresponds to the predetermined condition in the present invention.

When determining in step s2017 that three or more feature symbols are not rearranged or after executing the processing of step s2018, the main CPU 2041 completes the present subroutine.

The normal game in the present invention is not limited to the game executed by the above-mentioned normal-game execution processing, and the design of the game can be changed as appropriate.

Figure 63:
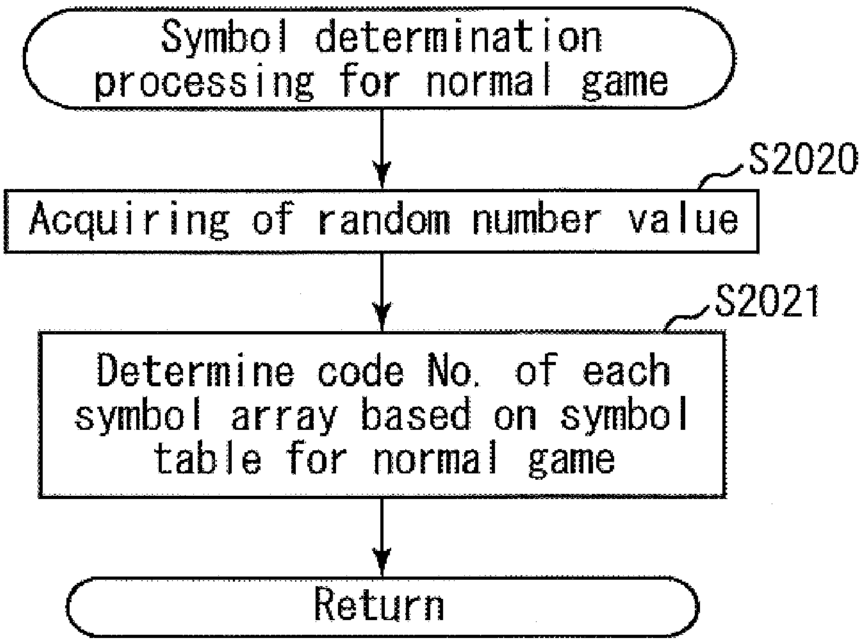
FIG. 63 is a flowchart showing a subroutine of symbol determination processing for a normal game.

FIG. 63 is a flowchart showing a subroutine of symbol determination processing for a normal game.

This processing is processing performed by the main CPU 2041 executing the symbol determination program stored in the RAM 2043.

First, the main CPU 2041 acquires random number values from the random number generator 2064 (step s2020). In this processing, the main CPU 2091 acquires five random number values corresponding to the respective symbol arrays of the display blocks 2028.

Next, based upon the acquired five random number values and the symbol table for the normal game, the main CPU 2041 determines a code number of each symbol array of the display blocks 2028 at stopping symbols (step s2021). For example, in a case where the random number value for the first array is "23035", "07" is determined as the code number of the first array. It should be noted that a code number of a symbol array corresponds to the code numbers of symbols to be rearranged to the display blocks 2028 in the first row out of the display blocks 2028 that are put in four rows.

After executing the processing of step s2021, the main CPU 2041 completes the present subroutine.

In the present embodiment, the case has been described where the random number generator 2064 is provided and a random number is extracted from the random number generator (a case of using a so-called hardware random number). However, in the present invention, a random number may be generated on the program (a case of using a so-called software random number).

Next, the feature-game execution processing is described with reference to FIG. 64.

Figure 64:
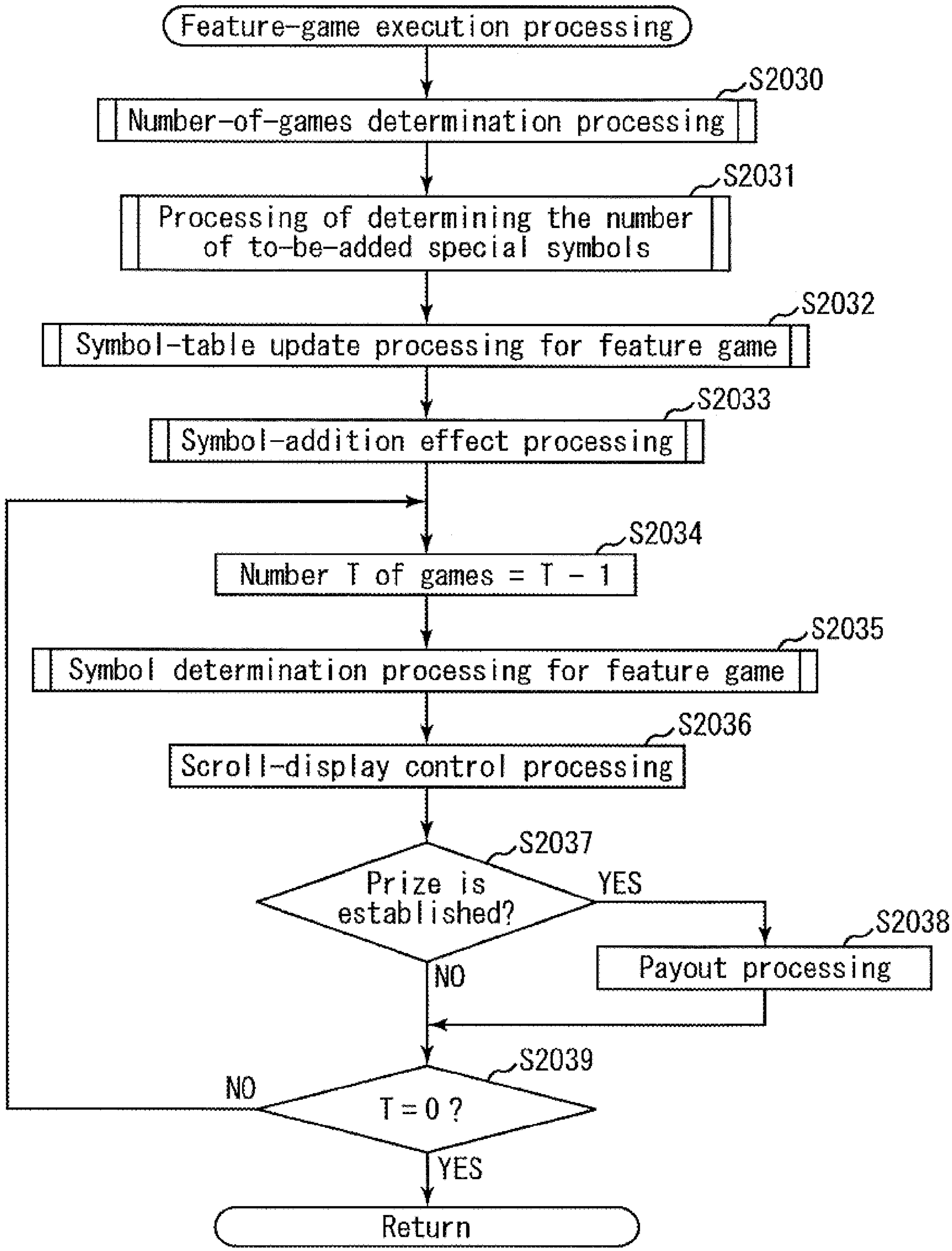
FIG. 64 is a flowchart showing a subroutine feature-game execution processing.

FIG. 64 is a flowchart showing a subroutine of feature-game execution processing.

A game executed by the feature-game execution processing corresponds to the special game in the present invention. It should be noted that the player can play the game without betting coins in the feature game.

First, the main CPU 2041 executes the number-of-games determination processing (step s2030). In the number-of-games determination processing, the main CPU 2041 determines the number T of games based upon the selection image 2307 (cf. FIG. 67A) selected by the player, and stores the number T of games into the RAM 2043. The number-of-games determination processing is later described in detail using the drawing.

Next, the main CPU 2091 executes processing of determining the number of the to-be-added special symbols (step s2031). In the processing of determining the number of the to-be-added special symbols, the main CPU 2091 determines the number of the to-be-added wild symbols as the special symbols based upon the selection image 2302 (cf. FIG. 55A) selected by the player. The processing of determining the number of the to-be-added special symbols is later described in detail using the drawing.

Next, the main CPU 2041 executes the symbol-table update processing for the feature game (step s2032). In the symbol-table update processing for the feature game, the main CPU 2041 updates the symbol table for the feature game based upon the number of the to-be-added wild symbols, which has been determined by the processing of determining the number of the to-be-added special symbols. The symbol-table update processing for the feature game is later described in detail using the drawing.

Next, in step s2033, the main CPU 2041 executes symbol-addition effect processing.

The symbol-addition effect processing is described later using the drawing.

Next, the main CPU 2041 stores a numeric value obtained by subtracting 1 from the number T of games stored in the RAM 2043, into the RAM 2043 as a new number T of games (step s2034).

Next, the main CPU 2041 executes the symbol determination processing for the feature game (step s2035).

FIGS. 73A and 73B are examples of a symbol table for the feature game, each showing the correspondence relationship among each symbol in each symbol array of the display block, the code number and the random number value.

The symbol table for the feature game shown in each of FIGS. 73A and 733 is stored into the RAM 2043 by later-described symbol-table update processing for the feature game.

In the symbol determination processing for the feature game, the main CPU 2041 executes the symbol determination program stored in the RAM 2043, to determine code numbers at stopping the symbols. Specifically, the main CPU 2041 acquires random number values, and determines the code numbers of respective symbol arrays at the time of stopping the symbols based upon the acquired random number values and the symbol table for the feature game. The symbol determination processing for the feature game is later described in detail using the drawing.

Next, in step s2036, the main CPU 2041 performs the scroll-display control processing. This processing is processing for controlling the display so as to rearrange the symbols determined in step s2035 after starting the scrolling of the symbols.

In this processing, the symbols including wild symbols in a total number of 14 as the above-mentioned predetermined number and the number of the to-be-added special symbols, which has been determined in step s2031, are scroll-displayed.

Next, the main CPU 2041 determines whether or not a prize has been established (step s2037).

As described above, establishment of the prize in the present embodiment refers to a case where at least one combination of two or more symbols of the same type out of "10", "J", "Q", "K", "FLOWER 1", "FLOWER 2", "BIRD" and "FISH" are rearranged on one of the pay lines 2300. It is to be noted that "WILD" as the wild symbol is a symbol which can be substituted for another symbol. In the feature game, since the number of the wild symbols has become larger than that in the normal game, the prize is more likely to be established compared to the normal game.

In the processing of step s2037, the main CPU 2041 counts the number of symbols of each kind rearranged in step s2036 on each pay line 2300. The main CPU 2041 then determines whether or not the counted number is equal to or more than two.

When determining that the prize has been established, the main CPU 2041 executes processing relating to the payout of coins (step s2038). Since this processing is the same as the processing of step s2016, the description thereof is omitted here.

Next, the main CPU 2041 determines whether or not the number T of games stored in the RAM 2043 is zero (step s2039). When determining that the number T of games is not zero, the main CPU 2041 returns the processing to step s2034. On the other hand, when determining that the number T of games is 0, the main CPU 2041 completes the present subroutine.

Figure 65:
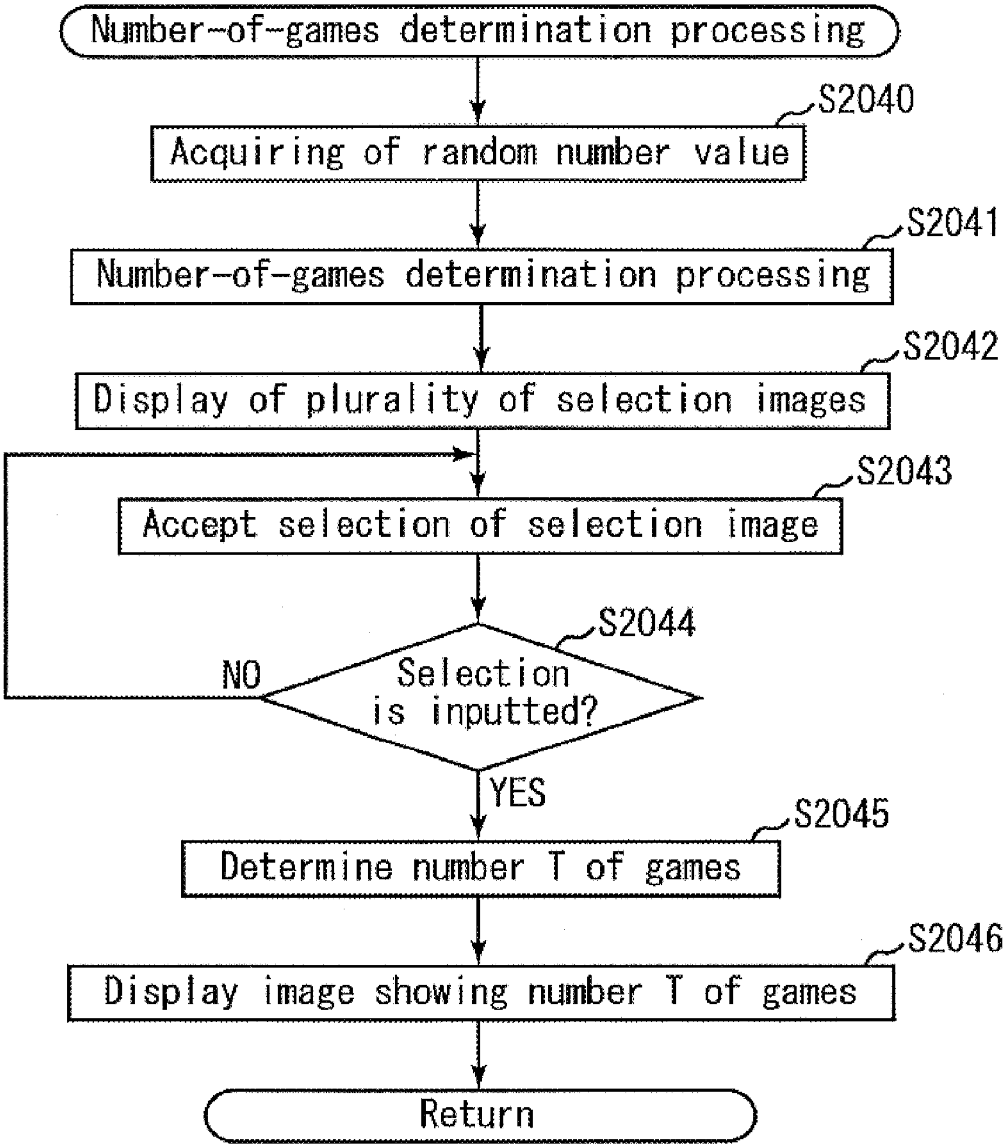
FIG. 65 is a flowchart showing a subroutine of number-of-games determination processing.

FIG. 65 is a flowchart showing a subroutine of the number-of-games determination processing.

First, the main CPU 2041 acquires random number values from the random number generator 2064 (step s2040). In this processing, the main CPU 2041 acquires five random number values corresponding to the respective selection images 307 (a selection image 2307A, a selection image 2307B, a selection image 2307C, a selection image 2307D, a selection image 2307E (cf. FIG. 67A)).

Next, the main CPU 2041 determines the number of games corresponding to each selection image 2307 (step s2041). In this processing, the main CPU 2041 determines the number of games corresponding to each selection image 2307, based upon the random number value acquired in step s2040 and the number-of-games determination table shown in FIG. 66.

FIG. 66 is a view showing the number-of-games determination table.

The number-of-games determination table shows the correspondence relationship between the number of games and the random number value.

For example, when random number values corresponding to the selection image 2307A, the selection image 2307B, the selection image 2307C, the selection image 2307D and the selection image 2307E are respectively 12235, 23123, 62387, 32332 and 23423, the numbers of games of 5, 10, 30, 15 and 10 respectively correspond to the selection image 2307A, the selection image 2307B, the selection image 2307C, the selection image 2307D and the selection image 2307E.

Next, the main CPU 2041 displays the selection image 2307A, the selection image 2307B, the selection image 2307C, the selection image 2307D and the selection image 2307E to the lower part of the lower image display panel 2016 (step s2042). The main CPU 2041 then accepts the selection of the selection image 2307 made by the player (step s2043).

Figure 67A:
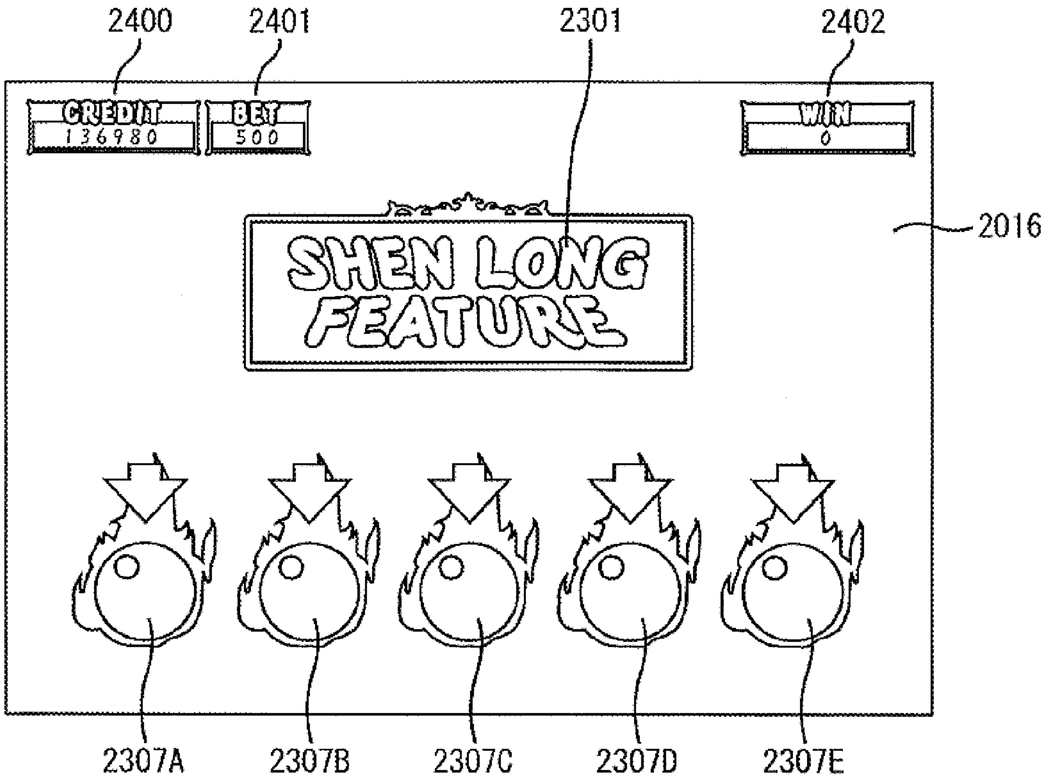
FIG. 67A is a view showing an exemplary image displayed to the lower image display panel provided in the slot machine according to one embodiment of the present invention.

FIG. 67A is a view showing an exemplary image displayed to the lower image display panel provided in the slot machine according to one embodiment of the present invention.

As shown in FIG. 67A, a feature-game start image 2301 showing the start of the feature game is displayed to the center part of the lower image display panel 2016.

To the lower part of the lower image display panel 2016, five selection images 307 (the selection image 2307A, the selection image 2307B, the selection image 2307C, the selection image 2307D, the selection image 2307E) are displayed. A player can select the selection image 2307 by touching the touch panel 2069 (cf. FIG. 57) provided on the lower image display panel 2016 with his or her finger or the like.

Next, the main CPU 2041 determines whether or not an input for selecting the selection image 2307 has been made (step s2044). In this processing, the main CPU 2091 determines whether or not to have received an input signal for selecting the selection image 2307 from the touch panel 2069. By the player touching a place in the vicinity of where the selection image 2307A is displayed on the lower image display panel 2016 with his or her finger or the like, the input signal for selecting the selection image 2307A is transmitted from the touch panel 2069 to the main CPU 2041. When determining not to have received the input for selecting the selection image 2307, the main CPU 2041 returns the processing to step s2043.

On the other hand, when determining in step s2044 that the input for selecting the selection image 2307 has been made, the main CPU 2041 determines the number of games corresponding to the selection image 2307 selected by the player, as the number T of games (step s2045).

For example, in a case where 5, 10, 30, 15 and 10 games respectively correspond to the selection image 2307A, the selection image 2307B, the selection image 2307C, the selection image 2307D and the selection image 2307E, and when the selection image 2307B is selected by the player, 10 games are determined as the number T of games. Next, the main CPU 2041 displays a number-of-games determination image showing the number T of games of the feature game to the center part of the lower image display panel 2016 (step s2046).

Figure 67B:
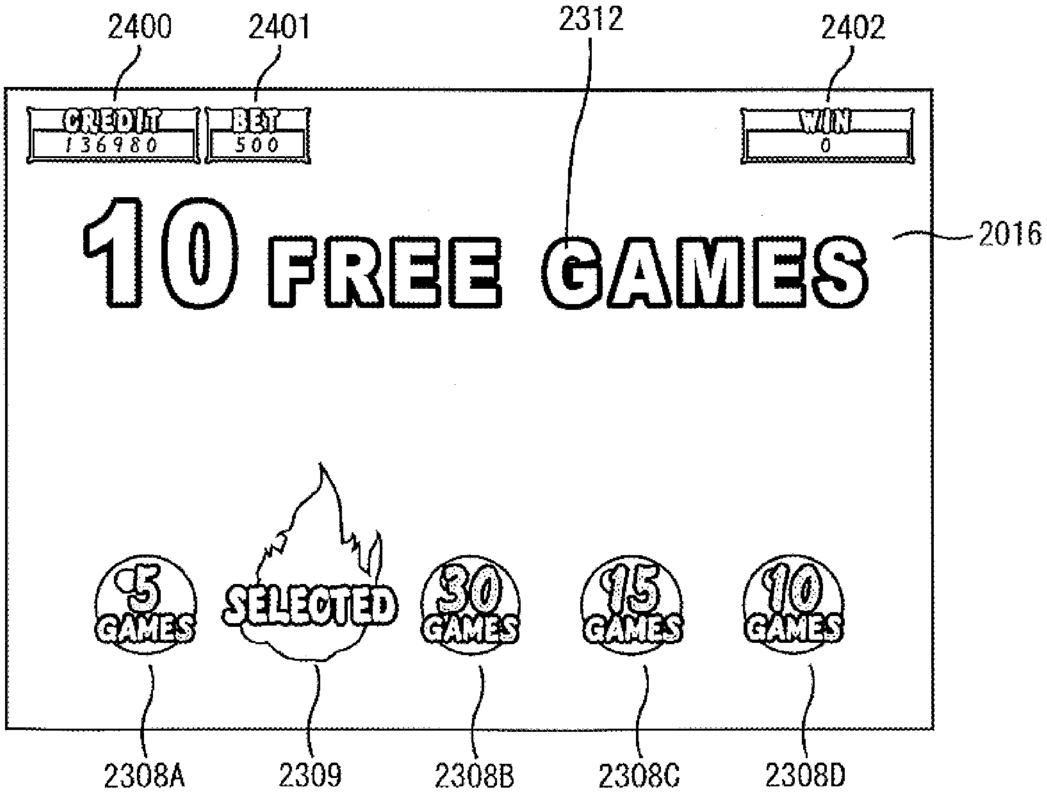
FIG. 67B is a view showing an exemplary image displayed to the lower image display panel provided in the slot machine according to one embodiment of the present invention.

FIG. 67B is a view showing an exemplary image displayed to the lower image display panel provided in the slot machine according to one embodiment of the present invention.

As shown in FIG. 67B, a number-of-games determination image 2312 showing the number T of games of the feature game is displayed to the center part of the lower image display panel 2016. In FIG. 67B, the number-of-games determination image 2312 shows that the number T of games of the feature game is 10. Further, the number-of-games images 2308 (a number-of-games image 2308A, a number-of-games image 2308B, a number-of-games image 2308C, a number-of-games image 2308D) each showing the number T of games in the case of selecting another selection image 2307 are displayed to the lower part of the lower image display panel 2016. The number-of-games image 2308A, the number-of-games image 2308B, the number-of-games image 2308C and the number-of-games image 2308D respectively show that the numbers T of feature games would have been 5, 30, 15 and 10 if the selection image 2307 displayed in the corresponding place had been selected by the player. Further, a selected image 309 shows that the selection image 2307B having been displayed at this position has been selected by the player.

After executing the processing of step s2046, the main CPU 2041 completes the present subroutine.

In the present embodiment, the case has been described where the number of games corresponding to each selection image 2307 is determined based upon the acquired random number value and the number-of-games determination table shown in FIG. 66. However, in the present invention, the number of games corresponding to each selection image 2307 may be previously determined.

Figure 68:
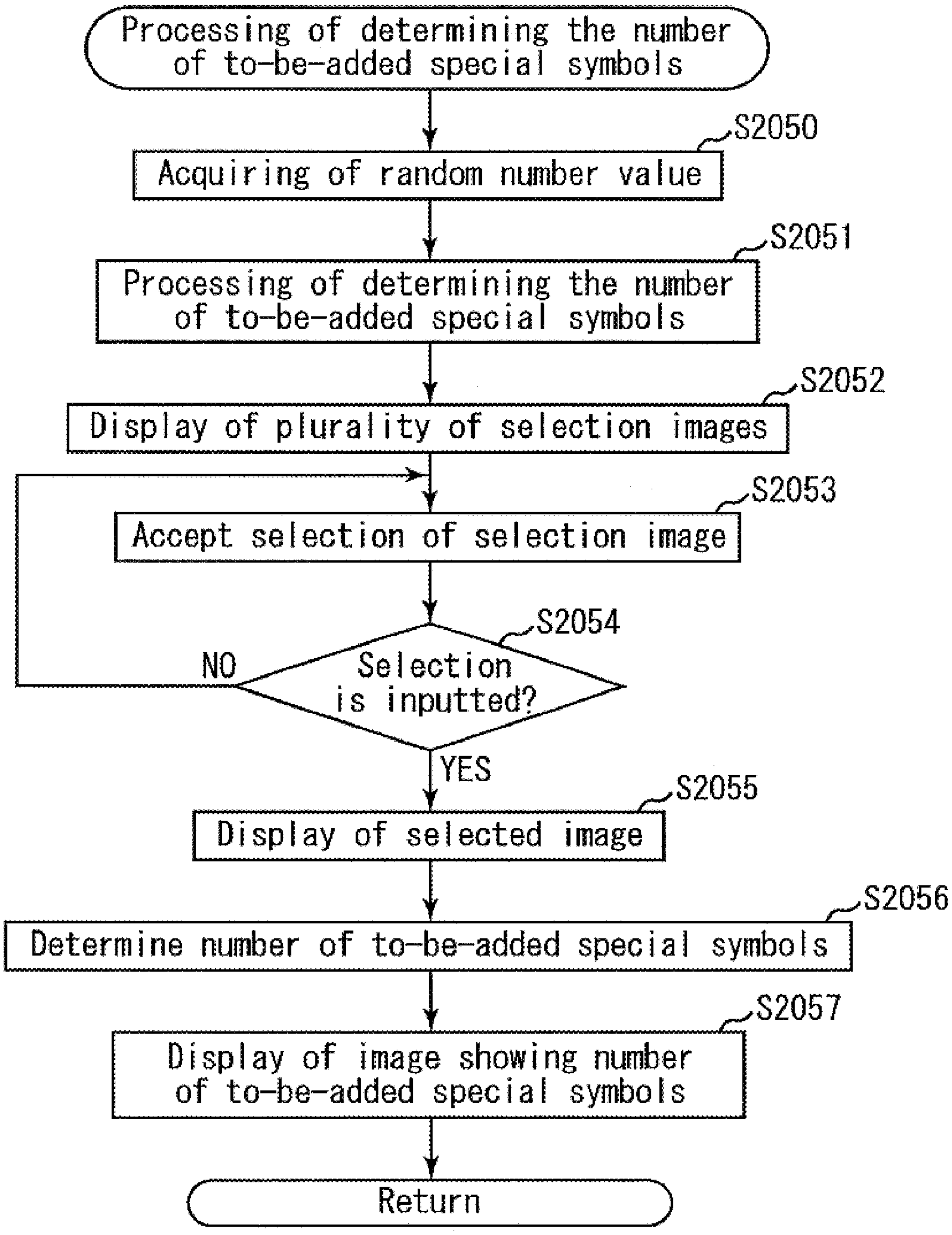
FIG. 68 is a flowchart showing a subroutine of processing of determining the number of to-be-added special symbols.

FIG. 68 is a flowchart showing a subroutine of processing of determining the number of the to-be-added special symbols.

First, the main CPU 2041 acquires random number values from the random number generator 2064 (step s2050). In this processing, the main CPU 2041 acquires five random number values corresponding to the respective selection images 2302 (the selection image 2302A, the selection image 2302B, the selection image 2302C, the selection image 2302D and the selection image 2302E (cf. FIG. 55A)).

Next, the main CPU 2041 determines the number of the to-be-added special symbols corresponding to each selection image 2302 (step s2051). In this processing, the main CPU 2041 determines the number of the to-be-added special symbols corresponding to each selection image 2302, based upon the random number value obtained in step s2050 and a table for determining the number of the to-be-added special symbols, which is shown in FIG. 69.

FIG. 69 is a view showing a table for determining the number of the to-be-added special symbols.

The table for determining the number of the to-be-added special symbols shows the correspondence relationship between the number of the to-be-added special symbols and the random number value.

For example, when random number values corresponding to the selection image 2302A, the selection image 2302B, the selection image 2302C, the selection image 2302D and the selection image 2302E are respectively 17235, 63123, 32387, 22332, and 3423, numbers of 20, 50, 30, 20 and 10 respectively correspond to the selection image 2302A, the selection image 2302B, the selection image 2302C, the selection image 2302D and the selection image 2302E, as the number of the to-be-added special symbols.

Next, the main CPU 2041 displays the selection image 2302A, the selection image 23028, the selection image 2302C, the selection image 2302D and the selection image 2302E to the lower part of the lower image display panel 2016 (step s2052). The main CPU 2041 then accepts the selection of the selection image 2302 made by the player (step s2053).

FIG. 55A is a view showing an exemplary image displayed to a lower image display panel provided in a slot machine according to one embodiment of the present invention.

As shown in FIG. 55A, a feature-game start image 2301 showing the start of the feature game is displayed to the center part of the lower image display panel 2016.

To the lower part of the lower image display panel 2016, five selection images 2302 (the selection image 2302A, the selection image 2302B, the selection image 2302C, the selection image 2302D, the selection image 2302E) are displayed. The player can select the selection image 2302 by touching the touch panel 2069 (cf. FIG. 57) provided on the lower image display panel 2016 with his or her finger or the like.

Next, the main CPU 2041 determines whether or not an input for selecting the selection image 2302 has been made (step s2054). In this processing, the main CPU 2041 determines whether or not to have received an input signal for selecting the selection image 2302 from the touch panel 2069. By the player touching a place in the vicinity of where the selection image 2302E is displayed, on the lower image display panel 2016 by his or her finger or the like, the input signal for selecting the selection image 2302E is transmitted from the touch panel 2069 to the main CPU 2041. When determining not to have received the input for selecting the selection image 2302, the main CPU 2041 returns the processing to step s2053.

On the other hand, when determining in step s2054 that the input for selecting the selection image 2302 has been made, the main CPU 2041 displays the selected image 2304 (step s2055).

FIG. 55B is a view showing an exemplary image displayed to a lower image display panel provided in a slot machine according to one embodiment of the present invention.

FIG. 55B is a view showing an exemplary image displayed to the lower image display panel in a case where the selection image 2302E is selected by the player.

When the selection image 2302E is selected by the player, as shown in FIG. 55B, the selected image 2304 is displayed at the position where the selection image 2302E has been displayed on the lower image display panel 2016. Further, at the positions where the selection images 2302 having not been selected had been displayed, non-selected images 2303 (the non-selected image 2303A, the non-selected image 2303B, the non-selected image 2303C, the non-selected image 2303D) are displayed.

Next, the main CPU 2041 determines the number of the to-be-added special symbols corresponding to the selection image 2302 selected by the player, as the number of the special symbols to be added (step s2056).

For example, in a case where 20, 50, 30, 20 and 10 as the number of the to-be-added special symbols respectively correspond to the selection image 2302A, the selection image 2302B, the selection image 2302C, the selection image 2302D and the selection image 2302E, and when the selection image 2302E is selected by the player, 10 is determined as the number of the to-be-added special symbols. Next, the main CPU 2041 displays the to-be-added number determination image 2305 showing the number of the to-be-added special symbols to the center part of the lower image display panel 2016 (step s2057).

FIG. 55C is a view showing an exemplary image displayed to the lower image display panel provided in a slot machine according to one embodiment of the present invention.

As shown in FIG. 55C, the to-be-added number determination image 2305 showing the number of the to-be-added wild symbols is displayed to the center part of the lower image display panel 2016. In FIG. 55C, the to-be-added number determination image 2305 shows that the wild symbols will be increased by ten. Further, the to-be-added number images 2306 (the to-be-added number image 2306A, the to-be-added number image 2306B, the to-be-added number image 2306C, the to-be-added number image 2306D) are displayed to the lower part of the lower image display panel 2016, each showing the number of the wild symbols which would have been increased if another selection image 2302 had been selected. The to-be-added number image 2306A, the to-be-added number image 2306B, the to-be-added number image 2306C and the to-be-added number image 2306D respectively show that the wild symbols would have been increased by 20, 50, 30 and 20, if the selection image 2302 displayed in the corresponding place had been selected.

The to-be-added number image 2305 corresponds to the image showing the number of the to-be-added special symbols in the present invention.

After executing the processing of step s2057, the main CPU 2041 completes the present subroutine.

In the present embodiment, the case has been described where the number of the to-be-added special symbols corresponding to each selection image 2302 is determined based upon the acquired random number value and the table for determining the number of the to-be-added special symbols, which is shown in FIG. 69. However, in the present invention, the number of the to-be-added special symbols corresponding to each selection image 2302 may be previously determined.

Figure 70:
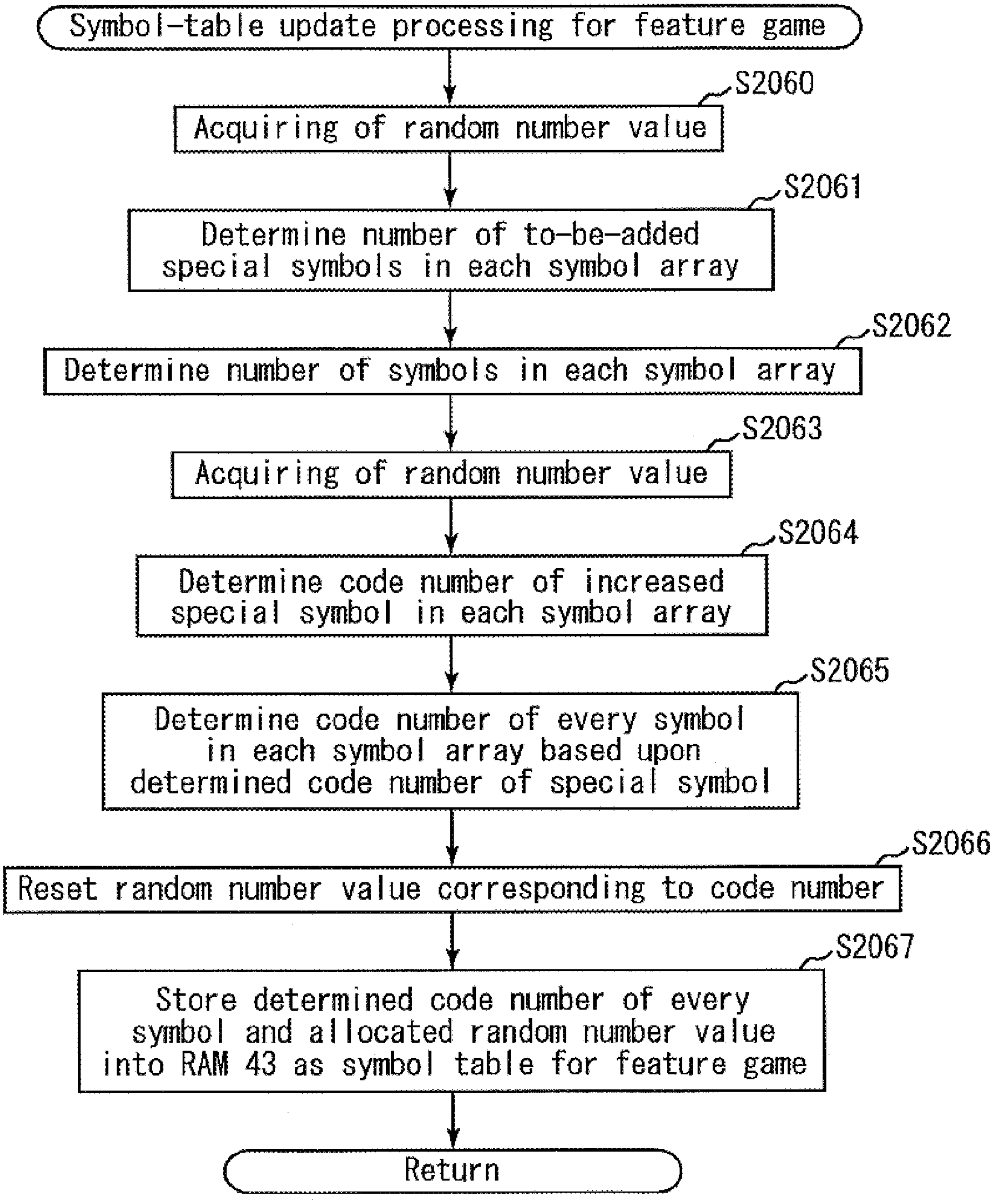
FIG. 70 is a flowchart showing a subroutine of symbol-table update processing for a feature game.

FIG. 70 is a flowchart showing a subroutine of symbol-table update processing for a feature game.

First, the main CPU 2041 acquires random number values from the random number generator 2064 (step s2060). In this processing, the main CPU 2041 acquires random number values in the same number as the number of the to-be-added special symbols, which is determined in step s2056.

Next, the main CPU 2041 determines the number of the to-be-added special symbols in each symbol array (step s2061). In this processing, the main CPU 2041 determines the number of the to-be-added special symbols in each symbol array, based upon the random number value acquired in step s2060 and the symbol-array determination table shown in FIG. 71.

FIG. 71 is a view showing the symbol-array determination table.

The symbol-array determination table shows the correspondence relationship between the symbol array No. and the random number value. It is to be noted that a symbol array No. 1 shows the first column of the display blocks 2028, a symbol array No. 2 shows the second column of the display blocks 2028, a symbol array No. 3 shows the third column of the display blocks 2028, a symbol array No. 9 shows the fourth column of the display blocks 2028, and a symbol array No. 5 shows the fifth column of the display blocks 2028.

For example, when the random number values acquired in step s2060 are 2313, 3123, 12382, 17325, 28768, 30223, 45235, 48766, 58776 and 62356, the number of the to-be-added special symbols in the symbol array No. 1 (the first column) is three, the number of the to-be-added special symbols in the symbol array No. 2 (the second column) is one, the number of the to-be-added special symbols in the symbol array No. 3 (the third column) is two, the number of the to-be-added special symbols in the symbol array No. 4 (the fourth column) is two, and the number of the to-be-added special symbols in the symbol array No. 5 (the fifth column) is two.

In the present embodiment, the case has been described where the number of special symbols to be added to each symbol array is determined based upon the acquired random number value and the symbol-array determination table shown in FIG. 71. However, in the present invention, the number of special symbols to be added to each symbol array may be previously determined according to each of the numbers of to-be-added special symbols, which is to be determined in the processing of determining the number of the to-be-added special symbols.

Next, the main CPU 2091 determines the number of symbols in each symbol array (step s2062). In this processing, the main CPU 2041 determines a total number of symbols in each symbol array based upon the number of the to-be-added special symbols, which has been determined in step s2061. Specifically, the total number of symbols in each symbol array is a numeric value obtained by adding 20 as the number of symbols in each symbol array shown by the symbol table for a normal game, to the number of the to-be-added special symbols in each symbol array, which has been determined in step s2061.

Next, the main CPU 2091 acquires random number values from the random number generator 2064 (step s2063). In this processing, the main CPU 2041 acquires random number values in the same number as the number of the to-be-added special symbols in each symbol array, which has been determined in step s2061. Namely, when the number of the to-be-added special symbols in the symbol array No. 1 (the first column) is three, the main CPU 2041 acquires three random number values for the symbol array No. 1 (the first column).

Next, the main CPU 2091 determines a code number of the special symbol to be added to each symbol array, based upon the random number value acquired in step s2063 (step s2064). In this processing, the main CPU 2041 determines a code number of the special symbol to be added to each symbol array based upon the random number value acquired in step s2063 and a code-number determination table shown in FIG. 72.

FIG. 72 is a view showing the code-number determination table.

The code-number determination table shows the correspondence relationship between the code number and the random number value.

For example, in a case where the random number values of the symbol array No. 1 (the first column) are 40567, 63535 and 65323, the code numbers are determined to be "13", "End" and "End".

In the present embodiment, the case has been described where a code number of the special symbol to be added to each symbol array is determined based upon the acquired random number value and the code-number determination table shown in FIG. 72. However, in the present invention, a code number of the special symbol to be added may be previously determined for each symbol array.

Next, the main CPU 2091 determines a code number of every symbol in each symbol array based upon the code number of the special symbol determined in step s2069 (step s2065). In this processing, based upon the code number of the special symbol determined in step s2064, the special symbol is added to each symbol array shown by the symbol table for a normal game in FIG. 59. For example, in a case where "13", "End" and "End" are determined in step s2064 as the code numbers of the special symbols to be added to the symbol array No. 1 (the first column), the wild symbol of "WILD" as the special symbol is added to code No. 13 in the symbol array No. 1 (the first column) shown in the symbol table for a normal game, and "FLOWER 2" originally corresponding to code No. 13 is displaced to code No. 14. In the same manner, each symbol is displaced from its original code number. Further, since there are two special symbols determined to have the code number of "End", the symbols of "WILD" are added to code No. 21 and code No. 22 as the ends of the symbol array No. 1 (the first column). In the same manner, a code number of every symbol in each of the other symbol arrays is determined.

The main CPU 2041 resets the random number values corresponding to the code numbers of each symbol array (step s2066). In this processing, the main CPU 2041 resets the correspondence relationship between the respective random number values from 0 to 65535 and the code numbers, based upon the total number of symbols in each symbol array which has been determined in step s2062.

The main CPU 2041 stores the correspondence relationship between the code number of every symbol in each symbol array, which has been determined in step s2065, and the random number value corresponding to the code number of each symbol array, which has been determined in step s2066, into the RAM 2043 as the symbol table for a feature game (step s2067). The symbol table for a feature game stored in the RAM 2043 is referred to in executing the symbol determination processing for a feature game.

FIGS. 73A and 73B each are an example of the symbol table for a feature game, which shows the correspondence relationship among each symbol in each symbol array of the display blocks, the code number and the random number value.

In FIG. 73A, the wild symbols are added to code Nos. 13, 21 and 22 of the symbol array No. 1 (the first column). Further, the wild symbol is added to code No. 12 of the symbol array No. 2 (the second column). Furthermore, the wild symbols are added to code Nos. 6 and 13 of the symbol array No. 3 (the third column). Further, in FIG. 73B, the wild symbols are added to code Nos. 11 and 12 of the symbol array No. 4 (the fourth column). Moreover, the wild symbols are added to code Nos. 19 and 20 of the symbol array No. 5 (the fifth column).

After executing the processing of step s2067, the main CPU 2041 completes the present subroutine.

Figure 74:
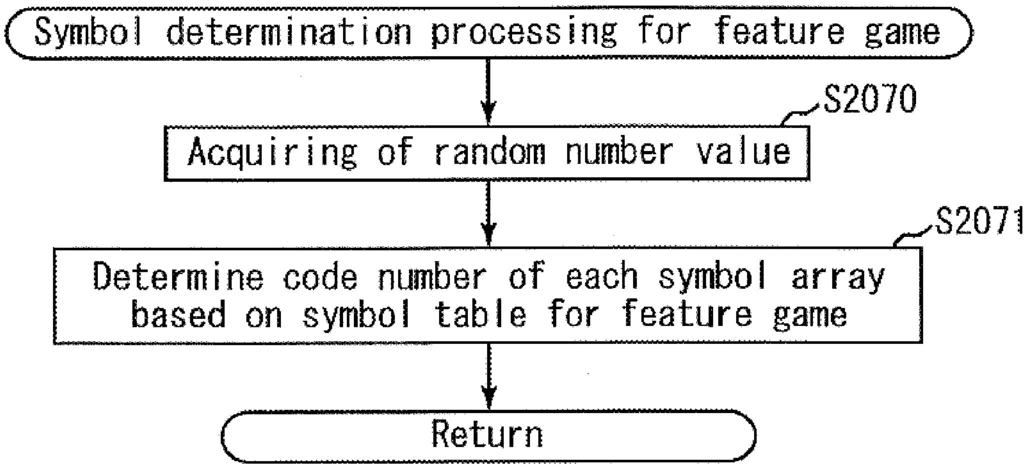
FIG. 74 is a flowchart showing a subroutine of symbol determination processing for a feature game.

FIG. 74 is a flowchart showing a subroutine of the symbol determination processing for a feature game.

This processing is processing performed by the main CPU 2041 executing the symbol determination program stored in the RAM 2043.

First, the main CPU 2041 acquires random number values from the random number generator 2064 (step s2070). In this processing, the main CPU 2041 acquires five random number values corresponding to the respective symbol arrays of the display blocks 2028.

Next, the main CPU 2091 determines a code number at stopping the symbols in each symbol array of the display blocks 2028, based upon the acquired five random number values and the symbol table for a feature game (step s2071). For example, in a case where the random number value of the first array is "23035", the number of "08" is determined as the code number of the first array. It should be noted that a code number of a symbol array corresponds to a code number of a symbol rearranged in the first array of the display blocks 2028 out of the four columns arrayed in the display blocks 2028.

After executing the processing of step s2071, the main CPU 2041 completes the present subroutine.

In the present embodiment, the case has been described where the random number generator 2064 is provided and a random number is extracted from the random number generator (a case of using a so-called hardware random number). However, in the present invention, a random number may be generated on the program (a case of using a so-called software random number).

Figure 75:
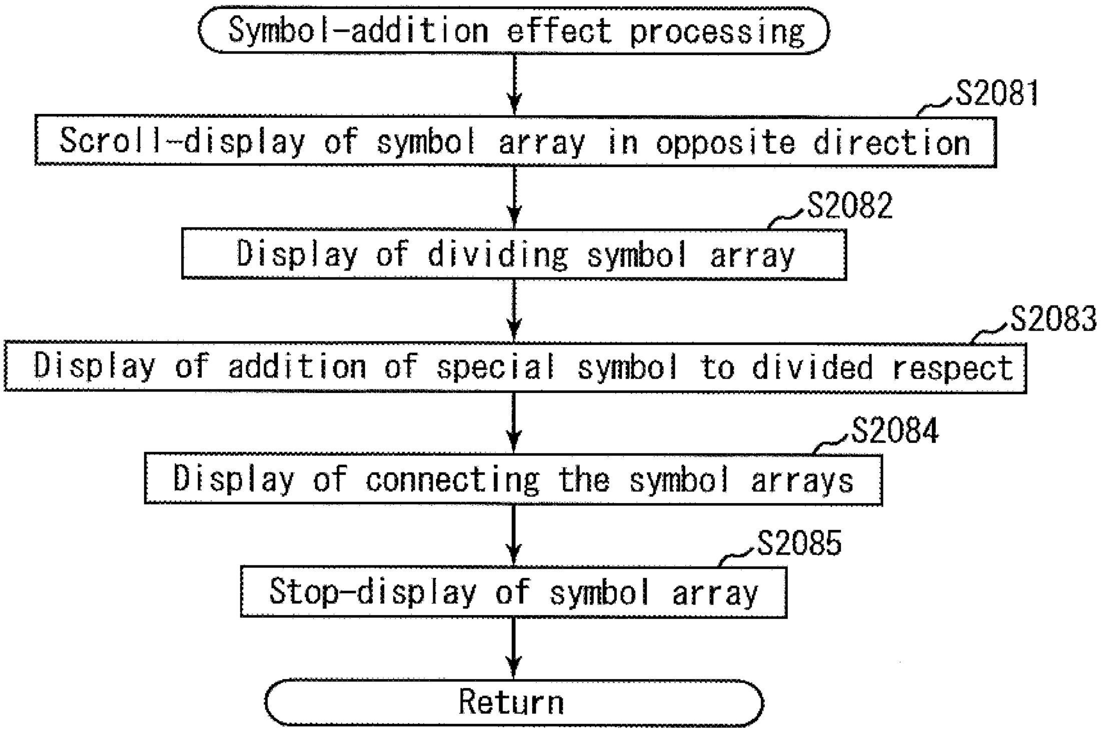
FIG. 75 is a flowchart showing a subroutine of symbol-addition effect processing.

FIG. 75 is a flowchart showing a subroutine of the symbol-addition effect processing.

FIGS. 76A to 76F are views each showing an exemplary image displayed to the lower image display panel provided in the slot machine according to one embodiment of the present invention.

Figure 76A:
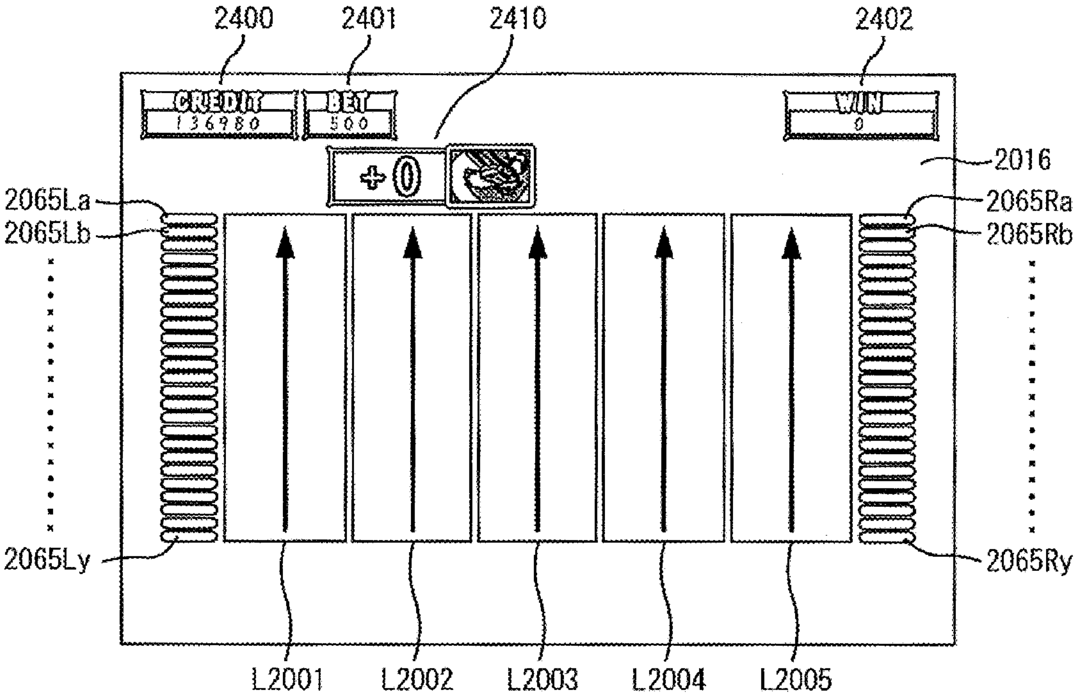
FIG. 76A is a view showing an exemplary image displayed to the lower image display panel provided in the slot machine according to one embodiment of the present invention.

First, in step s2081, the main CPU 2041 scroll-displays the symbol arrays L2001 to L2005 in the direction from the bottom to the top, namely, the direction opposite to the scrolling direction in the normal game (cf. FIG. 76A). This scroll-display in the opposite direction is conducted at a lower speed than that of the scroll-display in the normal game. It is to be noted that the symbol array L2001 corresponds to the leftmost column of the display blocks 2028.

As shown in FIG. 76A, the symbol arrays L2001 to L2005 are scroll-displayed in the direction from the bottom to the top, namely, the direction opposite to the scrolling direction in the normal game. This scroll-display in the opposite direction is conducted at a lower speed than that of the scroll-display in the normal game. Further, a display portion 410 of the number of the to-be-added wild symbols is displayed in the vicinity of the upper center of the lower image display panel 2016. To the display portion 410 of the number of the to-be-added wild symbols, "0" is displayed indicating that the number of the added wild symbols is 0.

Figure 76B:
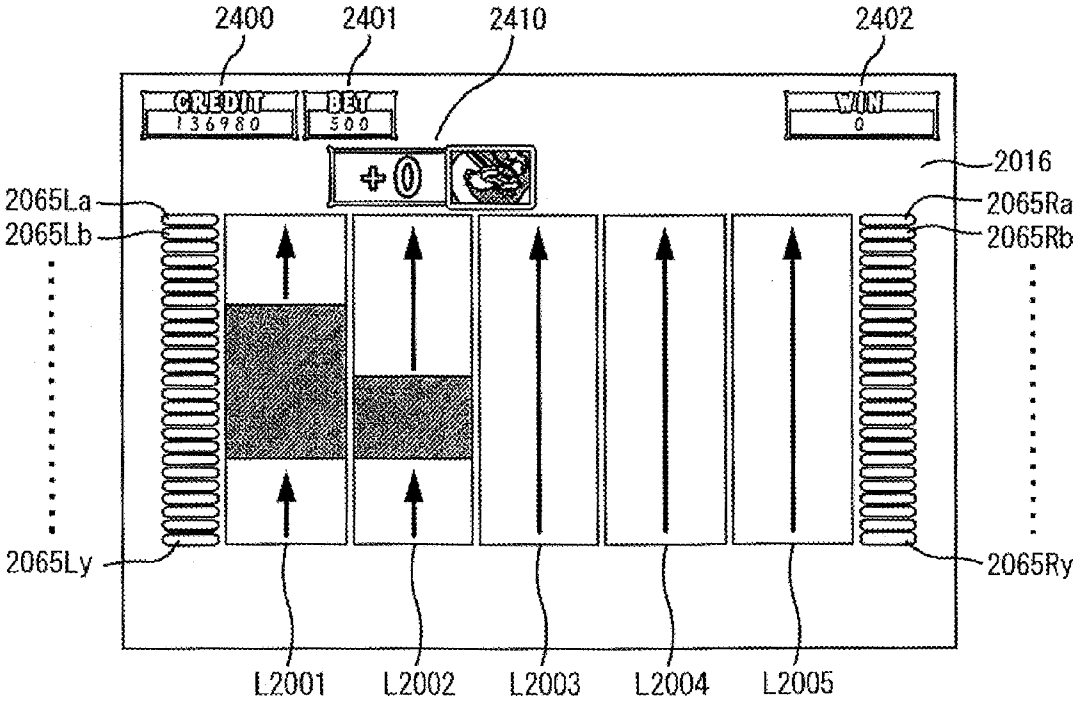
FIG. 76B is a view showing an exemplary image displayed to the lower image display panel provided in the slot machine according to one embodiment of the present invention.

Next, in step s2082, the main CPU 2041 conducts a display of dividing the symbol array L (cf. FIG. 76B). In this processing, the main CPU 2041 conducts a display of dividing the symbol array L between the symbol of the code number determined in step s2064 of FIG. 70 and the symbol of a code number smaller than the determined code number by one. For example, when determining to add the wild symbol to code No. 13 of the symbol array L2001, the main CPU 2041 conducts a display of dividing the symbol array L2001 between the symbol "FLOWER 2" of code No. 13 and the symbol "10" of code No. 12.

As shown in FIG. 76B, the display of dividing the symbol array L is conducted on the lower image display panel 2016. In FIG. 66B, a state of dividing the symbol array L2001 and the symbol array L2002 is displayed.

Figure 76C:
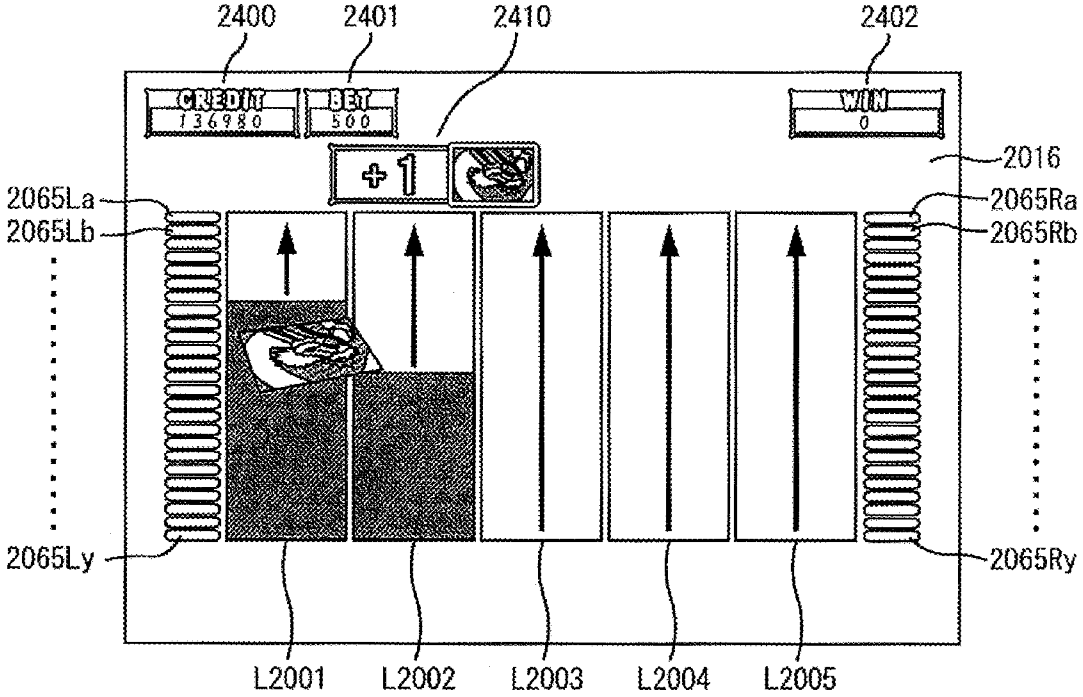
FIG. 76C is a view showing an exemplary image displayed to the lower image display panel provided in the slot machine according to one embodiment of the present invention.
Figure 76D:
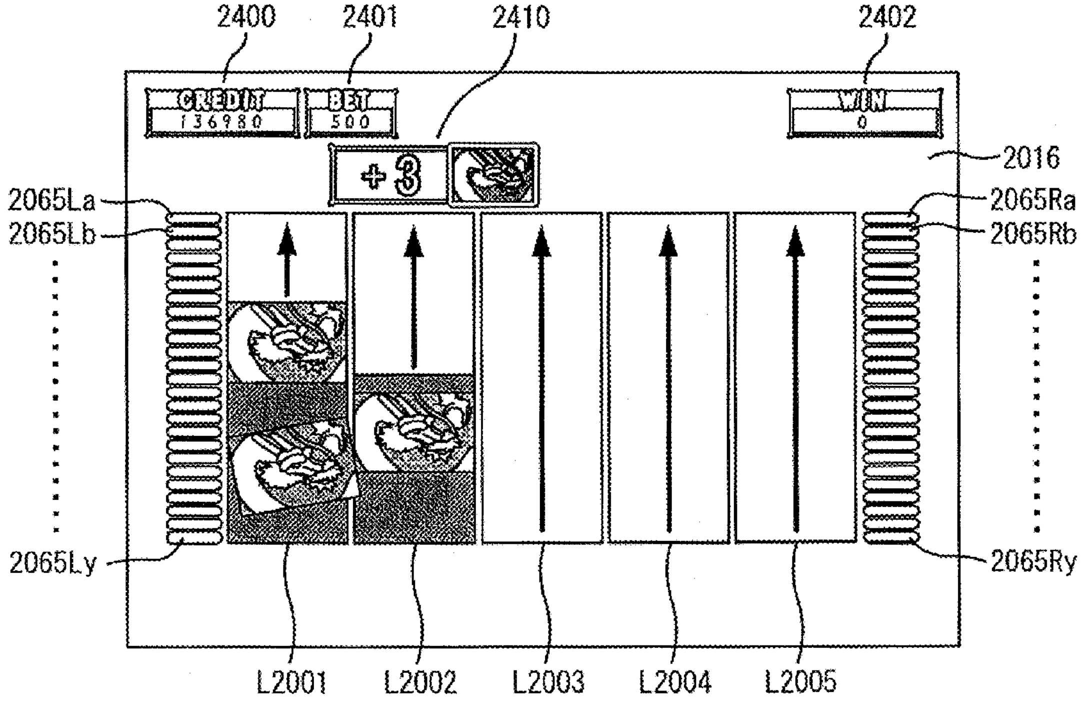
FIG. 76D is a view showing an exemplary image displayed to the lower image display panel provided in the slot machine according to one embodiment of the present invention.

Next, in step s2083, the main CPU 2041 displays addition of the wild symbol to the divided respect (cf. FIGS. 76C and 76D). As shown in FIGS. 76C and 76D, states of adding the wild symbols to the divided respects of the symbol arrays are displayed. In FIG. 76C, "1" is displayed in the display portion 410 of the number of the to-be-added wild symbols, indicating that the number of the added wild symbols is one. In FIG. 76D, "3" is displayed in the display portion 410 of the number of the to-be-added wild symbols, indicating that the number of the added wild symbols is 3.

Figure 76E:
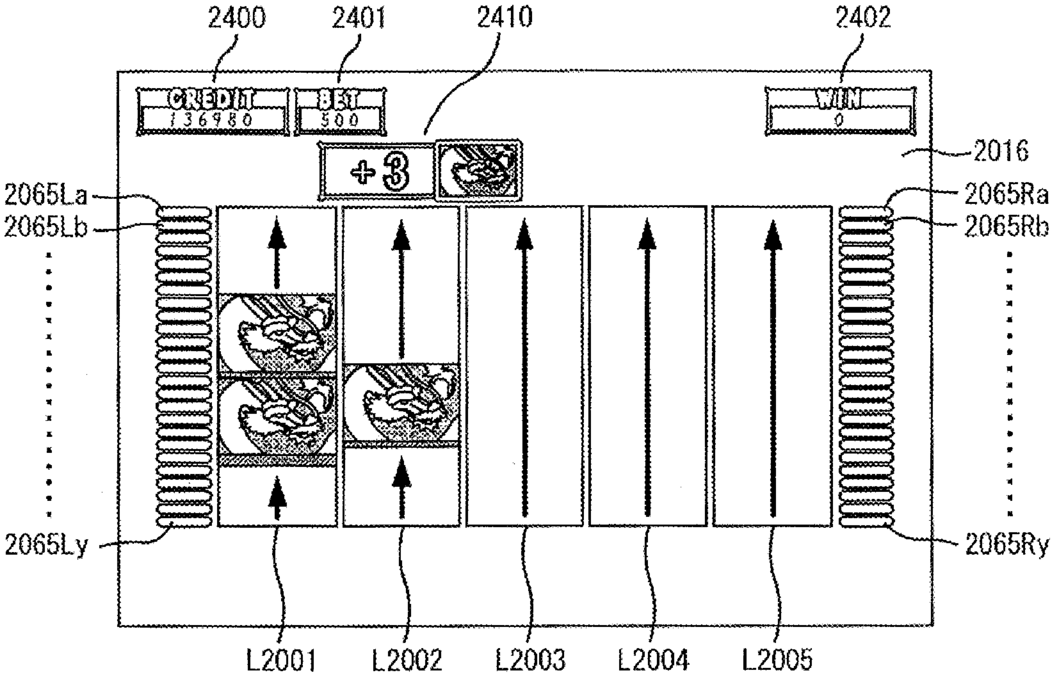
FIG. 76E is a view showing an exemplary image displayed to the lower image display panel provided in the slot machine according to one embodiment of the present invention.
Figure 76F:
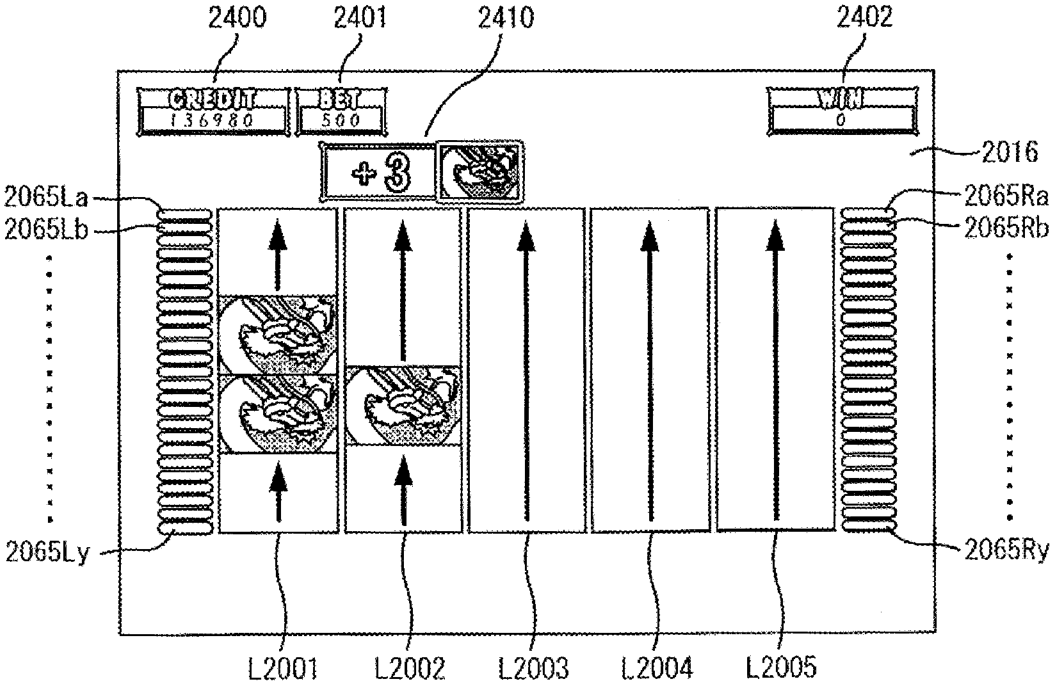
FIG. 76F is a view showing an exemplary image displayed to the lower image display panel provided in the slot machine according to one embodiment of the present invention.

Next, in step s2084, the main CPU 2041 conducts a display of connecting the symbol arrays L (cf. FIGS. 76E and 76F). As shown in FIGS. 76E and 76F, the display of connecting the divided symbol arrays is conducted.

Next, in step s2085, the main CPU 2041 stop-displays the scroll-display (scroll-display in the direction opposite to the direction in the normal game) of the symbol sequences L2001 to L2005, and completes the present subroutine.

As thus described, according to the slot machine 2010 and the control method thereof in the present embodiment, the normal game is executed in which symbols including a wild symbol are variably displayed and then stop-displayed to the lower image display panel 2016, and game media are paid out in an amount corresponding to the stop-displayed symbol or a combination of the stop-displayed symbols. The number of the to-be-added wild symbols, which can be displayed to the lower image display panel 2016, is then determined based upon an input from the touch panel 2069 when three or more feature symbols are stop-displayed in the normal game. Thereafter, the special game is executed in which symbols including the increased wild symbols are variably displayed and then stop-displayed to the lower image display panel 2016, and game media are paid out in an amount corresponding to the stop-displayed symbol or a combination of the stop-displayed symbols.

Since the number of wild symbols is increased, not the number of normal symbols, it is possible to make the player have expectations, and to provide a more attractive game.

Further, since the number of the to-be-added wild symbols is determined based upon an input from the touch panel 2069, it is possible to give the player an impression that the number of wild symbols has been increased by the player's input, so as to make the player more absorbed in the game.

According to the slot machine 2010 and the control method thereof in the present embodiment, when three or more feature symbols are stop-displayed in the normal game, a plurality of selection images 2302 are displayed to the lower image display panel 2016, and the number of the to-be-added wild symbols which can be displayed to the lower image display panel 2016 is determined based upon the input from the touch panel 2069, the input indicating selection of a single selection image 2302 out of the plurality of selection images 2302.

Since the number of the to-be-added wild symbols is determined based upon the input from the touch panel 2069, the input indicating selection of a single selection image 2302 out of the plurality of selection images 2302, it is possible to give the player an impression that the number of the wild symbols has been increased by the player's selection, so as to make the player more absorbed in the game.

Further, the number of the wild symbols is increased by a simple method of selecting a single selection image 2302 from the plurality of selection images 2302, thereby allowing a variety of players to play games without having feelings of discomfort.

According to the slot machine 2010 and the control method thereof in the present embodiment, the to-be-added number determination image 2305 indicative of the determined number of the to-be-added wild symbols is displayed to the lower image display panel 2016. Accordingly, it is possible to notify the player of the number of the to-be-added wild symbols, so as to give the player an impression that the number of the wild symbols is increased. Further, in a case where the to-be-added number is large, it is possible to have the player excited.

In the present embodiment, the case where the number of pay lines 2300 is 25 has been described. However, the number of pay lines is not particularly limited in the present invention, and for example, it may be 30.

In the present embodiment, the case where the special symbol is the wild symbol has been described. However, the kind of the special symbol is not limited in the present invention, and for example, the special symbol may be the feature symbol. Further, for example, there may be two kinds of special symbols of the wild symbol and the feature symbol. In this case, when the feature game is executed, the numbers of the wild symbols and the feature symbols as the special symbols are increased, and therefore, it is possible to have the player more excited compared with the case where only the number of the wild symbols is increased.

In the present embodiment, the case has been described where the predetermined condition is that three or more feature symbols are rearranged. However, the predetermined condition in the present invention is not particularly limited.

Examples of the predetermined condition may include the elapse of the predetermined time period after completion of the previous feature game. Further, the examples may also include that the number of times of the executed normal games after the completion of a previous feature game has reached a predetermined number of times.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A slot machine comprising:

a symbol display capable of variably displaying a plurality of symbols; and a controller, said controller programmed to perform the processing steps of:

(A) executing a normal game, in which said plurality of symbols are variably displayed and then stop-displayed to said symbol display after a bet of game media, and game media are paid out in an amount corresponding to a stop-displayed symbol or a combination of stop-displayed symbols;

(B) executing a first specific number of free games, when a first predetermined condition is established in the normal game executed in said processing step (A), said free game being executed without a bet of game media;

(C) executing a second specific number of free games, when a second predetermined condition different from said first predetermined condition is established;

(D) executing a third specific number of free games after executing said processing step (C), when said first predetermined condition is established before completing the execution of said processing step (C), said third specific number being larger than said first specific number; and (E) counting a number of maximum bet games, which is a number of normal games executed with the bet of game media at a predetermined maximum bet number; and wherein the third specific number is based on the number of maximum bet games counted in said processing step (E).

2. The slot machine according to claim 1, wherein said processing step (B) is the processing step of executing the first specific number of free games, in which said plurality of symbols are variably displayed and then stop-displayed to said symbol display, and game media are paid out in an amount corresponding to a stop-displayed symbol or a combination of stop-displayed symbols in a free game without the bet of game media, when a first predetermined condition is established in the normal game executed in said processing step (A), wherein the first predetermined condition is a stop-display of the symbols in a predeterminded stopped state, and said processing step (D) is the processing step of executing a third specific number of free games after executing said processing step (C), when the symbols are stop-displayed in said predetermined stopped state in said free game before completing the execution of said processing step (C), the third specific number being larger than said first specific number.

3. The slot machine according to claim 2, wherein said controller is further programmed to perform the processing steps of:

(F) counting a number of normal games executed in said processing step (A), and said processing step (C) is the processing step of executing the second specific number of free games, when the number of the normal games counted in said processing step (F) has reached a prescribed number.

4. The slot machine according to claim 3, wherein said processing step (A) is the processing step of executing the normal game, in which said plurality of symbols are scroll-displayed and then stop-displayed to said symbol display after the bet of game media in a number equal to or less than the predetermined maximum bet number, and game media are paid out in an amount corresponding to the stop-displayed symbol or a combination of the stop-displayed symbols.

5. The slot machine according to claim 3, wherein said controller is further programmed to perform the processing steps of:

(G) shifting a mode from a non-insurance mode to an insurance mode on condition that a predetermined number of game media has been inserted, and said processing step (F) is the processing step of counting the number of the normal games executed in said insurance mode in said processing step (A).

6. A slot machine comprising:

a symbol display capable of variably displaying symbols, including a special symbol; and a controller, said controller programmed to perform the processing steps of:

(A) executing a normal game, in which said symbols, including said special symbol, are variably displayed and then stop-displayed to said symbol display after a bet of game media, and game media are paid out in an amount corresponding to a stop-displayed symbol or a combination of stop-displayed symbols;

(B) executing a normal free game, in which said symbols including said special symbol, are variably displayed and then stop-displayed to said symbol display, and game media are paid out in an amount corresponding to a stop-displayed symbol or a combination of stop-displayed symbols, when a first predetermined condition is established in the normal game executed in said processing step (A), said normal free game being executed without the bet of game media;

(C) determining a payout of a predetermined amount of game media and executing a special free game, in which said symbols, including said special symbol, are variably displayed and then stop-displayed to said symbol display, and game media are paid out in an amount corresponding to a stop-displayed symbol or a combination of stop-displayed symbols, when a second predetermined condition different from said first predetermined condition is established, said special free game being executed without the bet of game media and being more advantageous than said normal free game; and (D) increasing a number of said special symbol that can be displayed to said symbol display, when the second predetermined condition different from said first predetermined condition is established.

7. The slot machine according to claim 6, wherein said controller is further programmed to perform the processing steps of:

(E) counting a number of normal games executed in said processing step (A), and said processing step (C) is the processing step of determining the payout of the predetermined amount of game media and executing the special free game when the number of the counted normal games has reached a prescribed number, the special free game being executed without the bet of game media and being more advantageous than said normal free game.

8. The slot machine according to claim 6, wherein said processing step (B) is the processing step of executing a first specific number of normal free games when a first predetermined condition is established in the normal game executed in said processing step (A), said normal free game being executed without the bet of game media, and said processing step (C) is the processing step of determining a payout of a predetermined amount of game media and executing a second specific number of special free games, when a second predetermined condition different from said first predetermined condition is established, said second specific number being larger than said first specific number.

9. The slot machine according to claim 8, wherein said processing step (B) is the processing step of executing the first specific number of normal free games, in which said symbols including said special symbol, are variably displayed and then stop-displayed to said symbol display without the bet of game media, and game media are paid out in an amount corresponding to a stop-displayed symbol or a combination of stop-displayed symbols, when the first predetermined condition is established in the normal game executed in said processing step (A), wherein the first predetermined condition is a stop-display of the symbols in a predetermined stopped state.

10. The slot machine according to claim 6, wherein the first predetermined condition is a stop-display of the symbols in a predetermined stopped state.

11. A slot machine comprising:

a symbol display capable of variably displaying a plurality of symbols; and a controller, said controller programmed to perform the processing steps of:

(A) executing a normal game, in which said plurality of symbols are scroll-displayed and then stop-displayed to said symbol display after a bet of game media in a number equal to or less than a predetermined maximum bet number, and game media are paid out in an amount corresponding to a stop-displayed symbol or a combination of stop-displayed symbols;

(B) executing a first specific number of free games, in which said plurality of symbols are variably displayed and then stop-displayed to said symbol display, and game media are paid out in an amount corresponding to a stop-displayed symbol or a combination of stop-displayed symbols in a free game without the bet of game media, when a first predetermined condition is established in the normal game executed in said processing step (A), said free game being executed without a bet of game media, wherein the first predetermined condition is a stop-display of the symbols in a predetermined stopped state;

(C) executing a second specific number of free games, when a second predetermined condition different from said first predetermined condition is established;

(D) executing a third specific number of free games after executing said processing step (C), when said first predetermined condition of stop-display of the symbols in said predetermined stopped state is established in a free game before completing the execution of said processing step (C), said third specific number being larger than said first specific number;

(E) counting a number of normal games executed in said processing step (A); and (F) counting a number of maximum bet games, which is a number of normal games executed with the bet of game media at the predetermined maximum bet number;

wherein the second predetermined condition occurs when the number of the normal games counted in said processing step (E) has reached a prescribed number; and wherein the third specific number is based on the number of maximum bet games counted in said processing step (F).

12. A slot machine comprising:

a symbol display capable of variably displaying symbols, including a special symbol; and a controller, said controller programmed to perform the processing steps of:

(A) executing a normal game, in which said symbols, including said special symbol, are variably displayed and then stop-displayed to said symbol display after a bet of game media, and game media are paid out in an amount corresponding to a stop-displayed symbol or a combination of stop-displayed symbols;

(B) executing a normal free game, in which said symbols, including said special symbol, are variably displayed and then stop-displayed to said symbol display, and game media are paid out in an amount corresponding to a stop-displayed symbol or a combination of stop-displayed symbols, when a first predetermined condition is established in the normal game executed in said processing step (A), said normal free game being executed without the bet of game media, wherein the first predetermined condition is a stop-display of the symbols in a predetermined stopped state;

(C) determining a payout of a predetermined amount of game media and executing a special free game, in which said symbols, including said special symbol, are variably displayed and then stop-displayed to said symbol display, and game media are paid out in an amount corresponding to a stop-displayed symbol or a combination of stop-displayed symbols, when a second predetermined condition different from said first predetermined condition is established, said special free game being executed without the bet of game media and being more advantageous than said normal free game; and (D) increasing a number of said special symbol that can be displayed to said symbol display, when the second predetermined condition different from said first predetermined condition is established.

* * * * *